(12) United States Patent
Reimer

(10) Patent No.: US 10,909,474 B2
(45) Date of Patent: Feb. 2, 2021

(54) TRIGGERING AN AUTOMATIC CREATION OF AN EVENT STAMP

(71) Applicant: PROXIMITY GRID, INC., San Jose, CA (US)

(72) Inventor: John H. Reimer, San Jose, CA (US)

(73) Assignee: Proximity Grid, Inc., San Jose, CA (US)

( * ) Notice: Subject to any disclaimer, the term of this patent is extended or adjusted under 35 U.S.C. 154(b) by 0 days.

(21) Appl. No.: 16/134,395

(22) Filed: Sep. 18, 2018

(65) Prior Publication Data

US 2019/0034832 A1  Jan. 31, 2019

Related U.S. Application Data

(63) Continuation-in-part of application No. 15/265,806, filed on Sep. 14, 2016, which is a continuation-in-part
(Continued)

(51) Int. Cl.
| | |
|---|---|
| *H04W 4/18* | (2009.01) |
| *H04W 4/02* | (2018.01) |
| *G06Q 10/06* | (2012.01) |
| *G06N 3/08* | (2006.01) |
| *G06N 20/00* | (2019.01) |
| *G06Q 30/06* | (2012.01) |
| *G06F 16/432* | (2019.01) |
| *G06F 16/487* | (2019.01) |
| *G06F 16/48* | (2019.01) |
| *G06F 16/438* | (2019.01) |
| *H04L 29/08* | (2006.01) |

(Continued)

(52) U.S. Cl.
CPC ........... *G06N 20/00* (2019.01); *G06F 16/433* (2019.01); *G06F 16/4387* (2019.01); *G06F 16/487* (2019.01); *G06F 16/489* (2019.01); *G06N 3/08* (2013.01); *G06Q 10/0637* (2013.01); *G06Q 30/0252* (2013.01); *G06Q 30/0255* (2013.01); *G06Q 30/06* (2013.01); *H04L 67/22* (2013.01); *H04W 4/02* (2013.01); *H04W 4/023* (2013.01); *H04W 4/185* (2013.01); *G06F 16/9537* (2019.01); *G06Q 30/0631* (2013.01); *H04L 67/18* (2013.01); *Y10S 707/912* (2013.01); *Y10S 707/913* (2013.01); *Y10S 707/918* (2013.01); *Y10S 707/99931* (2013.01); *Y10S 707/99933* (2013.01)

(58) Field of Classification Search
None
See application file for complete search history.

(56) References Cited

U.S. PATENT DOCUMENTS

2015/0258416 A1* 9/2015 Ianni ................. G06K 9/00342
                                                       700/91

\* cited by examiner

*Primary Examiner* — Idowu O Osifade
(74) *Attorney, Agent, or Firm* — David Lewis

(57) ABSTRACT

A method and system is disclosed in which information related to an orientation or motion pattern of a mobile device system is detected. A determination is made whether the orientation information detected corresponds to a predetermined motion pattern or orientation for collecting event stamp information. The event stamp information may include a location and/or other event information. If the detected orientation and/or motion patterns is detected, the event stamp information is automatically collected in response to the determination, and the event stamp information is is at least temporarily stored.

20 Claims, 74 Drawing Sheets

Related U.S. Application Data of application No. 13/663,318, filed on Oct. 29, 2012, now Pat. No. 9,767,418, which is a continuation-in-part of application No. 12/803,766, filed on Jul. 6, 2010, now Pat. No. 8,356,005, which is a continuation of application No. 11/490,905, filed on Jul. 21, 2006, now Pat. No. 7,761,400, application No. 16/134,395, filed on Sep. 18, 2018, which is a continuation-in-part of application No. 15/265,821, filed on Sep. 14, 2016, which is a continuation-in-part of application No. 13/663,318, filed on Oct. 29, 2012, now Pat. No. 9,767,418, which is a continuation-in-part of application No. 12/803,766, filed on Jul. 6, 2010, now Pat. No. 8,356,005, which is a continuation of application No. 11/490,905, filed on Jul. 21, 2006, now Pat. No. 7,761,400, application No. 16/134,395, filed on Sep. 18, 2018, which is a continuation-in-part of application No. 15/265,841, filed on Sep. 14, 2016, which is a continuation-in-part of application No. 13/663,318, filed on Oct. 29, 2012, now Pat. No. 9,767,418, which is a continuation-in-part of application No. 12/803,766, filed on Jul. 6, 2010, now Pat. No. 8,356,005, which is a continuation of application No. 11/490,905, filed on Jul. 21, 2006, now Pat. No. 7,761,400, application No. 16/134,395, filed on Sep. 18, 2018, which is a continuation-in-part of application No. 15/705,216, filed on Sep. 14, 2017, now abandoned, application No. 16/134,395, filed on Sep. 18, 2018, which is a continuation-in-part of application No. 16/025,856, filed on Jul. 2, 2018, now Pat. No. 10,390,212, which is a continuation-in-part of application No. 15/265,854, filed on Sep. 15, 2016, now Pat. No. 10,015,630.

(60) Provisional application No. 60/701,551, filed on Jul. 22, 2005, provisional application No. 62/394,752, filed on Sep. 14, 2016, provisional application No. 62/560,147, filed on Sep. 18, 2017, provisional application No. 62/565,038, filed on Sep. 28, 2017, provisional application No. 62/560,147, filed on Sep. 18, 2017, provisional application No. 62/567,140, filed on Oct. 2, 2017, provisional application No. 62/574,169, filed on Oct. 18, 2017, provisional application No. 62/579,110, filed on Oct. 30, 2017, provisional application No. 62/580,656, filed on Nov. 2, 2017, provisional application No. 62/585,812, filed on Nov. 14, 2017, provisional application No. 62/591,398, filed on Nov. 28, 2017, provisional application No. 62/596,351, filed on Dec. 8, 2017, provisional application No. 62/596,399, filed on Dec. 8, 2017.

(51) Int. Cl.
*G06Q 30/02* (2012.01)
*G06F 16/9537* (2019.01)

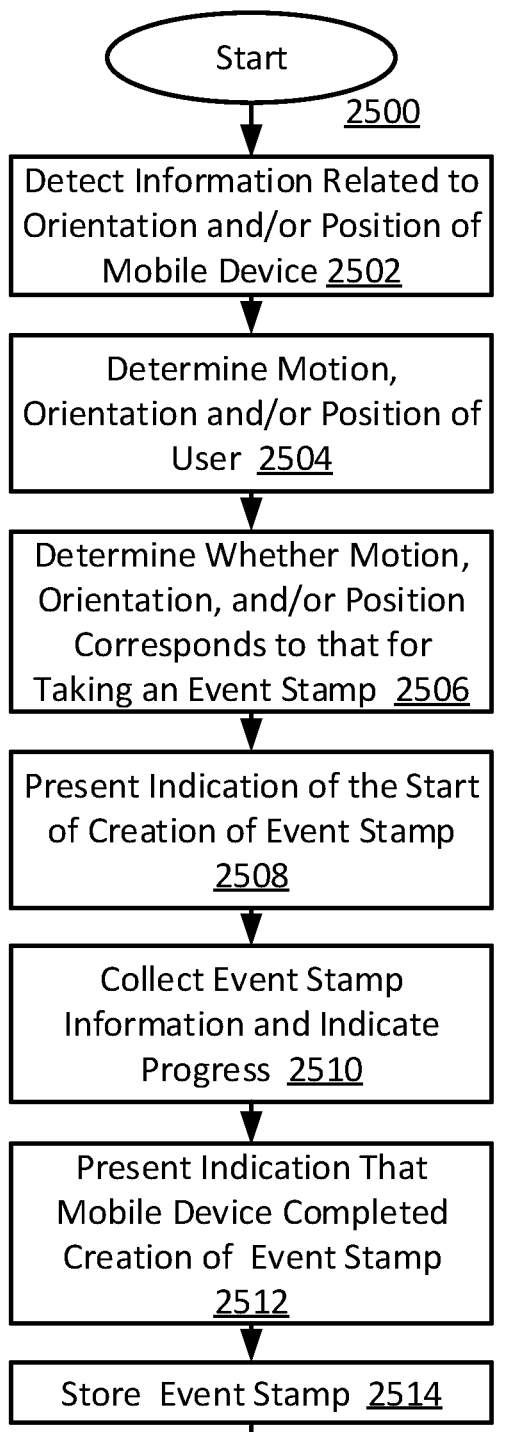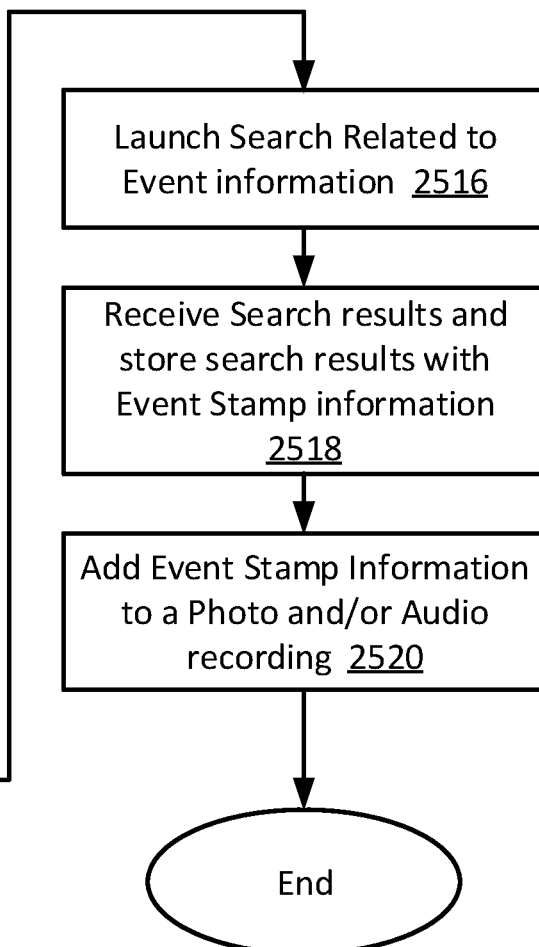
FIG. 25

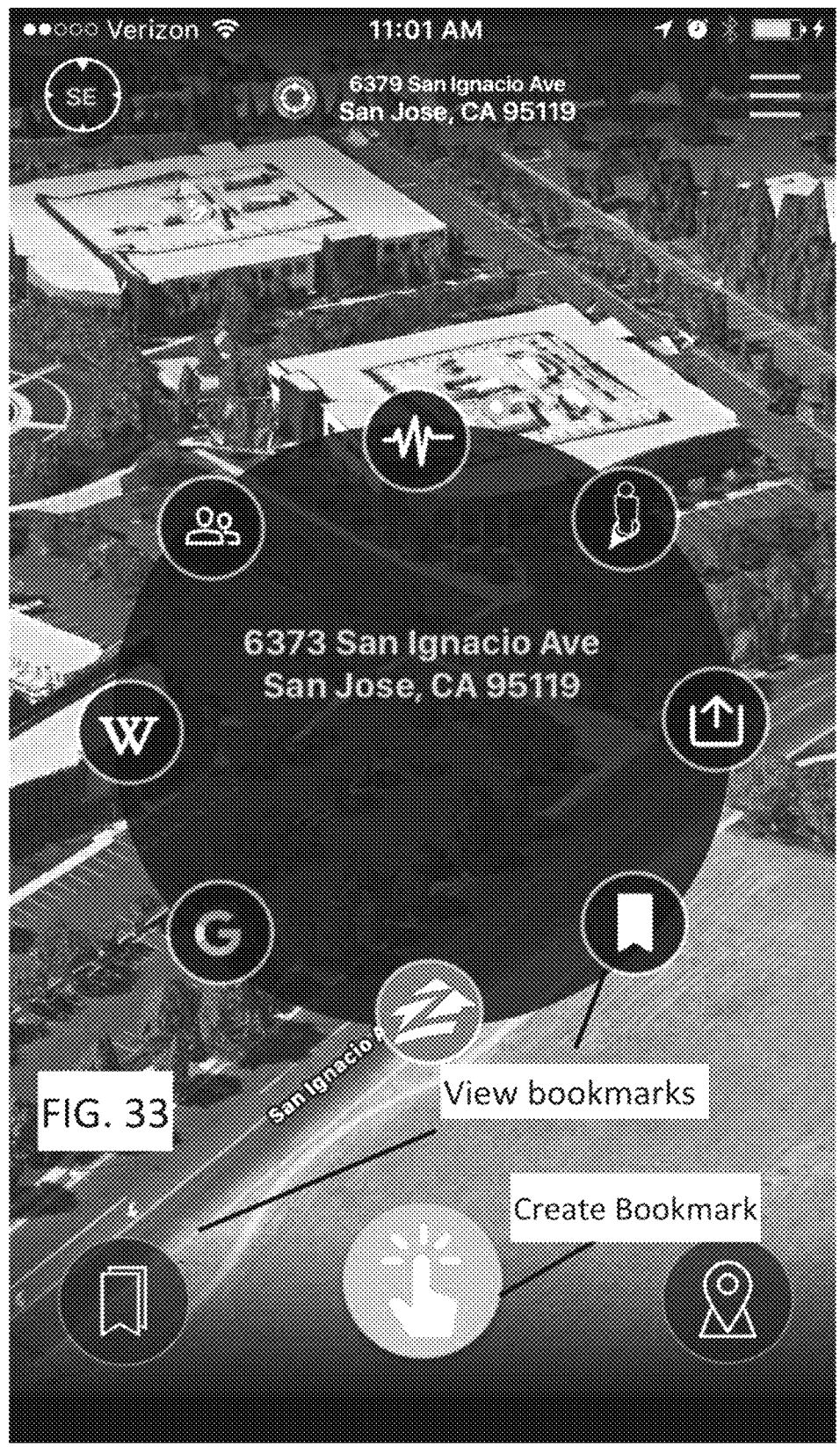

Place of Interest Template/Back of Card

- Name of Business
- Address
- Hours of Operation
- Description of type of business/ Products Sold
- Map
- Web Address
- Phone number/e-mail address
- Street View
- Comments
- Rating information

FIG. 41

New Sheet

☑ Join Group of Others that have Bookmarked this Grid Card

☑ Keep me informed

☑ Send promotional Offers

FIG. 59B

Join Group of Others that have Bookmarked this Grid Card

Keep me informed
☑ Send demographic information needed for this service?

Send promotional Offers
☑ Send personal information necessary for this service?

FIG. 59C

Directions?

Address

---------
---------

Other Information

Send Travel Updates to Grid card Owner?

Length of Time that Updates are Sent _____

Directions:
Proceed left on...

TRIGGERING AN AUTOMATIC CREATION OF AN EVENT STAMP

CROSS-REFERENCE TO RELATED APPLICATIONS

This application is a continuation-in-part of U.S. patent application Ser. No. 15/265,806, filed Sep. 14, 2016, by John H. Reimer, entitled, "Mash Guide/Proximity Grid," which is a continuation-in-part of U.S. patent application Ser. No. 13/663,318, filed Oct. 29, 2012, by John H. Reimer, entitled, "Identifying Events," which is a continuation-in-part of U.S. patent application Ser. No. 12/803,766, filed Jul. 6, 2010, by John H. Reimer, entitled, "Identifying Events," which is a continuation of U.S. patent application Ser. No. 11/490,905, filed Jul. 21, 2006, by John H. Reimer, entitled, "Identifying Events," which claims priority benefit of U.S. Provisional Patent Application No. 60/701,551, filed Jul. 22, 2005, by John H. Reimer, entitled, "Identifying Events,";

this application is a continuation-in-part of U.S. patent application Ser. No. 15/265,821, filed Sep. 14, 2016, by John H. Reimer, entitled, "Geotag," which is a continuation-in-part of U.S. patent application Ser. No. 13/663,318, filed Oct. 29, 2012, by John H. Reimer, entitled, "Identifying Events," which is a continuation-in-part of U.S. patent application Ser. No. 12/803,766, filed Jul. 6, 2010, by John H. Reimer, entitled, "Identifying Events," which is a continuation of U.S. patent application Ser. No. 11/490,905, filed Jul. 21, 2006, by John H. Reimer, entitled, "Identifying Events," which claims priority benefit of U.S. Provisional Patent Application No. 60/701,551, filed Jul. 22, 2005, by John H. Reimer, entitled, "Identifying Events,";

this application is a continuation-in-part of U.S. patent application Ser. No. 15/265,841, filed Sep. 14, 2016, by John H. Reimer, entitled, "Adding A Card To A Mash Guide/ Proximity Grid," which is a continuation-in-part of U.S. patent application Ser. No. 13/663,318, filed Oct. 29, 2012, by John H. Reimer, entitled, "Identifying Events," which is a continuation-in-part of U.S. patent application Ser. No. 12/803,766, filed Jul. 6, 2010, by John H. Reimer, entitled, "Identifying Events," which is a continuation of U.S. patent application Ser. No. 11/490,905, filed Jul. 21, 2006, by John H. Reimer, entitled, "Identifying Events," which claims priority benefit of U.S. Provisional Patent Application No. 60/701,551, filed Jul. 22, 2005, by John H. Reimer, entitled, "Identifying Events,";

this application is also a continuation-in-part of U.S. patent application Ser. No. 15/705,216, filed Sep. 14, 2017, by John H. Reimer, entitled, "Cinemaps II," which claims priority benefit of U.S. Provisional Patent Application No. 62/394,752, filed Sep. 14, 2016, by John H. Reimer, entitled, "Cinemaps";

this application is also a continuation-in-part of U.S. patent application Ser. No. 16/025,856, filed Jul. 2, 2018, by John H. Reimer, entitled, "Tracking People," which is a continuation-in-part of U.S. patent application Ser. No. 15/265,854, filed Sep. 15, 2016, by John H. Reimer, entitled, "Tracking People,", and also claims priority benefit of U.S. Provisional Patent Application No. 62/560,147, filed Sep. 18, 2017, by John H. Reimer, entitled, "Location Sharing," and claims priority benefit of U.S. Provisional Patent Application No. 62/565,038, filed Sep. 28, 2017, by John H. Reimer, entitled, "Book Mark Buddies/Keep Me-Informed,";

this application claims priority benefit of U.S. Provisional Patent Application No. 62/560,147, filed Sep. 18, 2017, by John H. Reimer, entitled, "Location Sharing,";

this application claims priority benefit of U.S. Provisional Patent Application No. 62/565,038, filed Sep. 28, 2017, by John H. Reimer, entitled, "Book Mark Buddies/Keep Me-Informed,";

this application claims priority benefit of U.S. Provisional Patent Application No. 62/567,140, filed Oct. 2, 2017, by John H. Reimer, entitled, "Community Grid Cards,";

this application claims priority benefit of U.S. Provisional Patent Application No. 62/574,169, filed Oct. 18, 2017, by John H. Reimer, entitled, "Grid Card Templates,";

this application claims priority benefit of U.S. Provisional Patent Application No. 62/579,110, filed Oct. 30, 2017, by John H. Reimer, entitled, "Automated Orientation Detection,";

this application claims priority benefit of U.S. Provisional Patent Application No. 62/580,656, filed Nov. 2, 2017, by John H. Reimer, entitled, "Establishing Ongoing Relationships Associated with Physical Locations Through Bookmarking,";

this application claims priority benefit of U.S. Provisional Patent Application No. 62/585,812, filed Nov. 14, 2017, by John H. Reimer, entitled, "Creating A Grid Card,";

this application claims priority benefit of U.S. Provisional Patent Application No. 62/591,398, filed Nov. 28, 2017, by John H. Reimer, entitled, "Send It Once with Sharing Locations,";

this application claims priority benefit of U.S. Provisional Patent Application No. 62/596,351, filed Dec. 8, 2017, by John H. Reimer, entitled, "On-The-Grid Cards,"; and this application claims priority benefit of U.S. Provisional Patent Application No. 62/596,399, filed Dec. 8, 2017, by John H. Reimer, entitled, "Map of An Application Layout,".

All of the above applications are incorporated herein by reference, in their entirety.

FIELD

The invention relates generally to finding information.

BACKGROUND OF THE DISCLOSURE

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

An individual may listen to a radio and hear a song or see something that catches the individual's interest (which the user may want to photograph or record some memory of). The individual may, at later time, search the web to find the song or information about the item seen or experienced, and may intend to purchase the song or something related to the item seen, but may not have enough information or forget some of the information needed for finding the song or the item seen.

To address this problem, US Patent Application, Publication Number 2004/0002938, discloses a marker for marking pieces of music and a dedicated timestamp. However, the use of the marker and timestamp are somewhat limited and could be improved.

SUMMARY OF INVENTION

In an embodiment, a mobile device automatically determines when the user has placed and/or is in the process of placing the mobile device in a particular position and/or orientation that indicates that the user will benefit from having an event stamp created. For example, the mobile device may detect that the user is in a position, in the process of getting into a position, or just moved into a position for taking a picture or view or talk into a wearable device. In response, an event stamp is created, which may include the time, day, location, and/or other information related to the user's location and/or events occurring associated with that location (e.g., time of day, date, whether, ambient sounds, an explanatory recording). As part of collecting the event stamp information, the user may be offered an opportunity to (or the mobile device may automatically) add an audio message, such as a description, an explanation, and/or other information related to an event.

In an embodiment, an event stamp or grid stamp function is provided that records multiple pieces of information, such as the time of day, the date, and the location. In an embodiment, the location is identified via GPS coordinates. In this specification, the phrases "event stamp" and "grid stamp" are used interchangeably—either term may be substituted for the other where ever either occurs to obtain a different embodiment. Thus, similarly, the phrases "event stamp function" and "grid stamp function" and "event stamp button" and "grid stamp button" are used interchangeably— either term may be substituted for the other where ever either occurs to obtain a different embodiment. In an embodiment, when performing a search in addition to returning the event information that has the closest correspondence to the event stamp, information about other events that have some partially corresponding information is also returned.

In an embodiment, activating the event function automatically launches an immediate search for the type of information sought. In an embodiment, the event stamp button includes a cylindrical component that rotates, and rotating the cylindrical component causes a scrolling through the search results found. In an embodiment, the user can configure different modes of operation, such as whether the event function causes just the storage of information for later use, launches an immediate search, or immediately causes a purchase of a product. In an embodiment, the event function has different modes (and optionally multiple mode buttons that invoke the different modes) in which in each of these modes different types of information are sought.

In an embodiment, the event stamp information may be used for determining which bus, plane, train, or other mode of transportation passed a certain location. In an embodiment, the activating the event stamp function causes a comparison of radio waves received to sound received or a comparison of sounds or clips from a song or other broadcast received and stored to sounds and/or images stored in a database to identify the broadcast of interest. In an embodiment, the event stamp information may be used for determining the location of a particular vendor and initiating a transaction, such as locating the nearest available taxi and ordering a taxi pickup. In an embodiment, the event stamp information may be used to immediately locate a restaurant or other vendor that is nearby, view the menu, and the restaurant owner may return special offers, possibly dependent upon the user visiting the restaurant within a certain time frame. In an embodiment, the event stamp information may be used to immediately locate a barber, hairstylist, dentist, doctor, or other shop that is nearby and schedule an appointment.

In an embodiment, the event stamp information may be used for establishing a journal of times and locations visited. In an embodiment, the event stamp may allow entry of a verbal annotation. In an embodiment, the event stamp may include a picture, and optionally the event stamp function may activate a camera (e.g., on a mobile phone).

Any of the above embodiments may be used alone, or with or without any combination of any of the other embodiments. Additionally, the invention is not limited to the embodiments listed above. Other embodiments of the invention may exist that do not include any of the above embodiments and/or that include other features not listed above.

BRIEF DESCRIPTION OF THE FIGURES

In the following drawings like reference numbers are used to refer to like elements. Although the following figures depict various examples of the invention, the invention is not limited to the examples depicted in the figures.

FIG. 25 shows a flowchart of a process of automatically creating an event stamp based on the user's actions.

FIG. 33 shows an example of a page that one sees upon opening the application.

FIG. 36 shows an example of a page having a list of bookmarks created that the user can choose.

FIG. 41 shows an embodiment of the template for the back of a grid card for a business.

FIG. 59B shows an example of a page of the grid card that may be sent to the user if the user bookmarks the grid card, allowing the user to in a group.

FIG. 59C shows an example of the page of the grid card that is presented to the user if the user selects to join a group of those that bookmarked the grid card.

FIG. 65 shows an example of the backside of the grid card.

FIG. 66 shows an example of the page of the grid card that is presented to the user if the user asks for directions.

DETAILED DESCRIPTION OF THE DRAWINGS

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

In general, at the beginning of the discussion of each of FIGS. 1-7, 10A, 10B, and 16-25 is a brief description of each element, which may have no more than the name of each of the elements in the one of FIGS. 1-7, 10A, 10B, and 16-25 that is being discussed. After the brief description of each element, each element is further discussed in numerical order. In general, each of FIGS. 1-25 is discussed in numerical order, and the elements within FIGS. 1-25 are also usually discussed in numerical order to facilitate easily locating the discussion of a particular element. Nonetheless, there is no one location where all of the information of any element of FIGS. 1-25 is necessarily located. Unique information about any particular element or any other aspect of any of FIGS. 1-25 may be found in, or implied by, any part of the specification.

In various places in discussing the drawings a range of letters, such as a-l, a-m, and a-n are used to refer to individual elements of various series of elements that are the same. In each of these series, the ending letters are integer variables that can be any number. Unless indicated otherwise, the number of elements in each of these series is unrelated to the number of elements in others of these series. Specifically, even though one letter (e.g. "l") comes earlier in the alphabet than another letter (e.g., "n"), the order of these letters in the alphabet does not mean that the earlier letter represents a smaller number. The value of the earlier letter is unrelated to the later letter, and may represent a value that is greater than, the same as, or less than the later letter.

Figure 1:
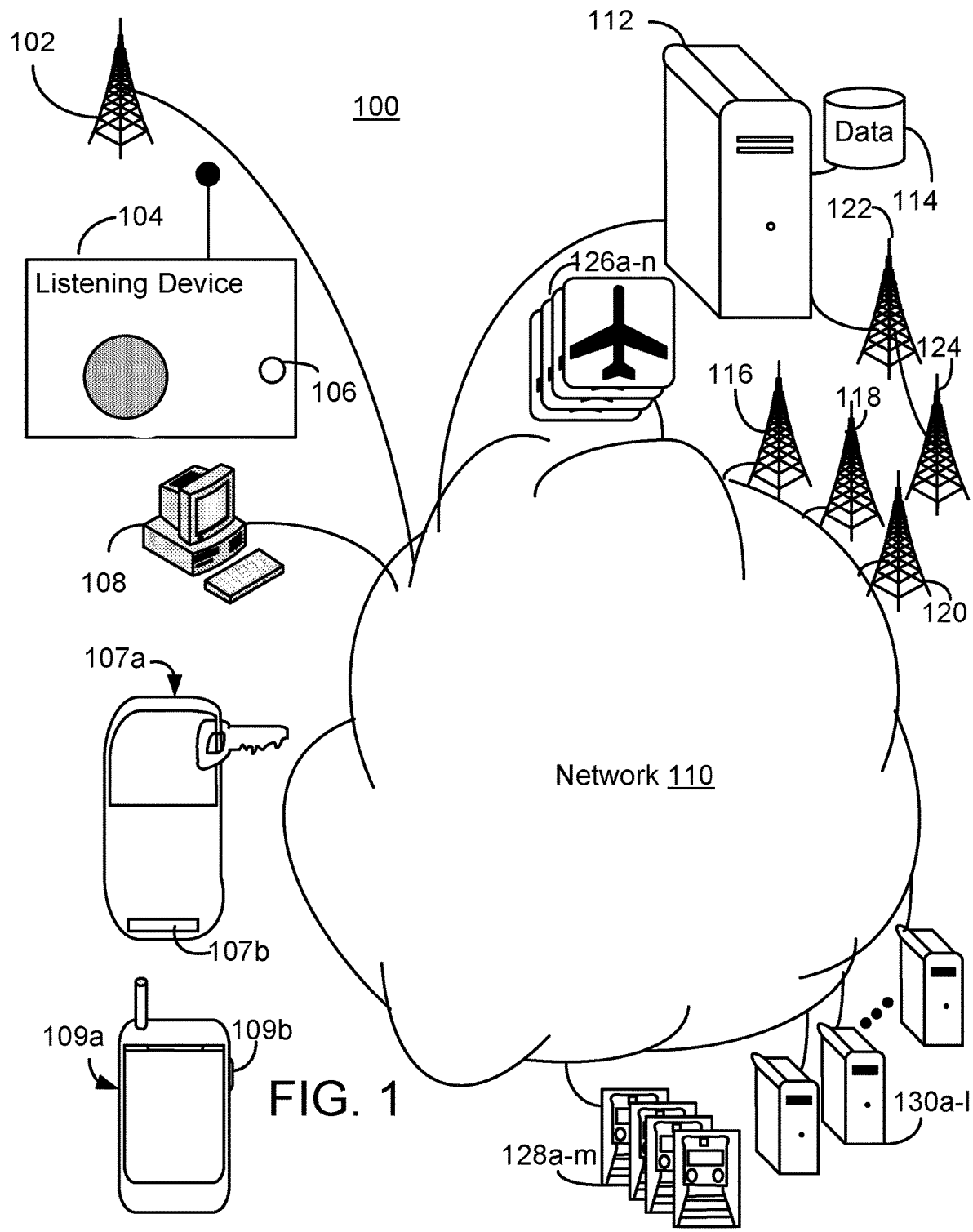
FIG. 1 shows a representation of an example of an event identification system.

FIG. 1 shows an event identification system 100. Event identification system 100 includes broadcast source 102, listening device 104 having event stamp button 106, keychain 107a having event stamp button 107b, network appliance 108, mobile phone 109a optionally having event stamp button 109b, network 110, website host 112, database 114, broadcast sources 116-124, airports 126a-n, train stations 128a-m, and vendor website hosts 130a-1. In other embodiments, event identifying system 100 may not have all of the components associated with FIG. 1 or may have other components in addition to or instead of those components associated with FIG. 1.

Event identification system 100 may be used for identifying one or more different types of events. Event identification system 100 identifies at least some identifying information associated with at least certain events, such as a name or another identifier of the event. In this context, event information encompasses a broad range of types of occurrences, such as songs being played on the radio, information about the environment at a particular time, an occurrence of an action, or other forms of events. Similarly, a company that broadcast the sound and/or video segments, a company that shows a movie or play, a company that hosts a sporting event, a company that runs a store (such as a barber shop or restaurant), or company that runs a mode of transportation, such as a taxi, train, bus, airplane, may be referred to as event sponsors. In this specification, any place the word "time" is mentioned, such as in conjunction with an event time associated with an event stamp, it is generic to the time of day, the calendar date, and the combination of the time of day and the calendar date. Consequently, any place the word "time" appears at least three specific embodiments may be obtained by substituting, the time of day, the calendar date, and the combination of the time of day and the calendar date for the word "time." As an example of a type of event that may be identified, in one embodiment, event identification system 100 is capable of identifying songs played on a radio station. In another embodiment, event identification system 100 is additionally, or alternatively, capable of identifying information about other types of events, such as which radio program was played at a particular time, information that was in an advertisement at a particular location, or which airplane or train passed by a particular location at a particular time or used a particular travel way (e.g., a particular train track, road, shipping lane and/or air passageway).

Broadcast source 102 may broadcast a wide variety of types of information, such as sound, text, and/or images. For example, broadcast source 102 may be a radio station that broadcasts sound segments, such as songs and/or radio programs. In another embodiment, broadcast source 102 may be a television station that broadcasts both image and sound information. Broadcast source 102 is discussed further in conjunction with broadcast sources 116-124.

Listening device 104 outputs the information being broadcast. For example, listening device 104 may include a radio. Listening device 104 may be capable of outputting sound or other information from other sources, such as a Compact Disc (CD), flash memory, and/or hard drive. For example, listening device 104 may include a radio, a television, and/or a media player, such as a Moving Pictures Expert Group 3 (MPEG 3—a compression standard—or more commonly referred to as MP3) player with a radio attached, or a cassette player with a radio attached. Optionally, listening device 104 may include a system that determines a current location, such as a Global Positioning System (GPS) or a receiver for receiving GPS coordinates from a GPS system. There are many embodiments of the event identification device. Listening device 104 is just one example of a device that may be used as and/or included in an event identification device. If the event identification device is capable of receiving broadcasts, it may be referred to as a receiving device. Other non-limiting examples are given below.

Event stamp button 106 is button that activates an event stamp function, which is a function that causes the recording of event stamp information, which may be identifying information. An event stamp function is generic to a time stamp but may include other information in addition to and/or instead of the time. For example, the event stamp may record time, location, image information (e.g. photographs, audio and/or video of a location and/or event), and/or a broadcast source being received. Any of the functions discussed in association with any of the event stamp buttons or event stamp functions in this specification may be associated with any event stamp function that may be initiated by any event stamp button. In this specification, the term identifying information refers to information that is used for identifying an event and the term event stamp information refers to information recorded as a result of activating an event stamp function. The event stamp function may be activated by one or two actions, for example. The event stamp information may be event identifying information. Event stamp button 106 is an example of an implementation of an event stamp function that may be included in any event identification device. For example, the event stamp information recorded by event stamp button 106 may include information related to when and where the event occurred and/or the type of event.

Event stamp button 106 may be a mechanical button, a heat sensitive pad, or other touch sensitive pad. Although in one embodiment, the event stamp function may be activated by pressing on a button in other embodiments the event stamp function is activated in any of a variety of other ways. For example, instead of event stamp button 106, the event stamp function may be activated by a switch, an icon on a display, a roller, a function of another button.

In one embodiment, event stamp button 106 is a timestamp that records the time of the event. In an embodiment, event stamp 106 may record a location associated with the pressing of event stamp 106. The location information may be useful for many different types of events in a variety of different ways. In the case of a radio broadcast, event stamp button 106 may record the time of day at which event stamp button 106 was activated, the radio station being played by listening device 104, and optionally may record location information (e.g., GPS coordinates). The location information may be useful in identifying a broadcast source such as a radio station, because the same radio station number may be used by different radio stations having different locations, for example. In other words, situations in which there are multiple radio or television stations having the same name but having different locations, the location information may be useful in differentiating between the two radios or television stations. Event stamp button 106 does not need to be placed on listening device 104.

The event stamp function may be associated with a multiplicity of different functions. Similarly, event identifying system 100 may be used for identifying any of a number of types of information. For example, the event stamp function may be used for creating a journal of locations and times that the locations were visited. The event stamp function may cause a search for a place, a song, a television program, a movie, a play, a form of transportation, and/or an advertisement. The event stamp function may cause a recording of an excerpt of a broadcast (including images and/or sound), sounds and/or images of the location at which the event function is implemented, and/or a voice annotation (e.g., explaining why the event stamp function was implemented and/or other information associated with an event). As another example, a user may be able to manually enter a time and a location along a railroad line, or a search may be automatically launched in response to activating an event stamp function, to find out which train passed by a particular location at a certain time. The user may be able to determine the train's origin and regular schedule. As another example, event identification system 100 may be used to find out information that was in an advertisement, such as on a billboard, in a bus or along a roadside and/or to find out information that was in an advertisement on television or radio.

Instead of, or in addition to, placing event stamp button 106 on listening device 104, an event stamp function may be placed on any mobile device to get information while traveling. The event stamp function may be placed on a viewing device, such as a television, on the dashboard of a car. The event stamp function may be placed elsewhere in a car, in a purse, in a wallet, on a briefcase, on a bicycle, on a keychain, watch and/or wearable device (some examples are discussed below). Similarly, event stamp button 106 may be included on a cell phone, a media player, a computer, a web appliance, a MP3 player, a radio, a television, a vehicle, a handheld computer, a keychain, watch and/or wearable device or a memorandum device, for example. Each time the user activates the event stamp function, an immediate search launched for a particular type of information. Additionally, or alternatively, the time and optionally other information, such as a radio station being played may be recorded in a memory system in a machine readable medium. Optionally or alternatively, the device also collects GPS or other location information that is included in the event stamp to facilitate identifying the station. At a later time or immediately after collecting the event information, the user causes the event stamps to be uploaded to the website or the event stamp is automatically sent to the website in response to activating the event stamp function, and for each event stamp, the website displays corresponding event information, such as songs. Alternatively, the user enters the event stamp information into the website manually. Event information related to events that occurred before and after the time of the event may be returned in addition to events associated with the same time as the event stamp. In an embodiment in which the events are songs being played, for each event stamp, the song played at that time of the event stamp is displayed and one or two songs before and after the song corresponding to the time of the event stamp may also be displayed. Then the user may select a link for purchasing one or more songs desired.

In an embodiment, the time, location, and/or other data could be recorded by hand for use in determining an event. Alternatively, the user may carry a device that has an event stamp function on it. If included on a radio, upon hearing the broadcast segment, the event stamp button is pressed, and the time and radio station are automatically recorded. If the device has GPS capability, the GPS coordinates may be automatically recorded as part of the event stamp. In an embodiment, broadcasts may be sent with profile information, which may appear at the head of a broadcast message or elsewhere. Circuitry (e.g., a programmed processor) associated with the event stamp may be configured for reading the profile information of a broadcast from the circuitry associated with a media player or other device that is designed to read the profile information from the broadcast segment.

The event stamp function may be associated with a continuous recording of events (e.g., a continuous recording of all broadcast segments played on a radio or media player). The event stamp may be just a marking on the recording to identify the segment stamped. Optionally, part of the recording is discarded and part is retained. The part retained includes at least the segment marked and may optionally also include one or more segments preceding the one marked and/or one or more segments following the one marked. The user may hear a segment, and after the segment is finished, the user may decide that to purchase the segment. Retaining the one or more segments prior to and/or after the one marked facilitates finding the segment that is desired, even after the segment is no longer being broadcasted.

Specifically, returning several segments associated with times or other information other than the time and event information associated with the event stamp may facilitate finding the event (e.g., the broadcast segment) of interest despite potential inaccuracies in the time information or other information associated with the event. Regarding broadcast sources, even if the time associated with the event stamp is accurate, the broadcast source may not have a schedule of which segment was played at any particular time. Even if the broadcast source initially had a schedule of when the broadcast source planned to broadcast each segment, the broadcast source may deviate from its plans. For example, the broadcast source may play the segments at different times, play the segments in a different order, play segments not planned to be played, or not play all of the segments planned to play. As another example, if the events are taxis that are currently available and nearby, several available taxis may be returned in addition to the closest taxi, because the user may prefer to wait a longer time to get a taxi that is less expensive and/or that provides more courteous service.

Thus, after pressing the event function, the user may retrieve the information recorded and use the information to determine the event (e.g., the segment such as a song that was broadcast) by visiting the website and entering at least some of the information recorded. The information recorded may be uploaded to the website or entered by hand Optionally, the event stamp function may automatically connect to a web address and initiate a purchase of the segment (e.g., by actually purchasing the segment or giving the user an option to purchase the segment). The event function may have different settings that control whether to immediately start a purchasing process or just record the event information without initiating a purchasing procedure. The event stamp function may send a communication, such as an e-mail or other communication, to a purchasing site (e.g., the website) that is answered at a later time. Alternatively, the event stamp function may initiate a direct link to the purchasing site.

As an example of listening device 104, listening device 104 may include at least a tuner having a read out of the station being played, a time source (e.g., a clock), and event stamp button 106. The event stamp function may be associated with a memory for recording the event stamp information. In an embodiment, instead of or in addition to using a time to identify a song, a fingerprint of the song is used. In other words, identifying characteristics of the song are recorded, such as a segment of the song, the tone, and/or the pitch. The identifying characteristics may then be used to identify and/or purchase the desired song. As another example in which time may or may not be included, the identification of a billboard may be performed by using the location to identify the advertisement. In an embodiment, the time is included in the event stamp even when not necessary for identifying the event.

Keychain 107a is another example of an event identification device, and keychain 107a may be for car keys and/or other keys. Event stamp button 107b is similar to event stamp button 106 in that it may be used for recording event identifying information, such as a time, a location, a radio station identifier, and/or other information that may be used for identifying an event. Event stamp button 107b is another example of a location where an event stamp function may be placed. Keychain 107a may include circuitry capable of locating a radio station based on sounds being emitted from a listening device (such as listening device 104) in response to activating event stamp button 107b. For example, keychain 107a may include a receiver for receiving audio signals. Upon pressing event stamp button 107b, the keychain scans radio stations using a tuner in the keychain. The audio signals for a radio external to the keychain are matched to songs found while scanning radio stations. Once a match is found, information identifying the song and/or the radio station playing the song is recorded. This information can be used later or immediately to purchase the song. Keychain 107a may be replaced with a watch, and/or wearable device.

Network appliance 108 may be any of a number of types of appliances that are capable of accessing a network, such as a computer, a terminal, a web television, and/or a mobile phone. The user enters event identification information recorded by an event stamp function (e.g., event stamp button 106 or 107b) into network appliance 108, and in response network appliance 108 sends the event identifying information to another location for identifying the event associated with the information recorded by the event stamp function. The information may be entered manually, uploaded, and/or transferred wirelessly into network appliance 108. Network appliance 108 may itself have a hardware and/or software version of an event stamp function, and this embodiment is another example of an event identification device. In addition to, or instead of, the information recorded by event stamp functions 106 or 107b, an event stamp function associated with network appliance 108. In addition to or instead of the event stamp functions discussed in conjunction with event stamp buttons 106, 107b, and 109b, the event function of appliance 108 may record the URL link associated with a webcast and optionally other information about the webcast to facilitate identifying the webcast.

Mobile phone 109a is another example of an event identification device, and is an example of a network appliance. Mobile phone 109a may link via a phone network to a computer network to retrieve information associated with an event function stamp. Mobile phone 109a may include an event stamp button 109b. Although event stamp button 109b is depicted as a button, event stamp button 109b may be a menu item that is selected using cursor control buttons, such as the cursor control buttons that are often associated with the keypad of a mobile phone.

Network 110 may be any one of, or any combination of one or more Local Area Networks (LANs), Wide Area Networks (WANs) (e.g., an Internet or intranet), phone networks, wireless networks, and/or other networks. Event identifying information is sent from one of the devices having an event function via network 110 to a database, where more information about the event may be obtained.

Website host 112 hosts a website that may be accessed by one of the network appliances. The event stamp information (which may include event identifying information) is sent from one of the network appliances, via network 110, to website host 112. Website host 112 uses the event stamp information (and/or other information) to retrieve other event information, which may include an event identifier (e.g., a name of an event) and/or to retrieve information about vendors, stores, service providers, and/or professional within a given proximity of a particular location. The other event information may include download information and/or purchase information, which may be used to download and/or purchase a recording or other information about the event. For example, if the event is one or more songs or other segments of a radio program or one or more segments of a television show, the information downloaded may include information about where to download and/or purchase the one or more segments, songs, programs and/or shows. In an embodiment, the website may return several segments that are before and after the one corresponding to the timeslot chosen. The reasons for returning events corresponding to times before and after the time of interest are explained above.

In one embodiment, website host 112 may host a website in which a user enters the time, location, and broadcast source (e.g., radio station or television station) and the website returns the segment (e.g., song title and artist, radio program, or television program) that was being broadcasted at that time, for example. The website may have links to one or more vendors that sell the segments (e.g., songs) that were broadcasted. In one embodiment, the selection of the link causes the segment to be purchased. Alternatively, by selecting the link the user may be brought to web pages associated with the vendor for making the purchase. In another embodiment, any segment may be downloaded for free. In an embodiment, downloading segments for free may be limited to certain conditions, only at certain times, and/or only certain segments. Thus, in embodiments having a website, the user can hear a segment of a broadcast, write down the time, place, and/or other event information (or record the event information using an event function), and then the user can go to the website to obtain the segment. In another embodiment, in response to activating the event function, an identification device (such as listening device 104, key chain 107*a*, network appliance 108, and/or mobile phone 109*a*) may automatically initiate a search or make a purchase via website host 112, which then automatically returns the search results and/or a purchase receipt to the identification device. In an embodiment, website host 112 may include an application which in response to determining that a professional that provides a particular type of service (that is being searched for) is within a given proximity (e.g., 1 mile) of the searcher, sends a message (e.g., including the searcher's phone number, e-mail address, or instant messenger address) to the professional to contact the searcher.

Database 114 may store information that is used by website host 112 in conjunction with the event stamp information sent from one of the web appliances or another identifying device to identify the event. Additionally, database 114 may store information related to where to obtain and/or purchase commodities related to the event, such as songs, radio programs, airline tickets, train tickets, and/or tickets to shows. For example, database 114 may store information, such as links to websites where a broadcast may be purchased, playlists, programming schedules, and/or contact information for various broadcast sources. Website host 112 may maintain database 114 (in which event information, such as broadcast segments and information about the broadcast segments are stored). Database 114 may maintain a correlation of event information. For example, database 114 may maintain a correlation of the segments actually broadcasted with the times the segments were broadcasted and optionally with the other information such as the broadcaster, and the broadcast area of the broadcaster. Database 114 may maintain a correlation of routes, schedules, and bus numbers and/or train identifiers. Database 114 may maintain a correlation of taxi identifiers and current locations of the taxis. Database 114 may maintain a correlation of restaurants, locations, menus, and/or special offers. Database 114 may maintain a correlation of times, locations, temperature, pressure, humidity, and/or whether it was sunny, cloudy, or raining. Database 114 may maintain a list of professionals, vendors, stores, and/or services correlated with the locations, an availability indication, and/or hours of operations of the professionals, vendors, stores, and/or services. The availability indication may indicate whether a store is currently open or closed and/or whether a professional is currently willing to accept requests for service. The locations of the professionals may include the current GPS coordinates (or other location identifiers) of the professional. For example, if the professional is a doctor currently attending a baseball game, the location of the professional may include the GPS coordinates of the doctor at the baseball game and the availability indication may indicate whether the doctor is available for providing general medical services, emergency services, or not available. Thus, if user is not feeling well while at the baseball game, the user can perform a search for doctors, and the doctor may receive a message that there is someone in the baseball stadium that needs the doctor's services.

To keep database 114 up to date, website host 112 may monitor one or more (possibly a very large number of) broadcast sources (e.g., radio stations) and/or other sponsors. Further, based on the monitoring database 114 may record the date, time of day, event sponsor (e.g., broadcast source), and/or the event occurrence (e.g., the segment being broadcast). In an embodiment, the various broadcast sources may be monitored by human monitors, associated with website host 112 and/or database 114, that enter the data about the broadcast segment into database 114. In an embodiment, the broadcast source (e.g., a radio station) or other event sponsor may send an event schedule (e.g., a playlist, a schedule of entertainment events, or schedule associated with a mode of transportation) to database 114, a record of the times when the events actually occurred (e.g., when the segments were actually broadcasted, the entertainment event actually occurred, or the times when a transportation vehicle actually arrived at locations on its schedule), and/or other information associated with the events. Website host 112 may provide the radio station or other event sponsors with tools for submitting a record to database 114 of when events occurred. Alternatively, the website host 112 may automatically monitor the event sources (e.g., broadcast sources or radio transmissions of dispatchers) and figure out which events occurred and when the events occurred.

In the case of broadcasts, the broadcast coming from the event source may include (e.g., come with) a profile from which event information may be extracted. For example, the profile may include the time of the segment, an identifier of the segment (e.g., the name of the song or program), and the location of the broadcast source of the segment. The event information may be extracted and stored in database 114 in correlation with the event, and/or may be extracted by the event identification device (e.g., listening device 104) of the user.

In the case of professionals, the professional may sign up for a service, which downloads an application onto the professional's cell phone or other mobile device, and the application may periodically send an update to database 114 of the current location of the professional. The application may include an option for indicating the professional current availability.

Broadcast sources 116-124 are a set of broadcast sources, such as radio or television stations. Broadcast sources 102 and 116-124 are one of many examples of types of event sponsors or event sources. Website host 112 collects information from broadcast sources 102 and 116-124 related to the time and content of broadcasts that were delivered, which may be stored in database 114. Thus, when information from an event stamp is received by website host 112, the information gathered from broadcast sources 102 and 116-124 may be used to determine the corresponding broadcast, the broadcast source from which the broadcast originated, and a link to a vendor that sells the broadcast. In some cases, the broadcast source may also be the vendor that sells the broadcast. Although only six broadcast sources are depicted, there may be any number of broadcast sources.

Broadcast sources 102 and 116-124 may be communicatively linked to website host 112 in a variety of different ways. For example, broadcast sources 102, 116, 118 and 120 may be linked to website host 112 via network 110. Thus, broadcast sources 102, 116, 118, 120 may be linked to website host 112 via WAN, LAN, and/or just ordinary phone lines, for example. Obtaining information from broadcast sources 102, 116, 118, and 120 may be automated or may involve a person telephoning, or listening to, broadcast sources 102, 116, 118, and 120, and then recording the information. Broadcast source 122 is an example of a broadcast source being directly connected to website host 112, and broadcast source 124 is an example of a broadcast source linked via another broadcast source, to website host 112. In an embodiment, an event source (e.g., one of broadcast sources 102 and 116-124 or other event source) and/or other sponsors of events may receive a monetary compensation each time a user purchases and/or accesses information related to a product based on an event (e.g., a broadcast or another event) that originated from (e.g., was sponsored by or broadcasted by) that event source. The broadcast source, such as one of broadcast sources 102 and 116-124, that hosted the event (e.g., that broadcasted the segment) may be compensated for purchases associated with the event, such as the purchase of the segment, every time a user makes a purchase that is based on information that is expected to have been obtained during the event, such as information indicating hearing the segment at the radio station or seeing an advertisement.

Airplane sources 126a-n and train sources 128a-m are examples of other sources of information about events and/or event sponsors that may provide information about events to website host 112. Airplane sources 126a-n represent one or more airports and/or airlines, and train sources 128a-m represent one or more train stations and/or transit services. For example, a user may hear a plane flying overhead, or a train passing by, at a particular time and location. The user then enters the information into one of the devices having an event stamp, such as network appliance 108 or mobile phone 109a. The event information is then forwarded to website host 112. Network host 112 then retrieves information from database 114, which was gathered from airplane sources 126a-n or train sources 128a-m, and then determines the airline and flight information or the train and train schedule, respectively. Network host 112 may also provide one or more links where an airline ticket or a train ticket (e.g., related to the event stamp information) may be purchased.

Vendor website hosts 130a-1 represent one or more host of websites of vendors that sell songs, movies, radio programs, television programs, tickets to shows, tickets to movies, train tickets, airline tickets, taxis, barbers, restaurants, products associated with an advertisement and/or other products related to event identifying information provided. Website host 112 may send a link such as a URL to a web appliance or cause a web appliance to link to one of vendor website hosts 130a-1, in response to receiving a request to purchase items associated with an event form website host 112 and/or form a web appliance. Website host 112 may refer a web appliance to one of vendor website hosts 130a-1 for buying a product and/or for finding out more information about the product.

Event identification system 100 may be used for identifying other types of events by including other types of organizations that are responsible for generating those events. For example, event identification system 100 may be used for identifying the contents of ads on buses or billboards by having website host 112 linked to the advertising agencies that produce the ads on the buses or billboards, respectively.

Figure 2:
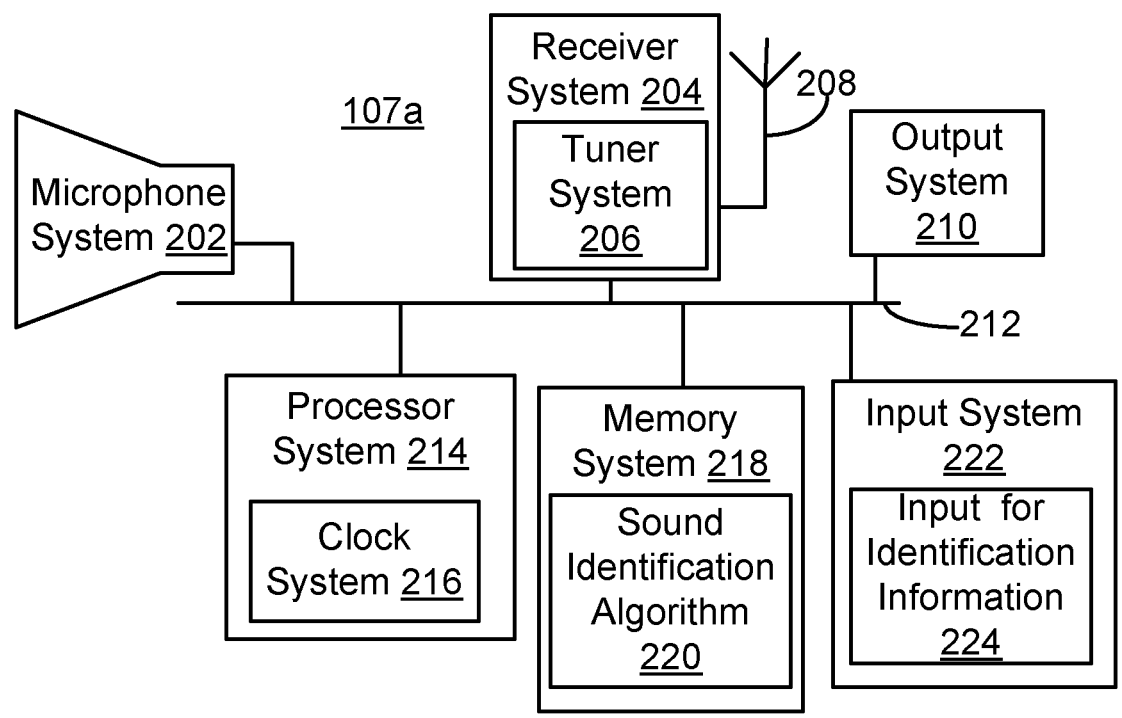
FIG. 2 shows a block diagram of an embodiment of the keychain of FIG. 1.

FIG. 2 shows a block diagram of an embodiment of keychain 107a. Keychain 107a may include microphone system 202 and receiver system 204, which may include tuner system 206. Keychain 107a may also include antenna system 208, output system 210, bus system 212, and processor system 214, which may include clock system 216. Keychain 107a may also include memory system 218, which may store sound identification algorithm 220. Also, keychain 107a may include input system 222, which may include input for identification information 224. In other embodiments, keychain 107a may include or may not include all of the components and/or may include other components, in addition to, and/or instead of the components listed above.

Microphone system 202 may include one or more microphones and may receive sound waves that are used for identifying a broadcast segment. Receiver system 204 may include one or more receivers that may receive radio waves, which may be compared to the broadcast segment in order to identify a television and/or radio station associated with the sound waves being emitted by the television or radio. Receiver system 204 may also be capable of receiving Global Positioning Satellite (GPS) signals for determining a current location.

Tuner system 206 may automatically tune the frequency of the radio waves that is received by receiver system 204 or otherwise change the channel or station being received by receiver system 204. By automatically tuning tuner system 206, a set of several stations and/or channels may be scanned in order to determine whether there is a match between the broadcast segment received by the microphone and the radio waves received by the receiver. In some cases, the time that it takes to match the sound waves received with a radio station may be longer than the time of play of the radio broadcast of interest, but nonetheless the radio station may be identified, which in combination with the time may identify the broadcast segment of interest.

Antenna system 208 is attached to receiver system 204 and picks up an electromagnetic signal from the environment, which is sent to receiver system 204. The electromagnetic signal picked up by antenna system 208 is determined by the current settings of tuner system 206. Antenna system 208 may be located within the key fob of the keychain and/or exterior to the key fob. In an embodiment, the keychain attached to the key fob is part of the antenna, and consequently any metal keys attached hanging on the keychain may also act as part of antenna system 208.

Output system 210 is for outputting identifying information associated with the broadcast segment. For example, output system 210 may include a port that can be communicatively coupled to a computer via which the event stamp information may be transferred to a computer so that the broadcast segment may be identified via a website on network 110. The communicative coupling may be accomplished by an electrical and/or optical connection, for example. In addition to, or instead of a port, output system 210 may include a display for displaying the event stamp information so that the event stamp information may be manually input to a web appliance attached to network 110. If output system 210 includes a display, the display may show information input by a user, so that the user can verify that the information that is currently being input is the information that was intended to be input. Depending on the embodiment, the display may be capable of displaying both input information and displaying automatically generated event stamp information. Alternatively, the display may only be capable of displaying one of the input information or the automatically generated event stamp information.

Bus system 212 carries signals between the components of keychain 107a. For example, bus system 212 communicatively couples microphone system 202, receiver system 204, and processor system 214 (processor system 214 is discussed in the next paragraph). In other embodiments, the components of keychain 107a communicate in other ways instead of using bus system 212.

Processor system 214 may compare signals generated by microphone system 202 (generated as a result of the microphone receiving sound waves) and signals generated by receiver system 204 (generated as a result of receiver system 204 receiving radio waves) to determine whether the broadcast segment matches the radio waves or matches a broadcast segment stored on database 114. Processor system 214 may also automatically change the settings of tuner system 206 in order to cause receiver system 204 to scan a set of radio and/or television stations. Processor system 214 may also process GPS signals to determine a location.

Clock system 216 may have many uses that facilitate the operations of processor system 214, for example. Additionally, clock system 216 may be used for recording a time associated with the broadcast segment received via microphone system 202. For example, if a user presses on an event stamp button, processor system 214 may read clock system 216 and record the time in association with other identifying information that may be recorded as event stamp information and may be used to identify the broadcast segment. In an alternative embodiment, processor system 214 may be replaced with a specialized circuit that is configured for comparing the broadcast segment with the radio waves received and thereby determine the radio or television station being listened to and/or configured for recording the time associated with a broadcast segment of interest.

Memory system 218 may store the event stamp information. For example, memory system 218 may store a time associated with activating the event stamp function and a radio or television station that processor system 214 identified as matching the broadcast segment. Memory system 218 may also store a location where the timestamp was pressed, which may have been determined by processor system 214 based on GPS signals. Memory system 218 may also store a part of the broadcast segment, which may be used to help identify the broadcast segment at a later time with the aid of a computer and/or a website.

Sound identification algorithm 220 may also be stored in memory system 218. Sound identification algorithm 220 may be the machine instructions implemented by processor system 214 to determine whether the broadcast segment received and stored in memory system 218 matches radio waves received or a broadcast segment in database 214.

Input system 222 may include a button that activates the event stamp function and causes event stamp information to be recorded in memory system 218 and/or may cause other identification information to be collected and/or stored as part of the event stamp information. Input for identification information 224 may include a keypad or other input mechanism via which identification information can be entered manually via the user, which may be used as event stamp information.

Figure 3:
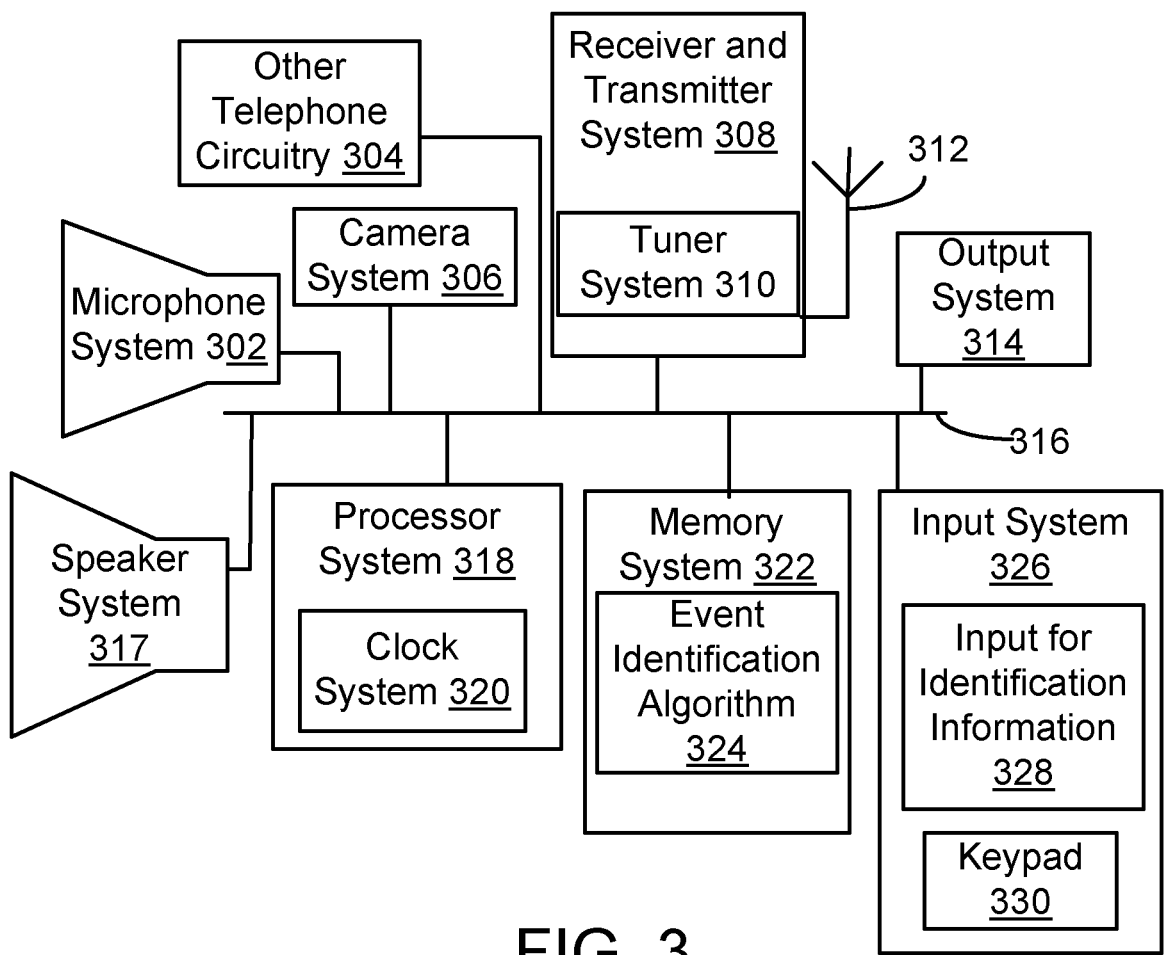
FIG. 3 shows a block diagram of an embodiment of the mobile phone of FIG. 1.

FIG. 3 shows a block diagram of an embodiment of mobile phone 109*a*. Mobile 109*a* may include microphone system 302, other telephone circuitry 304, camera system 306, and receiver and transmitter system 308, which may include tuner system 310. Mobile phone 109*a* may also include antenna system 312, output system 314, bus system 316, speaker system 317, and processor system 318, which may include clock system 320. Mobile phone 109*a* may also include memory system 322, which may store event identification algorithm 324. Also, mobile phone 109*a* may include input system 326, which may include input for identification information 328 and keypad 330. In other embodiments, mobile phone 109*a* may not include all of the components and/or may include other components, in addition to, and/or instead of the components listed above.

Microphone system 302 is for the user to speak into when making a telephone call. Other telephone circuitry 304 is the circuitry that allows mobile phone 109*a* to function as a telephone, which may include functions for dialing, connecting to a telephone network, storing messages, storing phone numbers, and voice mail, for example.

Camera system 306 is for taking pictures and is optional. The user may choose to take any picture desired upload the picture and send the picture to a friend, for example. Camera system 306 may also take a picture in response to activating the event stamp button 109*a*. The picture taken by camera system 306 in response to operating may be stored in association with the time and other identifying information.

Receiver and transmitter system 308 receives and transmits messages from and to, respectively, a wireless network. Receiver and transmitter system 308 may receive and transmit phone messages. Optionally, receiver and transmitter system 308 may also receive radio waves. Receiver and transmitter system 308 may also be capable of receiving GPS signals for determining a current location. Receiver and transmitter system 308 may be used for communicatively coupling to a web server, such as website host 112, that stores information, such as playlists of radio stations (that may be used for determining a song, program, or other broadcast segment), menus of restaurants, price lists, taxi locations, or other event information based on event stamp information stored in order to identify the broadcast segment or other event.

Tuner system 310 is optional, and (if present) may tune the frequency of the radio waves that is received by receiver and transmitter system 308 to allow the user to choose which radio station to listen to. Antenna system 312 is attached to receiver and transmitter system 308 and picks up an electromagnetic signal from the environment, which is sent to receiver system 204. The electromagnetic signal picked up by antenna system 312 is determined by the current settings of tuner 312.

Output system 314 is for outputting menu information, search results (which may have been produced as a result of activating an event function), viewing phone numbers being dialed, viewing phone numbers stored, viewing television programs, and optionally viewing information related to a radio station being listened to, for example. Output system 314 may be used for surfing a WAN, such as the Internet, sending and viewing text messages, and viewing web pages. For example, output system 314 may be used for viewing candidates for a broadcast segment or other event information that corresponds to event stamp information stored. Output system 314 may also be used to view the event stamp information being stored. Output system 314 may include a port that can be communicatively coupled to a computer via which the identification information may be transferred to a computer so that the event information may be identified via a website on network 110.

Bus system 316 carries signals between all of the components of mobile 109*a*. For example, bus system 316 communicatively couples microphone system 302, other telephone circuitry 304, camera system 306, receiver and transmitter system 308, output system 314, and processor system 318 (processor system 318 is discussed in the next paragraph). Speaker system 317 may be used for listening to phone calls, radio stations, television programs, and/or web pages, for example.

Processor system 318 may be configured for automatically or manually locating a website and sending event stamp information to a server for determining an identity of a broadcast segment associated with event stamp information stored on mobile phone 109*a* in response to pressing event stamp button 109*b*. Processor system 318 may also be configured for automatically making a purchase base on event stamp information (for example, based on information identifying the broadcast segment). Processor system 318 may also process GPS signals to determine a location.

Processor 318 may be configured for reading profile information in a broadcast segment.

Clock system 320 may facilitate the operations of processor system 318. Clock system 320 may also be used for determining a time associated with an event stamp. For example, if a user presses on an event stamp button, processor system 316 may read clock system 320 and record the time in association with other identifying information that may be used included in the event stamp information. In an alternative embodiment, processor system 318 may be replaced with a specialized circuit that is configured for recording event stamps, locating a website, sending the event stamp information to the appropriate host, receiving search results that are based on the event stamp information sent, initiating a purchase based on the event stamp information, and/or completing the purchase initialized.

Memory system 322 may store the identification information. For example, memory system 322 may store a time associated with pressing an event stamp button and a radio or television station that processor system 318 determined as being associated with a broadcast segment that was being played at the time the event stamp was pressed. Memory system 322 may also store a picture taken by camera system 306, which may have been taken in conjunction with pressing the event stamp button. Similarly, memory system 322 may store a location where the timestamp was pressed, which may have been determined by processor system 318 based on GPS signals. Memory system 322 may also store a part of the broadcast segment, which may be used to help identify the broadcast segment at a later time with the aid of a computer and/or a website. As explained above, storing a portion of a broadcast segment may facilitate automatically identifying the correct broadcast segment so that a purchase may also be automatically made without the user reviewing the item being purchased, because the likelihood of purchasing the wrong item is reasonably low.

Event identification algorithm 324 may also be stored in memory system 322. Event identification algorithm 324 may be the machine instructions implemented by processor system 318 that determines the station to which tuner system 310 is tuned. Event identification algorithm 324 may include instructions that cause processor system 318 to take measurements of the frequency to which tuner 310 is tuned. Event identification algorithm 324 may contain instructions that cause processor system 318 to automatically (and/or manually) access a remote database, send event stamp information to the database, and in response receive such results, such as information from the database further identifying the event. For example, the further information may be a name of a song, a name of a radio program, a name of a television program, a name of a movie, the number of a bus or train and a name of the company operating the bus or the train, a connection to a taxi dispatcher, the name of a product and an advertiser that makes the product such as the name of a restaurant, club, or hotel.

Input system 326 may include any of a variety of input mechanisms, such as keys, buttons, touch pads, ports for optically or electronically downloading information from other machines (e.g., computers or other mobile phones). In an embodiment, input for identification information 328 may include one or more buttons that initiate an event stamp function, which may include the collection of event identifying information. For example, input for identification information 328 may include a button that may cause processor system 318 to read and record the time from clock system 320. Additionally, the button may cause a picture to be taken and stored in association with the time. Alternatively, the button may cause processor 318 to collect GPS or other location information, which is then stored in association with the time. The button may also cause processor 318 to access a database containing more information related to the identifying information stored. Input identifying information 328 may include two buttons—one button may be for collecting and recording the event identifying information, and the other button may be for accessing one or more remote databases that are expected to contain more information related to event identifying information. Additionally, or alternatively, input for identifying information 328 may include a button for causing identifying information collected to be displayed via output system 314.

In an embodiment, input for identifying information 328 may include one or more mode buttons, which change the mode of an event stamp button. In one mode, the event stamp button may collect information related to a radio or television program being received, which is recorded as the event identifying information. In another mode, the event identifying information collected and recorded may be related to available transportation, such as commuter buses, trains, and planes. In yet another mode, the information collected and recorded may be related to forms of entertainment that are in a particular area, such as restaurants, clubs, gyms, theaters, parks, and museums. In still another mode, information related to advertisements, such as advertisements on public billboards or in public commuter facilities (e.g., trains, train stations, buses, bus stations, airports, and airplanes) and/or local shops, such as barbers, bookstores, grocery stores, clothing stores, and/or shoe stores may be collected and recorded. Some modes may collect and record the same information, but differ as to which database or which portion of a database is accessed when retrieving further information about the event. For example, a mode for collecting information related to advertisements and a mode for collecting information related to modes of transportation may both record the time, GPS information, and a picture, but the transportation mode may access a database of transportation schedules (e.g., bus, train, and/or plain schedules), while the advertisement mode may access a database storing names of advertisers, products advertised, and the locations where the advertisements are displayed. In a mode for transportation, current locations of available taxis may be included along with an option for automatically ordering a taxi to come and/or for automatically dialing a phone number to contact the taxi or the taxi dispatcher. In a mode for seeing information about places for entertainment, an advertisement may be generated in real time that give special offers if the user uses the service within a particular time frame. For example, if the user is standing outside of the door of a restaurant, and the user activates the event stamp function, in addition to receiving information ordinarily provided by the restaurant, the user may receive a discount if the use orders within a given period of time. In a mode for searching advertisements and local shops, the user may be able to automatically reserve a time for a haircut.

The modes may be configurable. For example, event identification algorithm 324 may include instructions that allow the user to configure a transportation mode to only collect information about trains. Event identification algorithm 324 may contain instructions that allow the user to establish a new mode.

Keypad 330 may be a standard keypad provided with a standard mobile phone. Alternatively, one or more of the keys of keypad 330 may act as one or more event buttons and/or as one or more mode buttons for the one or more event buttons. Keypad 330 may include keys and/or modes that allow the user to view event identifying information that was recorded, retrieve information from one or more databases related to the event stamp information initially recorded, and/or to purchase products based on the information retrieved from one or more databases. Additionally, or alternatively, keypad 330 may allow the user to configure one or more mode buttons of input for identification information 328.

Figure 4:
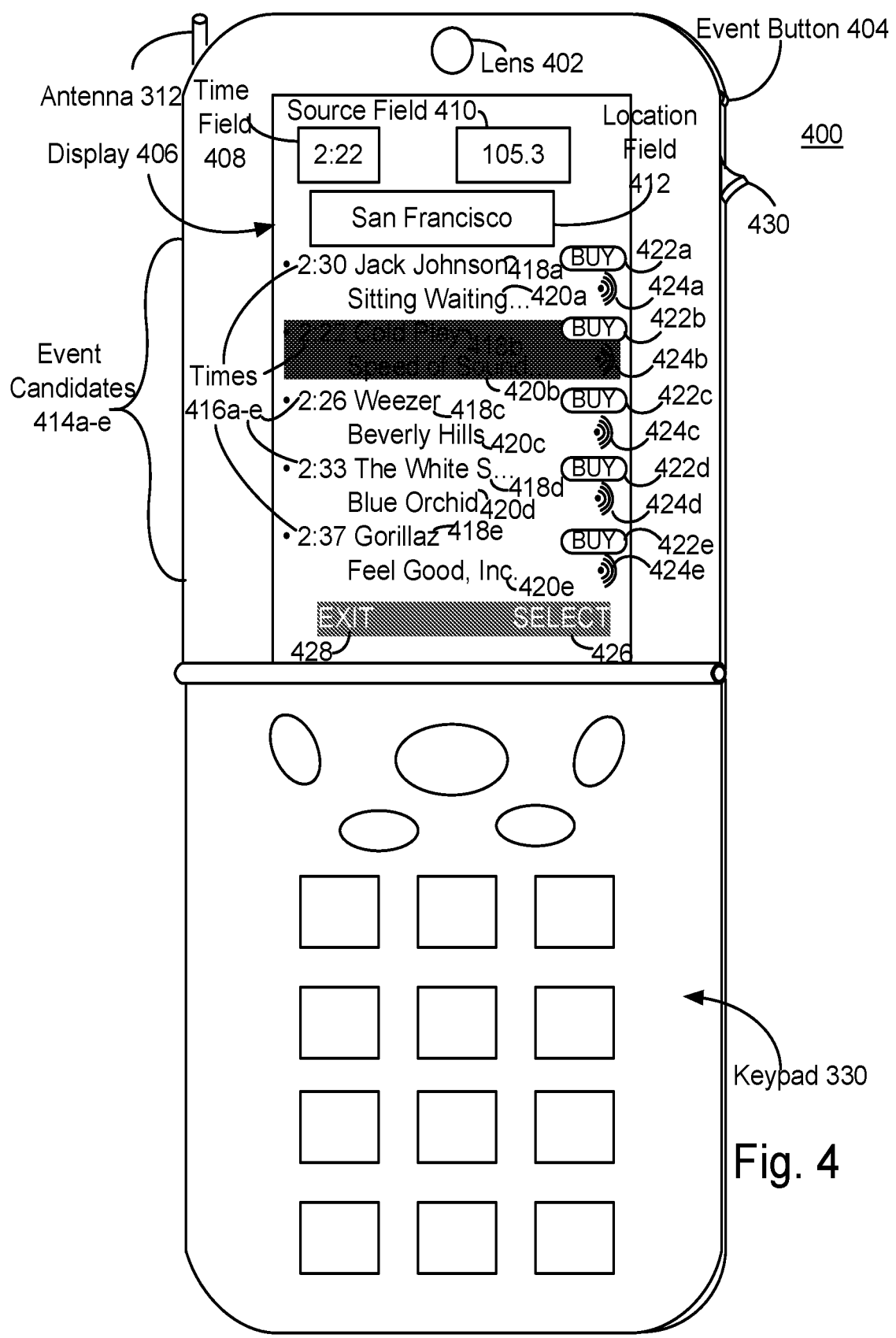
FIG. 4 shows a representation of an embodiment of the mobile phone of FIG. 1, which may be an embodiment of the mobile phone of FIG. 3 or another embodiment.

FIG. 4 shows an embodiment 400 of mobile phone 109a, which may be an embodiment of in FIG. 3 or another embodiment. Mobile phone 400 may include antenna system 312, keypad 330, lens 402, event button 404, display 406, time field 408, source field 410, location field 412, candidates 414a-e, which may include times 416a-e, event names 418a-e, event sponsors 420a-e, links 422a-e, and sampler links 424a-e. Mobile phone 400 may also include exit 426, select 428, and switch 430. In other embodiments, mobile phone 400 may include may not include all of the components and/or may include other components, in addition to, and/or instead of the components listed above.

Antenna system 312 and keypad 330 were described in conjunction with FIG. 3, above. However, antenna system 312 and keypad 330 may be used with different circuits than the one of FIG. 3. Lens 402 may be a lens for (forming an image to be recorded) or a view finder for a camera, such as camera system 306 (FIG. 3).

Event button 404 may be part of input for identification information 328 (FIG. 3). Although only one event button is illustrated in FIG. 4, mobile phone 400 may have multiple event buttons and/or mode buttons associated with event button 404, as discussed in conjunction with input for identification information 328. In the example of FIG. 4, event button 404 is illustrated as having a cylindrical component protruding from the housing of mobile phone 400. In an embodiment, the cylindrical component of event button 404 rotates. By pressing event button 404 inwards, the collection of event stamp information may be initiated. In this embodiment, rotating event button 404 may cause scrolling through information displayed in association with event button 404. For example, after associating the event stamp information collected with other event information in a remote database and after retrieving the information (e.g., search results) from the remote database, the information retrieved may be displayed on a display of mobile phone 400 and scrolled through by rotating the cylindrical component of event button 404. Similarly, event button 404 may be used for scrolling through event identifying information collected prior to retrieving information from any database. In other embodiment, event button 404 may have other features that facilitate navigation through information associated with events. In other embodiments, event button 404 may be another sort of switch or button, and scrolling and/or other navigation functions may be implemented by pressing navigation buttons on keypad 330 instead of, or in addition to, event button 404 having navigation features.

Display 406 is the display of mobile phone 400, which may be part of output system 314 (FIG. 3). In FIG. 4, mobile phone 400 is in a mode in which display 406 displays information (about an event) that was retrieved from a remote database. However, mobile phone 400 may have many other modes for displaying many other types of information, such as the information discussed in conjunction with output system 314.

Time field 408 displays a time that was recorded as a result of activating event button 404. In an embodiment, first the user presses event button 404, and event stamp information (e.g., one or more event identifying pieces of information) are collected and stored. Then, immediately or at a later time, a search is automatically launched or the user manually retrieves the event stamp information, and causes the event stamp information to be matched with more information in a remote database, which is returned to mobile phone 400. The information returned may be displayed on display 406. Time field 408 displays the time that the event stamp information was collected as a result of pressing event button 404. In other modes and/or in other embodiments, the time in time field 408 may be entered manually in addition to, or instead of, by selecting an entry stored in the memory of mobile phone 400 (which was stored as a result of pressing event button 402) as an event stamp.

Similarly, source field 410 shows the source of the event associated with the time in time field 408. In the example illustrated in FIG. 4, the event is the playing of a song, and source of the event is the radio station indicated in source field 410. However, in other embodiments and/or in other modes the source of the event displayed in source field 410 may be any of a variety of sources of events such as television stations, current locations of taxis, menu information for restaurants, a bus having an advertisement, an airport where a plane landed, or a train station where a train arrived. In some modes, the source of the event may be assumed to be unknown, and another type of information may be displayed in source field 410 or source field 410 may be left blank or not present on display 406.

Location field 412 may be a location where the event was observed, which was collected as a result of activating event button 404. In the example of FIG. 4, location field 412 illustrates the location where the song was heard. However, in other embodiments and/or modes the location may be a location where an advertisement, a plane, a train, a bus was seen, for example. Although in the example of FIG. 4, the location is a city, which is stationary and of a certain general size, in other embodiments and/or modes the location may be of a smaller or larger size and/or may be mobile. For example, the location may be designated by GPS coordinates, a longitude and latitude, a street, a county, a state, a country, a particular bus, a particular train, and/or a particular plane. In an embodiment, time field 408, source field 410, and/or location field 412 are filled in automatically in response to pushing event button 109b.

Event candidates 414a-e are candidates for the event of interest to the user. In an embodiment, the event candidate that is expected to be the one of interest to the user is at least initially displayed as highlighted (e.g., selected). In an embodiment, other candidates that occurred before or after the time associated with the event stamp are also displayed so that the user can decide which event (if any) is the one of interest. Although in the example of FIG. 4, five event candidates are displayed in other embodiments and/or other modes, more candidates or fewer candidates may be displayed. In an embodiment, the user can configure mobile phone 400 to display the number of candidates desired and/or can select criterion for deciding which candidates are most likely to be of interest.

Times 416a-e are the times at which each of candidate events 414a-e occurred. Names 418a-e are names of candidate events 414a-e, respectively, which in the example of FIG. 4 are names of songs. Sponsors 420a-e are the names of creators or producers or of candidate events 414a-e.

Links 422a-e are links where each of event candidates 414a-e or items related to each of event candidates 414a-e can be found, purchased, and/or downloaded. In the example of FIG. 4, links 422a-e may link the user to a webpage where the user can buy and download the song. In other embodiments and/or modes, the user may be brought to a site where the user can download the song for free, purchase tickets for a theater, make reservations for a restaurant, call a dispatcher of a nearby cab, and/or purchase tickets for a train, plane, and/or bus.

Sampler links 424a-e may allow the user to see and/or hear at least a portion of event candidates 414a-e, respectively. Thus in the example of a song the user can hear the song to determine if the event candidate is the song they want to purchase. In the example of a television program or movie, sampler links 424a-e may allow the user to see some of the movie or television program. In the case of a restaurant, sampler links 424a-e may allow the user to see the menu or a picture of the restaurant. In the case of a form of transportation, sampler links 424a-e may allow the user the see the fair, the schedule, and/or route that the particular public transportation vehicle follows.

Select 426 is for selecting one of links 422a-e or sampler links 424a-e. Exit 428 exits the mode for viewing candidates 414a-e, allowing the user to select other functions of mobile phone 400. Switch 430 is for turning mobile phone 400 on and/or off.

Figure 5:
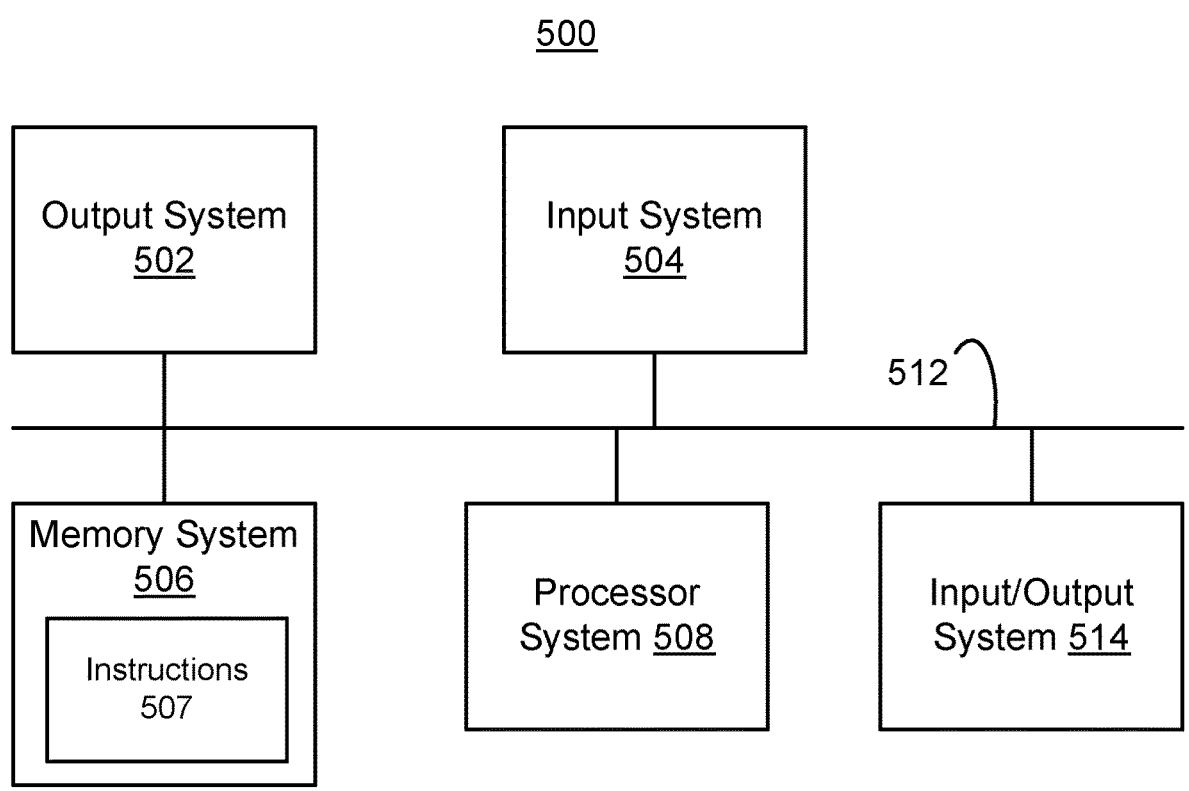
FIG. 5 shows a block diagram of an example of a machine that may be used in the event identification system of FIG. 1.

FIG. 5 shows a block diagram of a machine 500 used in event identification system 100. Machine 500 may include output system 502, input system 504, memory system 506, instructions 507, processor system 508, communications system 512, and input/output system 514. In other embodiments, machine 500 may include may not include all of the components and/or may include other components, in addition to, and/or instead of the components listed above.

Machine 500 is an example of a computer or other machine that may be used for any of network appliance 108, website host 112, database 114, and vendor website hosts 130a-1 may have the structure of machine 500.

Output system 502 may include any one of, some of, any combination of, or all of a monitor system, a handheld display system, a printer system, a speaker system, a connection or interface system to a sound system, an interface system to peripheral devices and/or a connection and/or interface system to a computer system, intranet, and/or internet, for example.

Input system 504 may include any one of, some of, any combination of, or all of a keyboard system, a mouse system, a track ball system, a track pad system, buttons on a handheld system, a scanner system, a microphone system, a connection to a sound system, and/or a connection and/or interface system to a computer system, intranet, and/or internet (e.g., IrDA, USB), for example.

Memory system 506 may include, for example, any one of, some of, any combination of, or all of a long term storage system, such as a hard drive; a short term storage system, such as random access memory; a removable storage system, such as a floppy drive or a removable drive; and/or flash memory. Memory system 506 may include one or more machine-readable mediums that may store a variety of different types of information. The term machine-readable medium is used to refer to any non-transient medium capable carrying information that is readable by a machine. One example of a machine-readable medium is a computer-readable medium. Another example of a machine-readable medium is paper having holes that are detected that trigger different mechanical, electrical, and/or logic responses.

Instructions 507 allow machine 500 to perform the tasks for which it was configured. If system 500 is used for network appliance 108, instruction 505 may include an event identification algorithm similar to that of keychain 107a and/or mobile phone 109a. If machine 500 is website host 112, instructions 507 may cause one or more processors to present a webpage presenting event candidates. If machine 500 is website host 112, instructions 507 may allow machine 500 to receive event identifying information from a network appliance, and to send representations of event candidates to website host 112. If machine 500 is website host 112, instructions 507 may forward the user to a website for purchasing items related to one of the event candidates. Instructions 507 may cause website host 112 to submit a query to database 114 and retrieve information from database 114. If machine 500 is any of network appliance 108, website host 112, database 114, and vendor website hosts 130a-1, instructions 507 may also include an algorithm for matching images and/or sound segments.

If machine 500 is used for database 114 or website host 112, instructions 507 may include a database server, which in turn may include instructions for finding and retrieving information from database 114. If machine 500 is used for database 114, memory system 506 may store information and/or representations of events, such as playlists, transportation schedules, television schedules, current movie showings, play bills, restaurant menus, and/or other information. If machine 500 is any of vendor website hosts 130a-1, instructions 507 may allow the vendor website host to receive a request to present a webpage for purchasing various products, such as songs, movies, tickets, and/or other products.

Processor system 508 may include any one of, some of, any combination of, or all of multiple parallel processors, a single processor, a system of processors having one or more central processors and/or one or more specialized processors dedicated to specific tasks. Processor 508 may implement instructions 507 and/or cause an event function to be performed in response to pressing an event stamp button or otherwise activating an event stamp function.

Communications system 512 communicatively links output system 502, input system 504, memory system 506, processor system 508, and/or input/output system 514 to each other. Communications system 512 may include any one of, some of, any combination of, or all of electrical cables, fiber optic cables, and/or means of sending signals through air or water (e.g. wireless communications), or the like. Some examples of means of sending signals through air and/or water include systems for transmitting electromagnetic waves such as infrared and/or radio waves and/or systems for sending sound waves.

Input/output system 514 may include devices that have the dual function as input and output devices. For example, input/output system 514 may include one or more touch sensitive screens, which display an image and therefore are an output device and accept input when the screens are pressed by a finger or stylus, for example. The touch sensitive screens may be sensitive to heat and/or pressure. One or more of the input/output devices may be sensitive to a voltage or current produced by a stylus, for example. Input/output system 514 is optional, and may be used in addition to or in place of output system 502 and/or input system 504. If machine 500 is network appliance 108, input/output system 514 may include an event stamp button or other mechanism for activating an event stamp function.

Figure 6:
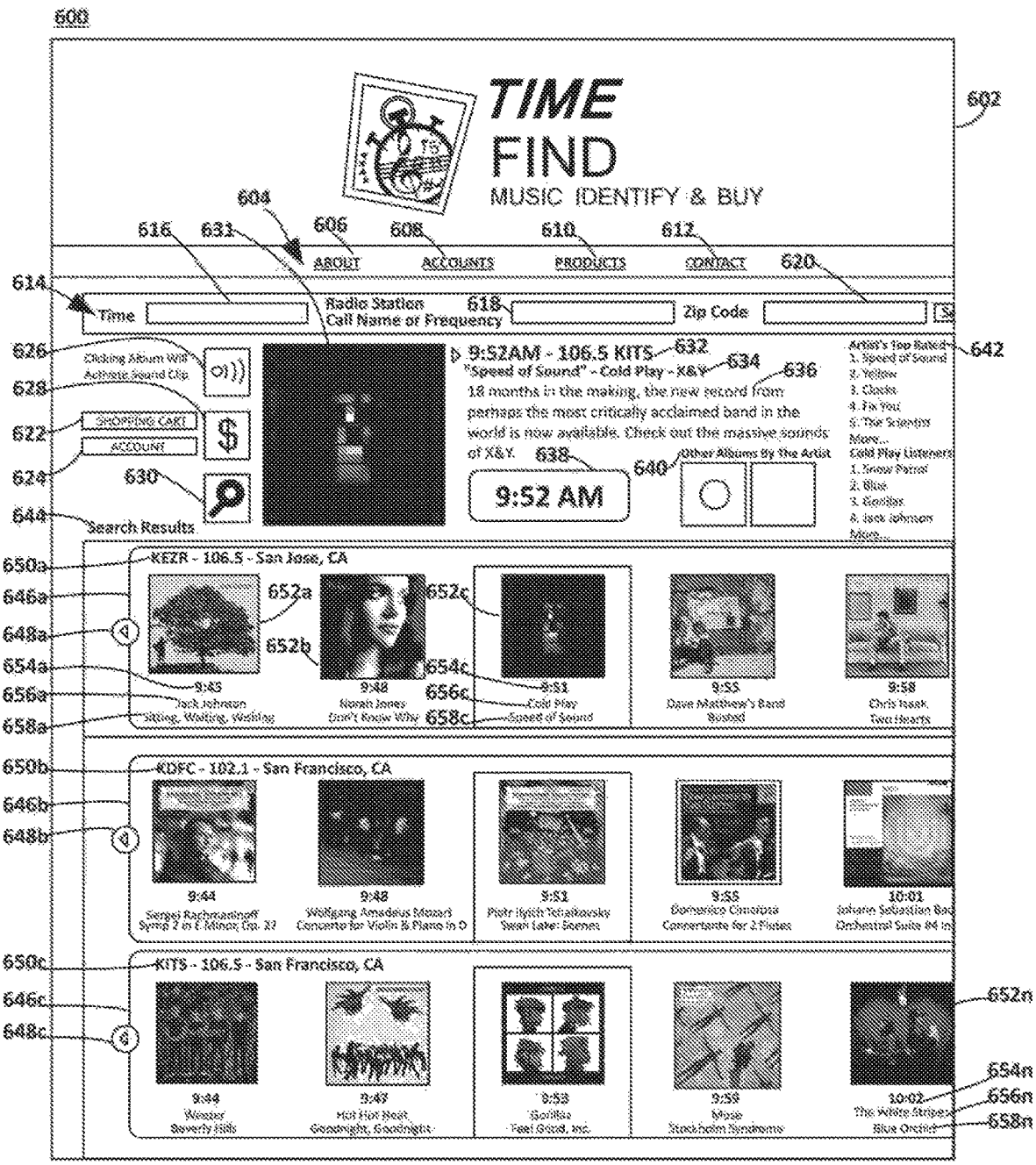
FIG. 6 shows an example of a screenshot of a webpage that may be presented by a website host.

FIG. 6 shows an example of a screenshot of a webpage 600 that may be presented by website host 112. Webpage 600 may include header 602 and navigation links 604, which may include about link 606, accounts link 608, products link 610, and contact link 612. Webpage 600 may also include search field bar 614, which may include time field 616, source field 618, and location field 620. Webpage 600 may include shopping cart link 622, account link 624, sampler link 626, price link 628, details link 630, selected candidate image 631, selected candidate source 632, selected candidate sponsor 634, selected candidate information 636, selected candidate time 638, same sponsor products 640, other related products 642, search results 644, event candidate sources 646a-c, navigation icons 648a-c, source identifiers 650a-c, event candidate images 652a-n, event candidate times 654a-n, event candidate sponsors 656a-n, and event candidate names 658a-n. In other embodiments, webpage 600 may not include all of the features listed above and/or may include additional features instead of, or in addition to, those listed above.

FIG. 6 displays an example of a webpage in which the events are broadcasts of songs. The respective titles and artists of the songs correspond to event stamps for songs. FIG. 6 has three rows of icons at the bottom, and each row includes five icons. Each row corresponds to a single event stamp. In each row, the icon that has been grayed indicates the song played precisely at the timeslot corresponding to a time associated with the event stamp. The user may select one of the icons corresponding to songs played before and after the grayed icon instead of selecting the grayed icon.

Specifically, header 602 may provide information identifying the purpose and/or owners of the website. Although not illustrated, the webpage shown in display 406 of FIG. 4 may have a similar header. However, webpage 600 has more room for a header, and consequently, header 602 may provide more information than a header for the Short Message Service (SMS) webpage of FIG. 4 or the header may be absent. In an embodiment, mobile phone 107a views a SMS version of webpage 600. Navigation links 604 are links to other web pages associated with the same website as webpage 600. About link 606 is a link to one or more webpages describing various aspects of the organization that sponsors and/or maintains the webpage 600. Accounts link 608 is a link to one or more webpages that assist an individual in setting up an account. Products link 610 links the user to one or more webpages that describe other products provided by the same organization that sponsors and/or maintains webpage 600. Contact link 612 links the user to one or more webpages that give information related to contacting the organization that sponsors and/or maintains webpage 600. In other embodiments, navigation links 605 may not include all of the links of the example of FIG. 4 or may include other links in addition to, or instead of, the navigation links of FIG. 4.

Search field bar 614 includes one or more different fields via which the user may search for the event of interest. Time field 616, source field 618, and location field 620 are essentially the same as time field 408, source field 410, and location field 412, respectively, which were described above in conjunction with FIG. 4. Although in the example of FIG. 4 location field 410 has a city name identifying the location and in the example of FIG. 6 the zip code is used for identifying the location in other embodiments location field 620 may use a city name or other location identifier and/or mobile phone 107a may use a zip code or other location identifier to identify the location associated with the event. In an embodiment, time field 616, source field 618, and location field 620 are filled in automatically. If the user of the webpage 600 or mobile phone 107a is accessing webpage 600 via a device without an event stamp or with an event stamp, but without a means of automatically transmitting the information to website host 112, the user is likely to enter the information manually.

Shopping cart link 622 links a user to one or more webpages where the user may view the items the user selected for purchasing, but has not yet purchased and/or the prices associated with the items selected for purchase. Account link 624 link the user to one or more webpages where the user can view information about their account. In an embodiment, accounts link 608 and account link 624 access the same information. In an embodiment, only one of account links 602 and account link 624 appear on webpage 600.

Sampler link 626 is the same as sampler links 424a-e, which are described in conjunction with FIG. 4, above. Although in the example of FIG. 4 each of event candidates 414a-e has a sampler link, while in the example of FIG. 6 only the selected candidate has a sampler link, in other embodiments and/or modes mobile phone 107a may only offer a sampler link for the selected candidate and webpage 600 may offer a sampler link for each event candidate. In other embodiments, sampler links do not appear for all event candidates displayed, but still appear for other event candidates in addition to the selected event candidate. For example, in another embodiment, in mobile phone 107a and/or on webpage 600, sampler links only appear for the three event candidates that are expected to have the highest likelihood of being the event candidate of interest.

Price link 628 may link the user to one or more webpages that show the price of the selected candidate. For example, price link 628 may link the user to a list of vendors or to links to vendors that sell items related to the event, and the prices that each vendor charges. Alternatively, selecting or moving a cursor over and/or near price link 628 may cause a balloon to appear displaying the price. In another embodiment, the price may be displayed instead of price link 628 and/or another price links may be displayed elsewhere.

Details link 630 may allow a user to view more details and/or see a larger version of an image displayed for the purposes of representing the selected candidate. Selected candidate image 631 may an image of an item associated with the selected candidate. For example, if the selected candidate is a song, candidate image 631 may be the image on a cover of an album and/or CD where the song can be found. Selected candidate source 632 is the source of the selected event candidate. Sources were described in conjunction with sources 418a-e of FIG. 4. Selected candidate sponsor 634 is the sponsor of the selected event sponsor. Event sponsor were described in conjunction with sponsor 420a-e of FIG. 4. Selected candidate information 636 gives more information related to the selected event candidate. Selected candidate time 638 is the time associated with the selected event candidate. The times associated with event candidates was described in conjunction with times 416a-e of FIG. 4.

Same sponsor products 640 is a list of products (e.g., events or other products) having the same sponsor (e.g., that were made by the same artist and/or that are sold by the same company). Other related products 642 is a list of other products related to the selected event. Search results 644 lists the results of one or more searches for events corresponding to one or more event stamps.

Event candidate sources 646a-c are the event sources that correspond to the information associated with each event stamp entered as a search query. Navigation icons 648a-c allow the user to navigate (e.g., scroll through) the candidate events associated with a particular event source. Source identifiers 650*a-c* identify the event sources. In the example of FIG. 6 in which the event sources are radio stations, the source identifiers 650*a-c* are the location, name, and/or frequency associated with each radio station. Event candidate images 652*a-n* are images (e.g. icons image of covers of CDs having the candidate song) associated with each of the event candidates, respectively. Event candidate times 654*a-n*, event candidate sponsors 656*a-n*, and event candidate names 658*a-n* are essentially the same as times 416*a-e*, sponsors 420*a-e*, and names 418*a-e*, respectively, which were described in conjunction with FIG. 4.

Figure 7:
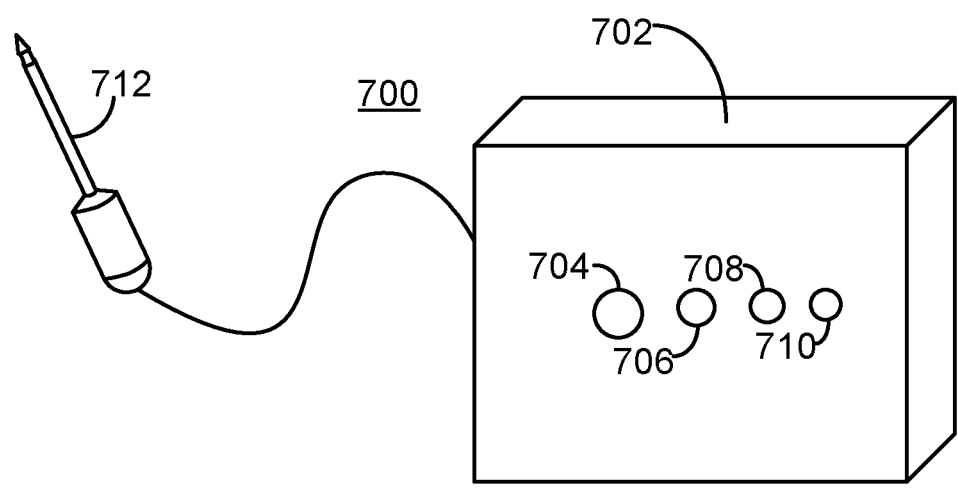
FIG. 7 shows a block diagram of an example of an attachment that may be attached to another device to thereby add an event button.

FIG. 7 shows an attachment 700 that may be attached to another device to thereby add an event button. Attachment 700 includes housing 702, event stamp button 704, first mode button 706, second mode button 708, third mode button 710, and connector 712. In other embodiments, attachment 700 may not include all of the components listed above and/or may include other components instead of, or in addition to, those listed above.

Attachment 700 may include a circuit similar to machine 500 housed within housing 702. Event stamp button 704 may have the same functions as event button 404 of FIG. 4. The machine to which attachment 700 is attached will be referred to as the primary appliance. Pressing event stamp button 704 may cause the device to which attachment 700 is attached (the primary appliance) to collect event stamp information. In another embodiment, pressing event stamp button 704 may cause attachment 700 to collect event information. For example, attachment 700 may include a clock whose time is read and recorded as a result of pressing event stamp button 704. Similarly, pressing event stamp button 704 may cause attachment 700 to determine a radio station to which the primary device is tuned. First mode button 706, second mode button 708, and third mode button 710 may change the mode of event stamp button 704. For example, first mode button 706 may place event stamp button 704 in a mode in which event information related to broadcasts is collected, second mode button 708 may place event stamp button 704 in a mode in which event information related to transportation is collected, and third mode button 710 may place event stamp button 704 in a mode in which event information related to entertainment (e.g., restaurants and theaters) is collected. There may be a third mode button for collecting information related to advertisements. Connector 712 connects to the primary appliance, such as a cell phone, computer, or another primary appliance. Connector 712 is not limited to the specific type of connector illustrated. Any of a number of connectors may be used instead, such as a USB connector or another connector. In one embodiment, attachment 700 stores the event information in the memory of attachment 700. In another embodiment, attachment 700 stores the event information collected in the memory of the primary appliance to which it is attached.

Figure 8:
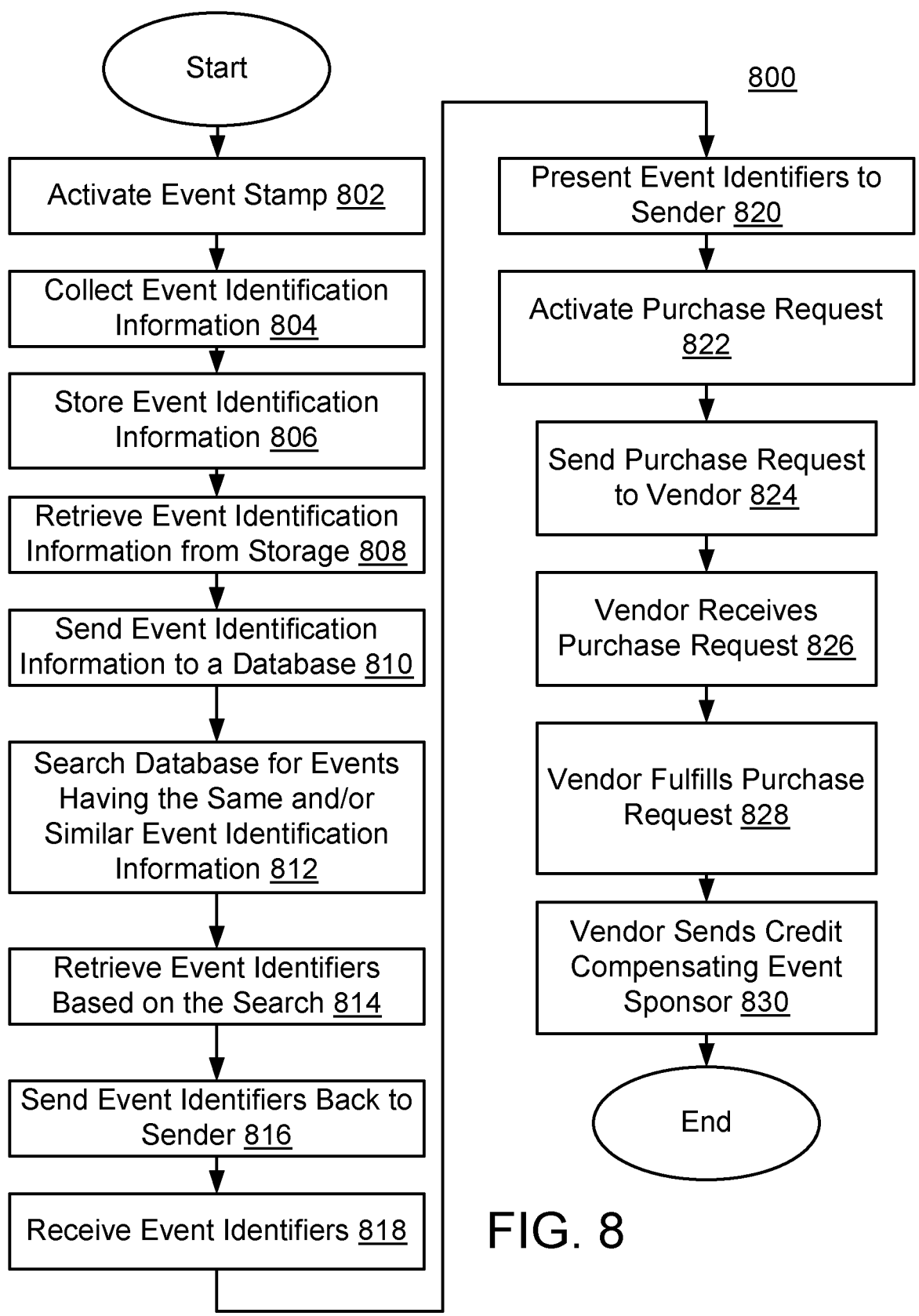
FIG. 8 shows a flowchart of an example of a method of using an event stamp.

FIG. 8 shows a flowchart of an example of a method 800 of using an event stamp. In step 802, an event function is activated. Step 802 may involve activating event functions associated with input for identification information 224, input for identification information 328, input system 504, and/or activating event stamp buttons 106, 107*b*, 109*b*, 404, and/or 704.

In step 804, event stamp information is collected, which may involve retrieving the time from a clock, retrieving GPS information, retrieving profile information from a broadcast of a radio, television or other broadcast segment, recording a portion of a broadcast segment, measuring and recording a frequency and/or station to which a tuner is set, taking a picture, recording a voice message, measuring and recording a temperature, measuring and recording an altitude, and/or measuring and recording a pressure. In an alternative embodiment, all or part of the event stamp information is entered manually in addition, or instead of, performing steps 802 and 804. In step 806, the event stamp information is stored, which may involve storing the event stamp information in memory system 218, 322, and/or 506.

In step 808, the event stamp information is retrieved from storage. For example, while the user is involved in some activity, the user merely activates the event stamp, and then at a later time when the user is not involved in any particular activity, the user retrieves candidate event information based on the event stamp information. Alternatively, step 806 may be performed automatically or manually immediately after collecting the candidate event information (for example is step 804), in which case the event stamp information may never be stored in long term storage. If the event stamp information is not stored in long term storage, step 806 may only involve storing the event stamp information is short term storage (e.g., in the cache of the processor) or step 806 and 808 may be skipped.

In step 810, the event stamp information is sent to a database. Step 810 may involve sending the event stamp information from listening device 104, network appliance 106, keychain 107*a*, and/or mobile phone 109*a* to website host 112, which may then be forwarded to an appropriate database, such as database 114, and/or to one or more other databases associated with broadcast sources 116-124, airports 126*a-n*, train stations 128*a-n*, taxis, restaurants, hair cutteries (or barbers or beauty parlors), other shops and/or forms of entertainment, and/or vendors associated with advertisements. Alternatively, the event stamp information may be manually or automatically transferred from listening device 104, keychain 107*a*, and/or mobile phone 109*a* to network appliance 106 (which may be a computer or mobile phone, for example) prior to sending the event stamp information to the appropriate database (the transfer may also be from a first mobile phone that has an event function, but that is not capable of accessing website host 112 or database 114, to a second mobile phone that does have access).

In step 812, the appropriate one or more databases are searched, which may involve automatically formulating and sending a database query to the appropriate database and searching the appropriate database via a database server based on the query. In step 814, candidate event information is retrieved based on the search of step 812. In step 816, the candidate event information is sent back to listening device 104, network appliance 106, keychain 107*a*, and/or mobile phone 109*a*. In the case of network appliance 106, mobile phone 109*a* or any other network appliance having a display, a webpage including candidate event information may be sent (the webpage may also include advertisements related to the event stamp information and/or the candidate event information and/or the current location of the event identification device with respect to the advertiser). Some examples of the candidate event information are found and discussed in conjunction with FIGS. 4 and 6. In step 818, the candidate event information (and possibly an associated webpage) are received by listening device 104, network appliance 106, keychain 107*a*, and/or mobile phone 109*a*. In step 820, the candidate event information (and possibly an associated webpage) is presented to the user on the display of the user's network appliance.

In step 822, the user initializes a purchase, which may be based on the candidate event information. Step 822 may involve the user reviewing the candidate information presented, deciding which candidate event information corresponds to the event of interest. Deciding which candidate event information corresponds to the event of interest may involve a significant amount of interaction between the user, the network appliance being used, website host 112 and/or the appropriate database. For example, the user may hear and/or view sample clips associated the candidate event information before deciding which candidate event information is of interest. As a further example, the user may be presented with the candidate event information for three candidate events having the closest time to the time associated with the event stamp information. However, the user may decide that none of the three candidate events are the events of interest, and request candidate event information for candidate event that are associated with other times that are not as close as to the time associated with the event stamp as the candidate event information originally presented. At the end of step 822, the user selects a purchase icon, such as links 422-*a*-*e*, therein initiating a purchase.

In step 824, in response to the user selecting the purchase icon, the request is sent to the vendor. In step 826, the vendor receives the request. In response, in step 828, the vendor determines the product requested and sends the product to the user, therein fulfilling the user's request. In step 830, the vendor determines through which source the user became interested in the product sold. For example, the vendor determines which radio station the user heard the song or on which television stations the user saw a program, and the vendor sends the source a payment. Alternatively, a portion of the purchase price may go to website host 112, which may in turn send a payment to the source of the event, or the source of the event is compensated in another fashion. In yet another embodiment, no payment is sent to the source of the event. In an alternative embodiment and/or mode, all or part of steps 820-826 may be performed automatically without user intervention.

In an embodiment, each of the steps of method 800 is a distinct step. In another embodiment, although depicted as distinct steps in FIG. 8, step 802-830 may not be distinct steps. In other embodiments, method 800 may not have all of the above steps and/or may have other steps in addition to or instead of those listed above. The steps of method 800 may be performed in another order. Subsets of the steps listed above as part of method 800 may be used to form their own method.

Figure 9:
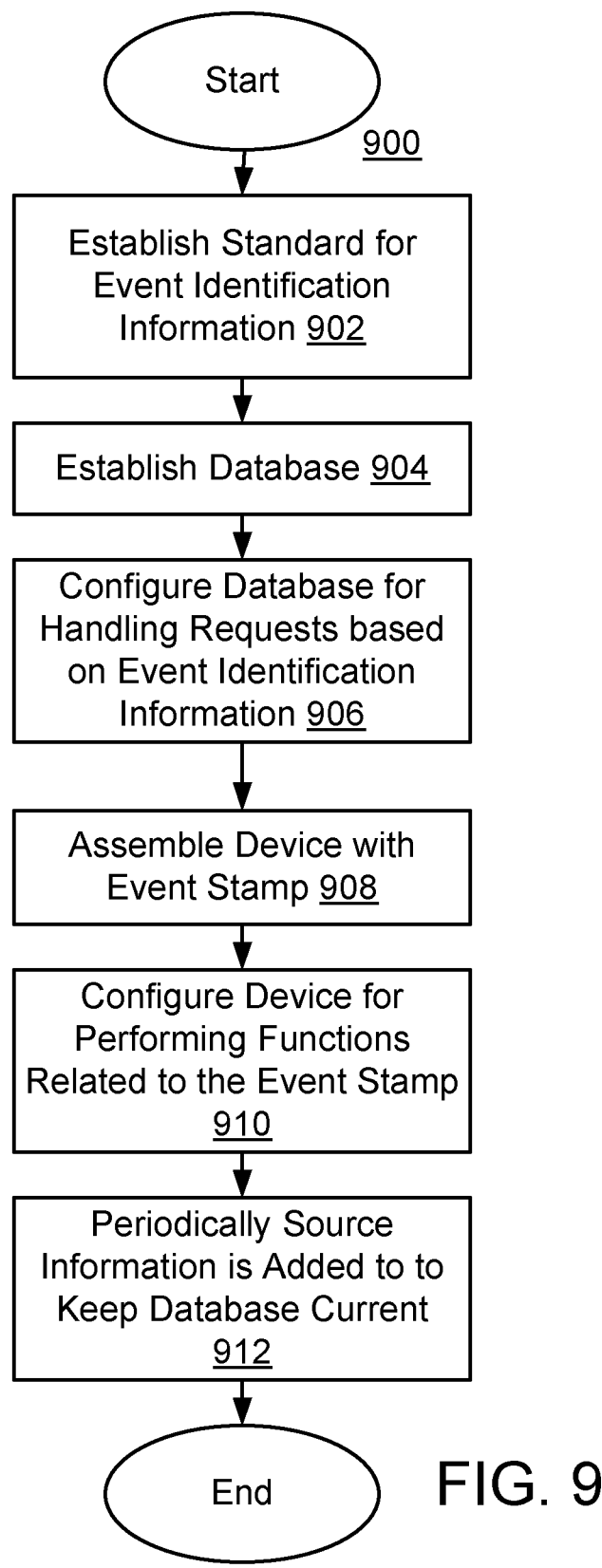
FIG. 9 is a flowchart of an example of a method for establishing event identification system of FIG. 1.

FIG. 9 is a flowchart of an example of a method 900 for establishing event identification system 100. In step 902, a standard may be established for event stamps. Having a standard for event stamps facilitates allowing a larger variety of participants than were no standard being used. By having a standard, each perspective participant may be reasonably sure of being capable of participating by conforming to the standard. The standard may include a minimal set of identifying pieces of information, an order in which the identifying pieces of information are stored in an event stamp, a location within a file or group of messages where the event stamp is stored and/or communicated. Different types of event stamps may have different standards. For example, event stamps for songs and programs may require a time, followed by a location, followed by a source of the event (e.g., a radio station or a television station). In contrast, the standard for a mode of transportation may include a time, followed by a location, where the location is a city or a street, followed by the type of transportation. Similarly, the standard for an advertisement may include a time, followed by where the advertisement was seen, heard, or otherwise observed (which may be a street, a form of transportation, a radio station, or a television station, followed by the type of transportation). Step 902 is optional, because event identification system 100 may be established without a standard for event stamps. For example, a proprietor may prefer not to have a publicly useable standard so that it is more difficult for competitors to compete. In step 904, a database is established (e.g., constructed or purchased) that for stores event data, such as database 114.

In step 906, the database is configured for handling requests for event information. For example, database 114 may be configured to automatically lookup retrieve and return event information in response to a request for information about an event. During step 906, database 114 may also be configured to automatically receive and/or request updates of information from a variety of vendors.

In step 908, identification devices, which may have event stamps, such as key chain 107*a*, mobile phone 109*a*, network appliance 106, and/or attachment 700 are constructed. If the identification device has an event stamp constructing the identification device includes installing and constructing the event stamp. In step 910, the identification devices are configured (e.g., programmed) for collecting the event stamp information, storing the event stamp information, retrieving the event stamp information, sending the event stamp information to a website host, receiving event information in reply, displaying the event information, sending a request to purchase items associated with the event, and/or receiving the purchased item.

In an embodiment, each of the steps of method 900 is a distinct step. In another embodiment, although depicted as distinct steps in FIG. 9, step 902-910 may not be distinct steps. In other embodiments, method 900 may not have all of the above steps and/or may have other steps in addition to or instead of those listed above. The steps of method 900 may be performed in another order. Subsets of the steps listed above as part of method 900 may be used to form their own method.

Block Diagram of Mash Guide

Figure 10A:
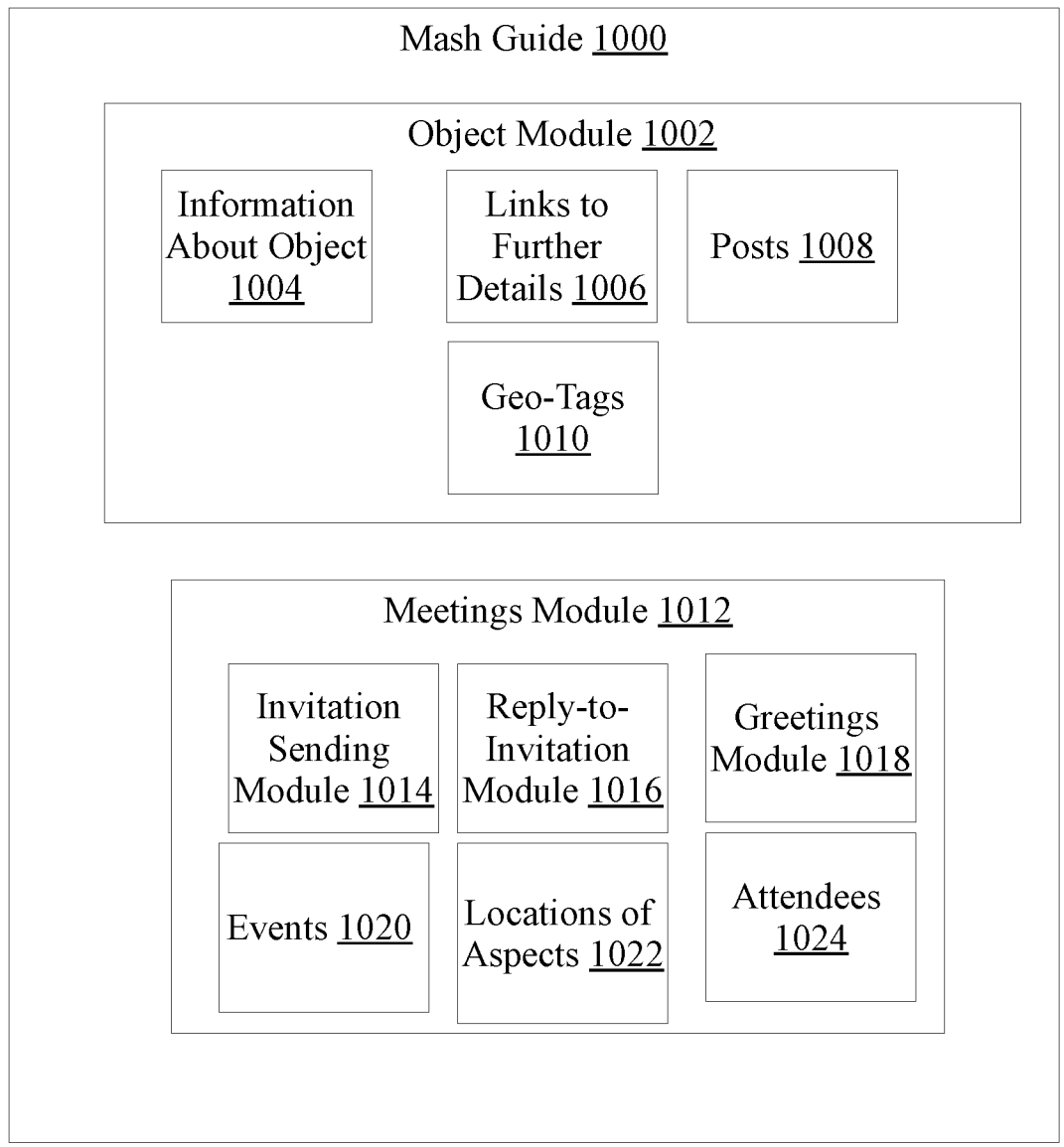
FIG. 10A shows a block diagram of an embodiment of a software for an event identification system.

FIG. 10A shows a block diagram of an embodiment of a mash guide 1000 for an event identification system. Mash guide 1000 may include object modules 1002 having information about object 1004, links to further detail 1006, posts 1008, and geo-tags 1010. Mash guide 1000 may also include meetings modules 1012, which may include invitation sending module 1014, reply-to-invitation module 1016, greeting module 1018, events 1020, locations of aspects 1022, and attendees 1024.

Hardware Configuration

Figure 10B:
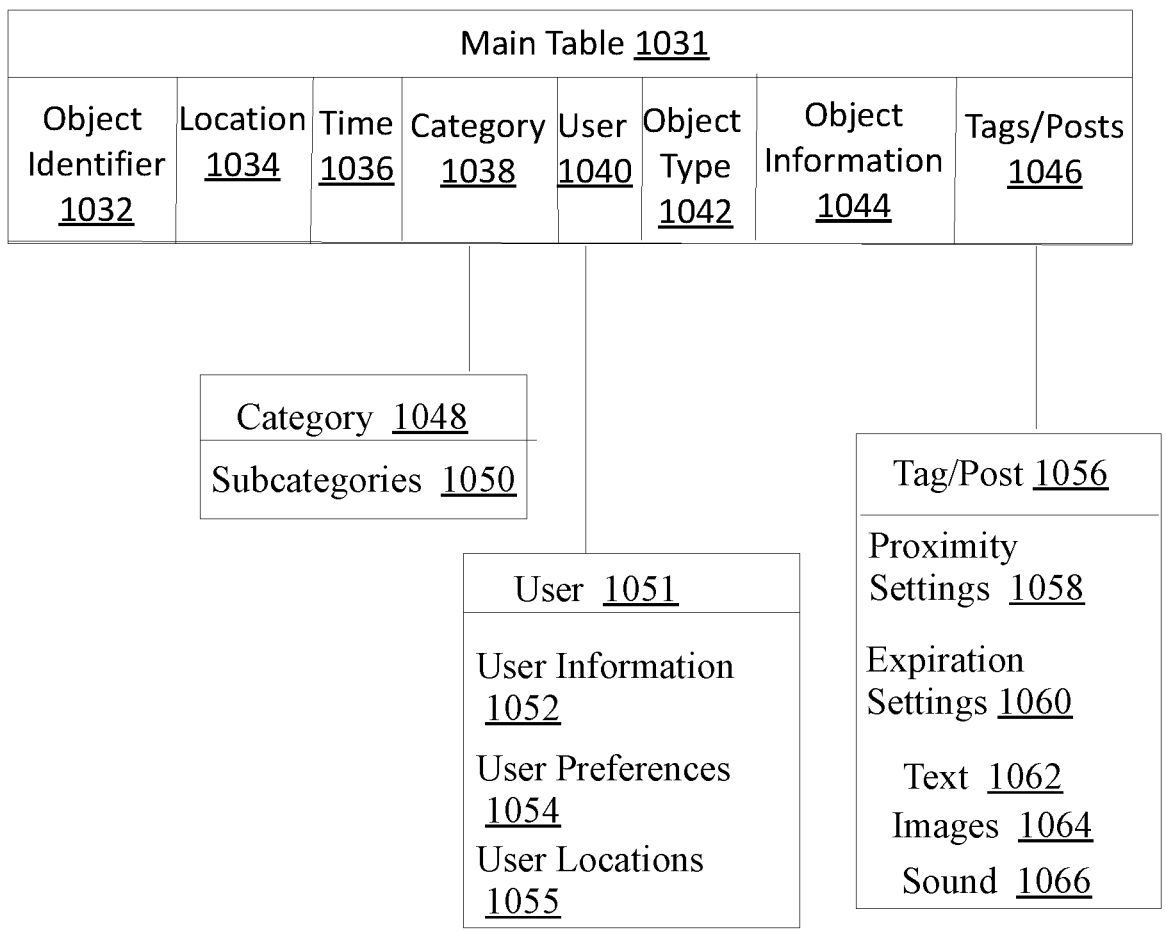
FIG. 10B shows a representation of an entity relationship diagram of an embodiment of an event identification system of FIG. 10A.
Figure 10C:
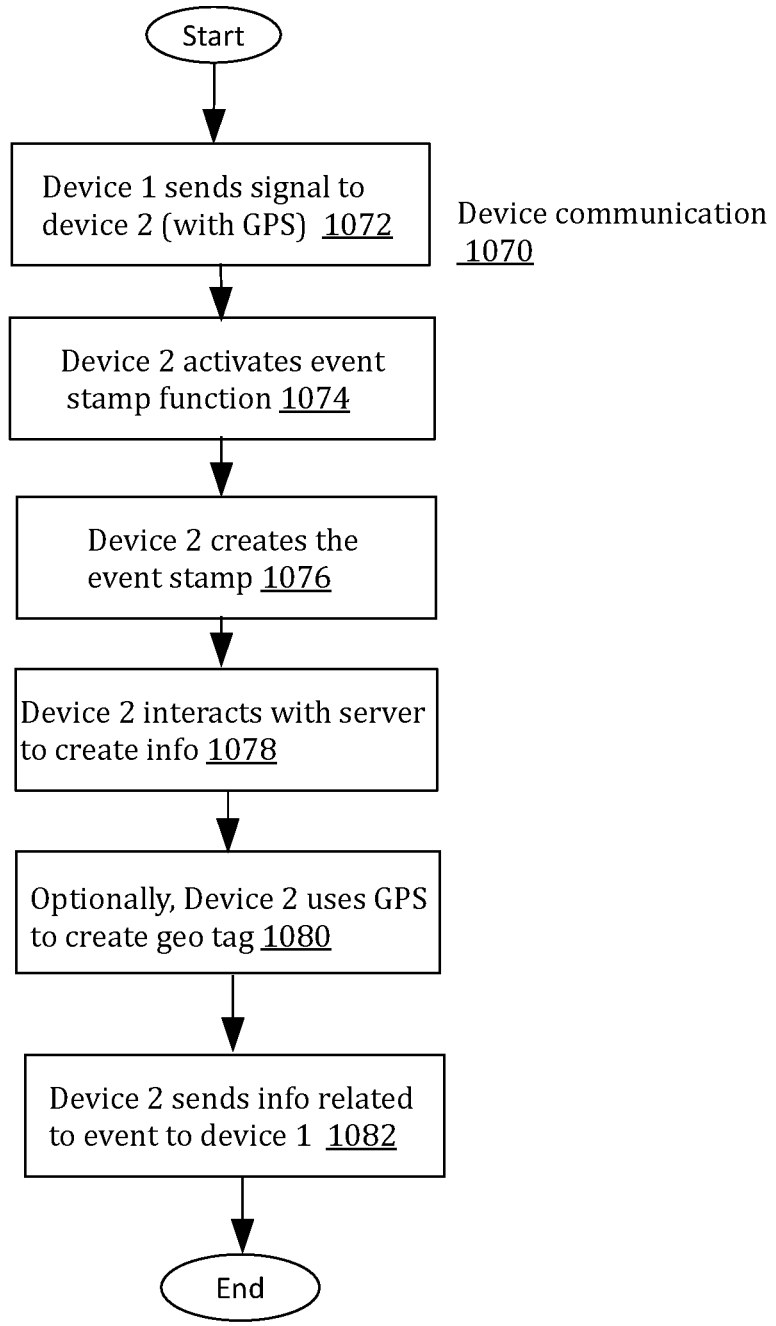
FIG. 10C shows a flowchart of an embodiment of a method of device communication for establishing the event identification system of FIG. 10A.
Figure 18:
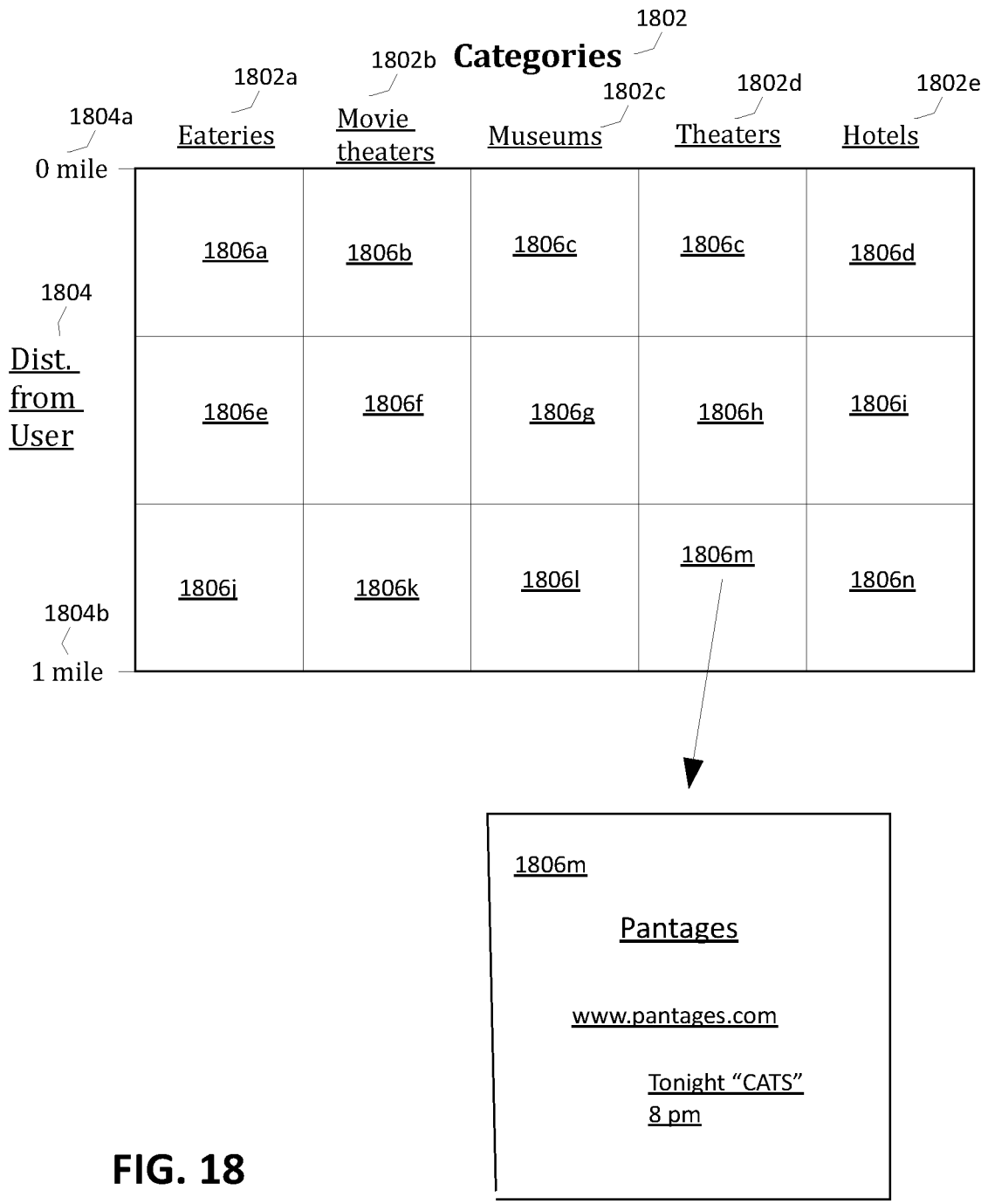
FIG. 18 shows a representation of an embodiment of a mash guide used in the event identification system.

An embodiment of hardware used for implementing mash guide 1000 is discussed in conjunction with FIGS. 10C and 18, for example. However, as background to the discussion of mash guide 1000, that hardware is also briefly discussed here, leaving the further details that are not needed for the discussion of the mash guide to FIGS. 10C and 18. In an embodiment there may be system including a wearable device, a network appliance, and a server. In one embodiment, a GPS module is in the network appliance. In another embodiment, the GPS is in the wearable device in addition to, or instead of, being in the network appliance. The network appliance may be a mobile device, for example. The network appliance may provide a connection to the Internet for the wearable device. Page views, based on information provided by a server, may be sent from the network appliance to the wearable device. An event stamp button and/or event stamp function may be on and/or incorporated into the wearable device, but is not necessarily on the wearable device. Throughout this specification, it should be understood that whenever an event stamp button is mentioned, it could be a physical event stamp button or a virtual event stamp button.

For example, upon activating an event stamp button on the wearable device, the wearable device may communicate some or all of the event stamp information to the network appliance and/or the wearable device may request the network appliance to prepare event stamp information. For example, the event stamp function (and geo tagging, which is discussed below) may be triggered by a stand-alone event stamp button that is not on the wearable device and/or that is on the wearable device, and the wearable device may be used for viewing the results of activating the event stamp function. The result of activating the event stamp button may be: displaying to the user the event stamp information, allowing the user to add more event stamp information (e.g., a sound recording, additional descriptive text, still images, and/or a video) in addition to the event stamp information collected automatically, and/or performing a search for events that match the event stamp information. For example, the network appliance may be a phone (or other mobile device) and the wearable device may be a watch, where the mobile device provides the connection to the Internet for the watch, which may have an event stamp button. The phone sends the pages to the watch. The watch sends a signal that the event stamp button was pressed, and in response, the mobile device creates the event stamp, using GPS facilities on the mobile device for adding location information to the event stamp information and/or other search information.

Mash Guide/Proximity Grid

Returning to the discussion of mash guide 1000, billboards and ads, such as those posted on buildings, at the side of roads, at bus stops, in train stations, in trains, in buses, and in taxis, have only a very limited amount of information. There are a lot of specialized applications for finding different types of location sensitive information, such as for movies, restaurants, and theaters, that are dedicated to finding a specific type of information or information that is associated with a particular company. However, there is no one place to find all of the location based information. The closest type of service that is available for uniting all of the different types of location based information are general purpose search engines (e.g., Google®), which search essentially static web pages.

Additionally, the search engines do not provide any information that is directly connected to specific billboards and ads. If one remembers enough of the information that is in the ad, when the user is in a location and situation that is amenable for formulating a search, the user may be able to do a search to find more information about the event, service or product in the advertisement. Although there is not a lot of resistance to performing a search or to opening one particular app related to one specific type of service, while traveling there is a lot of resistance to finding the one app that provides the desired type of information and/or for performing a search to get more information. Also, identifying multiple apps to get a variety of information related to a particular location can be cumbersome and time-consuming.

The proximity server provides information based on location regardless of the type of content, but the information is organized according to type of subject matter, so that the user may easily sort through and receive only the information of interest. Since the information is proximity based, the total amount of information is also limited. This further increases the ease of finding the desired information. This specification recognizes that a user is highly motivated to find certain types of information (which may be in an ad, for example), and the provider or a corresponding service, product, or event is highly motivated to provide the information regardless of how the user finds the information (whether or not the information is provided by the provider's specialized application or otherwise). Consequently, the providers are likely to be willing to provide information that populates the proximity grid. The proximity grid provides information from many different types of sources and of many different types discoverable in one location.

In an embodiment, the wearable device and/or network appliance retrieves from the proximity server and displays different objects that are grouped together and organized into guides, where each guide may include a different category of objects (each located at a different node of the mesh that form the mash guide) that are categorized by the subject-matter of the objects. In an embodiment, each guide is presented in a column (alternatively each guide is presented in a row) and each row (or alternatively each column) corresponds to a different distance and/or proximity. The guides may include links to multiple objects that are related to each other and that the user may scroll through.

In an embodiment, the user may combine guides, if desired. In other words, in an embodiment, a user may combine multiple guides together to return (e.g., in one column or row) objects that are at least related to all of the guides combined. For example, a user may be interested in seeing a movie and has not yet determined whether to see the movie at home or to see the movie at a theater, and consequently the user may want to search both nearby theaters and search services that rent movies simultaneously.

Note that the proximity grid is the grid of information that is posted in the system, whereas the mash guide 1000 is a specific manner in which the information is organized and presented to the user. In other words, the proximity grid is a network of places, establishments, people, businesses, public facilities (e.g., museums and parks), landmarks, etc. that have a grid card, via which users of the grid may locate entities and provide location-related information (as well as other information to others via the network. Mash guide is a guide to geo-tagged establishments and/or other entities that are available, via grid cards, to users. However, in this specification, the terms proximity grid and mash guide 1000 may be substituted one of the other to obtain different embodiments. Although the mash guide and proximity grid are not the same thing, one may substitute one term for the other where ever one of the two terms occur and obtain different embodiments.

In an embodiment, some or all of the objects in the mash guide 1000 may be based on event information, such as from event stamps, that are entered by individual users (which may later be searched for using event stamp information). In an embodiment, the user may select a particular object and be directed to additional information to learn more about the object. In an embodiment, in response to the user selecting a particular object and being directed to additional information to learn about the objects, the user may also be provided with an option to upload a user response about the object.

Optionally, the user posted information may be temporary and disappear after a period of time. Whether the posting is permanent or temporary and/or the duration of time of the posting may be based on user choices, event-provider input, and/or the choices of an administrator of a proximity server. In an embodiment, the user may set the user response to disappear after a period of time. The user may or may not be able to set the specific amount of time. In an embodiment, a user associated with an establishment related to an object may leave a user response that may include at least promotional offers and/or time sensitive information that relates to the object.

In an embodiment, the user provided information includes various user ratings, user comments, user provided sound recordings, user provided images (e.g., still images and/or video images), and/or other user provided information about the object that the user may optionally be able to listen to, read, and/or view. In this specification, the term image is generic to both still images and videos images. Whenever the term image is used, a video and/or still image may be substituted to obtain specific embodiments. In other words, the user response may include at least a rating based on a set scale, a text message left by the user, user provided images and/or a voice message left by the user.

In an embodiment, one may push a button and receive a grid or mesh having an arrangement of grid cards, which the user may navigate through, where the particular cards that are displayed are based on a user's preferences, the current time, and/or location.

In an embodiment, the mash guide 1000 may be used and searched without usage of any event stamp function or event stamp information, without usage of a smartphone and/or wearable device. For example, when the user accesses the mash guide 1000, the server may choose which objects to present to the user based on prior chosen preferences and/or the user's current location. Alternatively, or additionally, the user may have an option of inputting various parameters manually to perform a search and/or of having a search automatically performed based on information in an event stamp.

In an embodiment, event information (e.g., related to a physical object at a location) may be stored in response to activating an event stamp function. In response to activating an event stamp function, multiple types of event information are collected from a user. Event information that may be collected may include location information including GPS coordinates, time, user inputs including voice and images, and contextual information. In response to collecting the event information, the device displays multiple objects, which may be based at least in part on the event information. Based on the object displayed, the user may decide which of the objects corresponds to the event information collected as part of the event stamp. The physical object may be tagged with comments from the user collecting the event stamp information and/or from others that access the mash guide 1000.

An object module 1002 may be a module representing objects that are stored and presented to users viewing the mash guide 1000. The object represented by object modules 1002 may be any location based entity. There may be any number of object and type of objects in the mash guide 1000. For example, there may be objects representing landmarks, billboards, stores, museums, parks, historic sites, transportation stations (e.g., airports, airline terminals, bus stations, bus routes, buses, airline routes, airplanes, airlines, trains, train companies, train routes, and railroad tracks), professional service, professionals, individual people, entertainment, theaters, movies, movie theaters, eateries, barbers, hair stylists, stores, and/or circuses.

Geo-Cards and Geo-Ramps

Objects modules 1002 may include geo-cards and/or geo-on ramps that may be visible to the user when the user first views the object in the mash guide, which may include basic information about the object and links to further information about the object. The geo-card may be referred to as a card, grid card, proximity card, or proximity grid card. Wherever the phrase card, geo-card, grid card, proximity card, or proximity grid card occur one can be substituted for the other to obtain another embodiment. In an embodiment, those posting information, such as by creating a node, grid card, or mesh point of the mash guide 1000, provide at least a card (e.g., the grid card), which may be an object in objects modules 1002. The card may be returned to a user in response to performing a location based search (which may also be referred to as a geo search), which is a search for an item of interest (e.g., an event, person, and/or place) that is within a particular vicinity of interest. Further, data may also be available by clicking on links provided with the card.

In an embodiment, each posting has a geo-ramp (which is one of the objects of object modules 1002). The geo-ramp is the initial information provided about the item of interest, which is intended to induce the user to ask for more data. A program is provided, via which an individual user can quickly create a card. The card could be sent to people anywhere, but some of the information on the card may only be available when within a certain distance of a location (e.g., as a security check). The card has a geo tag, which in an embodiment must be created while at the location that is associated with the geo tag, but the geo-tag could be associated with the card at another location and/or time.

In an embodiment, each block or node of the mesh of the mash guide 1000 is a geo-card or grid card. For example, each store, vendor, theater, museum, eatery, landmark or other establishment in a particular vicinity (e.g., a village square) may have a separate geo-card and/or geo ramp that is visible to the user while the user is within a certain proximity of the location of that establishment. The number of geo-cards that are presented to the user and/or that are presented on the same page may depend on the user-determined proximity settings. In another embodiment, the mash guide 1000 may be a mixture of geo-cards and other objects. In yet another embodiment, a collection of geo-cards may be stored in a database in a searchable format that is unrelated to the mash guide 1000. Some of the information and/or geo-tags may only be available during certain times of the day. For example, a user may run a hot dog stand that is only open during certain hours of the day and the corresponding geo-tag is only discoverable during those times of the day that the hot dog stand is open.

In an embodiment, geo-tags may be placed on a social media site, which limits the visibility of the comments on the social media site to users within a predetermined vicinity of a location associated with the geo-tag. In an embodiment, the geo-tag may be used to prioritize search results according to location. For example, the content on the social media site may appear as a node of a mesh or grid (such as a mash guide 1000) in which the nodes of the mesh are that are further from the top and/or left sides of the page are associated with locations that are further from a particular location of interest, such as the user's current location or a location that the user plans on visiting. In an embodiment, one geo-tag may be an entire social media site, so that the entire site is only visible when the location of interest is within a predetermined vicinity of the location associated with the geo-tag. Additionally, or alternatively, individual portions of the social media site have separate geo-tags. For example, individual comments, individual posts, individual pages, and/or individual users may have different geo-tags each associated with a location that is allowed to be different from the other locations of the other geo tags. In an embodiment in which the social media site, as a whole, has a geo location, the geo-tags of the individual parts of the geo-site may be restricted to be within a certain vicinity of the location of the geo-tag for the site as-a-whole, which may be the vicinity that is associated with a location of an event, a store, an establishment, and/or a site of interest associated with the site, for example. Similarly, in an embodiment in which an element social media site has a geo-tag (or geo-location), the geo-tags of the individual sub-elements of that element may be restricted to be within a certain vicinity of the location associated with the geo-tag for the element as-a-whole, which may be the vicinity that is associated with a portion of a location of an event, a portion of a store, a portion of an establishment, and/or a portion of a site of interest associated with the element, for example.

Information about object 1004 is descriptive information about the entity represented by the object. For example, the information may include times of availability, contact information, phone number, e-mail address, website, a description of the services and/or products provided by the entity, and/or promotional offers. Links to further detail 1006 may include links that provide further information about the entity represented by the object. For example, the links to further information may include a link to another page that is part of the mash guide that provides more detailed information, or a link to a webpage and/or website that provides further information about the entity.

Posts 1008 may include objects that were posted by someone that is associated with the entity and/or objects posted by other users, such as comments critiquing the entity and/or helpful information about the entity.

Geo-tags 1010 may be location based tags that are associated with the object, with comments posted by users about the object, with different aspects and information about those aspects of the object. For example, the object may have one geo tag associated with the object as a whole, which determines the vicinity associated with the object in the mash guide. Various rooms and/or exhibits within an establishment represented by the object may have different geo tags that associate a vicinity with those rooms and/or exhibits, which may determine when that information appears in the mash guide in association with the object.

Meetings module 1012 is one specific type of object that represents meetings. Meetings 1012 may include all of the features of one of the object modules of object modules 1002. Meetings module 1012 may include tools for setting up a meeting, tools for adding descriptive information about the meeting, tools for associating the meeting with a location, and tools for associating the meeting with a time. Meetings 1012 may include tools for entering an agenda to the meeting, and entering sessions, session times, session locations, session topics, and/or session speakers.

Invitation sending module 1014 may include tools for preparing and sending invitations and/or other announcements to interested parties. The invitation may include the time, place, agenda, schedule, sessions, activities, and/or speakers of the meeting.

Reply-to-invitation module 1016 may include software that the attendees can download and use to indicate whether the user is attending the meeting. Reply-to-invitation module 1016 may also include a module that automatically sends multiple messages with updates about the attendees estimated time of arrival, progress in traveling to the meeting, and/or current location.

Greeting module 1018 may include tools for the organizer of the meeting to post greeting messages that are presented and/or visible to the attendee upon arrival at the meeting. The messages may also include information about updates to the meeting, the current happenings at the meeting, and changes in locations of the meeting or of events associated with the meeting. Whether or not the greeting messages of the greetings module 1018 are visible to the attendees may be determined by a geo tag associated with the greeting messages, the location of the attendee and the current time. Different events within the meeting may have their own greeting messages that have their own geo tags associated with the greeting messages, and whose visibility may also be determined by the event specific geo-tag, the location of the attendee, and the current time.

Events 1020 may include a list of events associated with the activities and information about the events. Optionally, some or all of the information about the event may include geo tags that determine whether the user can view the information about the event depending on the user's location. Locations of aspects 1022 may include the locations of the meeting, the location of different events of the meeting and/or the location of different sessions of the meeting. Locations in the locations of aspects 1022 may include GPS coordinates and/or other coordinates for determining the locations of interest. Locations of aspects 1022 may include geo tags associated with the meeting. Attendees 1024 may include information about attendees of the meeting. Each attendee may be given a page on which others may post messages and/or the attendee may post messages. Attendees 1024 may include information about the attendee that other attendees and/or the host of the meeting may view. Attendees 1024 may include public and/or private location information about the attendees, which other attendees and/or the host may use to locate the attendee and/or meet with the attendee.

Schema

FIG. 10B shows a representation of an entity relationship diagram of an embodiment of a schema 1030 for an event identification system of FIG. 10A. Schema 1030 may include main table 1031 having object identifiers 1032, locations 1034, times 1036, categories 1038, users 1040, object types 1042, object information 1044, and tags/posts 1046. Schema 1030 may also include category 1048 having subcategories 1050 and user 1051 having user information 1052, user preferences 1054, and user location 1055. Schema 1030 may also include tags/posts 1056, having proximity settings 1058, expiration settings 1060, text 1062, images 1064, and/or sound 1066.

Schema 1030 is just one example of a manner of storing and organizing the data in the mash guide. In an embodiment, schema 1030 is a relational database. However, other types of databases may be used instead.

Main table 1031 is a table representation of a database object that represents the content of the mash guide. In the embodiment of FIG. 10B, a star schema is used (although in other embodiments another schema may be used) in which the keys of the main table 1031 link to other tables that provide more information about the information associated with that key of the main table 1031. The columns of the main table 1031 represent the attributes of main table 1031. Each column of main table 1031 may be a key in one or more other tables that contain more information about the attribute represented by that column.

Object identifiers 1032 are a list of identifiers that identify the individual object of the mash guide. In an embodiment, each object identifier of object identifiers 1032 may be just a numerical or alpha numerical value that the database uses to identify the object. In an embodiment, each object identifier 1032 is a unique value that is used to only identify one object. In an embodiment, the column for object identifies 1032 is a primary key for main table 1031. Each object identifier uniquely identifies a record of the database, which contains more information about the object identified by the object identifier. There may be other tables that include more information about the objects associated with object identifier 1032.

Locations 1034 are locations associated with the objects of object identifiers 1032. Each object may be associated with multiple locations. For example, if the object is a franchise (e.g., a chain of movie theaters) or an establishment with many branches (e.g., a library system) each branch or franchise may have a different location associated with the object. Similarly, an establishment having many rooms and/or exhibits in different locations may have multiple locations associated with the object representing the establishment, one location for each room and/or exhibit. Some objects may have multiple locations for multiple branches and each branch may have multiple locations associated with different rooms and/or exhibits (e.g., a system of museums). Also, sometimes two object may have the same location, if the two objects are close enough to one another, or if the resolution of the location coordinates available is too low to distinguish between the two locations. The location determines the vicinity within which the object is visible within the mash guide and/or the ranking/position of the object within a guide of the mash guide.

Times 1036 are the times associated with the objects of object identifiers 1032. Times 1036 may determine the times at which the information about objects associated with object identifiers 1032 is visible to users. Each object may be associated with multiple times 1032. For example, if the establishment associated with the object has a complicated schedule of when the establishment is open and closed. The times may include an hour of the day, the day of the week, the day of the month, and/or the day of the year to account for different days having different schedules. Similarly, an establishment with many locations (e.g., many franchises) or an establishment with many branches (e.g., a library system) may have different times associated with the object as a result of having different schedules. Also, an establishment having many rooms and/or exhibits with different schedules, may have multiple times associated with the object representing the establishment, including a different set of times for each room and/or exhibit. Some objects may have multiple times for multiple branches and each branch may have multiple times associated with different rooms and/or exhibits (e.g., a system of museums). Also, two object may have some of the same times and/or the same set of times if the two objects have similar or the same schedules. The times 1036 may determine the times within which the object is visible within the mash guide and/or the ranking/position of the object within a guide of the mash guide.

Categories 1038 are the categories associated with the objects. Categories 1038 may include subcategories of the categories. Some categories may be entertainment, theater, movies, sports arenas, ice skating rinks, ski resorts, museums, food, grocery stores, restaurants, fast food stores, coffee shops, pubs, bagel places, diners, ice cream parlors, education, schools, colleges, universities, high schools, elementary schools, preschools, after school care and/or enrichment centers, day care centers, household goods, furniture stores, hardware stores, computer stores, office supply stores, sporting goods stores, gyms, banks, restrooms, urgent care hospitals, clothing stores, and/or toys.

Users 1040 may include the users that are registered with the system. Each user may have a separate column, which may indicate which objects and/or categories of objects the user is interested in seeing. Users 1040 may indicate which categories the user wants grouped together as one category. For example, the categories and/or objects that a given user is not interested in seeing may be marked with a zero. Each category that the user is interested in seeing may be marked with a different number, and those categories that the user wants grouped together may be given the same number. The number used may indicate a hierarchy based on the interest of the user.

Object types 1042 may indicate something about the type of establishment represented by the object. For example, a person and a store may have different object types 1042. Some examples of object types 1042 may include entertainment, food, educational, commercial, and/or free.

Object information 1044 may include descriptive information about the establishment represented by the object. For example, object information 1044 may include a description the type and quality of the services and/or products offered by the establishment, upcoming events, sales, and a schedule of times that the establishment is open. Object information may be included as sound, text, and/or image information.

Tags/posts 1046 may include tags and/or posts that were posted by various users, who may be members of the general public and/or individuals that represent the establishment, such as a manager, officer, host, and/or owner of the establishment.

Category 1048 is a table of categories that includes further information about the categories. In an embodiment, the information in key categories 1038 is a primary key of the table categories 1048. Each category of categories 1048 may represent a different category listed in categories 1038. For example, category 1038 may just include a list of numerical identifiers of the categories, and the rest of the information about the category may be in table category 1048. The category represented by category 1048 may be a subcategory listed in categories 1038. Subcategories 1050 are the subcategories of category 1048 (which in turn may be a subcategory listed in categories 1038 as a subcategory of one of the categories of categories 1038).

User 1051 may be a table of users that includes further information about each user (e.g., user table 1051). Each user in the user table 1051 may correspond to one of the users of users 1040. For example, user 1040 may just include a list of numerical identifiers of the users, and the rest of the information about the users may be in user table 1051. An organization may be one of the users of users 1040, and may have several individuals associated with the organization that are users as a result of being members of the organization. In which case, the corresponding record of user table 1051 may include a list of individuals of that organization that are users as a result of the organization being a user.

User information 1052 may include information about user 1051, which may include the user's name, profession, marital status, hobbies, likes, and dislikes, and/or contact information. Alternatively, if the user is an organization, the information may be about the organization.

User preferences 1054 may include user chosen preferences, such as which guides to combine together, which guides to show the user, and/or expiration time of the user's comments, for example.

User location 1055 may be the current location coordinates of the user. User location 1055 may be used to determine whether the user is within a predetermined vicinity of an establishment represented by an object. User location 1055 may be used in combination with locations 1034 to determine whether to show an object to the user and/or the order in which to present the object to the user.

Tags/posts 1056 is a table of tags and posts that users add to the object and/or elements of objects of the mash guide, which provide further information about the tags and/or posts than tags/posts 1046. In an embodiment, the key tags/posts 1046 of table 1031 may be the primary key of the table tags/posts 1046. For example, tags/posts 1056 may just include a list of numerical identifiers of the tags/posts, and the rest of the information about the tags/posts may be in table tags/posts 1046.

Proximity settings 1058 are the settings that determine the vicinity within which the tag or post becomes visible to the user. For example, when the difference between the location coordinates associated with the tag and/or post is less than a specific magnitude set by proximity settings 1058, the tag and/or post is made visible to the user. In an embodiment the proximity setting 1058 may allow the user to set a proximity that corresponds to any of a variety of shapes (e.g., circle, oval, rectangle, polygon, trapezoid, and/or rhombus), and if the user's coordinates are within that vicinity having the specified shape, the tag and/or post becomes visible to the user.

Expiration settings 1060 are settings that determine when the tag and/or post expires and is no longer visible to any user no matter where that user is located. The expiration settings may be set by the provider of the event and/or establishment and/or by the user posting the post and/or tag.

Text 1062 is the text that is included in the tag or post, which expresses the thought that the user wishes to convey. Images 1064 are any pictures, still of video images, or any other images that the user wishes to upload and include in the tag and/or post. The images may help clarify the message in the text and/or may convey another message. Sound 1066 is the sound that the user wishes to associate with the tag and/or post. Sound 1066 may be any sound that is intended to accompany text 1062 and/or images 1064. Optionally sound 1066 may carry its own message unrelated to and/or unaccompanied by any text and/or images. For example, sound 1066 may be a voice recording. In an embodiment, if sound 1066 includes a voice recording, sound 1066 is converted to text automatically or at the user's request.

In an alternative embodiment, each category of category 1038 may have its own table category 1048 having the information provided by the table category 1048, each user of users 1040 may have their own table having the information provided by the table user 1051, and/or each tag/post of tag/post 1046 has its own table tag/post 1056 having the information provided by the table tag/post 1056.

Device Communications

FIG. 10C shows a flowchart of an example of method 1070, which is a method of device communication. Method 1070 may be used in an embodiment of a method for establishing the event identification system of FIG. 10C (which may be an embodiment of the system of FIG. 1) in which a mobile device communicates with a second device. The device communication may be implemented on any network appliance, including a smart watch, a cellular phone (e.g., smartphone), tablet computer, laptop, or desktop, for example. Method 1070 allows a user possessing a watch or smart watch that does not have all of the functions of a smartphone to still be able to use the event identification system. In an embodiment, the smart watch performs some of the functions related to the event stamp function while the smartphone performs other functions related to the event stamp function. In an embodiment, the smart watch includes an event stamp button. In an embodiment, the smart watch includes an interface having virtual and/or hardwired input buttons and a display.

In this specification, the term item of interest may refer to an event, person, place, and/or any item of interest.

In step 1072, the user presses a physical or a virtual event stamp button device 1, and in response device 1 sends a signal to device 2. In an embodiment, only one of devices 1 and 2 contain GPS, which is device 2. In an embodiment, device 1 is a watch. In an embodiment, device 2 is a smart telephone with GPS. In the embodiment in which device 1 is a watch and device 2 is smartphone, the watch may not necessarily have any connection to any network, but can only communicate with the smartphone. In an embodiment, the watch has an event stamp button on it. The event stamp function may be located on device 1 or device 2 or another device. In an embodiment, the user activates an event stamp button. As a result, device 1 activates an event stamp function. Optionally, device 1 may request GPS information from device 2 to include in the event stamp information. Then device 1 may send a signal to the device 2 to perform a search based on the event stamp information. Alternatively, device 1 may send a signal to device 2, requesting device 2 to active the event stamp function. In an embodiment, device 1 (e.g., the smart watch) sends signals via a local communication channel and/or local network to device 2 (smartphone). In an embodiment, device 1 (e.g., a smart watch) may send the time of the event to device 2 as part of the activation signal which device 2 incorporates into the event stamp. The time of the event stamp may be the time at which the event stamp button was activated.

In step 1074, device 2 activates the event stamp function based on the signal from device 1. In an embodiment, event stamp information (e.g., related to a physical object at a location) may be stored in response to activating an event stamp function. The event stamp has been discussed in reference to the event identification system 100 of FIG. 1. In response to activating an event stamp function, multiple types of event stamp information may be collected from a user. The event stamp information that may be collected may include location information including GPS coordinates, time, user inputs, including voice and images, and contextual information, for example. The location information can be input by the User. Optionally, the device 2 contains GPS, and in response to activating the event stamp function, device 2 automatically determines the location of the user at the time of the activation of the event stamp button. As part of the activation, the user may also indicate more information about the event, including but not limited to, a photo, a voice description, a sound description, etc. In an alternative embodiment, device 1 may implement the event stamp function and just obtain the location information from device 2, if device 1 does not have GPS or another mechanism of automatically determining the current location.

In step 1076, device 2 creates the event stamp. Device 2 places the information of the event stamp into the event stamp format. The event stamp has been discussed with reference to FIG. 1 in the event identification system 100. An example of communications between device 1, device 2 and a proximity server will be discussed in conjunction with FIG. 16, below. In step 1077(a), in an embodiment, the event stamp information is sent to a proximity server to perform a search, based on the event stamp information. In step 1077(b), device 2 receives the results of the search in which the information returned (which is based on the event stamp function) is organized in a mesh. The details of the mesh were discussed in conjunction FIGS. 10A and 10B and are discussed further in conjunction with FIG. 18, for example. If one is interested in a particular type of event, one can likely find it on the internet. However, there is no single location where one can go to find all the types of things that one is interested in, and that will also return information of interest that was not specifically requested and that is related to the user's immediate environment. The mash guide, by default, shows the user topics of interest organized according to location. If the user wants to perform a search, a search can be performed on the database of the mash guide, which will return information about the content searched that is organized according to location.

There may be a metadata structure that is added to each object to help categorize the objects/events. There may also be member posted events, which could be personal parties that are open to mash guide members. The database may include a media layer, which may include voice and image. By allowing the user to post voice reviews, there is less resistance to posting reviews, and the user may be more likely to post good reviews. Also, if there is less resistance to posting information, the owner of an establishment may be more likely to post promotional offers. In an embodiment, posts that are more recent may be highlighted, such as by having the post flash or be in a particular color or labeled as recent. There may be a tag on an object that indicates that there is a geo tag with more information about the object, and the user could go to their mash guide search for the geo tag and/or object having the geo tag and listen to the recording. For example, in places where a phone number is provided for providing more information, there could also be a geo tag. In step 1078, device 2 sends information related to the event to device 1. Device 2 then transmits the results of the event stamp function to device 1 for the user to analyze. The user may choose to find out more information about one or more of the objects. In an embodiment, the page views based on the event may be sent to the watch. Data can include data about objects, data from individual users, data from special services (e.g., Fandango), and data associated with items of fixed location, such as historical landmarks or billboards (the billboard advertiser and/or owner may provide the proximity server with information about the location and content of each billboard and ad).

In optional step 1080, the user is presented with an option to post a geo tag related to the location associated with the event stamp. The geo tag is created using device 1 and/or device 2, by posting information related to a location in association with that location. Posting a geotag may involve the following steps. First device 1 and/or 2 presents the option to post a geo tag to the user and the user enters the information. Then a message having the information for the geo tag is sent from device 1 to device 2 and then to the server. The server then posts the information and associates the information with the location. In an embodiment, the information in the geo tag is only made available to users that are within a certain vicinity of the location associated with the geo-tag. Geo-tagging organizes information based on the location of the device (device 1) so that different data is available depending on the user's proximity to various locations.

In step 1082, device 2 sends the information related to an event from the server to device 1. The information from the server is based on an event stamp function, a mash guide, a meeting, a mob cast, etc. The event identification system allows a user to learn about the user's immediate environment in real-time on any type of device. The mash guide is a mesh of blocks of information about different events (in other words the blocks may be arranged in a mesh). The blocks in the mesh may be arranged according to category, location, and/or time of event to aid the user in sifting through the information in the mash guide. Mash guides will be discussed further in conjunction with FIG. 11 (in the introduction to flowchart 1100) and FIG. 16.

In an embodiment, each of the steps of method 1070 is a distinct step. In another embodiment, although depicted as distinct steps in FIG. 10C, step 1072-1082 may not be distinct steps. In other embodiments, method 1070 may not have all of the above steps and/or may have other steps in addition to or instead of those listed above. The steps of method 1070 may be performed in another order. Subsets of the steps listed above as part of method 1070 may be used to form their own method.

Meet Ups (Meeting Greeting Cloud)

A user, such as the host of a meeting, other person responsible for organizing the meeting or other interested party, may post a piece of information about a meeting that is updatable in real time. The meetings may be added to the mash guide or may be stored in a separate database for meetings. In an embodiment, the home page representing a meeting could is a geo card. In another embodiment, the home page representing a meeting is not necessarily a geo card.

There may be a downloadable app and/or a node in a mesh (e.g., in a mash guide or proximity grid), to help one find a location, and the node may have posts. When one arrives within a vicinity of the location, the user may receive a welcome message (e.g., "Welcome John! Thank you for coming"), updates about the meeting, information about what is currently happening at the meeting (e.g., the wedding ceremony will start in ten minutes), and/or instructions about where to go and how to find the room or group of rooms where the meeting is currently being held. As another example, as a user Sam is pulling in to the location associated with the event, such as the driveway of a house that is hosting a meeting, the system may send a message "Hey, Sam welcome! Everyone is in the backyard."

The system may include options for a host to send invitations, invites, and/or e-mails announcing an event and optionally requesting an RSVP. Once the user arrives at the meeting, information is available that can be accessed via a mobile device, and can be updated in real time to accommodate last minute changes in the details of the meeting. There may be two or more levels of being present, such as nearby and checked in. The user may be also able to post and update an expected time of arrival. Although twitter can be used for posting comments about an event, the comments are not organized in any manner. People attending an event can post what is happening and a user could track what just their friends have to say about the event. After the event ended, possibly nothing can be posted to the event.

Send it Once

Optionally, as part of the meeting greeting feature (or as a stand-alone feature), when a user activates an invitation to an event, the invitation or a reply to an invitation may create an object or add an element to an object that shows whether the user is nearby and/or checked-in. the object may be visible to the host (or other interested party) and may show a list of expected attendees the status of each attendee, such as where the attendee is currently (how far the attendee is from the meeting and/or whether the attendee has arrived). The user may choose to allow others to see the estimated time and location for the user's approach. There may be a one-time tracker arrival object, which automatically announces when the user is within a certain predetermined time and/or distance from the user's destination. For example, after the user sends a message that the user is on the way, a message may be automatically sent when the user is ten minutes away and/or five minutes away etc. In other words, the user sends an RSVP or an indication that the user is about to come to the meeting, just once, and automatically multiple updates of the user's progress to the meeting is tracked and updated periodically and/or at predetermined distance intervals.

For example, a first user may select a first object (e.g., an RSVP to a meeting or an I-am-on-my-way indicator) from a guide (e.g., a mash guide). In response, automatically, the selection of the first object triggers the sending of a second object (e.g., a message saying I am only 5 miles away) to other users, where the second object is based at least in part on the first object. In an embodiment, in response to sending the first object, other users will receive multiple subsequent objects that may be based at least in part on the first object. In an embodiment, the multiple subsequent objects are sent to the other users at predetermined times and/or distances (e.g., I am 5 miles away and I am 1 mile away or I am a half an hour away and I am 5 minutes away), where the predetermined times and/or distances may relate to the first user's estimated time of arrival, an interval of time, and/or a distance of travel. In an embodiment, the multiple subsequent objects provide location information of the first user, which may at least include the GPS location (a street location, or other indication of location) of the user.

More about Meeting-Greetings

In an embodiment, the category of a mash guide may relate to an interaction between one or more users, where the objects contained within the mash guide may include objects that at least relate to the interaction. In an embodiment, the interaction between one or more users may relate to a meeting between one or more users. In an embodiment, the objects related to a meeting may provide real-time updates of information about the meeting that is of interest to a user. In an embodiment, the real-time updates about the meeting may include information relating to the location of other users that are currently at the meeting. In an embodiment, the information relating to the location of the users at the meeting may include the GPS coordinates of the user at the meeting, GPS coordinates of users on the way to the meeting, and/or an estimated time of arrival of users to the meeting.

In an embodiment, in response to a user selecting a particular object related to a meeting and being directed to additional information to learn about the objects related to the meeting, the user may be given the ability to update the additional information about the meeting. In an embodiment, the updates to the additional information about the meeting may include text messages and/or voice messages to other users (e.g., that are at the meeting), reminders to other users (reminders related to the meeting), and/or changes to the object related to the meeting. In an embodiment, a user can create an object related to the meeting that may be displayed in the mash guide.

Add Your Event

In an embodiment, a user may be presented with options for tagging a location and have the tag show up in the mash guides as something going on within a particular vicinity. To look ahead and send an expiring tracking option, the user may create or post greeting objects that publicize start and finish times and/or other real-time information relevant to the meeting. Once at meeting, one may establish social connections and send posts to checked-in people.

Preferences for notification about an event may include proximity and geo tag info information that may be posted by visitors and/or friends. Using the system users may be able to see what various people (e.g., lecturers and/or people engaged in individual conversations) are saying now at the meeting.

If the site (e.g., a mash guide) is launched with primarily the meetings options, then as meetings occur and more information is posted about different sites related to the meetings, the site may be expanded to include other location based information. As a result, the site may be initially populated with only information that is easier to post, information that users organically, and/or a minimum of information about the event, without need to populate the site.

Mobcast

A mobcast is a group of one or more pages on which users post information about an event and which is dedicated to the event. A mobcast may occur when many people attend an event (or location) and post information and/or other media content about the event. From the posted information, one can get an idea of what the event is like, and, if enough information is posted, one can virtually attend the event. The mobcast may be applied to provide information about a meeting or another event. Optionally, the posts about the event may expire based on a predetermined time after the event begins and/or ends (e.g., elimination). Or, in an embodiment, after the posts of an event expire, the event can still be found, but the event is not live (e.g., the event is in hibernation).

As an example of a mob cast, there may be a data base for national parks in which users can add their own comments, photos, and recordings about the parks as the users visit. Potential visitors (or scientists) may view those photos to determine whether to visit the park and/or to see how the park is changing due to changes in nature. As another example of a mobcast many people may post information about a meeting as the meeting is occurring, allowing those that are not able to attend to get an idea of the events that occurred during the meeting. Similarly, attendees that are at one part of the meeting may be able to later (or simultaneously) get an idea of what happened (or is happening) at other parts of the meeting that occurred (or are currently occurring) at the same time (when the user was elsewhere in the meeting). For example, attendees that are at one part of the same room may be able to later (or simultaneously) get an idea of what happened (or is currently happening) at other parts of the same room at the same time. Likewise, attendees that are at one event or session of the meeting may be able to later (or simultaneously) get an idea of what happened (or is happening) at other events or sessions of the meeting that occurred (or are currently occurring) at the same time as the event the user attended (or is currently attending) a different session or event.

Mash guide, meeting-greeting, send-it once, and mobcast may be implemented on any server and accessed on any device having computer readable medium, including a cellular phone, tablet computer, or laptop/desktop computer.

Further General Comments

In general, in an embodiment, to implement, the mash guide, geo-cards, geo-ramps, meeting greeting, or mob-cast, for example, a first user may send a message (e.g., about an event or locations) that may be seen by other users, which may or may not be associated with the first user, and may be viewed as objects by the other users. In an embodiment, the selection of other users may be based at least in part on the message of the user and/or the location of the other users (e.g., the selection may be a selection of an event or location that the first user posted information about). In an embodiment, the other users may provide a user response which may include voice messages, text messages, and/or picture messages (e.g., which may provide more information about the event or location). In response, the first user (e.g. a provider of the event) may receive an object that is based at least in part on the user response of the other users.

In an embodiment, in response to a user selecting a particular object and being directed to additional information to learn about the objects, the user may be given the ability to update the additional information. In an embodiment, the update to the additional information may include text messages and/or voice messages to other users, reminders to other users, and/or changes to the object. In an embodiment, a user can create an object that may be displayed in the guide. There may be a rules based lifetime for objects. For example, after a set period of time (e.g., 2 hours, 2 days, years for example) past the start time of event, end of an event, and/or other significant time associated with the event, the object expires. There may be multiple expiration times associated with an event. There may be a time after which, no new posts about what is currently happening at the meeting can be posted, there may be a time after which no new comments about the meeting can be posted. There may be a time after which certain geo tags expire. There may be a time after which one group of people (e.g., the public) can see only certain information, while another group of people (e.g., members of an organization) can still see all of the information. There may be a time after which no information about the event can be seen.

There may be events or places that allow tags in which some or all of the tags have a short term voice review that disappears after a short amount of time (e.g., a review of a particular item that is only available for a short period of time). The owner (e.g., the person that originally established the post) can post time sensitive information and time sensitive posts about his own place. People may add pictures. In an embodiment, an indication is provided, such as an icon flashing, which indicates when a post is current.

In an embodiment, the system may translate voice tags to text (where the voice tags and/or text are associated with the meeting, geo-tag, geo-card, send-it-once reply, geo-on-ramp, and/or mash guide, for example).

Account Setup and Discovery Engine

Figure 11:
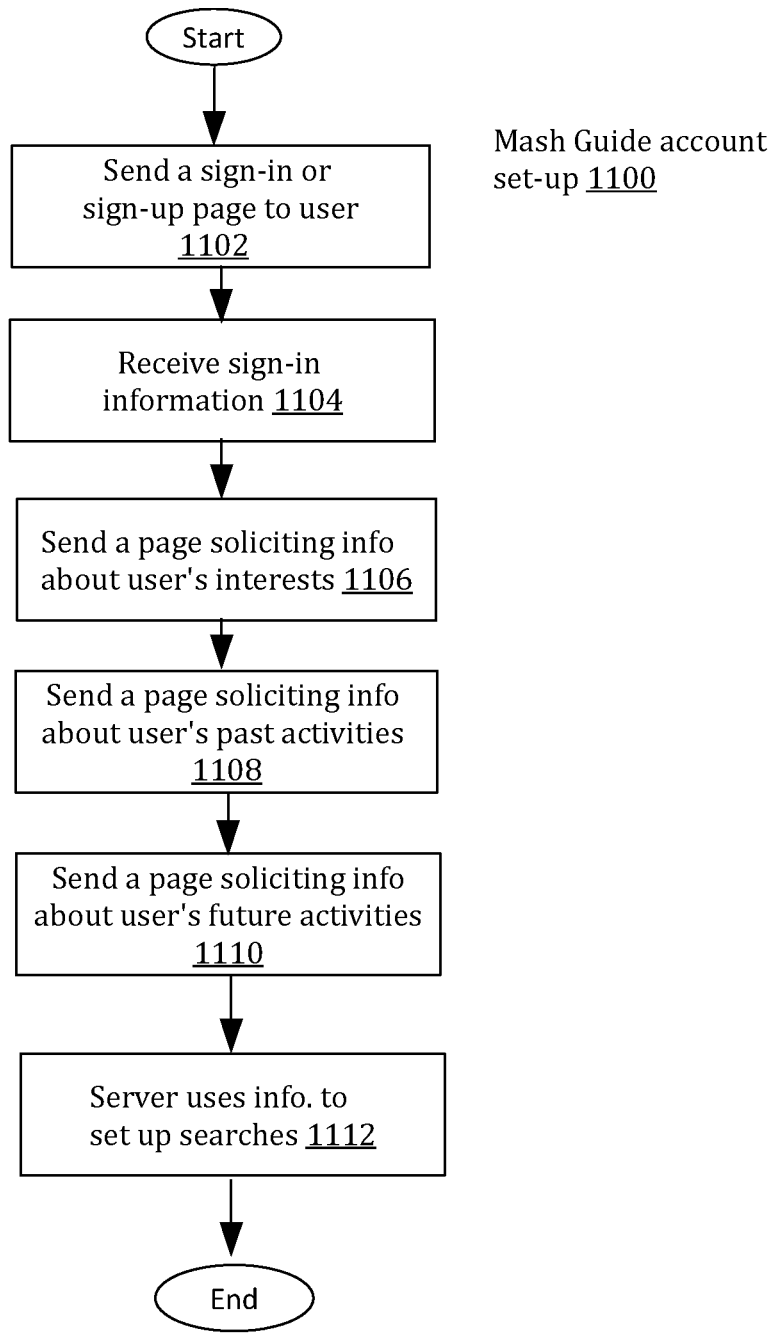
FIG. 11 shows a flowchart of an embodiment of a method of activating a mash guide account.

FIG. 11 shows a flowchart of an embodiment of method 1100 in which a mash guide account is set-up and/or activated in an embodiment of a method for establishing the event identification system from the perspective of the server. In the embodiment in FIG. 11, the information received at the server may be received from a smart watch via a smartphone and the results may be sent from the server to the phone to the watch.

Regarding method 1100, a discovery engine may be stored on the proximity server, which finds things that user may not have necessarily been looking for, per se, but that the user is likely to be interested in, based on the user's past, past interests and current interests.

In embodiment, the server sends a sign-up or sign-in page to the user. Upon sign-up, the user may fill out a questionnaire asking not only the user's likes and dislikes, but the user's past activities (from which additional interests may be gleaned) and the things that the user may have wished that they did (whether or not the user actually did those things). In an embodiment, a user may provide information about his/her interests by answering questions/prompts from the device. The answers to the questions may determine (at least in-part) which objects are returned to the user. In an embodiment, the questions/prompts may relate to various topics that can be used to help determine relevant objects that the user is likely to be interested in.

When a user logs in, the user may see every nearby event that may be of interest (mash guide). In the setup, there is an attempt to find key words and/or other triggers that are likely to aid in discovering information the user is seeking and information that the user is likely to find interesting (whether or not that information was requested by the user). In other words, the discovery engine searches for information that is not related to the user's search, but that is nonetheless expected to be of interest to the user.

In embodiment upon sign-up to the mash guide, the user may fill out a questionnaire asking not only the user's likes and dislikes, but the user's past activities (from which additional interests may be gleaned) and activities that the user may have wished to have done, but did not do. The user may be asked questions about what the user did in the past (e.g., as a child) and what the user would have liked to have done as a child, in addition to being asked about what the user likes and does not like.

Although in FIG. 11 the mash guide was discussed with reference to a smart watch, a smartphone and a server, the mash guide may be implemented on any computer readable medium device, including a cellular phone, tablet computer, laptop, or desktop. The mash guide may include a media layer—voice and images (still or moving images). In an embodiment, the mash guide may have a filter and/or sort button to filter out unwanted objects, events or images according to subject matter, distance, and/or time. The user may use a "hands free" method to navigate through the columns and/or rows of the mash guide system (e.g., by voice commands) In an embodiment, in response to pushing a physical or virtual button, a mash guide opens up and an event stamp can be created. Using the information about the user, information input by the user (e.g., as a result of creating an event stamp), the location, the time, etc. the system can produce a mash guide giving the user real-time information based on the search and the location.

In step 1102, the server sends a sign-in or sign-up page to the user. When signing up, a user sets up the username and password. The name and password may include any of a variety of security processes. The user may set up an account when the user wishes to receive information in the mash guide or when the user wants to post information in the mash guide. The mash guide may aid the user in matching the event stamp information with a specific event. The mash guide may include a collection of locations or objects based on information arranged by topic and location and/or time.

In step 1104, after receiving the user's choice for a username and password, the server sets up the account having the user's chosen password and username.

In steps 1106-1110, the server sends further pages requesting more information about the user that will be used in the future to create user-specific search results (e.g., the mash guide). The mash guide is tailored for the user based on the user's interests (past and present interests). For example, the user may be asked about courses taken, professions, hobbies, place of residence, fantasy places of residence, about what their past and present fantasy careers would be, past and present fantasy hobbies would be, past and present fantasy academic course of study, past and present fantasy extracurricular activities, and/or what courses or activities the user would have liked to participate in, but did not. Thus, for example, if the user indicates that the user had a fantasy career as a child of being an astronaut, the system may present places and events related to space exploration to the user in the mash guide even though the user did not ask for those events, because there is reason to believe that space exploration is of interest to the user, based on the user's former fantasy career. The mash guide is interactive in that the mash guide is based on the user inputs, geo tags, and other comments the user may have input previously.

In step 1106, the server presents to the user one or more pages for entering information about the user's interests. The user may provide information about interests by answering questions/prompts from the server, via device 1 and/or 2. The organization of the mash guide and/or the objects presented to the user in the mash guide may be based, at least in part, on the user's input during the setup process. In an embodiment, the questions/prompts may relate to various topics that can be used to help determine relevant objects and/or types of objects that the user is likely to be interested in. In an embodiment, the one or more pages presented to the user may include a questionnaire asking not only about the person's likes and dislikes, but about the person's activities from which additional interests may be gleaned. The information collected about the user may include clubs, topics of interest, the user's volunteer activities, political activities and preferences, religion, hobbies, books read and/or favorite books, movies viewed watched and/or favorite movies, television programs viewed and/or favorite television programs, information about the user's pets, the sports that the user is interested in and participates in, the teams that the user follows, the user's expertise, the places that the user has traveled to or is interested in traveling to, food preferences, music interests, the user's languages, make and model of the user's car, other modes of transportation used by the user, the user's health and the user's interests in health, the user's favorite brands and the brands used by the user, the user's favorite shops and the shops used by the user, the user's favorite people and the people the user knows, dislikes, motivations, type of computer, type of cell phone, type of tablet computer, etc.

In step 1108, the server presents, via device 1 and/or 2, to the user one or more pages for entering information about the user's past activities. From the user's past activities, more information about the user's interests may be inferred and/or identified. The user may be asked questions about what they did at different times of their life (as a child, as a teenager, as a college student, as an adult, etc.). Statistical correlations may be made between the user's past activities, and interests of people sharing those past activities, in order to predict the user's current interests to determine which objects to present to the user in the mash guide and/or to determine a priority in which to present certain objects to the user in the mash guide.

In step 1110, the server sends a page soliciting information about the user's future. The user provides information about the user's future or hoped-for activities and/or long-term goals (e.g., to buy a summer home in Lake Tahoe, to go to law school, to learn a language, to learn to scuba dive) or bucket list. From this, more information about the user's interests may be identified and used in searches.

In step 1112, the server uses the information to configure the view of the mash guide presented to the user to be user-specific. When the user activates an event stamp function, results of a search based on the event stamp information may be presented in the form of a mash guide, which may be configured according to the information the user enters about the event, the information the user included about the user's interests and experiences, the location, the time, etc. in addition to including the search results (an example of a mesh of the mash guide will discussed in conjunction with FIG. 17). The user may also open the mash guide without specifically doing a search, and when the user initially opens the mash guide, the mash guide may be populated with the user's favorites (e.g., the topics the user likes to browse). If the user activates an event stamp function, the mash guide will automatically use the information the user input, the location, and the time to determine the configuration and the priority of the results returned by the search.

In an embodiment, although depicted as distinct steps in FIG. 11, step 1102-1112 may not be distinct steps. In other embodiments, method 1100 may not have all of the above steps and/or may have other steps in addition to or instead of those listed above. The steps of method 1100 may be performed in another order. Subsets of the steps listed above as part of method 1100 may be used to form their own method.

Using the Mash Guide

Figure 12:
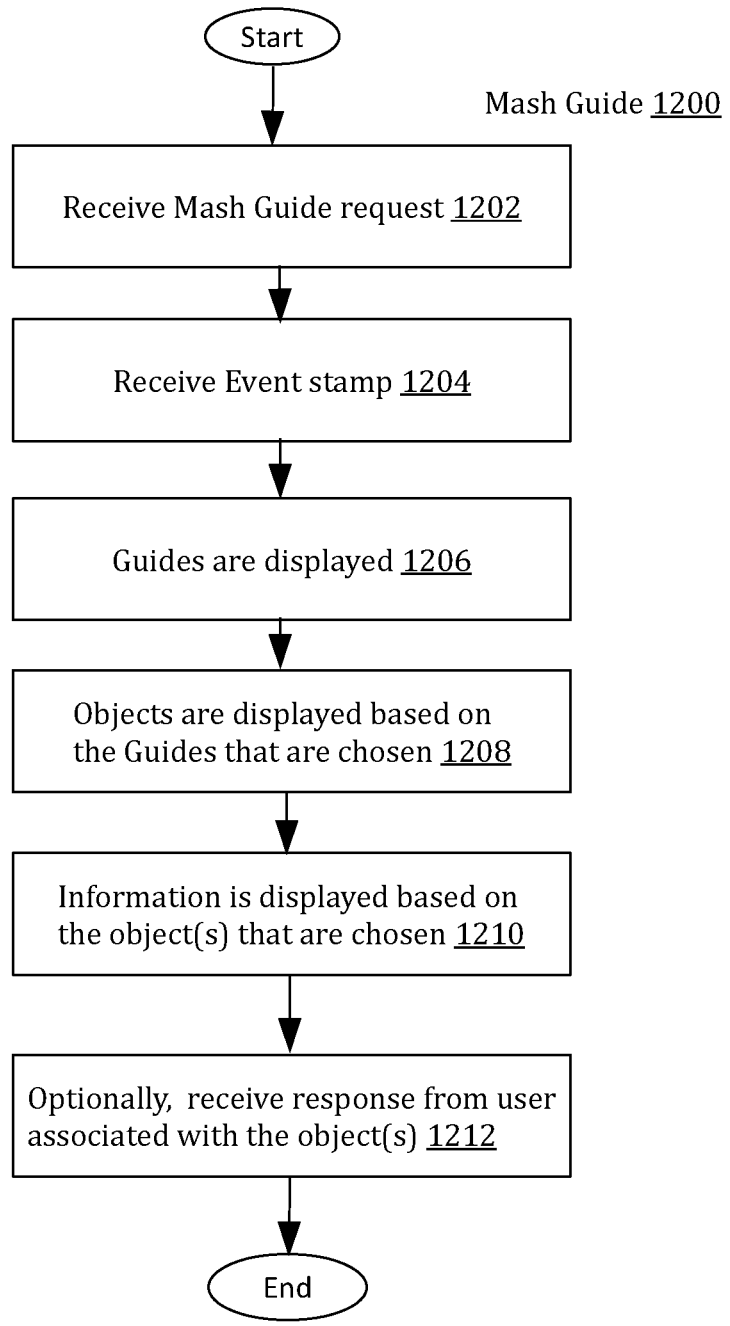
FIG. 12 shows a flowchart of an embodiment of a method of using a mash guide.

FIG. 12 shows a flowchart of an embodiment of method 1200 for using a mash guide. As discussed above, in conjunction with FIG. 11, the view of the mash guide presented to the user may be tailored for the individual user based on the user's interests. Additionally, or alternatively, the mash guide may display results according to the user's location and the time of day, but the contents displayed are not specifically tailored for any one user. In the embodiment in FIG. 12, the information received at the server may be received from a smart watch via a smartphone and the results may be sent from the server to the phone to the watch.

In step 1202, a mash guide request is received from a user because an event stamp function is activated on a device. Event stamp information (e.g., related to a physical object at a location) may be stored in response to activating an event stamp function. In response to activating an event stamp function, information may be collected including location information (such as GPS coordinates), time, user inputs, including voice and images, and/or other contextual information (e.g., meta data). In response to collecting the event stamp information, the device sends the event stamp information to perform a search.

In step 1204, after a search is submitted, based on the event stamp information, the proximity server performs a search. If there is a voice message, the voice message may be parsed. If the event stamp information includes an image, a pattern matching algorithm may attempt to match the image with images of objects in that area and/or an algorithm may attempt to recognize characters in the image (if there are any) and search for the characters in association with objects associated with the locations within a vicinity of the location of the event stamp. In an embodiment, as part of the search, there may be an attempt to find key words that are associated with objects that are likely to be of interest to the user. In an embodiment, the server also searches for objects that are related to things that are not being expressly sought, but are expected to be of interest (based on the user's interests). The discovery engine may find things that the user may not have necessarily been looking for, but that the user is likely to be interested in. The information entered by the user in the initiation process (see FIG. 11) may be used.

In an embodiment, the proximity server may organize data from multiple other sites of similar content to allow the user to search the content together. The format that the data is presented in and the meta data may be standardized. Data can be presented in a mesh with columns for categories and rows for distance from the user. Alternatively, the rows and columns could be interchanged. In an embodiment, in searching the event stamp information, a proximity search is performed, and the proximity automatically filters out data that would not be of interest to the user based on user interests and history (see FIG. 11).

In an alternate embodiment, if the results are viewed on a phone or watch, the user may be able to swipe a finger to get to the next piece of data, the next card in a category, and/or the next category, and the server returns multiple objects which may be based at least in part on the event stamp information.

In step 1206, the guides that are found by the server in doing the search are returned to the device for display to the user. The guides may include links to multiple objects that are related to each other and that the user may scroll through. In an embodiment, the guides are based on event stamp information and comments from other users. The guides may be the columns in the mesh. For example, the guides may be eateries, theaters, museums, hotels, etc.

In step 1206, objects are displayed based on the guides that are chosen. After receiving the results, the user may combine multiple guides together to return objects that are at least related to two or more guides. For example, if a user likes the Stanford college calendar and the MIT college calendar, these two guides may be mixed together to create a generic college calendar.

In step 1210, information is displayed based on the object(s) that are chosen. In an embodiment, the user may select a particular object and be directed to additional information to learn more about the object. In an embodiment, the additional information may include various user ratings about the object that the user may optionally be able to listen to, read, or view.

In optional step 1212, a response from the user is uploaded and associated with the object(s), as chosen by the user. In an embodiment, in response to the user selecting a particular object and being directed to additional information to learn about the object, the user may upload a user response about the object which optionally may be temporary and disappear after a period of time. The user response may include at least a rating based on a set scale, a text message, left by the user, and/or a voice message left by the user. In an embodiment, the user and/or host of the event may set the user response to disappear after a period of time, which the user and/or host may or may not be able to set. In an embodiment, a user that establishes an object, may include promotional offers and/or time sensitive information that relate to the object, for example.

The mash guide creates a single place for the user to go for location based information instead of going to multiple places to find the same information.

Optionally, if the objects returned do not include any that correspond to the event stamp information sent, the user may add an entry to the mash guide. For example, if the user is walking down the street and finds a monument, the user may create an event stamp with a photograph and/or verbal description of the monument, and have a search performed for the monument. The mash guide is returned, but there is no monument at the locations of interest in the mash guide. If the mash guide has an entry for the object of interest, a tag with comments may be added from the one collecting the event stamp information and/or from others that access and view the event stamp information. The comments may or may not include reviews. In an embodiment, the reviews may have an expiration. Optionally, the tag may only be viewed by other users that are within a predetermined proximity of that site and/or that are performing a search based on an earlier created event stamp.

The results returned may be a view of the mash guide in which the information is grouped into guides based on the user's interests (see FIG. 11 and/or the location of the user, based on GPS). Guides may include different objects that are categorized by the subject-matter of the objects.

In an embodiment, each of the steps of method 1200 is a distinct step. In another embodiment, although depicted as distinct steps in FIG. 12, step 1202-1212 may not be distinct steps. In other embodiments, method 1200 may not have all of the above steps and/or may have other steps in addition to or instead of those listed above. The steps of method 1200 may be performed in another order. Subsets of the steps listed above as part of method 1200 may be used to form their own method.

Creating Meetings

Figure 13:
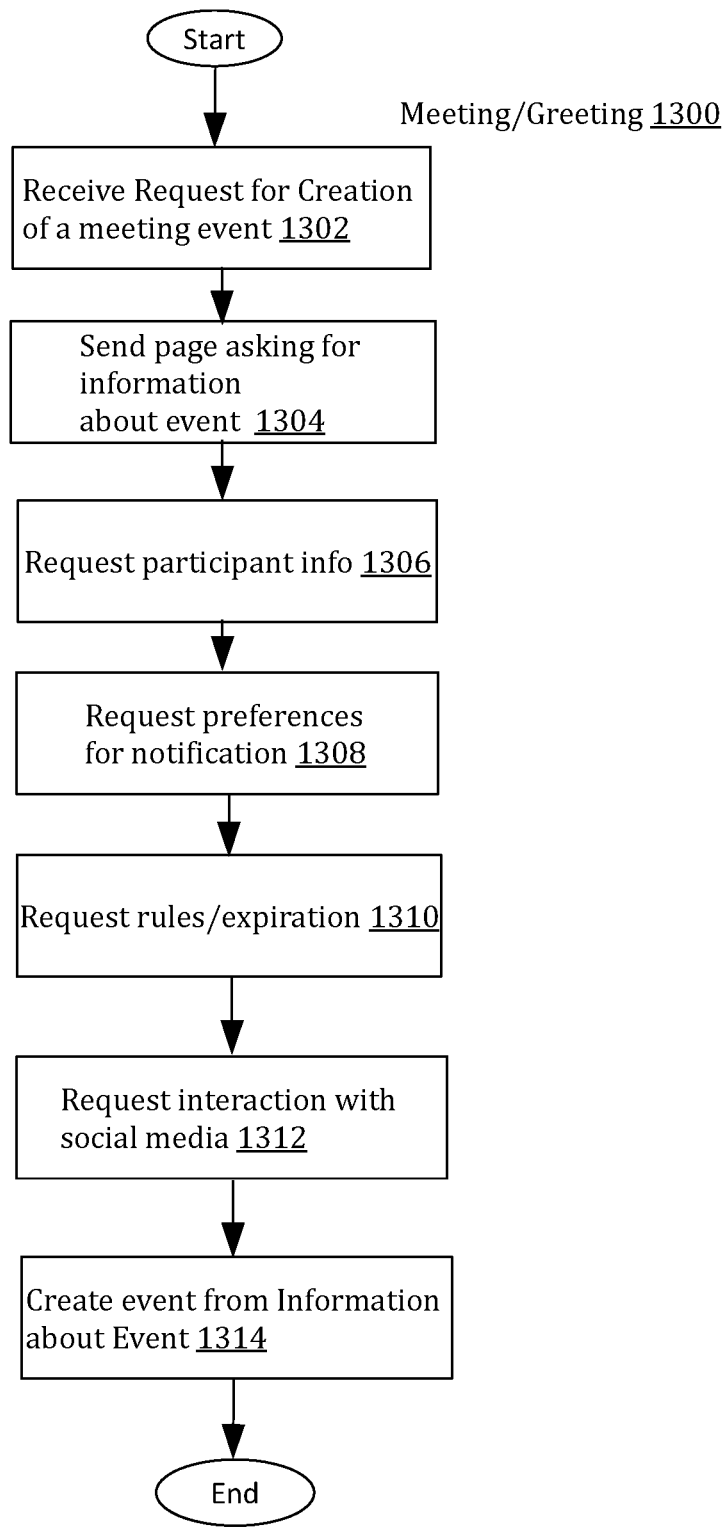
FIG. 13 shows a flowchart of an embodiment of a method of creating a meeting/greeting event.

FIG. 13 shows a flowchart of an embodiment of method 1300 of creating a meeting/greeting event.

The meeting/greeting allows a host to set up a meeting, send out invitations, identify when attendees arrive, and send greeting messages to the arriving attendees as the attendees arrive. In the embodiment in FIG. 13, the information received at the server may have been received from a smart watch via a smartphone and the results may be sent from the server to the phone to the watch.

In step 1302, the server receives a request from a user to initiate the creation of a meeting event. The meeting may be a consumer meeting (a non-business meeting, such as a party, of users that is not focused on any business goal) or a business meeting. The host may set up a meeting and input information about the meeting (e.g., as detailed in the remaining steps of method 1300), such as times, information, location, attendees, methods of notification, and comments. The meeting may be posted or parts of the meeting may be posted. Optionally, the host may electronically send invitations via emails, for example. In an embodiment, the site allows the host (or a representative of the host) to create an object and assign a URL to the object. The host/user may tag the location and have it show up in the mash guides as an event.

In step 1304, time information is requested from the user. For example, a public start time, and public finish time can be set up and posted. Optionally, observation of the times of arrival of attendees may be set up. As part of the observations of time of arrivals of attendees, when the attendees arrive for the meeting, the attendee may receive a hospitality greeting. The host may choose a setting that causes a message to be sent to a particular attendee, such as "Hey Sam, welcome" as hospitality for those just arriving.

In step 1306, a request for participants is sent to the meeting creator/user. The participants may be entered into the meeting so that the participants' arrivals at the meeting may be tracked, greetings may be sent to the attendees as the attendees arrive, so that attendees may post messages about the meeting during the meeting, and so that attendees of the meeting may send messages to one another using the meeting greeter. The host/user can choose which participants are allowed at the meeting/event or may allow all of the public to be participants (e.g., a political town hall). Alternatively, the host may choose the participants to be anyone within a particular location (e.g., anyone within a chosen diameter around a particular GPS coordinates).

In step 1308, preferences are requested for notification. Preferences for notification may include proximity and geo tag information of and/or from visitors and/or friends. Using the system, a visitor to the meeting may be able to see who else is present at the meeting and where particular people are currently located. Also, users may be able to see the current posts of the people who are currently at the meeting. The system may translate voice tags to text, and allow users to post talks and/or conversation with others at the meeting in association with the meeting.

In step 1310, information about rules/expiration of the event is requested. The meeting can be set up with an expiring tracking option. There may be rules-based lifetimes for objects. For example, after 2 hours from the start of the event/meeting, the item expires. The expiration may be associated with the meeting as an object. In other words, the expiration may determine how long the meeting object remains in the system. Alternatively, the expiration may decide how long the meeting object is modifiable. After the expiration, the meeting may still exist as a historical object, but no longer be modifiable (e.g., and after the expiration, comments may not be allowed).

In step 1312, optionally, an interaction with social media can be set up. The server sends a request to the user/meeting creator to choose whether to include interaction with social media. If the user decides to include interaction with social media, interactions such as Meetup meetings, Facebook, and Twitter feeds with geo tags can be set up. Depending on whether the meeting is public, the meeting may be returned when a user causes a search to be performed based on an event identification stamp. The meeting may be visible, in the mash guide, for example, when someone is in an area near the meeting.

In an embodiment, the site, initially populated with the meeting, may later also include more information posted about different sites related to the meeting (e.g., informational, future meetings, etc.). The server may request the further information or the meeting creator, or other users may include the information by sending it to the server.

In step 1314, the server uses the information to set up the meeting, interactively before the meeting, during the meeting, to set up the rules and notifications (times), to set up the start and end, invitations, check ins, rule-based lifetimes, comments, etc.

Once at the meeting, user may have the ability to individually post messages, after the user checks in. The user may be able to post the information to specific individuals, e.g., on a page of the meeting for that individual. Alternatively, posts that go to all participants can be set up. The posts can be set up in a rule-based manner. Other information may be posted including updated agendas, a Wi-Fi password, if the location changes, who is attending, who checked in, future meeting information, etc. In an embodiment, all of the steps of the meeting/greeting can occur via voice commands (including comments). Accepting voice commands for setting up and conducting the meeting allows the user to use the systems in a "hands free" mode.

In an embodiment, each of the steps of method 1300 is a distinct step. In another embodiment, although depicted as distinct steps in FIG. 13, step 1302-1314 may not be distinct steps. In other embodiments, method 1300 may not have all of the above steps and/or may have other steps in addition to or instead of those listed above. The steps of method 1300 may be performed in another order. Subsets of the steps listed above as part of method 1300 may be used to form their own method.

Send it Once

Figure 14:
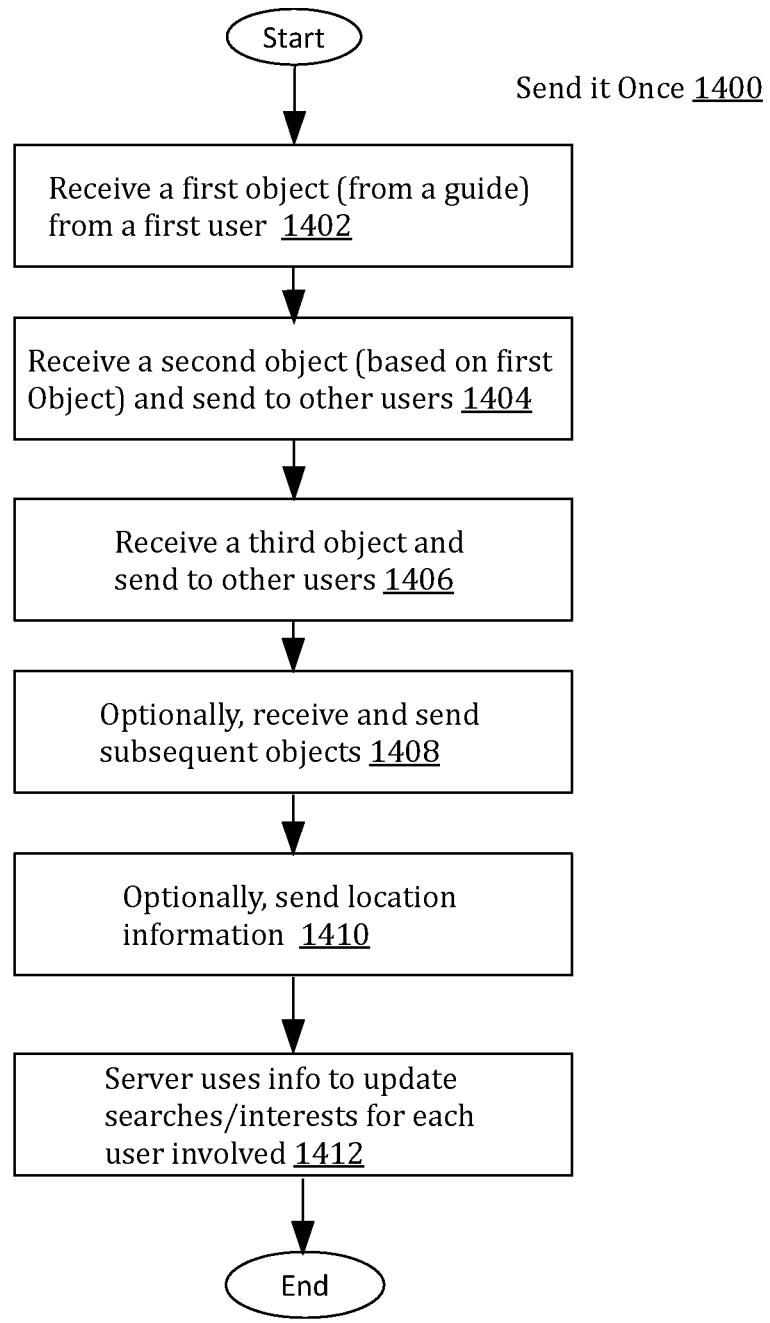
FIG. 14 shows a flowchart of an embodiment of a method of using a send it once page.

FIG. 14 shows a flowchart of an embodiment of method 1400 a "send it once" event in an embodiment of a method for establishing an event identification system. Send it once may be used by a host to track the arrivals of attendees at meetings or parties. The host can send out invitations. Those that reply to the invitation only need to send a reply indicating that the user is coming and/or on their way, and when the attendee is on the way to the meeting, the host may automatically receive updates of the attendee's progress. When someone arrives at the event, the host may be notified. Attendees may use the system to contact the host about arrival times. Send it once can be used in conjunction with any embodiments that include meetings, parties, seminars, and events in which people are invited to or are attending. In the embodiment in FIG. 14, the information received at the server may have been received from a smart watch via a smartphone and the results may be sent from the server to the phone to the watch.

In step 1402, the server receives a first object from a first user. The first user selects a first object from a guide (Guides were discussed, above, with respect to FIGS. 11 and 12. For example, the guide may be for parties. The host may set up a party as an object within the party categories (guides).

In step 1404, the server receives a second object (based on the first object) and sends it to other users. The second object may be based at least in part on the first object. Attendees may use the system to find meetings and/or parties and to RSVP. The second object may be a comment (e.g., "We're on our way! . . . Here is our estimated time of arrival." In an embodiment, the comment(s) can be posted via an audio message (e.g., the person can push a button and speak into the device to send an immediate comment).

In step 1406, the server receives a third object and sends the third object to other users. The third object may be sent to other users based on a predetermined time. For example, the third objects may be updates about the user's progress in arriving at a destination. The second object may be based at least in part on the first object. Optionally, one or more of the objects (first object, second object, or third object, etc.) may be sent to the other users at predetermined times. The predetermined times that the objects are sent may relate to the first user's estimated time of arrival or an interval of time. The location may be monitored by the system via GPS. Thus, accepted users may be within 1 mile, 0.5 mile, 100 feet, or 20 feet of the GPS location, or 10 feet, 5 feet, or 1 foot of the event.

In an embodiment, the times may relate to an event start time, various times during the event, an event end time, etc. In an embodiment, the times may relate to the usefulness of the objects at a time of day (e.g., a coupon or a start-time for a sale). For example, attendees may send comments to the host about when the attendees will arrive and/or where the attendees are prior to arrival.

In step 1408, optionally, the server receives subsequent objects and the subsequent objects are sent to other users. The subsequent objects may be sent based on a predetermined time. The number of objects sent and the predetermined time may be chosen by the first user. For example, when someone arrives at a party, everyone at the party may receive a notification that someone has arrived. The host may use this function to know when an important person arrives.

In step 1410, optionally, the server may send location information to other users based on a request from one or more users. One or more of the objects may include information about the location of the first user, the GPS location of the first user, maps, directions, etc.

In step 1412, the server uses any of the information related to the event to update searches/interests for each user involved.

In an embodiment, each of the steps of method 1400 is a distinct step. In another embodiment, although depicted as distinct steps in FIG. 14, step 1402-1410 may not be distinct steps. In other embodiments, method 1400 may not have all of the above steps and/or may have other steps in addition to or instead of those listed above. The steps of method 1400 may be performed in another order. Subsets of the steps listed above as part of method 1400 may be used to form their own method.

Mobcast

Figure 15:
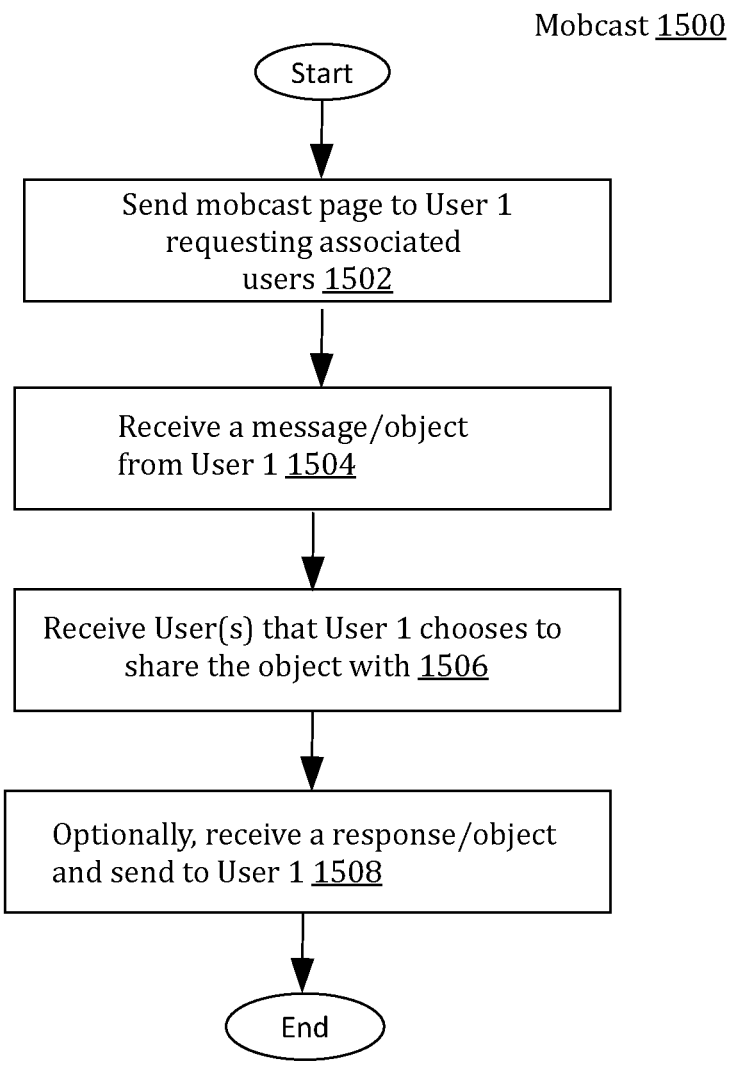
FIG. 15 shows a flowchart of an embodiment of a method of using a mobcast system.

FIG. 15 shows a flowchart of an embodiment of method 1500 of implementing a mobcast in an embodiment of a method for establishing the event identification system. The mobcast may be implemented for any event or object that is applicable. For example, a mobcast may be set up or implemented when there is a "mob" of people attending an event (e.g., a sports event, a concert, a dance recital/program, a play, a movie, a party, etc.). In the embodiment in FIG. 15, the information received at the server was received from a smart watch via a smartphone and the results are sent from the server to the phone to the watch.

In step 1502, the server creates an event, such as a meeting where other users may post information about the event (e.g., a mobcast). Optionally user 1 selects associated users that are associated with the event. Optionally, the user can choose which users can receive the mobcast. The choice of users may be based on a relationship with the user, personal interests, marketing, type of job, sex, age, etc. The choice of users may also be based on who is known to be attending the event or comments may be accepted based on the location/GPS of the user (if the location of the user corresponds to the location of the event). Alternatively, no one ever chooses the members of the mob, the mob forms organically, by people attending the event.

In step 1504, the server receives a message/object from user 1. User 1 may post a message/object about the event in association with the object representing the event, which may be seen by other users. The object may be a recording of a session or talk that occurred at the event, a recording of an incident that occurred at the event, and/or other information about the event. In one embodiment, the message/object can be seen by any users that are within certain proximity of the event. In another embodiment, the message/object may be viewed by anyone regardless of proximity. In an embodiment, only those users within certain proximity of the event may post information about the event. The message/object may be a comment about the event, a picture, a video, an audio, etc.

In step 1506, optionally, the server may request information from user 1 choosing user(s) with whom to share the object. In an embodiment, the selection of the users can be based at least in part on the message of the user and/or the location of the other users. In step 1508, optionally, user 1 receives a response/object from the other users. In an embodiment, the other users may provide a user response, which may include voice messages, text messages, and/or picture messages. In response, the first user may receive an object that is based at least in part on the user response of the other users.

Steps 1504-1508 may be repeated by different users. As a result of multiple users posting information about the event, if enough users post information and comments about the event, someone that is not at the event can get a feel for what the event was like.

In an embodiment, each of the steps of method 1500 is a distinct step. In another embodiment, although depicted as distinct steps in FIG. 15, step 1502-1508 may not be distinct steps. In other embodiments, method 1500 may not have all of the above steps and/or may have other steps in addition to or instead of those listed above. The steps of method 1500 may be performed in another order. Subsets of the steps listed above as part of method 1500 may be used to form their own method.

Figure 16:
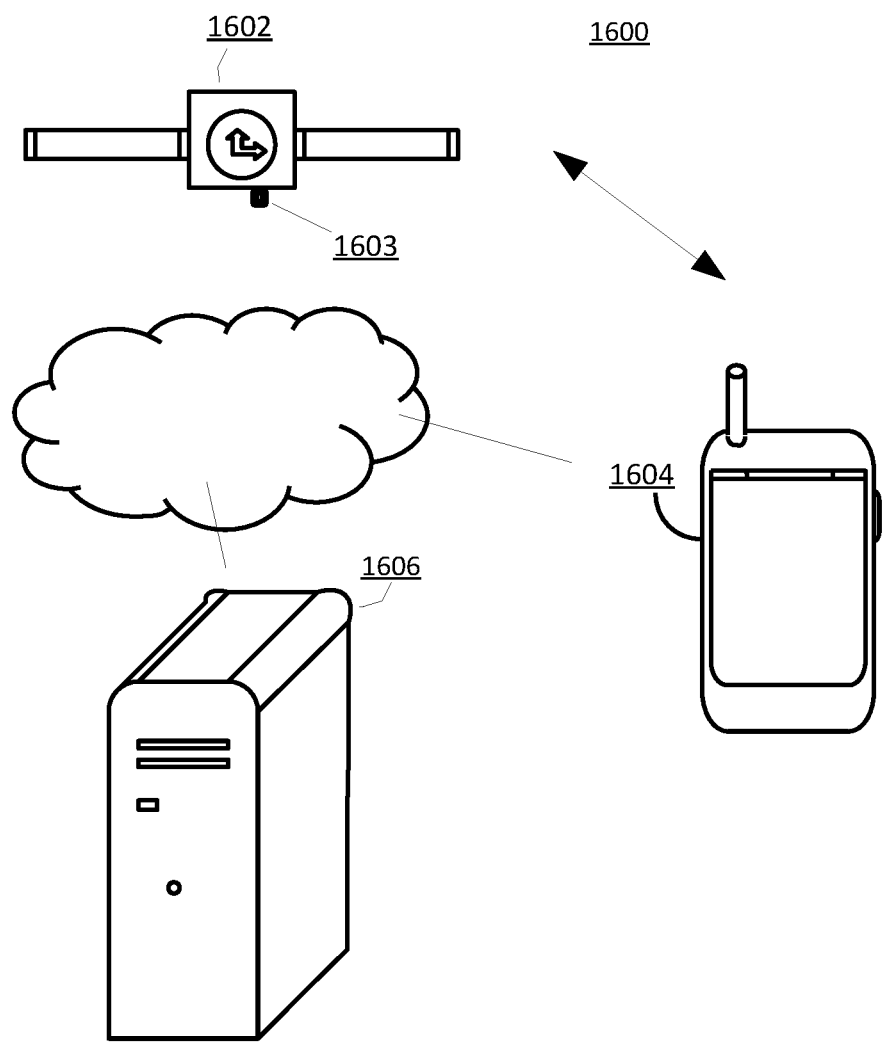
FIG. 16 shows a representation of an example of communication between devices in an embodiment of an event identification system.

FIG. 16 shows a representation of an example of device communication system 1600 in an embodiment of an event identification system. In other embodiments, 1600 may not have all of the elements or features listed and/or may have other elements or features instead of or in addition to those listed. Device communication system 1600 may include wearable device 1602, event stamp button 1603, network device 1604, proximity server 1606, and network 1608. In other embodiments, device communication system 1600 may not include all of the features listed above and/or may include additional features instead of, or in addition to, those listed above.

A method for using device communication system 1600 was explained with reference to FIG. 10. Device communication system 1600 allows a user to activate an event stamp from a wearable device, such as a watch, and then the event stamp information is sent via a smartphone or network device to a proximity server. The proximity server may look up information and/or return information in the mash guide, based on the event stamp information received (FIGS. 11 and 12, Meeting/greeting (FIG. 13), Send it Once (FIG. 14) and Mobcast (FIG. 15).

Wearable device 1602 may include event stamp button 1603. Event stamp button 1603 is an embodiment of the event stamp function discussed earlier in the specification, such as with respect to FIGS. 1 (106, 107, and 109). Wearable device 1602 may be communicatively coupled to proximity server 1606 via the network. Alternatively, wearable device 1602 is only communicatively coupled to a mobile phone and mobile phone communicates with the network. Watch may be communicatively coupled to a network device 1604 via a local wireless connection. Upon pressing an event stamp button 1603 on the wearable device 1602, the wearable device 1602 sends a signal to a network device 1604 (e.g., the smartphone 1604), which initiates the event stamp function, which in turn may be used to retrieve information from pages associated with the mash guide, meeting/greeting, send it once, and/or mobcast. Based on the response to the event stamp function, the wearable device 1602 may then be used to make a purchase, to upload a comment, and/or to find out more information.

Network device 1604 is discussed with reference to FIG. 17. Network device 1604 may be communicatively coupled to proximity server 1606, via the network. Network device 1604 may be communicatively coupled to wearable device 1602, via a local wireless connection. Network device 1604 may be used to activate the event stamp functions and send the results to wearable device 1602. Network device 1604 is discussed with reference to FIG. 1 (109).

Proximity server 1606 is a machine that contains the algorithm to carry out a proximity-based search and other functions based on the event stamp functions, mash guides, mobcasts, meeting/greeting, etc. Proximity server 1606 can be communicatively coupled to network device 1604 and/or wearable device 1602 via the network.

Network 1608 is in an embodiment of network 110, which was discussed with reference to FIG. 1.

Figure 17:
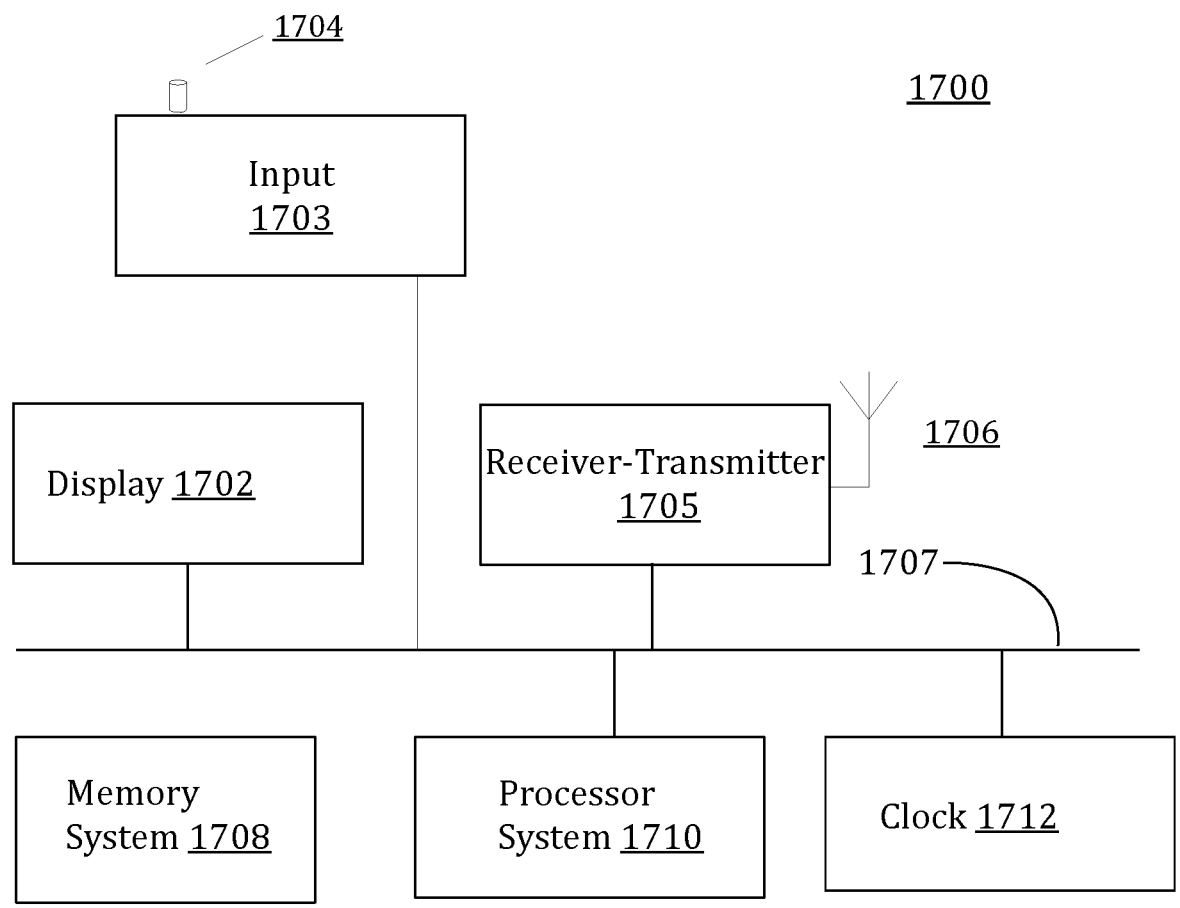
FIG. 17 shows a block diagram of an embodiment of the watch of FIG. 16.

FIG. 17 shows block diagram of an embodiment of the wearable device 1700. The wearable device 1700 may be a smart watch and may include Display 1702, input 1703, event stamp button 1704, receiver-transmitter 1705, antennae system 1706, communication system 1707, memory system 1708, processor system 1710, and clock 1712. In other embodiments, wearable device 1700 may include additional components and/or may not include all of the components listed above.

Wearable device 1700 may be an embodiment of wearable device 1602, which was discussed in conjunction with FIG. 16. Display 1702 may be a display for displaying information related to the functioning of the wearable device 1700. In an embodiment in which wearable device is a watch, display 1702, may display the time, when wearable device 1700 is not being used for other purposes. Optionally, wearable device 1702 may be capable of interfacing with the display of another device upon which the user may view information from the wearable device 1700.

Input system 1703 may include microphone, one or more physical buttons for inputting settings, one or more virtual buttons, a touch sensitive screen, and/or an interface for connecting to input systems of other systems, such as any one of, some of, any combination of, or all of a keyboard system, a mouse system, a track ball system, a track pad system, buttons on a handheld system, a scanner system, a microphone system, a connection to a sound system, and/or a connection and/or interface system to a computer system, intranet, and/or internet (e.g., IrDA, USB), for example.

Event stamp button 1704 is a button that activates an event stamp function, which is a function that causes the recording of event stamp information, which may be identifying information. Event stamp button is discussed with reference to FIG. 1 (see 106) in more detail, for example.

Receiver-transmitter system 1705 receives and transmits messages from and to, respectively, a wireless network. Receiver-transmitter system 1704 may include a separate receiver and transmitter and/or may include a combined receiver and transmitter. Receiver-transmitter system 1704 receives and transmits phone messages. Optionally, receiver-transmitter system 1704 may also receive radio waves. Receiver-transmitter system 1704 may also be capable of receiving GPS signals for determining a current location. Receiver-transmitter system 1704 may be used for communicatively coupling to a web server or proximity server, such as website host 112 or proximity server 1606, that stores information, such as playlists of radio stations (that may be used for determining a song, program, or other broadcast segment), menus of restaurants, price lists, taxi locations, restaurant locations, theater location (movie, music or play), museum location information or other event stamp information based on event stamp information stored in order to identify the broadcast segment or other event.

Antenna system 1706 is attached to receiver-transmitter system 1705 and picks up and sends electromagnetic signals from/to the environment, which is sent to/received at receiver-transmitter system 1705.

Communication system 1707 carries signals between all of the components of wearable device 1700. For example, communication system 1707 communicatively couples receiver-transmitter system 1705, input system 1703, display 1702, and processor system 1710 (processor system 1710 is discussed in the next paragraphs).

Memory system 1708 may store the even stamp information. For example, memory system 1708 may store a time and location at which the event stamp button was pressed. Memory system 1708 may also store a picture taken by a camera system, which may have been taken in conjunction with pressing the event stamp button. Similarly, memory system 1708 may store a location where the timestamp was pressed, which may have been determined by processor system 1710 based on GPS signals or may be sent from a network appliance. Memory system 1708 may also store a part of the broadcast segment, which may be used to help identify the broadcast segment at a later time with the aid of a computer and/or a website. Processor system 1710 may be configured for automatically or manually locating a website and sending event stamp information to a server to perform a search based on the event stamp information. Processor system 1710 may be configured for accessing a proximity server, via a network appliance to access information associated with or add information to a mash guide, mobcast, meeting/greeting, or other activity in response to pressing an event stamp button. Processor system 1710 may also be configured for automatically making a purchase or posting a comment based on the results of a search performed based on event stamp information. Processor system 1710 may also process GPS signals to determine a location or request GPS information from a network appliance. Processor 1710 may be configured for reading profile information in a broadcast segment.

Clock 1712 may include all of the functions of a normal clock, such as display the current time and provide alarms at the user's choosing. Clock system 1712 may facilitate the operations of processor system 1710. Clock system 1712 may also be used for determining a time associated with an event stamp. For example, if a user presses on an event stamp button, processor system 1710 may read clock system 1712 and record the time in association with other identifying information that may be used included in the event stamp information. In an alternative embodiment, processor system may be replaced with a specialized circuit that is configured for recording event stamps, locating a website, sending the event stamp information to the appropriate host, receiving search results that are based on the event stamp information sent, initiating a purchase based on the event stamp information, and/or completing the purchase initialized.

FIGS. 18a and b show a representation of an embodiment of a mash guide 1800 used in the event identification system to display results, particularly in association with the mash guide (or proximity grid). Mash guide 1800 may be an embodiment of mash guide 1000. FIG. 18a shows the mash guide 1800. The mash guide 1800 may include categories header 1802 with each category 1802a-e; distance from user header 1804, with distance markers 1804a and 1804b, and object square 18a-n. FIG. 18b shows an example of the information shown in each object 1806m, which may be a grid card (or node) on mash guide 1800. In other embodiments, mash guide 1800 may not include all of the features listed above and/or may include additional features instead of, or in addition to, those listed above.

The list of categories of categories header 1802 (which is made up of the collection of category headers 1802a-e) may label one axis of a mesh of mash guide 1800 (mash guide 1800 may show the results of a search). The categories of categories header 1802 can be the guides discussed with reference to the mash guides. FIG. 18 provides an example and a mash guide, which may be the results of a location search in a city. The user may be in a neighborhood that the user is not familiar with and wants to find out about what types of entertainment or facilities are available within the neighborhood. The objects returned are presented in a mesh or grid. The categories of the example of FIG. 18 include eateries 1802a, movie theaters 1802b, museums 1802c, theaters 1802d, and hotels 1802e.

Distance-from-user-header 1804 indicates the distance from the user or location entered. In the column below, markers are given identifying the distance to the various establishments in the same row as the marker. Distance markers 1804*a* and 1804*b* indicate the distance to the establishments in the same row as the distance marker of interest. Distance-from-user-header 1804, with distance markers 1804*a* and 1804*b*, show the distance to the various facilities and establishments from the user's current position. In the example of FIG. 18, the results include a location search in a city. The objects returned are presented in a mesh, with the distances being laid out from the closest to the furthest indicating which objects in the categories are closest to the user and which are further from the user. In the example of FIG. 18, the distances are from 0 miles (1804*a*) and 1 mile (1804*b*). The user can choose the parameters of the distance to view establishments that are the chosen distance from the user.

Object squares 18*a-n* are the objects returned in the search. Each of object squares 18*a-n* represents a different object. In an embodiment, object squares 18*a-n* include pictures of the objects (eatery, movie theater, museum, hotel, etc.). Information may also be presented within the object square that is readable without selecting the object, such as opening and closing time, dates of operation, what is showing, show times, address, and telephone number. If the user selects the object (e.g., by touching or clicking on the object), the object may be presented in a larger format (more readable) than the object appears in the mesh, or may be presented with more information about the object.

FIG. 18*b* shows the enlarged object 1806*m* after being selected by the user. In the example of FIG. 18*b*, the enlarged object 1806*m* is for the Pantages theater and includes more information and/or links, such as the website (a link capable of being activated) names of shows (CATS), show times (Tonight "CATS" 8 pm), ticket prices, the address of the theater, the telephone number of the theater and/or other information allowing the user to purchase tickets and/or learn more about available shows.

Figure 19:
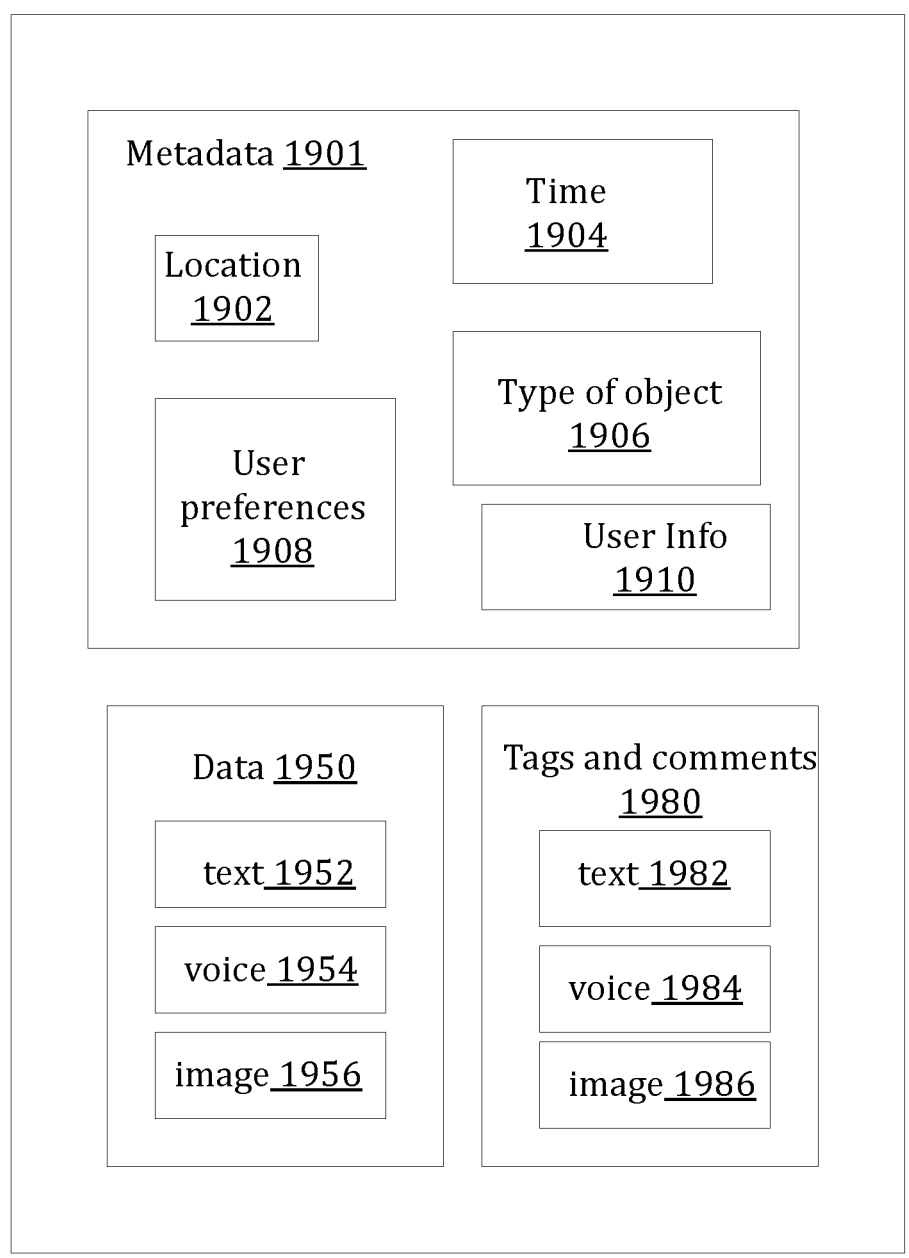
FIG. 19 shows a representation of an embodiment of how the information in the mash guide can be formatted as a card.

FIG. 19 shows a representation of an embodiment of the structure 1900 of a node of a mash guide. Structure 1900 may include metadata 1901, which may include location 1902, time 1904, type of object 1906, user preferences 1908, and user information 1910. Structure 1900 may also include data 1950, which may include text 1952, voice 1954, and image 1956. Structure 1900 may also include tags and comments 1980, which may include text 1982, voice 1984, and image 1986. In other embodiments, structure 1900 may not include all of the features listed above and/or may include additional features instead of, or in addition to, those listed above.

In an embodiment, structure 1900 may be the structure of a card, such as a geo card, a page for hosting a meeting, a page for hosting a mobcast, a geo tag, and/or a geo on-ramp, for example. However, the information in each node of the mash guide is organized into a unified format, so that the data and/or metadata can be searched through to determine the relevance of the data to a particular guide and/or search. The metadata of each object may include an indicator that indicates the type of data that the object contains. Having a uniform structure for the metadata facilitates allowing third parties to add their own nodes to the mash guide.

The information on the card may be divided into sections as follows:

Metadata|data|tags and comments.

The metadata associated with an event stamp may include,

Location|time|type of object|user information|user preferences.

The data and/or the tags and comments may further be divided into layers as follows, Text|voice|images.

The metadata 1901 of each object may include an indicator that indicates the type of data that the object contains. The metadata 1901 may include the location, time, type of object, user preferences, and user information.

Location 1902 may include metadata indicating the location and/or where to find the location in structure 1900, which associated with the items of fixed location, such as historical landmarks or bill boards (the bill board advertiser and/or owner may provide the proximity server with information about the location and content of each billboard and ad)

The time 1904 may include metadata indicating the time and/or where to find the location in structure 1900, which be the time that the event or card is active. For example, the time may be the time that a store or restaurant is open, the time a show starts, the time a movie starts, or the time a meeting starts. Alternatively, the time may be the time that a coupon is active or a sale occurs. The time can be used when the user activates the mash guide and/or event stamp to identify whether the event should be included in the mash guide.

The type of object 1906 may include metadata indicating the type of object and/or where to find the type of object in structure 1900, which the category of the object, whether the object is a meeting, a play, a musical performance, a store, a theatre and/or play, etc. The type of object may be used to identify whether the object should be placed in a certain category in the mash guide.

User preferences 1908 may include metadata indicating the user preferences and/or where to find the user preferences in structure 1900. The user preferences and/or the metadata about the user preferences may include information about when the user wants the card to be displayed, how the user wants the card to be displayed, and what will be displayed.

User information 1910 can include information identifying the user. The user that is identified is the user that is associated with the event/card and/or creates the event card.

The metadata 1900 may include data related to special services (e.g., Fandango). For example, the metadata may include whether the event is associated with a particular application such as Fandango.

The data 1950 may include any data related to the event that is described on the card, such as the agenda for the event, people attending the event, people speaking at the event, and/or performers performing at the event, etc. The data 1950 may include text 1952. The text 1952 data can include any information about the event that the user might find helpful and that may be convenient to convey, via text. For example, the text data may include data about the operating hours, the beginning and end time of an event, an explanation of the event, the price, the location, more information about the performers, a website to go to for more information about the event, the venue and/or the performers, etc. (see for example, FIG. 18, the card numbered 1806*m*).

Voice 1954 information may be any or all of the information that is provided as text information and/or other information about the event. In other words, the text information may be converted to voice information and vice versa. The voice information may also be a preview or an example of the performance, movie, etc. of the event. With the voice layer, the seller can leave information that one can click and listen to. Any posting may have a geo card with voice component and/or a web address where a user may listen to the comments and tags that have been posted about the subject matter of the sign. For example, a sign advertising a house for sale may be associated with a voice recording that is returned when the user presses an event stamp button within a certain vicinity of the sign and/or that is returned as a block on a mash guide when a user is within a certain vicinity of the sign, and for example, the voice recording may give a more pictorial description of the house than the text description.

The image 1956 data may include any supplemental information about the event shown as an image. The image might show a theater, an ad for a movie or other performance, an image of a restaurant, an image of a monument, store, or museum. An exemplary image of the food or merchandise in a store or restaurant might be shown. The image 1956 might be a photo of a person involved in a meeting, a speaker, or the person throwing a party. The image 1956 might be the photo of a user.

The tags and comments 1980 can include any additional information provided by users. The additional information might be information that has changed during the course of the event, information about people at the event, information rating the event, food, merchandise, experience, etc. The tags and comments 1980 can be provided as text, voice or images. Regarding the voice layer, someone may be really interested in posting something, because he/she has a motivation. However, some users are hesitant to post anything, because of the time involved, unless the user is angry. Allowing users to post voice tags and voice messages can reduce the time needed to post a comment and/or tag and therefore may encourage more people to post comments and tags.

Geo tags or event stamps and messages including geo tags or event stamps sent by the user may include similar metadata as in metadata 1901 and/or a similar structure to structure 1900.

Hardware

Wearable Device

Figure 20:
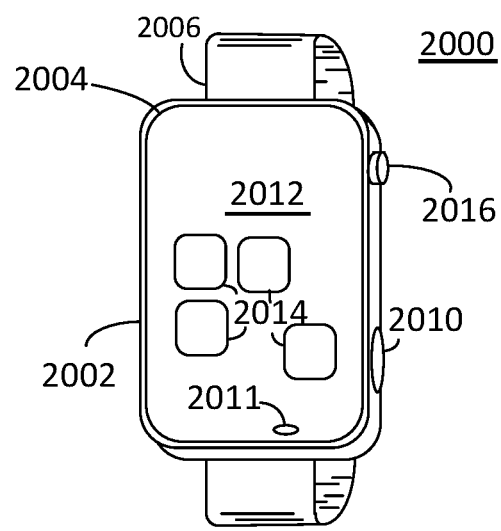
FIG. 20 shows a representation of an embodiment of a wearable device.

FIG. 20 shows a representation of an embodiment of a wearable device 2000. Wearable device 2000 may include housing 2002, rim 2004, band 2006, button 2010, button 2011, display screen 2012, apps 2014, and knob 2016. In other embodiments, wearable device 2000 may include may not include all of the components and/or may include other components, in addition to, and/or instead of the components listed above.

Wearable device 2000 is one embodiment of a wearable device. Although FIG. 20 depicts wearable device 2000 as a smart watch in other embodiments other wearable devices may be used (e.g., a smart headband, smart exercise monitor, a smart pin communicator, or a smart body temperature sensor). Housing 2002 is the enclosure for the housing the components of wearable device 2000, such as a processor, memory, and/or antenna. The housing 2002 may include a display screen and a rim.

Rim 2004 is optional and is a rim that surrounds the display screen. Band 2006 may connect to opposite sides of housing 2002 and form a loop through which a person's arm may fit through, so that the user may wear the wearable device 2000 on the user's arm. In alternative embodiments, band 2006 may wrap around other parts of the body, such as the user's torso, ankle, leg, neck, or other part of a user's body to secure the housing 2002 to the user. In an alternative embodiment, the band 2006 may be formed from two straps that fasten together, such as by a buckle, snap, clasp, Velcro® and/or other fastener, so that user may wrap the straps around the body part and then fasten the two straps together. In an embodiment, the housing 2002 may have lugs or rods that connect to the ends of the band 2006.

Button 2010 is a button on smartphone 2000 that performs an action when pressed. For example, pressing button 2000 may activate a light, cause the temperature to display, cause the time to display. The function activated by button 2010 may depend on the current mode that the watch is in and/or the sequence and manner in which the button 2010 is pushed. For example, pushing button 2010 quickly, twice in a row may activate a different function than pressing button 2010 once. Additionally, or alternatively, button 2010 may be an event stamp button, which, when pressed, may cause the wearable device 2000 to create an event stamp and/or establish communications with smartphone for creating an event stamp. Button 2010 may be a physical button. Optionally, the button 2010 may automatically launch a search for an event matching the event stamp information, such as by opening a mash guide, and presenting entries in the mash guide based on the event stamp information. Opening the mash guide may involve locating a website where the mash guide information is stored and searching through the mash guide entries for entries relevant to the event stamp information. The elements of, or entries in, the mash guide may be grid cards. The mash guide may be an arrangement of cards grouped according to location and according to category, where in any given category, cards for closer locations, or for locations closer to a location of interest, are listed first. Optionally, the cards may be arranged in rows and columns, in which each column is a different category and the cards in higher rows are closer. Alternatively, each row may be a different category and columns closer to the left side are closer in proximity to the user's current location or another location of interest.

Optionally, there may be other buttons for turning on or off wearable device 2000, setting the time, setting an alert, taking a photograph, and/or recording a video/audio. Button 2010 may be configured to implement or to initiate the implementation of locations sharing.

Button 2011 is on the display screen. Button 2011 may be physical or virtual. Button 2011 may be present in addition to button 2010 or instead of button 2010. In different embodiments, different ones of the functions described in conjunction with button 2010 may be performed by button 2011 instead. For example, button 2010 may activate a light, cause the time to display, and/or cause the temperature to display, depending on the mode and/or the sequence of presses of button 2010 (and/or a knob), whereas button 2011 may activate an event stamp function.

Display screen 2012 is a display that shows graphics and text to the user and may be used for viewing a mash guide and/or results of a search performed based on event stamp information. Display screen 2012 may present options for sharing a location with another user by sharing a grid card with a location that is updates as the user's location changes and/or bookmarking grid cards. The display screen 2012 may be any type of a display screen that can provide a visual output for wearable device 2000, such as liquid crystal display, light emitting diode display, for example. In an embodiment, the display screen 2012 may form the face of wearable device 2000, and the rim 2004 may wrap around the edges of the display screen 2012. In an embodiment, display screen 2012 may be part of housing 2002.

In an embodiment, the display screen 2012 may include a touch sensitive display screen that is configured to receive a user input through the user's touch. All or part of display screen 2012 may be touch sensitive. The display screen 2012 may be formed for an array of capacitive sensors (e.g., arranged in rows and columns), allowing display screen to sense being touched in multiple places simultaneously, which may distinguish between the multiple locations where display screen 2012 was touched, thereby receiving user inputs through the capacitive sensing elements and wearable device 2000 may respond differently according to where and the sequence of, pattern of, and/or combination of elements that were activated by the touch. Display screen 2012 may display a virtual event stamp button, that activates an event stamp function. Display screen 2012 may be used for viewing search results, which may have been produced as a result of activating an event function and/or selecting a grid card showing the current location of a person or item of interest. Display screen 2012 may be used for viewing phone numbers being dialed and/or stored; and for displaying apps and/or other programs running on the wearable device 2000. Optionally, display screen 2012 may be used for viewing information (e.g., about a location being shared or book mark selected) related to an event corresponding to an event stamp created by wearable device 2000 and/or a smartphone. Display screen 2012 may be responsive to swiping action produced by a user swiping a finger over display screen 2012 (e.g., to cause the page of the mash guide, of another website, or of an app) to switch to the next page.

Knob 2016 is optional and/or may be purely decorative, serving no function. Alternatively, knob 2016 may be a crown, a wheel, and/or other button, which may be rotatable and/or may move in-and-out relative to housing 2004, by being pressed and/or pulled by the user. Optionally, the turning of the knob 2016 adjust the time. In an embodiment, the user may configure the knob 2016 to activate the event stamp function when pressed. In another embodiment, when the knob 2016 is pressed a home screen may be displayed showing a mash guide and/or the main menu, for example. Knob 2016 may be present in addition to buttons 2010 and 2011 or instead of button 2010 and/or 2011. In different embodiments, different ones of the functions described in conjunction with button 2010 may be performed by knob 2016 instead. For example, knob 2016 may set the time, button 2010 may activate a light, cause the time to display, and/or cause the temperature to display, depending on the mode and/or the sequence of presses of button 2010 and/or a knob 2016, whereas button 2011 may activate an event stamp function.

Front of Smartphone

Figure 21A:
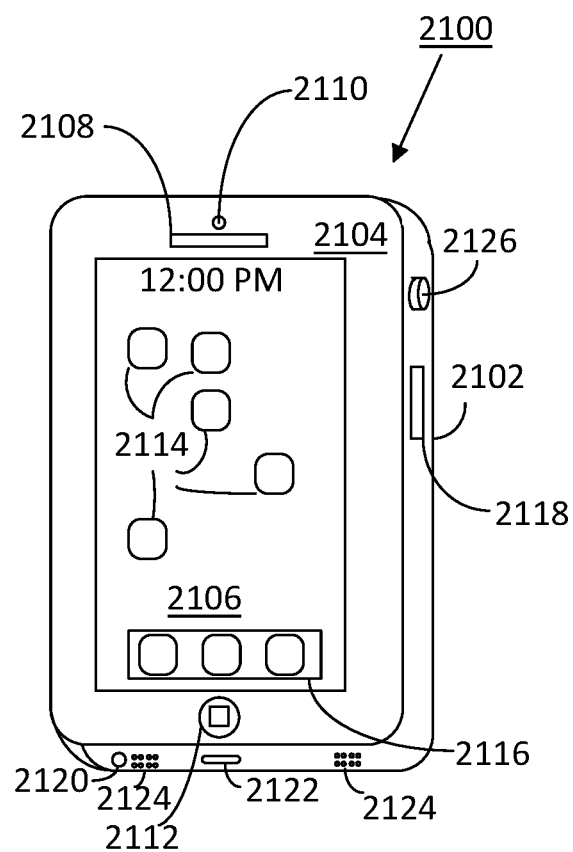
FIG. 21A shows a representation of an embodiment of the front of the smartphone.

FIG. 21A shows a representation of an embodiment of the smartphone 2100. Smartphone 2100 may include phone housing 2102, screen border 2104, touch sensitive display 2106, ear speaker 2108, camera 2110, button 2112, apps 2114, primary apps 2116, sim card 2118, port 2120, port 2122, microphone/speaker(s) 2124, optional button 2126. In other embodiments, smartphone 2100 may include may not include all of the components and/or may include other components, in addition to, and/or instead of the components listed above.

Smartphone 2100 is a phone that communicates with wearable device 2100 and is capable of downloading and running apps. Phone housing 2102 encases the rest of smartphone 2100. Phone housing 2102 may encase the processor system, memory, other computing elements, camera, clock, antenna, and/or other hardware of the smartphone 2100. The phone housing 2102 may include a touch sensitive display screen that is at least partially surrounded by a border. Optionally areas outside of the display screen may also be touch sensitive.

Border 2104 is optional and surround the display screen of smartphone 2100.

Touch sensitive display 2106 is the display screen and forms an input area smartphone 2100, via which the user may run apps and interact with the smartphone 2100. In an embodiment, the touch sensitive display screen 2106 may form a part of the face of smartphone 2100, and the border 2104 may wrap around the edges of display screen 2106 of smartphone 2100.

Touch sensitive display 2106 may be any type of display screen that can provide a visual output, such as liquid crystal display or light emitting diode display, and can receive user input through capacitive sensing elements. In an embodiment, touch sensitive display 2106 may form the face of smartphone 2100, and the border 2104 may wrap around the edges of touch sensitive display 2106. In an embodiment, touch sensitive display 2106 may be part of phone housing 2102. In an embodiment, touch sensitive display 2106 is a multi-touch display screen. Touch sensitive display 2106 may be formed for an array of capacitive sensors (e.g., arranged in rows and columns), allowing display screen to sense being touched in multiple places simultaneously, which distinguishing between the multiple locations where touch sensitive display 2106 was touched, thereby receiving user inputs through the capacitive sensing elements and responding differently according to where and the sequence of combination of elements (or pattern of elements) that were activated by the touch. Touch sensitive display 2106 may display a virtual event stamp button, that activates an event stamp function. Touch sensitive display 2106 may be used for viewing search results, which may have been produced as a result of activating an event function. Touch sensitive display 2106 may be used for viewing phone numbers being dialed and/or stored; for displaying apps and/or other programs running on the smartphone 2100. Optionally, touch sensitive display 2106 may be used for viewing information related to an event corresponding to an event stamp created by wearable device 2000 and/or a smartphone 2100. Touch sensitive display 2106 may be responsive to a swiping action produced by a user swiping a finger over touch sensitive display 2106 (e.g., to cause the page of the mash guide, of another website, or of an app) to switch to the next page. Touch sensitive display 2106 may display search results (which may have been produced as a result of activating an event function), viewing phone numbers being dialed, viewing phone numbers stored, displaying apps (or programs running on the smartphone 2100), optionally viewing information related to a radio station being listened to, and/or menu information. In an embodiment, smartphone 2100 and wearable device 2000 may communicate with one another, and the user may have a choice of whether to activate the even stamp function, via a button on smartphone 2100 or on wearable device 2000. After the event stamp function is activated, the user may then have a choice of whether to view the results on smartphone 2100 or wearable device 2000. Touch sensitive display 2106 may be used as a view finder for the camera on smartphone 2100 and capturing an image that may automatically converted or added to a grid card related to the location photographed.

Ear speaker 2108 outputs the audio from a website and/or during a phone call through the earpiece. Smartphone 2100 may also have a speakerphone speaker separate from the ear speaker 2108. In an embodiment, each speaker 2108 produce sounds at a volume that is appropriate for listening to, while the user's ear is up against the face of smartphone 2108 and another speaker is used for higher volumes. The speakerphone speaker may output the audio for situation where music is being played, for example.

Camera 2110 may have a lens for forming an image to be recorded on a digital medium and/or may include a view finder on the back of smartphone 2100. Touch sensitive display 2106 may be used as a view finder for camera 2110 when taking pictures with camera 2110 facing the user. Camera 2110 may be activated by the even stamp function and caused to take a picture, such as when creating a proximity card (or grid card). The lens of camera 2132 on the back of smartphone 2100 may be used for forming images on a digital media while taking pictures with the front of the smartphone 2100.

Button 2112 is power button that turns on the smartphone 2100. Optionally, button 2112 may also cause smartphone 2100 to automatically collect event stamp information, depending on the mode that the phone is in, and may optionally launch a search based on the event stamp information collected, such as by causing the mash guide to be opened and populated with information that is based on the event information collected. In an embodiment, the button 2112 may perform other actions (e.g., when pressed in combination with other functions) in addition to or instead of activating an event stamp function. For example, pressing and holding the button 2112 for three seconds may launch an application.

In an embodiment, the smartphone 2100 may have a button for presenting a home screen to the user, which could be the mash guide. In another embodiment, the smartphone 2100 may have a switch or button for turning smartphone 2100 on and/or off.

Apps 2114 are apps that the user may download, run, and/or delete, which perform various functions using smartphone 2100. Primary apps 2116 are apps that control the basic functions of smartphone 2100. Primary apps 2116 may include a telephone app, which controls dialing phone numbers, making phone calls, downloading other apps, deleting apps, surfing the network. In another embodiment, primary apps 2116 may include apps that the user chose to include so that the user may quickly find the app, or instead of apps that are related to the basic functions of the mobile phone. Sim card 2118 contains the information identifying the phone to the network and/or other hardware or software needed for making phone calls. Port 2120 may be a power port in which a power cord may be plugged into, to power and/or recharge the smartphone 2100. Port 2122 may be used for communicating with other devices, via a wired connection, such as via a Universal Serial Bus (USB) cable. Microphone/speaker(s) 2124 may include a microphone, via which the user may speak into smartphone 2100 when making a phone call and/or when recording sounds. Optionally, microphone/speaker(s) 2124 may be automatically activated as part of an event stamp function being activated, such as part of creating a proximity card and/or bookmark. Microphone/speaker(s) 2124 may include additional speaker(s) that complement ear speaker 2108. In an embodiment, the speakers of microphone/speaker(s) 2124 are used to produce sound when smartphone 2100 is in a speaker-phone-mode and/or when producing an alert (such as when smartphone 2100 is functioning as an alarm clock). Alternatively, ear speaker 2108 produces sound that is loud enough for a speaker-phone-mode, by turning up the volume of the sound.

Optional button 2126 may be an event stamp button. In other embodiments, the event stamp button may be located elsewhere instead of on the upper right side of the smartphone 2100. Optionally, smartphone 2100 may include a virtual event stamp button in addition to, or instead of, optional button 2126.

Back of Smartphone

Figure 21B:
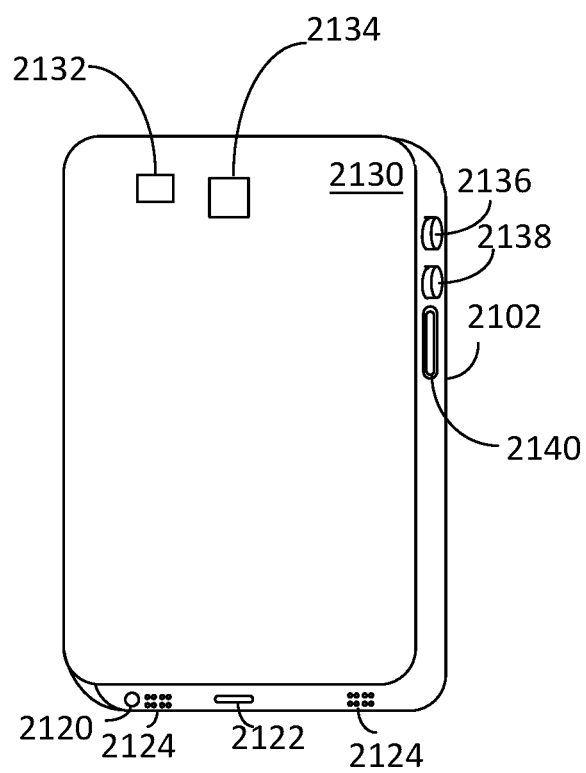
FIG. 21B shows a representation of an embodiment of the back of the smartphone.

FIG. 21B shows a back view of smartphone 2100. The back view shows phone housing 2102, port 2120, port 2122, microphone/speaker(s) 2124, back 2130, lens 2132, light 2134, volume buttons 2136 and 2138, and ringer button 2140.

Phone housing 2102, port 2120, port 2122, and microphone/speaker(s) 2124 were discussed above in conjunction with FIG. 21A. Back 2130 is the back of smartphone 2100. Lens 2132 is another lens of the camera. Lens 2132 may be used for forming an image on a digital media of the smart while using touch sensitive display 2106 as a view finder and/or as a view finder when taking pictures with the lens on the front of the for forming images on a digital media. Light 2134 may be turned on to provide illumination and/or may be used as a flash for the camera. Volume buttons 2136 and 2138 may be used for raising and lowering the volume of the speakers. Ringer button 2140 may turn on and/or off the ring tone of the smartphone 2100 (for example, when smartphone 2100 is in the vibrate mode, it may desirable that the phone not make noise when someone calls).

Circuit Diagram of Wearable Device

Figure 22:
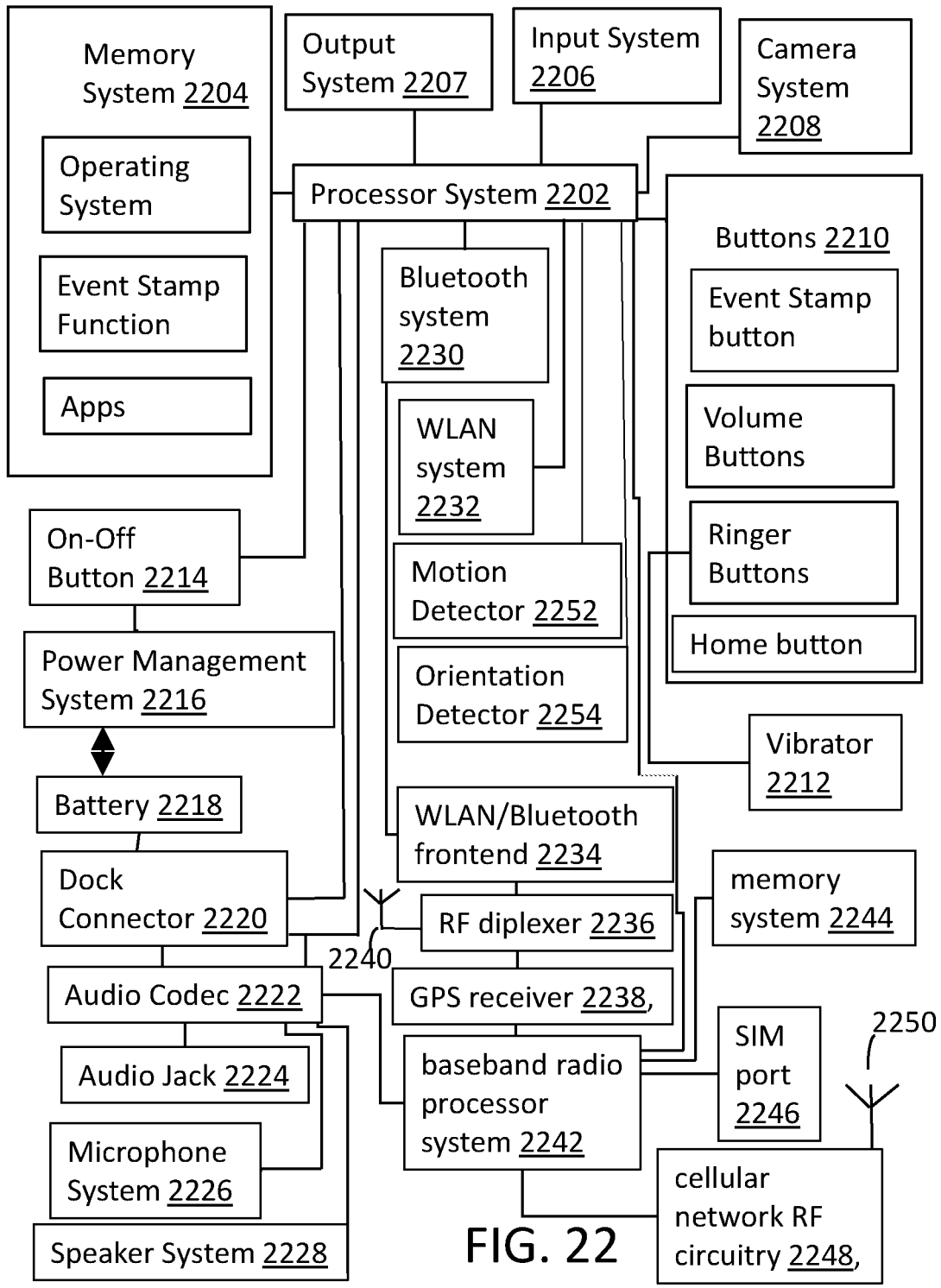
FIG. 22 shows a block diagram of an embodiment of a smartphone.

FIG. 22 shows a block diagram of an embodiment of a smartphone 2200. The smartphone 2200 may include processor system 2202, memory system 2204, input system 2206, output system 2207, camera system 2208, buttons 2210, vibrator 2212, on/off button 2214, power management unit 2216, battery connection 2218, dock connection 2220, audio codec 2222, audio jack 2224, microphone system 2226, speaker system 2228, Bluetooth system 2230, WLAN system 2232, WLAN/Bluetooth frontend 2234, RF diplexer 2236, GPS receiver 2238, antenna 2240, baseband radio processor system 2242, memory system 2244, SIM port 2246, cellular network RF circuitry 2248, antenna 2250, motion detector 2252, and/or orientation detector 2254. In other embodiments, smartphone 2200 may not include all of the components and/or may include other components, in addition to, and/or instead of the components listed above.

Smartphone 2200 may be an embodiment of the smartphone of FIGS. 21A and 21B. Processor system 2202 is the main processor system of smartphone 2202. Processor system 2202 runs applications (which may be downloaded from a network, such as the Internet), causes phone numbers to be dialed, performs tasks necessary for smartphone 2200 to function as a phone and/or surf a network, such as the Internet.

Processor system 2202 may be configured to automatically or manually locate a website and send event stamp information to a server for determining an event associated with event stamp information stored on smartphone 2200 in response to pressing an event stamp button. Processor system 2202 may also be configured (e.g., hardwired or programmed) for automatically making a purchase based on event stamp information (for example, based on information identifying the broadcast segment). Processor system 2202 may also process GPS signals or other location identifying signals to determine a location. Processor system 2202 may implement machine instructions for initiating the event stamp function and retrieving information from pages associated with the mash guide, geo-cards, proximity cards, geo-ramps, meeting/greeting, send it once, and/or mobcast.

Memory system 2204 stores the boot code for starting the smartphone 2200, the operating system that runs on smartphone 2200, and any applications that runs on the operating system. Among the applications stored in memory 2204 are those applications relied upon for the core functioning of the smartphone 2200, which may include an application for making phone calls, an application for downloading new applications, and/or an application for surfing a network, for example. Memory system 2204 may also store information associated with event stamps, bookmarks on a proximity grid, sharing grid cards, cards on a proximity grid, and/or connecting to a proximity grid. For example, memory system 2204 may be used for storing information gathered in response to one or more specific instances of activating an even stamp function, such as a time associated with pressing an event stamp button, location information gathered as a result of activating the event stamp function, and/or other location based information associated with activating the event stamp function, such as a radio or television station that was being received, a picture associated with the user's current location or item of interest at the current location. Memory system 2204 may also store one or more machine instructions that facilitates interacting with, and/or for interacting with a server that implements, a mash guide, sharing locations, creating cinemaps, geo-cards, proximity cards, geo-ramps, meeting/greeting, send it once, bookmarks of grid cards, and/or mobcast. A cinemap is a video clip that shows a location as seen when flying in the near the location. A simple cinemap may be to just show a view as seen when circling around the location, whereas a more complex cinamap may be a clip of how to travel from one location to another, such as how to travel from the entrance of an estate or campus to a particular location on the estate or campus.

Memory system 2204 may also store a picture taken by camera system 2208, which may have been taken in conjunction with pressing the event stamp button. Similarly, memory system 2204 may store a location where the timestamp was pressed, which may have been determined by processor system 2202 based on GPS signals from GPS receiver 2238. Memory system 2204 may also store photos, video recordings, audio recordings (e.g., a part of the broadcast segment), other event information, which may be used to help identify events at a later time with the aid of a computer and/or a website. In an embodiment, an event identification algorithm (e.g., as part of the event stamp function) may also be stored in memory system 2204.

Input system 2206 may include any of a variety of input mechanisms, that may not expressly appear in FIG. 22, such as keys, buttons, touch pads, virtual keypad on a touch screen, ports for optically or electronically downloading information from other machines (e.g., computers or other mobile phones) (and input system 2206 may include any or all of the input mechanism shown in FIG. 22). In an embodiment, the input system 2206 may include one or more buttons for inputting identification information in association with creating an event stamp, bookmark of grid cards, cinemap, and/or proximity card or sharing a location by sharing a link or other connection to a grid card. The buttons of the input system 2206 may initiate an event stamp function, which may include the collection of event identifying information. Additionally, the button may cause a picture to be taken and stored in association with the time. Alternatively, the buttons of input system 2206 may cause processor 2202 to collect GPS or other location information, which is then stored in association with the time. The buttons of input system 2206 may also cause processor 2202 to access a database containing more information related to the identifying information stored. Input system 2206 may include a button that activates the event stamp function and causes event stamp information to be recorded in memory system 2204 and/or may cause other identification information to be collected and/or stored as part of the event stamp information. In an embodiment, the input system 2206 may include a touch sensitive display screen that responds to the touch and presses of the user on the screen.

Output system 2207 includes any output not expressly shown in FIG. 22 (and may include any or all of the output mechanism shown in FIG. 22). For example, output system 2207 may be for outputting menu information, search results (which may have been produced as a result of activating an event function), viewing phone numbers being dialed, viewing phone numbers stored, viewing television programs, and optionally viewing information related to a radio station being listened to, listening to phone calls, for example. Output system 2207 may be used for viewing information resulting from surfing a Wide Area Network (WAN), such as the Internet, sending and viewing text messages, and viewing web pages. For example, output system 2207 may be used for viewing candidates for a broadcast segment or candidates for other event information that corresponds to event stamp information stored. Output system 2207 may also be used to view the event stamp information being stored. Output system 2207 may include a port that can be communicatively coupled to a computer via which the identification information may be transferred to a computer so that the event information may be identified, via a website on a network. In an embodiment, the output system 2207 may include or be a touch sensitive display screen.

Camera system 2208 is for taking pictures. The user may choose to take any picture desired, upload the picture, optionally store the picture on a server, and send the picture to a friend, for example. Camera system 2208 may also take a picture in response to activating the event stamp button, which may be a physical button on the smartphone and/or a virtual button that is pressed through the touch screen. The picture may be taken as part of creating a cinemap, bookmarks of grid cards, location sharing, and/or establishing a proximity card, for example, which may involve activating an event stamp function. The picture taken by camera system 2208, in response to activating the event stamp button, may be stored in association with the time and other identifying information.

Buttons 2210 are buttons on smartphone 2200 that perform an action when pressed. Buttons 2210 may include an event stamp button, home/menu button, and a volume button, which controls the volume of the audio coming from the speaker system or audio jack (if the smartphone 2200 is connected to an external speaker through the dock). The event stamp button, when pressed, may cause the smartphone 2200 to locate a website and send event stamp information to a server for determining an identity of a broadcast segment, an identity of a location, or identify items at a location associated with event stamp information stored on smartphone 2200.

Other buttons and functions on smartphone 2200 include a button that controls rings, which is used to indicate whether a phone vibrates when receiving an incoming call and may be tied to the volume button, and an on/off button, which allows the user to turn on the phone or reset the phone when pressed.

Vibrator 2212, when activated, may cause smartphone 2200 to vibrate. Vibrator 2212 may be activated as an alert when an alarm is triggered, if the ringer is turned off. Alternatively, there may be a virtual or physical button that turns on the vibrator regardless of whether the ringer is turned off. Vibrator 2212 may be activated by a gaming application in response to specific occurrences during a game.

On/off button 2214 turns smartphone 2200 on and off. On/off button 2214 may trigger a power management unit to causes smartphone 2200 to power down in a particular sequence that is deemed to be beneficial and/or power efficient.

Power management unit 2216 monitors the power consumption by individual components of smartphone 2200 and may signal power management commands to one or more of the components, as needed, so as to conserve battery energy and control battery temperature. The power management unit 2216 may monitor the more-power-intensive components, which may include the baseband radio processor, the processor system 2202, output system 2207, and/or the cellular network RF circuitry.

Battery 2218 is the battery that powers smartphone 2200.

Dock connection 2220 allows for the smartphone 2200 to connect to an external device for the purpose of sending and receiving data. For example, the dock connection 2220 may connect to a data cable attached to a computer, so that the user may transfer music, pictures, and other information between the computer and the smartphone 2200. In addition, the dock connection 2220 may be connected to an external power source (e.g., a cable connected to an electrical outlet, a power adapter, or an external battery), charging the battery of smartphone 2200, via battery connection 2218. Dock connection 2220 may be used for connecting smartphone 2200 to a projector system, for projecting movies being streamed to smartphone 2200 or pictures taken by smartphone 2200. As another example, Dock system 2220 may be used for connecting smartphone 2200 to a sound system for playing music stored on smartphone 2200 or streamed to smartphone 2200.

Audio codec 2222 is an audio coder-decoder that codes signals from the microphone into electrical signals representing sound for storage and/or that are interpreted by other components and decodes signals representing sound to signals that produce sound when applied to a speaker. Audio codec 2222 decodes the electrical signals to act as an interface to the analog input of the microphone system and the analog outputs of the receiver and speaker system, by providing analog amplifiers and other analog signal conditioning circuitry that is needed for conditioning the analog acoustic transducer signals. The audio codec 2222 may be a separate integrated circuit package.

In one embodiment, the audio codec 2222 may operate in either a media player mode or a phone call mode. Through the programming for the processor system 2202 or through control signals, audio codec 2222 can be configured into either the phone call mode or media player mode. In media player mode, the smartphone 2200 operates as a digital media player, where the audio codec 2222 converts analog signals to digital signals and digital signals to analog signals, converting signals from the analog acoustic transducer to generate corresponding digital signals. The audio codec 2222 supplies the digitized microphone signal to the processor system 2202 and converts a digital audio signal from the processor system 2202 into analog form and then applies the analog signal to the receiver and/or speaker system for playback.

In call mode, the smartphone 2200 operates as a mobile telephone device, where the user can have real-time audio conversation with another remote user during a cellular telephone call. In call mode, the audio codec 2222 acts as an analog pass through with no digital conversion, so that the analog acoustic transducer signals are passed through, with perhaps some analog amplification or buffering, between the baseband radio processor system and the acoustic transducers. Audio codec 2222 may send the audio signal to one or more external speakers connected through the dock connection 2220.

Audio codec 2222 may also include an event stamp function mode, a mode for running apps, a mode for interacting with a WAN (e.g., via smartphone 2200), which may include a combination of the functions performed during call mode and media player mode, for example.

Audio jack 2224 receives sound signals from other devices. Audio jack may be used for plugging a speaker and/or microphone into smartphone 2200. Audio codec 2222 may code and decode sound signals from audio jack 2224. Headphones/earphones may plug into audio jack 2224, for example, allowing the smartphone 2200 to output the audio signals through the audio jack. In such embodiment, the audio codec 2222 may send the audio through the audio jack 2224, instead of through the speaker system.

Microphone system 2226 is for the user to speak into when making an audio recording, making a telephone call, asking a question (to perform a voice activated search), or calling out a voice command Microphone system 2226 may be connected to audio codec 2224, which may code signals from microphone 2226.

Speaker system 2228 may be used for listening to phone calls, radio stations, television programs, and/or web pages, for example. Audio codec 2224 may decode audio signals before sending the signals from the speaker 2228. The speaker system 2228 may include an ear speaker and/or a speakerphone speaker.

Bluetooth system 2230 is a UHF/shortwave radio system for communicating with other devices. Bluetooth system 2230 wirelessly connects the smartphone 2200 with other local devices, such as speakers, wearable device, or other smartphones.

WLAN system 2232 produces signals for communicating via a wireless local area network. WLAN system 2232 receives and transmits data and information from and to a wireless network, for example, by a TCP/IP link. Additionally, WLAN system 2232 may receive and transmit phone messages. Bluetooth system 2230 and WLAN system 2232 provide additional wireless communication channels for the smartphone 2200. The Bluetooth system 2230 and the WLAN system 2232 may share an antenna for short range wireless communications.

The RF diplexer 2236 may include a pair of RF ports that are coupled to the antenna. The diplexer 2236 may be a passive device, and may include a low pass filter on one port and a high pass filter on a second port. The diplexer 2236 may multiplex between two channels of two frequencies—a lower frequency signal (filtered by the low pass filter) and high signal (filtered by the high pass filter), onto a third port. The signals on the two ports may occupy separate frequency bands, so that both signals can coexist on one port without interfering with each other.

One of the RF ports of diplexer 2236 may be used for GPS services, which the GPS receiver 2238 uses to obtain GPS data, so that the smartphone 2200 can indicate its location to the user and/or the GPS information received via one RF port of the diplexer 2236/GPS receiver 2238 may be included in the event stamp information. The other RF port of the RF diplexer 2236 is coupled to WLAN/Bluetooth frontend 2234, which combines the RF signals of Bluetooth and WLAN. RF diplexer 2236, the WLAN/BT frontend 2234 and baseband radio processor 2242 may receive radio waves through the antenna. The WLAN/BT frontend 2234 and a baseband radio processor may be used for communicatively coupling to a web server, such as a website host, that stores information, such as the mash guide, playlists of radio stations (that may be used for determining a song, program, or other broadcast segment), menus of restaurants, price lists, taxi locations, or other event information based on event stamp information stored in order to identify the broadcast segment or other events of the event stamp.

The antenna 2240 is an antenna for short range wireless communications. Antenna 2240 connects to the RF diplexer 2236, which allows the Bluetooth channel and the WLAN channel to share the antenna.

The baseband radio processor system 2242 is a chip that manages all the radio functions, such as the information from the antenna 2250. Baseband radio processor system 2242 has a firmware and its own memory system 2244. The baseband processor system 2242 may also perform cellular baseband processing tasks including cellular protocol signaling, coding and decoding, and signaling with the external RF transceiver.

In an embodiment, the services for GPS, cellular network, Bluetooth link, and WLAN may be managed by programs running on the processor system 2202, which communicates with the baseband radio processor system 2242, Bluetooth system 2230, and WLAN system 2232 through separate component buses. In another embodiment, there may also be separate component buses connecting the baseband radio processor system 2242 to the Bluetooth system 2230 and WLAN system 2232 to allow the Bluetooth system 2230 and WLAN system 2232 to use the audio processing engine in the baseband radio processor system 2242. For example, using the WLAN system 2232, the use of the audio processing engine could allow the user to conduct a wireless voice over IP phone call. As another example, using the Bluetooth system 2230, the user could conduct the phone call through a wireless headset.

Memory system 2244 is the memory dedicated to baseband radio processor system 2242 and may programs run by baseband radio processor system 2242.

SIM port 2246 holds the SIM card of smartphone 2200. SIM card 2246 may store an encryption key (Ki) and an International Mobile Subscriber Identity (IMSI) (or other identifier). Baseband radio processor system 2242 may request user access to a cellular network based on the authentication of the user (a module that checks the user information and password) and the SIM card, which is inserted in the SIM port 2246 of the smartphone 2200. The SIM port 2246 reads the SIM card for information regarding the cellular network.

The cellular network RF circuitry 2248 may be a RF transceiver integrated circuit package. The cellular RF circuitry 2248 may have a frequency up-converter and a down converter.

Antenna 2250 is the antenna for the cellular network RF 2248. The frequency upconverter, uplinks signals from the baseband radio processor system 2242 into the radiation band of the antenna 2250. The RF down-converter translates the downlink signal from the radiation band of antenna 2250 into a lower frequency suitable for input to the baseband radio processor system 2242. In an embodiment, the RF up conversion and down conversion may be performed directly, from and to baseband radio processor system 2242, rather than going through an intermediate frequency (IF).

Motion detector 2252 detects motion of the smartphone 2200. For example, motion detector 2252 may include one or more solenoids (which may be a straight tube or have a toroidal shape) having a magnet that slides within the solenoid or toroid as the smartphone moves. Optionally, there may be one or more solenoids aligned with each of two or three axes, which may be perpendicular to one another. Alternatively or additionally, the motion of the smartphone 2200 may be detected using accelerometers and/or gyros, which may be aligned with three axes, which may be perpendicular to each other. Alternatively or additionally, a the motion detector may include a magnetometer that detects changes in the Earth's magnetic field that result from changing location, a GPS receiver and/or camera for detecting changes in location, echo location (e.g. using ultrasound or inaudible sound), and/or radar. Similarly, motion detector 2252 may include a straight tube, circular tube (or other shaped tube) having a fluid with bubble or a ball (with or without a fluid). A light may be shined through the tube and a light detector may detect the position of the bubble or the ball by the difference of the intensity of light at different locations of the tube that result from the difference in transparency and/or index of refraction of the bubble and fluid or the ball and the location in the tube without the ball. By detecting change in the position of the ball or bubble, motion of the smartphone 2252 may be inferred. There may be two or three of such tubes arranged along two or three axes, which may be perpendicular to one another. The motion detector sends signals to processor system 2202. The signals are analyzed to determine patterns and/or characteristics or the motion. The movement and/or orientation of the mobile device may be used for inferring a movement of the user. When the patterns and/or characteristics of the motion match predetermined patterns and/or characteristics that indicate that the user may benefit from having an event stamp created, event stamp information is collected and the event stamp may be automatically created. The detection of certain patterns or characteristics of motion may be associated with certain movements, commonly performed prior to taking a picture, and/or speaking into the mobile device. The pattern or characteristics may be associated with a user chosen motion.

Orientation detector 2254 may be part of motion detector 2252 or may be a separate unit and optionally may include the same hardware as motion detector 2252. However, when detecting motion, the change of the information indicating the position is analyzed to determine what the change was, and from the change in the information indicating a position, a motion is inferred. Whereas, when determining the orientation, the position information while the smartphone is stationary may also be used, such as the accelerometer or gyro information along multiple axes, or information about the position of the ball or bubble in a tube, and/or magnet in a solenoid, where different tubes or solenoids are aligned along different axes. Alternatively or additionally, the change in position information may be used to determine an orientation of the mobile device. The orientation of the mobile device may be used for inferring a position into which the user is configured. When the orientation matches a predetermined orientation that indicate that the user may benefit from having an event stamp created, event stamp information is collected and the event stamp may be automatically created. The detection of orientation may be associated with certain orientations, commonly used for taking a picture, and/or speaking into the mobile device. The orientation may be associated with a user chosen motion.

Input system 2206 includes any input not already specified elsewhere. In other words, although input 2206 may include camera system 2208, buttons 2210, on/off button 2214, microphone system 2226, Bluetooth system 2230, WLAN system 2232, WLAN/Bluetooth frontend 2234, RF diplexer 2236, GPS receiver 2238, antenna 2240, and antenna 2250, motion detector 2252, orientation detector 2254, and/or other input. Similarly, output system 2207 includes output not listed elsewhere. In other words, although output system 2207 may include vibrator 2212, dock connection 2220, audio jack 2224, speaker system 2228, Bluetooth system 2230, WLAN system 2232, WLAN/Bluetooth frontend 2234, RF diplexer 2236, antenna 2240, and/or antenna 2250. Output system 2207 may include other output.

Circuit Diagram of Smartphone

Figure 23:
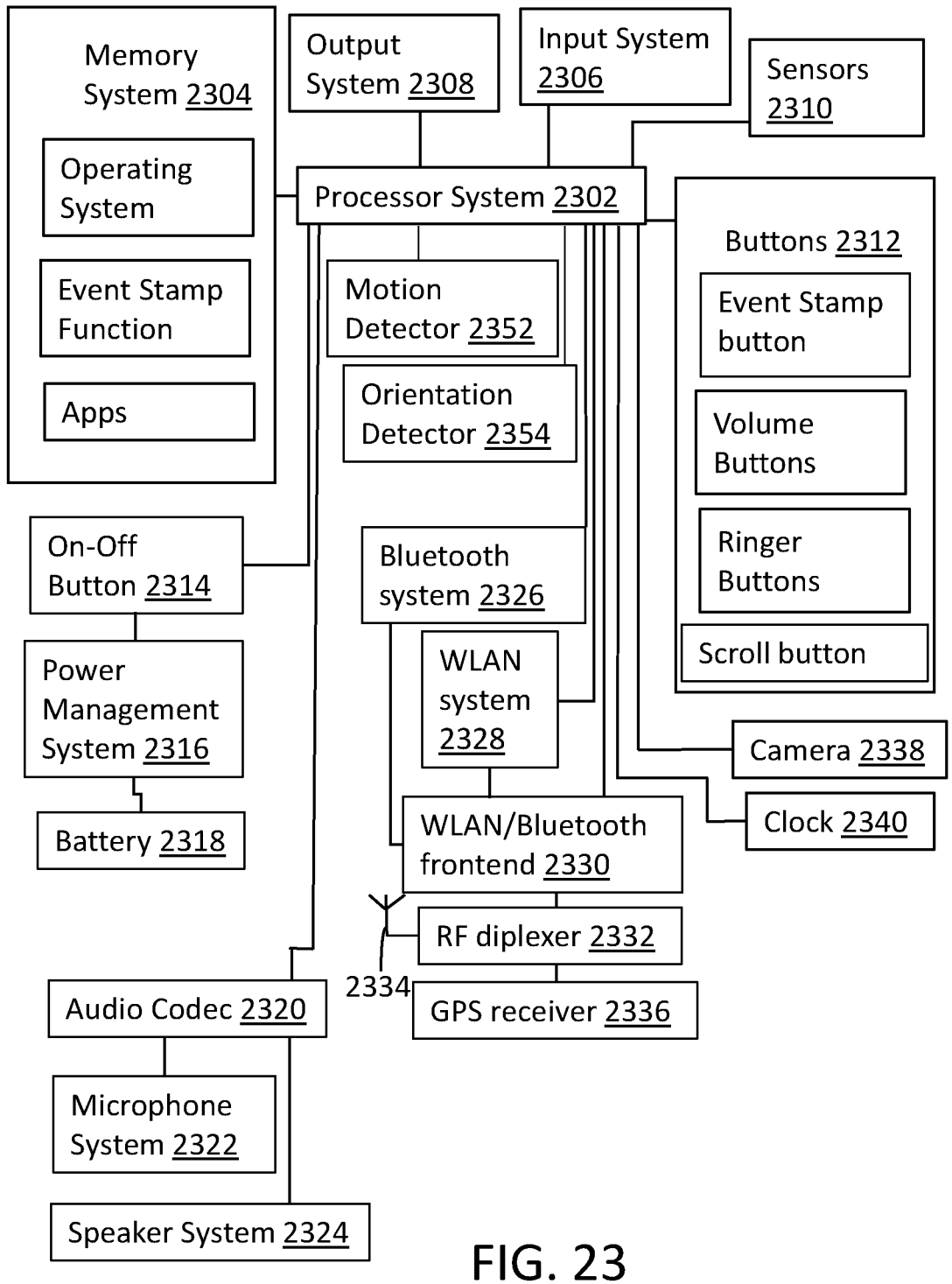
FIG. 23 shows a block diagram of an embodiment of a wearable device.

FIG. 23 shows a block diagram of an embodiment of a wearable device 2300. The wearable device 2300 may include processor system 2302, memory system 2304, input system 2306, output system 2308, sensors 2310, vibrator 2311, buttons 2312, on/off button 2314, power management unit 2316, battery connection 2318, audio codec 2320, microphone system 2322, speaker system 2324, Bluetooth system 2326, WLAN system 2328, WLAN/Bluetooth frontend 2330, RF diplexer 2332, antenna 2334, GPS receiver 2336, camera system 2338, real time clock 2340, motion detector 2352, and orientation detector 2354. In other embodiments, wearable device 2300 may not include all of the components and/or may include other components, in addition to, and/or instead of the components listed above.

Wearable device 2300 may be an embodiment of the wearable device of FIG. 20. Processor system 2302 may be configured to communicate with smartphone 2200. Processor 2302 may automatically or manually collect some or all of the event stamp information and/or cause smartphone 2200 to collect the remainder of the event stamp information, cause smartphone 2200 to locate a website and send event stamp information to a server, and identify an event associated with event stamp information stored on wearable device 2300 in response to pressing an event stamp button on wearable device 2300. Processor system 2302 may also be configured for automatically making a purchase based on event stamp information (for example, based on information identifying the broadcast segment). Processor system 2302 may also process GPS signals to determine a location. Processor system 2302 may be configured for reading profile information in a broadcast segment. In an alternative embodiment, wearable device 2300 may connect to a network without use of a smartphone.

Memory system 2304 may store the boot code for starting the wearable device 2300, the operating system that runs on wearable device 2300, and any applications that runs on the operating system. Memory system 2304 may also store the identification information. For example, memory system 2304 may store a time associated with pressing an event stamp button and a radio or television station that processor system 2302 determined as being associated with a broadcast segment that was being played at the time the event stamp was pressed. Memory system 2304 may also store a part of the broadcast segment, which may be used to help identify the broadcast segment (or other event information) at a later time with the aid of a computer and/or a website. As explained above, storing a portion of a broadcast segment may facilitate automatically identifying the correct broadcast segment so that a purchase may also be automatically made without the user reviewing the item being purchased, because the likelihood of purchasing the wrong item is reasonably low.

Memory system 2304 may also store a picture taken by camera system 2238, which may have been taken in conjunction with pressing the event stamp button and stored as event stamp information. Similarly, memory system 2304 may store a location where the timestamp was pressed, which may have been determined by processor system 2302 based on GPS signals from GPS receiver 2236 and/or other location information, as event stamp information. Memory system 2304 may store an audio recording associated with an event as event stamp information. In an embodiment, an event identification algorithm may also be stored in memory system 2304.

Input system 2306 may include any of a variety of input mechanisms, such as keys, buttons, touch pads, virtual keypad on a touch screen, ports for optically or electronically downloading information from other machines (e.g., computers or other mobile phones). Input system 2306 may include input mechanism not expressly show in FIG. 23 (input system 2306 may also include any of the input mechanism shown in FIG. 23). In an embodiment, the input system 2306 may include one or more buttons for inputting identification information. One or more buttons of input system 2306 may initiate an event stamp function, which may include the collection of event identifying information. Additionally, the one or more buttons of input system 2306 may cause a picture to be taken and stored in association with the time. Alternatively, the one or more buttons of input system 2306 may cause processor system 2302 to collect GPS or other location information, which is then stored in association with the time. The one or more buttons of input system 2306 may also cause processor system 2302 to access a database containing more information related to the identifying information stored. Input system 2306 may include a button that activates the event stamp function and causes event stamp information to be recorded in memory system 2304 and/or may cause other identification information to be collected and/or stored as part of the event stamp information. In an embodiment, the input system 2306 may be a touch sensitive display screen that responds to the touch and presses of the user on the screen.

Output system 2308 is for outputting menu information, search results (which may have been produced as a result of activating an event function), viewing phone numbers being dialed, viewing phone numbers stored, viewing apps, and optionally for viewing information related to a radio station being listened to, for example. Output system 2308 may include output mechanisms not expressly shown in FIG. 23 (output system 2308 may also include any or all of the other output mechanisms shown in FIG. 23). Output system 2308 may be used for surfing a WAN, such as the Internet, sending and viewing text messages, and viewing web pages. For example, output system 2308 may be used for viewing candidates for a broadcast segment or other event information that corresponds to event stamp information stored. Output system 2308 may also be used to view the event stamp information being stored. Output system 2308 may be used for viewing a mash guide, a proximity card, a cinemap, a grid card created by the user, bookmarked grid cards, a grid card from another user shared with the present user. Output system 2308 may include a port that can be communicatively coupled to a computer via which the identification information may be transferred to a computer, so that the event information may be identified via a website on network. In an embodiment, the output system 2308 may be a touch sensitive display screen.

Sensors 2310 are sensors on wearable device 2300 that help the wearable device 2300 collect information of the watch's surrounding. Sensors 2310 may include accelerometers, heart rate monitor, proximity sensor, temperature sensors, and gyroscope. Other sensors may be included for different applications, such as monitoring the user's blood glucose level.

Vibrator 2311 may cause wearable device 2300 to vibrate. Processor system 2302 may cause vibrator 2311 to vibrate when an alarm is activated, at the beginning of, during, and/or at the completion of collecting event stamp information and/or creating an event stamp. Processor system 2302 may cause vibrator 2311 to vibrate when an event stamp is automatically being created to inform the user that an event stamp is being created.

Scroll button 2312 is a button on wearable device 2300 that can be pressed (into the wearable device) or turned (similar to the way one would turn the knob on a watch). Depending on whether scroll button 2312 is pressed or turned, the action performed is different and action performed may depend on what is displayed on the touch screen and/or state of the system. In an embodiment scroll button 2312 may be used for setting the time. In an embodiment, the scroll button 2312 may be configured to be an event stamp button, which, when pressed, sends a signal to a paired smartphone (e.g., smartphone 2200), which initiates the event stamp function, which in turn may be used to retrieve information from, or add information to, pages associated with the mash guide, meeting/greeting, send it once, create a cinemap, bookmarks of grid cards, and/or mobcast, and/or sharing a location, such as by sharing a connection to a grid card. Based on the response to the event stamp function, the wearable device 2300 may then be used to, via interacting with smartphone 2200 make a purchase, to upload a comment, and/or to find out more information. In another embodiment, instead of accessing the network and/or creating an event stamp, via smartphone 2200, scroll button 2312 may be configured to be an event stamp button, which, when pressed, initiates the event stamp function, which in turn may be used to retrieve information from, or, via a network connection and a server, add information to, pages associated with the mash guide, meeting/greeting, send it once, create a cinemap, bookmark a grid card, and/or to initiate a mobcast. Scroll button 2312 may be connected to the crown of a watch.

Power management unit 2316 monitors the power consumption by individual components of wearable device 2300 and may signal power management commands to one or more of the components as needed, so as to conserve battery energy and control battery temperature. The power management unit 2316 may monitor the more power intensive components, which may include the processor system 2302 and output system 2308, for example.

Battery connection 2318 connects the smartphone battery to the power management unit 2316, providing power to the smartphone. Battery connection 2318 may also connect the battery to an induction coil that allows the battery to be charged wirelessly and/or form random electromagnetic fields in the air.

Audio codec 2320 is an audio coder-decoder that acts as an interface to the analog input of the microphone system 2322 and the analog outputs of the receiver and speaker system 2324, by providing any and all analog amplifiers and other analog signal conditioning circuitry that is needed for conditioning the analog acoustic transducer signals. The audio codec 2320 may be a separate integrated circuit package.

In one embodiment, the audio codec 2320 may operate in a media player mode or call mode, for example. Through the programming from the processor system 2302 or control signals, audio codec 2320 can be placed in either mode (or in other modes). In media player mode, the wearable device 2300 operates as a digital media player, where the audio codec 2320 converts analog signals to digital signals and digital signals to analog signals, converting signals from an analog acoustic transducer to generate the corresponding digital signals. The audio codec 2320 supplies the digitized microphone signal to the processor system 2302 and converts a digital audio signal from the processor system 2302 into analog form and then applies it to the receiver and/or speaker system 2324 for playback.

In call mode, the wearable device 2300 interacts with smartphone 2200, so that the user can have real time audio conversation with another remote user during a cellular telephone call. In the call mode, the audio codec 2320 passes analog signals through with no digital conversion, so that the analog acoustic transducer signals are passed through to the speakers and from the microphone, with perhaps some analog amplification or buffering, between the baseband radio processor system 2302 and the acoustic transducers.

Audio codec 2320 may also include an event stamp function mode, a mode for running apps, a mode for interacting with a WAN (e.g., via smartphone 2200), which may include a combination of the functions performed during call mode and media player mode, for example.

Microphone system 2322 is for the user to speak into when recording audio, making a telephone call, asking a question to initiate a voice command or voice activated search, for example.

Speaker system 2324 may be used for listening to phone calls, announcing the time, sounding an alarm, listening to radio stations, listening to television programs, and/or listening to audio content on web pages, for example. The speaker system 2324 may include a speakerphone speaker.

Bluetooth system 2326 is a UHF/shortwave radio system for communicating with other devices, such as smartphone 2200. Bluetooth system 2326 wirelessly connects the wearable device 2300 with other local devices, such as speakers, wearable device, and/or other smartphones.

WLAN system 2328 produces signals for communicating, via a wireless local area network. WLAN system 2328 receives and transmits information from and to a wireless network, for example, by a TCP/IP link. Additionally, WLAN system 2328 may receive and transmit phone messages. Bluetooth system 2328 and WLAN system 2328 for communicating with smartphone 2200. The Bluetooth system 2326 and the WLAN system 2328 may share an antenna for short range wireless communications.

WLAN/Bluetooth frontend 2330 is the front end for the Bluetooth system 2326 and the WLAN system 2328, and WLAN/Bluetooth frontend 2330 acts as an interface between Bluetooth system 2326 and the WLAN system 2328 and signals sent by and received at wearable device 2300.

The RF diplexer 2332 may include a pair of RF ports that are coupled to the antenna. The diplexer 2332 may be a passive device, and may include a low pass filter on one port and a high pass filter on a second port. The diplexer 2332 may multiplex between two channels of two frequencies—a lower frequency signal (filtered by the low pass filter) and high signal (filtered by the high pass filter), onto a third port. The signals on the two ports may occupy separate frequency bands, so that both signals can coexist on one port without interfering with each other.

One of the RF ports of diplexer 2332 may be used for GPS services, which the GPS receiver may use to obtain GPS data, so that the wearable device 2300 can indicate a current location to the user, which may be included in the event stamp information. The other RF port of the RF diplexer 2332 is coupled to WLAN/Bluetooth frontend 2330, which combines the RF signals of Bluetooth and WLAN. RF diplexer 2332, the WLAN/BT frontend 2234 and baseband radio processor 2242 may receive radio waves through the antenna. The WLAN/BT frontend 2234 and a baseband radio processor may be used for communicatively coupling to a web server, such as website host, that stores information, such as the mash guide, playlists of radio stations (that may be used for determining a song, program, or other broadcast segment), menus of restaurants, price lists, taxi locations, or other event information based on event stamp information stored in order to identify the broadcast segment and/or other events.

Bluetooth system 2326 and WLAN system 2328, which is optional, provide additional wireless communication channels for the wearable device 2300. Bluetooth system 2326 wirelessly connects the wearable device 2300 with other local devices, such as speakers, wearable devices, or other smartphones. WLAN system 2328 receives and transmits information from and to a wireless network, for example, by a TCP/IP link. Additionally, WLAN system 2328 may receive and transmit phone messages. The Bluetooth system 2326 and the WLAN system may share an antenna for short range wireless communications.

The RF diplexer 2332 has a pair of RF ports that are coupled to the antenna 2334. One of the RF ports is used for GPS services, which the GPS receiver 2336 uses to obtain GPS data, so that the wearable device 2300 can indicate a current location to the user. The other RF port of the RF diplexer 2332 is coupled to WLAN/Bluetooth frontend 2330, which combines the RF signals of Bluetooth and WLAN. Through antenna 2334 and RF diplexer 2332, the WLAN/BT frontend 2330 and baseband radio processor may receive radio waves. The WLAN/BT frontend 2330 and baseband radio processor may be used for communicatively coupling to a web server, such as website host 2112 of FIG. 21A, that stores information, such as mash guides, playlists of radio stations (that may be used for determining a song, program, or other broadcast segment), menus of restaurants, price lists, taxi locations, or other event information based on event stamp information stored in order to identify the broadcast segments and/or other events.

Camera system 2338 is for taking pictures and is optional. The user may choose to take any picture desired, upload the picture, and send the picture to a friend, for example. Camera system 2338 may also take a picture in response to activating the event stamp button, which may be a physical button on the smartphone or a virtual button that is pressed through the touch screen. The picture taken by camera system 2338 in response to activating the event stamp button may be stored in association with the time and other identifying information.

Although not shown, the wearable device 2300 may have a baseband radio processor system that manages all the radio functions and may be connected to an antenna and a separate memory system.

Real time clock 2340 is a computer clock that keeps track of the current time. Real time clock 2340 may be in the form of an integrated circuit. Real time clock 2340 may have an alternate source of power to continue to keep time while the primary source of power is off or unavailable. Alternatively, the wearable device 2300, through Bluetooth system 2326 or WLAN system 2328, may collect the information for the current time from a nearby device through a wireless connection, or the wearable device 2300, through the baseband radio processor, may get the time from a nearby radio tower.

Motion detector 2352 and orientation detector 2354 may be the same as motion detector 2252 and orientation detector 2254, respectively, except that motion detector 2352 and orientation detector 2354 detects the motion, change of motion, and/or orientation of wearable device 2300 instead of smartphone 2200. In an embodiment, smartphone 2200 and wearable device 2300 may communicate with one another and share position and/or location information to assist in and/or determine one another's position, motion, and/or orientation. Motion detector 2352 and/or orientation detector 2354 may be included in sensors 2310.

As mentioned above, input system 2306 includes input system not expressly shown in FIG. 23. In other words, although input system 2306 may include sensors 2310, vibrator 2311, buttons 2312, on/off button 2314, microphone system 2322, Bluetooth system 2326, WLAN system 2328, WLAN/Bluetooth frontend 2330, RF diplexer 2332, antenna 2334, GPS receiver 2336, and camera system 2338, motion detector 2352, orientation detector 2354, and/or other input systems as well. Similarly, output system 2308 includes any output system not expressly shown in FIG. 23. In other words, although output system 2308 may include speaker system 2324, Bluetooth system 2326, WLAN system 2328, WLAN/Bluetooth frontend 2330, RF diplexer 2332, and/or antenna 2334. Output system 2308 may include other output mechanism as well. In an embodiment, any of (or all of) the hardware and/or circuitry of smartphone 2202 may be included in wearable device 2302, and any of (or all of) the hardware and/or circuitry of wearable device 2302 may be included in smartphone 2202.

Further Discussion of Hardware

Figure 24:
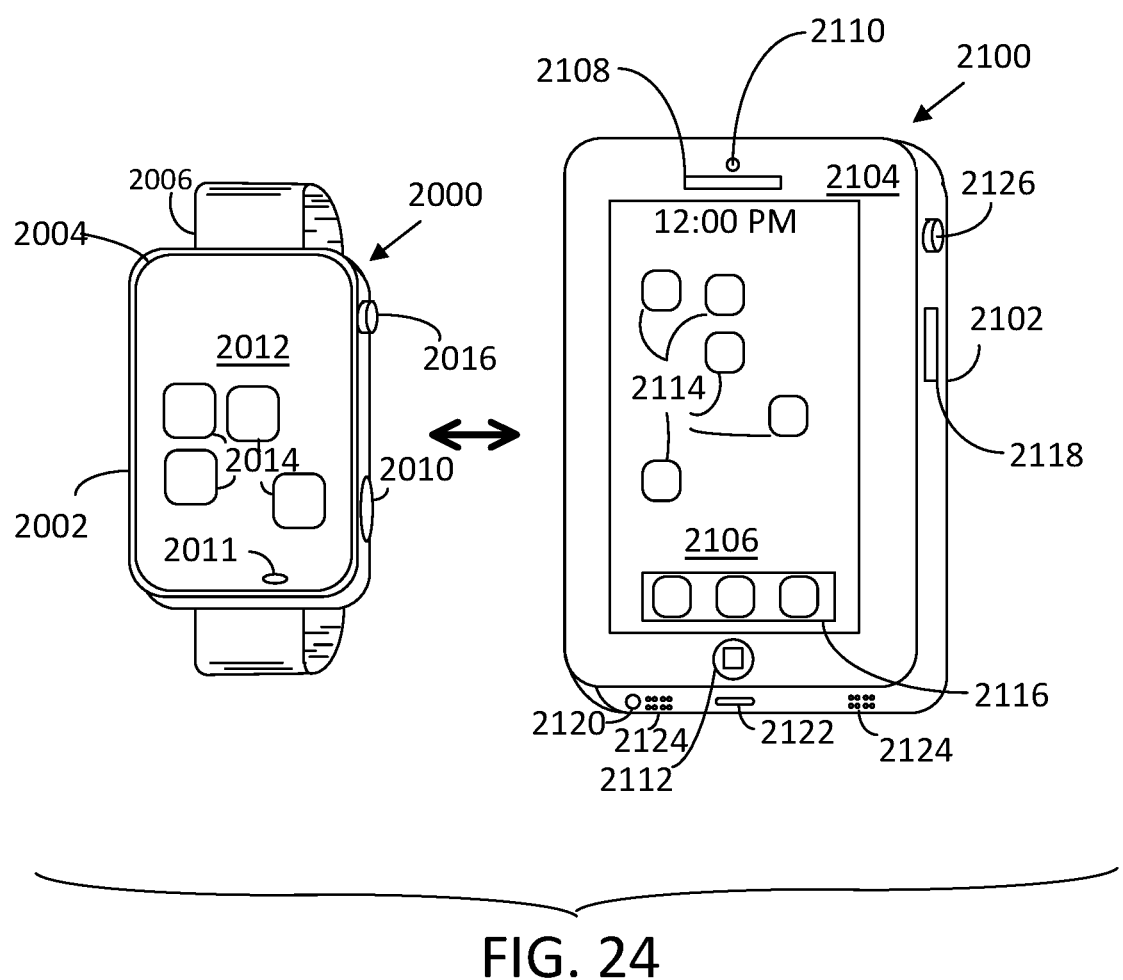
FIG. 24 shows a representation of an example of pairing between wearable device and smartphone.

FIG. 24 shows a representation of an example of pairing between wearable device 2402 and smartphone 2404 to be used in an event identification system and may be an embodiment of FIGS. 20-23.

Pseudocode for Application

Below are pseudocode snippets that implement various functions of the application and/or the proximity grid server, for example. The pseudocode snippets below may be stored in memory system 304 and optionally also in memory system 404 and/or in the proximity grid server, for example.

```
Event stamp pseudo code snippet
    // An example of one possible EventStamp structure for a
language having a structure of or a structure similar to C.
    struct EventStamp {
        Date time; // Date and time of capture in GMT
        double latitude;
        double longitude;
        double altitude;
        double pitch;
        double yaw;
        double roll;
        double bearing; // direction of travel
        double speed; // travel speed in m/s
        double height; // estimated height above local ground surface
        int floor; // Estimated building floor level
        double noise; // detected local ambient noise
        Activity activity; // Detected activity type information
        Address address; // Geocoded address information
        enum Activity {
            Standing,
            Walking,
            Running,
            Cycling,
            Driving,
            Flying,
            Unknown
        }
```

```
        struct Address {
            String name;
            String street;
            String city;
            String state;
            String postcode;
            String country;
        }
    }
```

The above pseudo code snippet is just one example of one possible code that defines one possible structure for the event stamp. The structure of the event stamp of the above example includes a parameter that stores the date and time captured by the event stamp function, which may be expressed in any format such as an integer or decimal time stamp, or as any common or proprietary time structure, or as a string such as ISO 8601, or any other date and/or time format, and may assume a specific time zone such as Greenwich Mean time (GMT), or may include an explicit time zone or time offset such as in an ISO 8601 encoded date, or may express a local time independent of any time zone. The event stamp structure may include parameters for latitude, longitude, and altitude, which may be stored in double precision. The event stamp may also include parameters that relate to the manner in which the bearer of the smartphone or wearer of the watch is turning, such as the pitch (the rotation about an axis oriented perpendicular to the direction of travel and parallel to the top and bottom of the vehicle the wearer or bearer is traveling in), yaw (the rotation about an axis oriented perpendicular to the direction of travel and perpendicular to the top and bottom of the vehicle the wearer or bearer is traveling in), and roll (the rotation about an axis oriented parallel to the direction of travel) (when the vehicle is resting on a flat level surface, the yaw is perpendicular to the ground, and pitch and roll are parallel to the ground, the pitch, roll, and yaw are always perpendicular to one another and remain in a fixed orientation with respect to the vehicle in which the user is traveling in or fixed with respect to the average orientation of the user's body, if the user is not traveling in a vehicle). In an embodiment, the pitch, roll, and yaw are stored in double precision (however single precision or another format and precision may be used). The event stamp may also include parameters for the bearing (the direction of travel), the speed of travel, the estimated height above the ground, the estimated floor of the building in which the user is on, a recording of the ambient noise level and/or an audio signal collected from a radio station or other signal source, the address, and the activity the user is engaged in. In an embodiment, the floor number may be stored as an integer and the other parameters having numerical values may be stored in double precision (however other formats may be used, such as single precision, string, or text). The activity may be a parameter that has one of a finite set of possible values. For example, in an embodiment, the activity is chosen from walking, standing, running, cycling, driving, flying, and/or unknown. Optionally sitting, may also be a possible value. The address may include a structure, which may include a parameter for a name, which may be the name of the building at current location, the name of the resident, and/or the name of owner of the building at the current location. The Address may also have parameters for the name of the street and number associated with address (e.g., 15 Pine Avenue), city, state/province/territory, postal code and/or country associated with the location in which the user is located. The parameters of the address may be string values. However, other values may be used. For example, one may have a table that converts names of cities, states, provinces, countries, territories, and/or streets into numerical or alphanumerical codes, which may be used instead of the names of the cities, states, provinces, countries, territories, and/or streets.

The following code snippet captures the information needed for creating the event stamp and populates the structure (e.g., of the prior code snippet) that defines the event stamp.

```
Pseudo code snippet for capturing the information for the event
stamp
// Sample pseudo-code for preparing a grid stamp in a
C-like language:
GridStamp getCurrentGridStamp( )
{
    GridStamp gridstamp;
    gridstamp.time = gmtime( );
    gridstamp.latitude = GPSService::getCurrentLatitude( );
    gridstamp.longitude = GPSService::getCurrentLongitude( );
    gridstamp.altitude = GPSService::getCurrentAltitude( );
    gridstamp.pitch = OrientationService::getCurrentPitch( );
    gridstamp.yaw = OrientationService::getCurrentYaw( );
    gridstamp.roll = OrientationService::getCurrentRoll( );
    gridstamp.bearing = GPSService::getCurrentBearing( );
    gridstamp.speed = GPSService::getCurrentSpeed( );
    gridstamp.height = gridstamp.altitude -
TopographyService::getSurfaceAltitude(gridstamp.latitude,
gridstamp.longitude);
    gridstamp.floor = (int)round(gridstamp.height / 3);
    gridstamp.noise = MicrophoneService::getCurrentLevel( );
    gridstamp.activity =
ActivityService::getCurrentActivityType( );
    gridstamp.address = GeocoderService::getAddress
(gridstamp.latitude, gridstamp.longitude);
    return gridstamp;
}
```

The above pseudo-code is an example of a method for preparing a grid stamp using a language having the same structure as C or a structure similar to C. The pseudo code includes an object for getting the current grid stamp, which in the above example is getCurrentGridStamp( ) which in-turn includes an object, for getting many of the parameters of the object gridstamp, which in the example above is called, gridstamp, which invokes several methods. The method gridstamp.time invokes a routine for getting the time, which is gmtime( ). In an embodiment, the event stamp only has a single time, because the event stamp represents a specific moment. The method gridstamp.latitude invokes a function getCurrentLatitude( ) of services (GPSService) provided by the GPS chip, which determines the latitude. The method gridstamp.longitude invokes a function getCurrentLongitude( ) of services (GPS Service) provided by the GPS chip, which determines the longitude. The method gridstamp.altitude invokes a function getCurrentAltitude( ) of services (GPSService) provided by the GPS chip, which determines the altitude. The method gridstamp.pitch invokes a function getCurrentPitch( ) of services (OrientationService) of the motion detector of the smartphone or smart watch, which determines the pitch. The method gridstamp.roll invokes a function getCurrentRoll( ) of services (OrientationService) of the motion detector of the smartphone or smart watch, which determines the roll. The method gridstamp.bearing invokes a function getCurrentBearing( ) of services (GPSService) of the motion detector or GPS chip of the smartphone or the smart watch, which determines the bearing. The method gridstamp.speed invokes a function getCurrentSpeed( ) of services (GPSService) of the GPS chip, which determines the speed. The method gridstamp.height invokes the method gridstamp.altitude to obtain the altitude of the user. The method gridstamp.height invokes a function getSurfaceAltitude(gridstamp.latitude, gridstamp.longitude) of services (TopographyService) of the smartphone or smart watch (which may involve sending a query to a database on a server), which determines the altitude of the ground under the user based on the latitude and longitude returned by the methods gridstamp.latitude and gridstamp.longitude. The altitude of the ground is subtracted from the altitude of the user to obtain the height of the user. The method gridstamp.floor invokes a function gridstamp.height of services (GPS Service), which determines the height of the user. The height is divided by 3 (or another number approximating how many units of measurement are in each floor) and then rounded to the nearest integer. If the height is computed in meters, since there are about 3 meters per floor, by dividing the number representing the height by 3 one usually gets the number of the floor that the user is on (unless the floors are unusually high or unusually short). The method gridstamp.noise invokes a function getCurrentLevel( ) of services (MicrophoneService), which in this example records volume of the noise (e.g., 16 decibels). The method gridstamp.activity invokes a function getCurrentActivityType( ) of services of the smart watch or smartphone, which determines what activity the user is engaged in. The method gridstamp.address invokes a function getAddress (gridstamp.latitude, gridstamp.longitude) of services (AddressService) of the smart watch or smartphone, which determines the address based on the latitude and longitude determined by the methods gridstamp.latitude and gridstamp.longitude. In an embodiment, the smartphone provides a service of looking up an address based on the latitude and longitude. However, the service may involve sending a request to a server to submit a query for searching for the address at the server's database.

The date and time may be captured from the smartphone or smart watch's internal clock. The latitude, longitude, and altitude may be determined by a GPS unit in the smart watch and/or smartphone. Optionally, the smart watch and/or smartphone may include an altimeter for detecting the altitude. The bearing, pitch, roll, the speed, and yaw may be determined by comparing GPS coordinates at different times. Alternatively, the smartphone and/or smart watch may include a compass, gyros, and/or accelerometers (e.g., three accelerometers and/or gyros, each pointed in a different one of three perpendicular directions), and/or other motion detectors for determining the orientation and changes in orientation of the wearer that detect the roll, yaw, pitch, speed, and/or bearing. The activity may be determined based on the speed, location coordinates, and/or pattern of motion may be used to determine the activity. For example, if the altitude is too far above the ground for the user to be on the ground, it may be assumed that the user is flying. If the user is not flying, and the user is on land, the speed of the user may be used to determine whether it is possible for the user to be standing, running, cycling, or driving. If the user is not currently moving, whether or not the user is in a car may be determined based on the altitude of the user, whether the user's GPS coordinates place the user in the middle of road, whether the user is vibrating, and/or the background noises around the user. When the user is moving fast enough to be running, whether user is running, cycling, or driving may be determined based on the roll of user, the vibrations of the user, and/or the background noise. A runner tends to bob up and down at a relatively low frequency and high amplitude, whereas a driver tends to vibrate at a significantly higher frequency, but with a lower amplitude. The user will tend to tilt into each turn while cycling more so than a driver or runner.

As a result of activating the event stamp function, the smartphone and/or smart watch may send a request to a server for the altitude of the ground (e.g., how far above sea level the ground is), the address of the current location, the number of floors in the building where the user is located. From the altitude and the height of the ground, the height above the ground that the user is located at may be computed. Similarly, from the altitude and the height of the ground, the number of floors in the building, the floor that the user is located at maybe estimated.

The content of an event stamp may be transmitted in the following format.

Example of Event Stamp JSON

```
// Sample JavaScript Object Notation (JSON) serialized form
that might be used to transport an EventStamp structure over a network:
    {
      "time": "2016-10-05T17:37:18+00:00",
      "latitude": 51.5113861,
      "longitude": 0.1405944,
      "altitude": 42.6427,
      "pitch": 5.986524,
      "yaw": 48.9865,
      "roll": 2.376123,
      "bearing": 48.024,
      "speed": 0.8321,
      "floor": 3,
      "noise": 43.285,
      "height": 10.6427,
      "activity": "walking",
      "address": {
        "name": "Apple Corps",
        "street": "3 Savile Row",
        "city": "London",
        "state": "",
        "postcode": "W1S2ER",
        "country": "UK"
      }
    }
```

In the above example, the parameter "time" has the value "2016-10-05T17:37:18+00:00," the parameter "latitude": as the value 51.5113861, the parameter "longitude": has the value 0.1405944, the parameter "altitude" and the value 42.6427, the parameter "pitch": 5.986524, the parameter "yaw" has the value 48.9865, the parameter "roll" has the value 2.376123, the parameter "bearing" has the value 48.024, the parameter "speed" has the value 0.8321, the parameter "floor" has the value 3, the parameter "noise" has the value 43.285, the parameter "height" and the value 10.6427, and the parameter "activity" has the value "walking". The parameter "address" is associated with several other parameters, which are "name", "street", "City", "state", "postcode", and "country". The parameter "name" has the value "Apple Corps" (which is the owner of the building where the user is located), the parameter "street" has the value "3 Savile Row", the parameter "city" has the value "London", the parameter "state" may have a null value (or in another embodiment may have the value "England"), the parameter "postcode" has the value "W1S2ER", and the parameter "country" has the value "UK".

Database Grid Object

Below is an example of grid object that may be stored in a database and queried with an event stamp.

```
// An example of one possible structure that could be queried using
an EventStamp, using the structure of C
    struct GridObject {
        ID id;
        String name;
        Address address;
        Photo photo;
        String category;
        Date startTime; // Date the object first became available at this
        location, if any
        Date endTime; // Date the object stopped being available at
        this location, if any
        Geometry location; // Point or polygon geometry of the object
        Double altitude;
        Double height;
        int floor;
    }
```

The above object has the attributes of id, name, address, photo, category, startTime, endTime, location, altitude, height, and floor. The grid object may be searched by any of the attributes of the grid object (similar to searching the columns of a table). The id is an identifier of the object, which may be a numerical value, for example, which uniquely identifies the grid object. Name is a name assigned to the object. The name may be the owner of the building, if the object is in a building. The address is the physical street address of the location associated with the grid object. The address may be a structure including several parameters, such as a street address, city, state, country, and/or postal code. Photo is a photograph (or other image) that was uploaded by the user, which the user associates with the location and the grid card. Category is a category to which the object or location associated with the grid card belongs. The category may be a category of a mash guide, such as eateries, parks, places of interest, monuments, real estate, theaters, malls, clothing stores, etc. StartTime is the date and/or time the object first became available at this location (if the user chooses to add this information to the grid object or chooses to make the grid object viewable by others only after a certain date and/or time). EndTime is time and/or date that the object is scheduled to no longer be available or stopped being available at this location, if any. In an embodiment, in contrast to the event stamp, which may have only a single time (e.g., the time of the creation of the event stamp), a grid object may have both a start and an end, because the grid object may occupy a given space over a particular interval of time, during which the grid object exists and/or can be accessed.

Location identifies a region of interest. The shape of the region is specified by the value of the geometric shape, which could have values, such as a point, line, or a polygon geometry (such as a triangle, square, rhombus, rectangle, pentagon, hexagon, etc.) Altitude is the altitude that the object is located at. Height is the height above ground that the object is located at. Floor is an integer value indicating which floor of a building the object associated with the grid object is located.

Below is a JSON, which may be used for transporting the information in the grid object between devices over a network, such as the Internet. For example, when a search is requested based on an event stamp a JSON similar to the one below may be sent to a server to perform a search or when a user would like to share an event stamp with another user, a JSON similar to the one below may be sent to the other user.

```
// Sample JSON serialized form that might be used to transport a
GridObject structure over a network:
{
    "id": "12344567890",
    "name": "Apple Corps",
    "address": {
        "name": "Apple Corps",
        "street": "3 Savile Row",
        "city": "London",
        "state": "",
        "postcode": "W1S2ER",
        "country": "UK"
    }
    "photo": "http://images.example.com/eanghs3npgslhcemsueh.jpg",
    "category": "Landmarks",
    "startTime": "1968-01-01T00:00:00+00:00",
    "endTime": null,
    "location": {"type":"Point", "coordinates":[0.1405944, 51.5113861]},
    "altitude": 42.6427,
    "height": 10.6427,
    "floor": 3
}
```

The above JSON indicates that the parameter id has the value 12344567890, which may uniquely identify the event stamp in a database of event stamps on a server, or in a data collection, having event stamps, on a server. The parameter name has the value Apple Corps. The structure address includes the parameter name (which has the value Apple Corps), the parameter street (which has the value 3 Savile Row), the parameter city (which has the value London), the parameter state (which has a null value), the parameter postcode (which has the value W1S2ER), and the parameter country (which has the value UK). The parameter photo has the value http://images.example.com/eanghs3npgslhcems-ueh.jpg, which is the URL where the photo may be found. The parameter category has the value Landmarks indicating that the image in the photo is related to a landmark. The parameter startTime had the value 1968-01-01T00:00:00+00:00, and the parameter endTime has the value null. The parameter location is a structure, which is associated with two parameters, which are type and coordinates. The parameter type has the value Point, which indicates that the location is a single point (as opposed to a region or a particular geometric shape). The parameter "coordinates" has the value [0.1405944, 51.5113861], which may be the latitude and the longitude of the point of the center of another geometric object indicated by the parameter "type." The parameter altitude has the value 42.6427, the parameter height has the value 10.6427, the parameter floor has the value 3.

Structured Query Language (SQL) Based Query for a Grid Object

Below is an example of a procedure for querying a grid object using an event stamp, which may be performed in response to receiving a JSON object, similar to the one above.

```
// Example of an efficient SQL based query for a GridObject using
an EventStamp
global QuadTree<double, double, GridObject> = GridObjectIndex;
List<GridObject> queryGridObjects(EventStamp eventstamp,
Double distance = 100.0)
{
    List<GridObject> ret;
    List<GridObject> near = GridObjectIndex.findNear
(eventstamp.longitude, eventstamp.latitude, distance);
    int a;
    for(a = 0; a < near.count; a++)
    {
        GridObject o = near[a];
        // Also filter by other factors from the eventstamp
        if (o.floor == eventstamp.floor && o.startTime <=
eventstamp.time && o.endTime >= eventstamp.time)
        {
            ret.add(o);
        }
    }
    return ret;
}
```

In the procedure above, QuadTree is a tree of grid objects, which although not expressly referenced by the other routines is searched by them to find the grid objects. The statement, global QuadTree<double, double, GridObject>= GridObjectIndex assigns the collection of objects in GridObjectIndex to QuadTree, which arranges the objects into a tree. The statement List<GridObject>queryGridObjects (EventStamp eventstamp, Double distance=100.0), sets the type for the object queryGridObjects to List<GridObject>, so that the results of the class queryGridObjects are a list of grid objects (which are found in a query). When the class queryGridObjects is invoked, the local object ret is assigned the type List<GridObject>, and as a result, ret has the format of a list of gird objects. In the above procedure, ret is the list of grid objects returned at the end of the procedure. Next the object near is also assigned the type List<GridObject> (so that near also has the format of a list of grid objects). The specific list of grid objects that is assigned to the object near is put together from the results of implementing the method GridObjectIndex.findNear, which finds the grid objects that have position coordinates that are near the longitude determined by eventstamp.longitude, which is the longitude captured by the event stamp, and near the latitude determined by eventstamp.latitude, which is the latitude captured by the event stamp. Specifically, the grid stamps must be within a region having the shape specified in the location parameter of the JSON, that has a size that encompasses objects within the distance of the value of the input parameter "distance" of the longitude and latitude of the event stamp. Next an integer "a" is declared and initiated at the initial value of 0. The integer a is used as a for-loop index. The for-loop repeats itself as long as the integer a is less than the value stored in the parameter near.count. Near.count is a count of how many grid objects are in the object near. After each repetition of the loop, the value of the integer is incremented (e.g., by 1). During each repetition of the loop the object o is set the next object in the near list. At the a+1$^{th}$ repetition of the For-loop, the value of the a$^{th}$ object in the list of objects in the object near is assigned to the local object o. In the example above, during the first time performing the for-loop, a=0. Then an if statement is invoked. The if statement of this example determines whether three conditions are true. Specifically, the if statement determines whether the condition that the floor of the object (which has the value of o.floor) is the same as the floor of the event stamp (eventstamp.floor), the startTime of the object (o.startTime) is less than or equal to the time of the event stamp (eventstamp.time), and the end time of the object (o.endTime) is less than the time of the event stamp (eventstamp.time) (which may mean, for example, that object was on the same floor as where the event stamp was taken and that the object o existed and/or was accessible at the time the event stamp was taken). If all three of these conditions are true, then the object o that was retrieved (which was near[a]) is added to the return list by the method ret.add(o). After all of the objects for each value of a of the for-loop are tested (which is near[0] to near[$a_{max}$]) the list of objects ret is returned. In an embodiment, the results of the above procedure are obtained automatically, after capturing an event stamp with no other user input. The results may be presented to the user as a mash guide.

Below is a routine for implementing an SQL query for a grid object using an event stamp and user input. For example, after obtaining the results of the above routine, the user may want to further limit the search results returned by performing a query, which may be done with the procedure below. Alternatively, the procedure below may be used for submitting a query to the database of the proximity grid regardless of whether the above procedure was implemented.

```
// Example of an efficient SQL based query for a GridObject using
an EventStamp
global Database db;
List<GridObject> queryGridObjects(EventStamp eventstamp,
Double distance = 100.0)
{
    String query = """
    SELECT *
    FROM gridobjects
    WHERE ST_Intersects(location, ?)
    AND floor = ?
    AND (startTime IS NULL OR startTime <= ?)
    AND (endTime IS NULL OR endTime >= ?)
    """;
    List<GridObject> ret;
    List<DbRow> rows = db.findAll(query,
DatabaseHelper::makeCircleAsPoly(eventstamp.latitude,
eventstamp.longitude, distance), eventstamp.floor, eventstamp.time,
eventstamp.time);
    int a;
    for(a = 0; a < rows.count; a++)
    {
        ret.add(GridObject(rows[a]));
    }
    return ret;
}
```

In the above procedure, database db is declared and given the type global database. Database db is the database that will be searched. Next, the object queryGridObjects is assigned a type of List<GridObject>. In other words, after implementing the class queryGridObject, a list of grid objects is returned. The query that is implemented, is based upon the information in the event stamp eventstamp, where the grid objects returned have position coordinates that identify positions that are within a distance of 100 (e.g., within a 100 miles).

Implementing the class queryGridObject may involve, formulating a query object which is a string of characters that is parsed by the database server. The query may be formulated as a SELECT statement. The first argument of the SELECT statement is a wildcard (*), and so all of the attributes of the objects of gridobject are selected. The objects meet the condition that ST_Intersects(location, ?) is true, where ST_intersects is a routine that is true when the geometry bound to the query parameter "?" intersects the geometry stored in record's location field location, the user's chosen location is represented by a question mark. Additionally, the objects selected must have a floor that is the same as the user's input, a start time that is either not specified (null) or less than or equal to the user specified start time, and an end time that is either not specified or greater than or equal to the user specified end time. At the point in the routine just after the if statement, the query has been formulated but has not been submitted to the database server. Next the local object ret is declared to be of the type List<GridObject>, and will have the format of a list of grid objects. Next the object rows is declared as having the type List<DbRow>, which sets the object rows to have the format of a list of database rows. The object rows is assigned the results of the method db.findAll, which is a method that searches the database based on the query, "query" (which is the query formulated in the prior steps of the above procedure). The method db.findAll binds (e.g., links) the calculated circle (from makeCircleAsPoly( ) and the eventstamp.time (twice) to the 3 parameter placeholders ("?") in a logical expression in the query, which are the location, the start time, and the end time. The method db.findAll calls the makeCircleAsPoly method, which sets up a polygon that approximates the circle having a radius of the value "distance," centered at the latitude of eventstamp.latitude and the longitude of eventstamp.longitude (e.g., the polygon may circumscribe the circle or the circle may circumscribe the polygon). The shape of the polygon may be determined by the type parameter of the location structure of the JSON for the grid object. The user input for the floor, start time, and end time in the SELECT statement, are specified by eventstamp.floor and eventstamp.time, respectively. The object rows will contain all database rows corresponding to database objects within the polygon, that meet the conditions of the SELECT statement. Next, to transfer the rows found to the local object ret, an integer "a" is declared, and a for-loop is implemented where a is the index integer, and "a" is initiated with a value of 0, and is incremented until a is equal to rows.count. The value of row.count is obtained by a count of the row in the object rows. For each of the values of "a," the row (retrieved from the database db by the above query) rows[a] is placed into the format specified by GridObject and added to the local object ret. After iterating though all the values of "a" of the for-loop, ret is returned, as a list of the grid objects found by the query formulated, that are within the polygon specified in the format specified by GridObject.

Method of Automatically Taking an Event Stamp

FIG. 25 is a flowchart of a method for detecting when to automatically collect event stamp information and optionally create an event stamp.

In step 2502, information related to an orientation, position, and/or motion of a mobile device system (e.g., smartphone 2200 and/or wearable device 2300) is detected by a detector. In an embodiment, the mobile device system is a wearable device, such as watch. In an embodiment, the mobile device system is a smartphone. In an embodiment the mobile device system includes wearable device 2402 and smartphone 2404.

In optional step 2504, position, orientation, and/or motion of the user is determined by the motion detector 2252, motion detector 2352, orientation detector 2254, and/or orientation detector 2354. The motion of the user maybe detected and/or inferred based on motion of the mobile device system. For example, the camera on the mobile device system may detect the position of the user's head, and/or other body parts echo location may be used to image the user's position. In an embodiment, further including detecting by a detector of an orientation of the user's head. In an embodiment, the method further including detecting by a detector that a display (e.g., of output system 2207 or 2308) of the mobile device system is facing the user.

In an embodiment, the information related to the orientation of a mobile device system may include at least information related to orientating the mobile device system to face towards the user. In an embodiment, the mobile device system being a wearable device that is worn on a wrist of the information related to the orientation of a mobile device system including at least information related to turning a wrist of the user. In an embodiment, the information related to the orientation of a mobile device system may further include at least information related to bending an arm having wrist towards the user in combination with turning the wrist. In an embodiment, the mobile device system includes a camera, and the information related to the orientation of a mobile device system includes at least information related to lifting the mobile device system so as to be oriented parallel to the user's face or the ground. In an embodiment, the information related to the orientation of a mobile device system includes at least information related to a placement of the mobile device system at a height of the head. In an embodiment, the method also includes detecting by a detector that a viewer of the mobile device system is facing the user and a camera lens of the mobile device system facing away from the user. Step 2504 may be performed in addition to and/or instead of step 2502.

In step 2506, a determination is made, by the mobile device system, whether the orientation, position, and/or motion information detected (in step 2502 and/or 2504), corresponds to a predetermined orientation for collecting event stamp information, the event stamp information may include a location. In an embodiment, the information related to the orientation of a mobile device system and may include at least information related to an indication that a change in orientation occurred.

In step 2508, in response to the determination of movements of the mobile device system and/or user, an orientation of the mobile device system and/or position of the user that indicates that an event stamp should be taken, an indication is presented to the user that the mobile device is beginning to collect the event stamp information. Step 2508 may include a visual display (e.g., via output system 2207 and/or 2308) and/or a vibrator vibrating (e.g., via vibrator 2212 or 2311).

In step 2510, the event stamp information is collected. Optionally, an indication of the progress made in collecting the event stamp information may be presented as the event stamp information is collected. The event stamp information may be collected automatically in response to detecting that the user has oriented the mobile device for collecting the event stamp information (e.g., by positioning the camera on the mobile device in position to taking a picture and/or to record an audio entry (e.g., by the user bending the user's arm and holding the wearable device near the user's mouth for recording a message), for example. As part of step 2510, an indication (e.g., a display) is presented to the user indicating that the collection of event stamp information is ongoing. Optionally, a recording may be played explaining what is happening and/or music (or other noises) may be played. Optionally, step 2510 may include sending information to a server to perform a search for more information related to the event information collected by the mobile device, which may be received by the mobile device and added to the event stamp information.

In step 2512, an indication (e.g., a display) is presented to the user indicating that the collection of event stamp information is complete. Optionally, a distinctive audio sound, such as beep and/or verbal explanation may be sounded indicating that the event stamp information has been collected.

In step 2514, the event stamp information is automatically stored in the nonvolatile memory, which the user may reference later.

In optional step 2516, the event information is sent to a server and a search is automatically launched for event information.

In optional step 2518, after the server searches for information associated with the event information the mobile device receives the results of the search.

In optional step 2520, a determination is made whether a picture has been taken or a recording was made in association with collecting the event stamp, and if a picture was taken or recording was made in association with creating the event stamp, automatically adding the event stamp information to picture or recording Optionally, the picture and/or recording may be automatically taken as part of step 2510, as part of collecting the event stamp information.

Online maps may only provide limited information. Also this specification recognizes that it is desirable to allow users to add to content to a proximity grid, so that more information and more personalized information may be provided about locations.

One may have certain groups of people with whom one desires to share certain types of information frequently. Continually, preparing and sending e-mails may be tedious and the people receiving the e-mails may lose track of location-based information and may find it difficult to look up the relevant locations associated with the information. Further sending e-mails and text messages while traveling to keep one another informed of each other's locations can introduce additional difficulties. One may have a desire to post location information and associate the location information with a particular items or place. However, it is desirable to keep the effort required for creating the location information to a minimum.

Making information about a location easily accessible to a user may at times be difficult. At times a use may see an item or location and not know that there is more information about the item or location available online.

By bookmarking a webpage, the machine of the user determines one or more locations to store a link to the webpage where the user may easily find the link, to thereby facilitate returning to the website relatively easily without the need to remember the URL or the search that the user performed to find the webpage. However, the relationship established with the webpage is just one-way in that bookmarking the webpage does not result in the owner of the webpage having any communications or knowledge about the one that bookmarked the webpage. The owner of the webpage likely will not even know that the webpage has been bookmarked.

Bookmark Buddies (22-14)

In an embodiment a user creates of a bookmark of a location on a proximity grid. The bookmark may be associated with a cinemap and/or proximity card (which may be referred to as a geo card). Optionally, the user may share the bookmark with another user. Optionally, as a result of the sharing of the bookmark, the other user automatically receives updates to the bookmark.

COMMUNITY GRID CARD (22-15)

One may be provided with tools for creating a grid card (which may also be referred to as a proximity card). The grid card may include posts from multiple people so that the grid card is a community grid card where multiple people can post information, thereby creating a virtual billboard. One may have a physical billboard associated with a corresponding virtual billboard. The comqu grid card may have rules, such as how long a post remains present. There may also be a database of old posts so that even after the post is removed from the physical and virtual billboards a grid card having the old posts can still be found as a convenience for someone interested in a post that is no longer present.

GRIDCARD TEMPLATES (22-17)

It may be desirable to post different type of location information on a grid card depending on the type of location that is being posted. To simplify the creation of the grid card, templates are provided that correspond to different types of locations and/or grid card that one may want to create. The user selects a template, and according to the template selected different information is automatically collected and fields are automatically filled with the information collected. The user may then edit the information that was automatically collected to tailor the gird card for the desired purpose.

(22-19)

A sign is provided that indicates that more information is available about a particular product or location in a proximity grid. There is an association stored in a server that store a proximity grid. which associates the on- the-grid sign with a grid card representing the location or item. When a user sees an on-the-grid sign, the user merely needs to activate an event stamp function (e.g., by pushing a virtual or physical button). As part of the event stamp function the location of the user is sent to the server and grid cards associated with nearby locations are presented to the user. Then, based on the location of the user, a grid card appears having information about the item or location having the phvsical sign (however the grid card associated with the physical sign may appear in combination with other grid cards associated with other nearby locations.

22-22

A function on a user device may be activated, and in response, the user device automatically collects location information. The user device also automatically sends, from the user device to a server, a request. The request includes at least the location information indicative of a location of the user device that sent the request and an indication to create a grid card. A copy of the page showing the grid card located on a map and a pin (or other icon or visual representation) associating the grid card with the location is received at the user device from the server. In an embodiment an event stamp function is provided that records multiple pieces of information such as the time of day the date and the location which may be used for creating the grid card. In an embodiment the location is identified via GPS coordinates.

The grid card may have different widgets that contain card certain types of information. For example, the grid card may include a widget for a text box, a street view, a web address, and an image. A user may be sent a pages including tools for adding the widget to the grid card.

In this specification, the terms grid stamp and event stamp are used interchangeably. Throughout this specification, terms gird card, grid stamp, and event stamp and grid stamp are may be substituted one for the other to obtain different embodiments. In an embodiment when performing a search in addition to returning the event information that has the closest correspondence to the event stamp information about other events that have some partially corresponding information is also returned.

In an embodiment, activating the event function automatically launches an immediate search for the type of information sought. In an embodiment, the event stamp button includes a cylindrical component that rotates, and rotating the cylindrical component causes a scrolling through the search results found. In an embodiment, the user can configure different modes of operation, such as whether the event function causes just the storage information for later use, launches an immediate search, or immediately causes a purchase of a product. In an embodiment, the event function has different modes (and optionally multiple mode buttons that invoke the different modes) in which in each of these modes different types of information are sought.

In an embodiment, the event stamp information may be used for determining which bus, plane, train, or other mode of transportation passed a certain location. In an embodiment, the activating the event stamp function causes a comparison of a radio waves received to sound received or a comparison sounds or clips from a song or other broadcast received and stored to sounds and/or image stored in a database to identify the broadcast of interest. In an embodiment, the event stamp information may be used for determining the location of a particular vendor and initiating a transaction, such as locating the nearest available taxi and ordering a taxi pickup. In an embodiment, the event stamp information may be used to immediately locate a restaurant or other vendor that is nearby, view the menu and the restaurant owner may return special offers possibly dependent upon the user visiting the restaurant within a certain time frame. In an embodiment the event stamp information may be used to immediately locate a barber, hairstylist, dentist, doctor, or other shop that is nearby and schedule an appointment.

In an embodiment, the event stamp information may be used for establishing a journal of times and locations visited. In an embodiment, the event stamp may allow entry of a verbal annotation. In an embodiment, the event stamp may include a picture, and optionally the event stamp function may activate a camera (e.g., on a mobile phone).

22-23

In an embodiment, a user bookmarks a grid card. In response to bookmarking the grid card the user may be asked if the user would like to receive updates to the grid card. Since the grid cards is associated with a physical location and since the user receives communication from the grid card owner and can send communications to the gird card owner, via the grid card, consequently, as a result of bookmarking the grid card the user effectively, a two-way ongoing relationship with the entity associated with the location is established. Upon bookmarking the grid card, the user effectively asks to have a relationship with the owner of the grid card, and so the owner of the grid card knows, or can expect. that the information that the owner of the grid card sends is wanted by the user receiving the information.

In an embodiment, as a result of bookmarking a grid card, where appropriate the user ma also be asked if the user would like to receive promotional offers from an organization associated with the location associated with the grid card and may be asked if the user would like to join a group of other users that have bookmarked the grid card. As part of being entered into the group, the user is provided with contact information, such as an e-mail address, an address on a proximity grid, and/or an address on a social network, via which the members of the group may contact one another and/or share posts that relate to the location associated with the grid card.

22-24

When a user reguests directions, via a grid card. the user is provided the option to establish a sharing of the user's location with a person (or other entity) associated with a location that the user is attempting to find. As a result, if the user selects the option to share the user's location with entity associated with the location, both the user and the entity at the location are automatically sent one or more updates of the user's location (and progress in traveling to the locations). Optionally. the user is also provided with the location of the entity at the location (so that if the location is large and if the entity is person, for example, the user knows where at the location to go to meet the person).

Optionally, the only update is an alert shortly just before the user is about to arrive or is close by. Optionally, the user has a choice to select whether the entitv at the location receives multiple updates and/or whether the entitv is allowed to view the user's current location whenever the enti desires e. . until the user arrives. Optionally the user may select a period of time during which the user's location may be viewed by the entity at the location.

LOCATION SHARING (22-13)

A user may be rovided with tools for creating a proximity card (e.g., which may include a cinemap) and sharing the grid card with others. Optionally, two users may mutually share proximity cards of one another to aid in finding one another. The proximity cards being shared may be automatically updated as the location changes for each of the users having a proximity card that is being shared. When one user comes within a preset proximity of another user's proximity card that is being shared an alert may be outputted by the user's system thereby informing the user that the user has arrived at the location associated with the other user's proximity card (which may be the location of the other user).

A graphical interface may include a button, which when pressed, captures a location (e.g., the Global Positions System (GPS) coordinates), marks the location on an electronic map, which may be associated with a proximity grid, and then includes a text field in which the user can add comments and/or a photo. Then the user can send a grid card showing the location having a photo and/or comments marking the location. The shared location may include sending a link to a cinemap, which may be automatically created or which the user may create prior to sending the location.

MUTUAL SHARING OF LOCATIONS (22-13)

When a user is close to a particular grid card, and the user has indicated that the user is looking for the location associated with that grid card, the user may receive an alert (e.g., the phone may vibrate and/or the card or information from the grid card may appear on the screen of the user).

One user may share a location with other users and include a request that one or more of the other users share their location with that user. The mutual sharing may be set up to last for a fixed period of time, until the users have located one another, or reach a certain destination (e.g., a meeting place). The system may indicate directions of travel on the balloons representing the people mutually sharing their locations with one another. Each user may be presented with map showing markers (e.g., balloons)—one for each user whose location is being shared, and optionally a marker for an agreed upon destination.

The grid cards created may be kept personal and only available on the proximity grid to the creator and/or those users that the creator of the cards designate.

A data container may be associated with the cinemap created (e.g., a balloon), which may include several pictures.

The cards created on the proximity grid may have two sides. On one side there may be a photo and some basic information, such as the date, time, and name of location, while the other side may include further information. the Geo cards (which may be referred to as proximity cards) may scrape information about current the current locations from various sources, such as Wikipedia, personal information stored in the system (e.g., phone number, e-mail address, name) listings of business, and public places, and automatically add the information to the GeoCard (or proximity card), by default, and then give the user an option to accept and/or remove the information, in addition to providing fields for the user to add further information and/or comments.

In an embodiment, the system has an option for viewing photos prior to selecting the photos for adding the photos to a proximity/Geo card. In an embodiment, the photos are labeled with an indication as to whether the system has a location associated with the photo (so that the user knows whether the photo may be uploaded to the system immediately or whether the user needs to associate a location with the photo). Additionally, a filter may be provided for viewing only the photos that have been associated with a location.

SCREENSHOTS RELATED TO SHARING LOCATIONS (22-13) (FIGS. 26-32)

Regarding FIGS. 26-32, a graphical interface may include a button, which when pressed, captures a location (e.g., the Global Positions System (GPS) coordinates), marks the location on an electronic map, which may be associated with a proximity grid, and then includes a text field in which the user can add comments and/or a photo. Then the user can send a grid card showing the location having a photo and/or comments marking the location. The shared location may include sending a link to a cinemap, which may be automatically created or which the user may create prior to sending the location.

Figure 26:
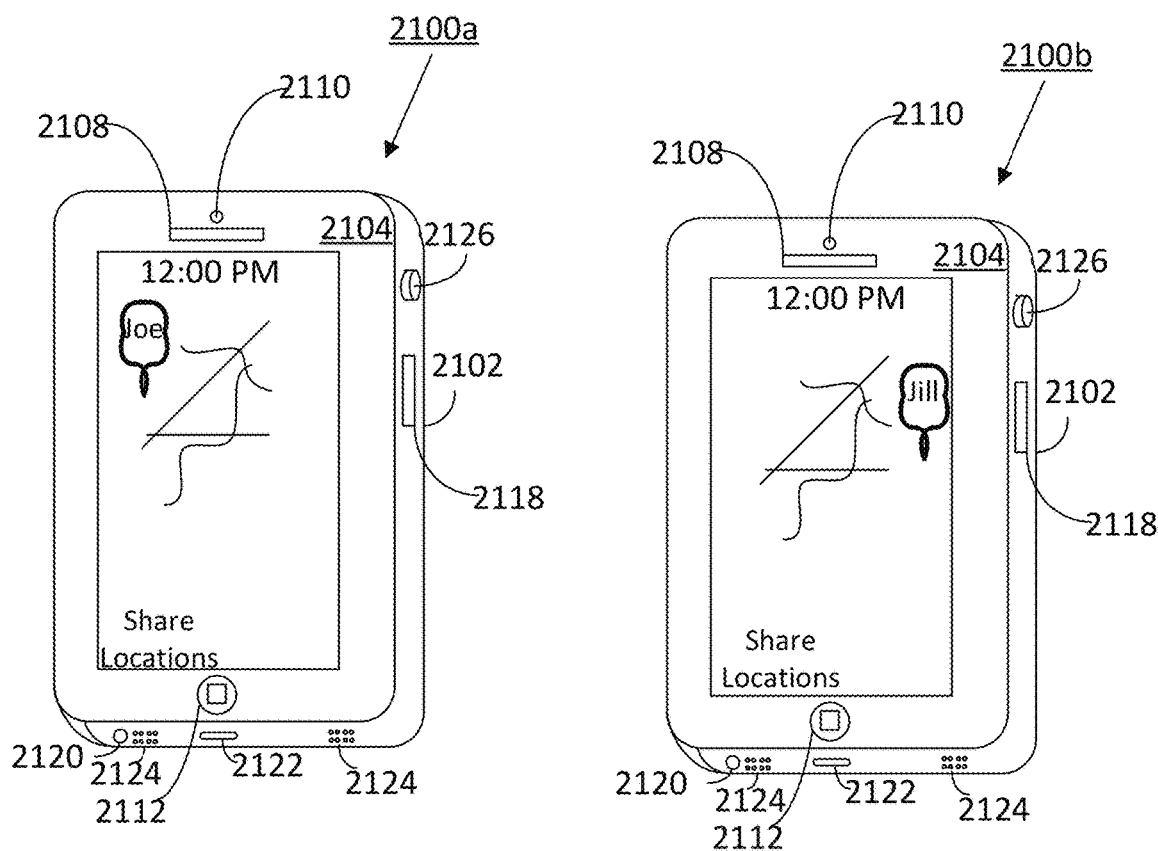
FIG. 26 shows an example of the user screens of two different users that have each marked their own location.

FIG. 26 shows an example of the user screens of two different users that have each marked their own location. For example, the user of smart phone 2100a may be Joe and the user of smart phone 2100b may be Jill. Each user has set up their smart phone to indicate their current location, by creating a grid stamp that is updated the user associated with that grid stamp moves, Each user has a link for sharing their location other others.

Figure 27:
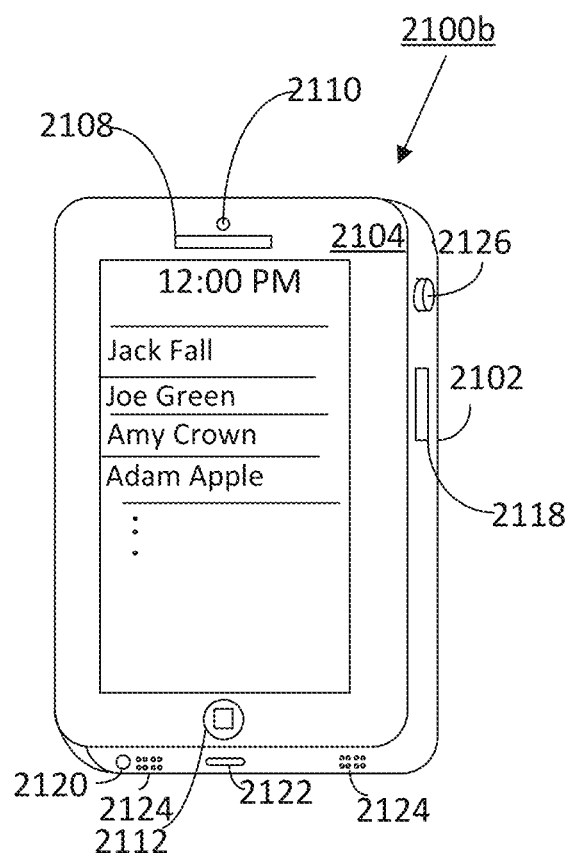
FIG. 27 shows an example of a first of the two users of FIG. 26 choosing to share their location with a second of the two users of FIG. 26.

FIG. 27 shows an example of a first of the two users of FIG. 26 choosing to share their location with a second of the two users of FIG. 26. In FIG. 27, Jill has decided to share her location with Joe. Accordingly Jill selected or otherwise activated the share location link. As a result, a list of Jill's contacts is presented to Jill, so that Jill can choose the user to share her location With.

Figure 28:
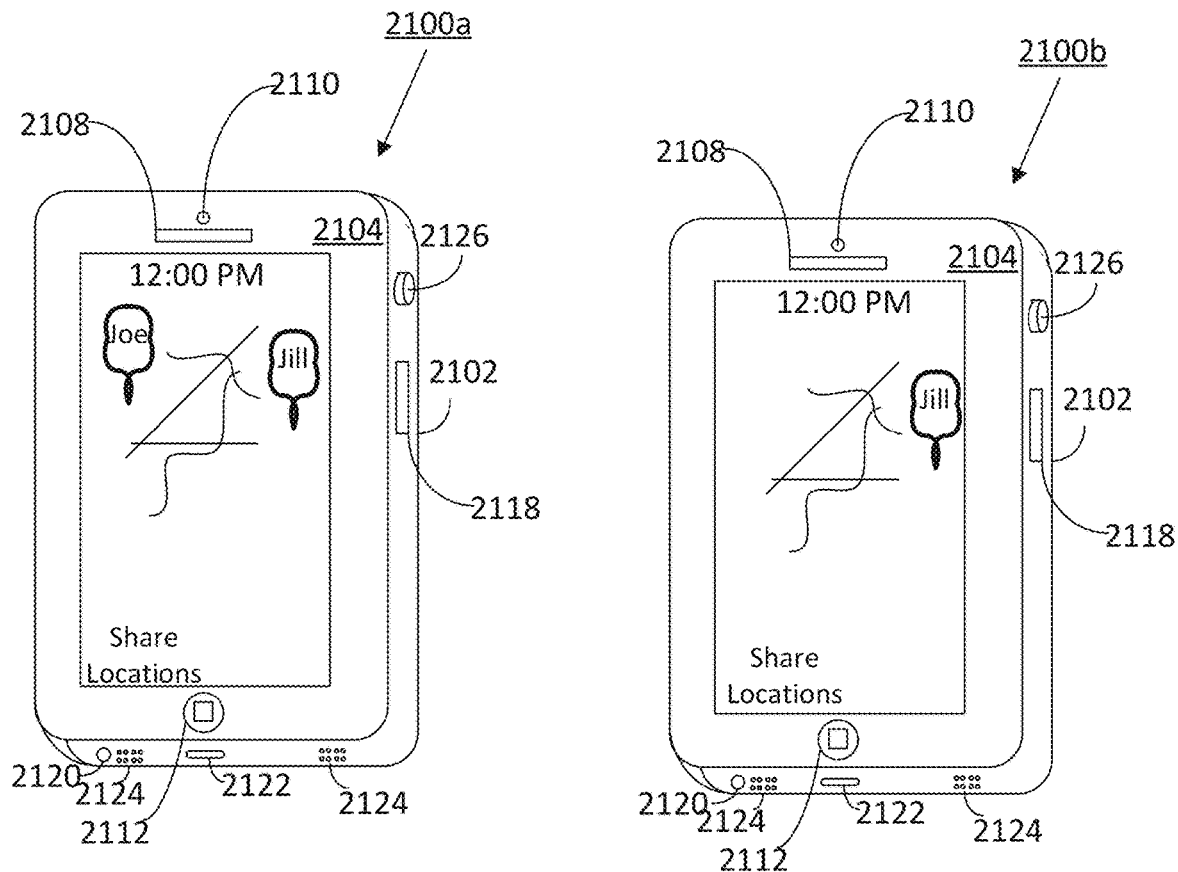
FIG. 28 shows an example of the two users screens of FIG. 26 after the first user has shared their location with the second user.

FIG. 28 shows an example of the two users' screens of FIG. 26 after the first user has shared their location with the second user. For example, Jill has chosen to share her location with Joe, and consequently, a grid stamp indicating Jill's location is located on Joe's screen. Optionally Joe has set the settings in Joe's applications so that a notification is sent when Joe is near a location associated with a grid stamp of interest, such as a shared location of another user. For example, Joe may select Jill's grid stamp and then select an option to notify Joe when Jill is nearby. Alternatively, Joe may have set a default setting that causes Joe to be notified when near a location associated with a user that shared their grid stamp.

Figure 29:
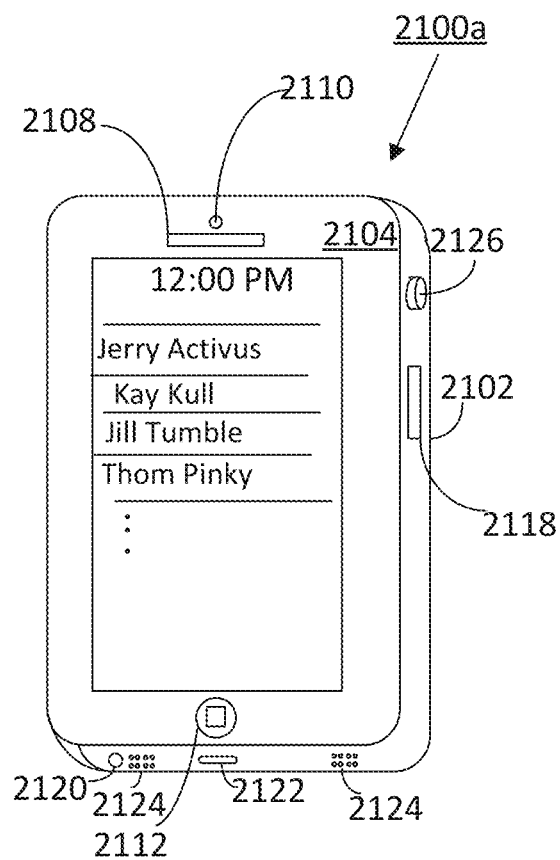
FIG. 29 shows an example of the second user of FIG. 26 choosing to share their location with the first user.

FIG. 29 shows an example of the second user of FIG. 26 choosing to share their location with the first user. In FIG. 29, Joe has decided to share his location with Joe. Accordingly, Joe selected or otherwise activated the share location link. As a result, a list of Joe's contacts is presented to Joe, so that Joe may choose a user to share his location with.

Figure 30:
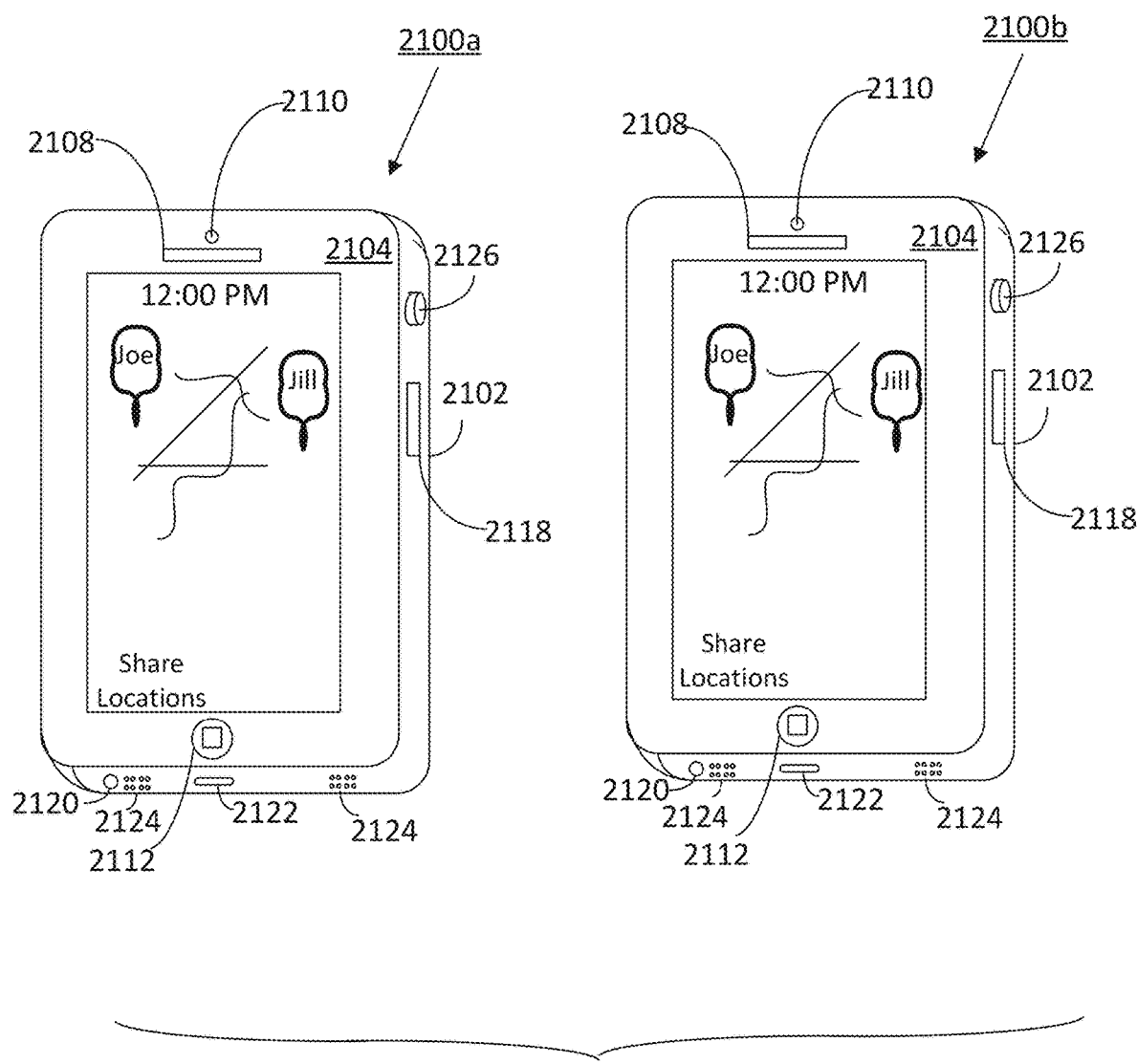
FIG. 30 shows an example of the user screens of the users of FIG. 26 after both users have shared their locations with each other.

FIG. 30 shows an example of the user screens of the users of FIG. 26 after both users have shared their locations with each other. After both Joe and Jill have decided to share each other's location with each other both of their user screens show the each other's grid stamp. Optionally, Jill has set the settings in Jill's applications so that a notification is sent when Jill is near a location associated with a grid stamp of interest such as a shared location of another user. For example, Jill may select Joe's grid stamp and then select an option to notify Jill when Joe is nearby. Alternatively, Joe may have sent a default setting that causes Jill to be notified when near a location associated with a user that shared their grid stamp.

Figure 31:
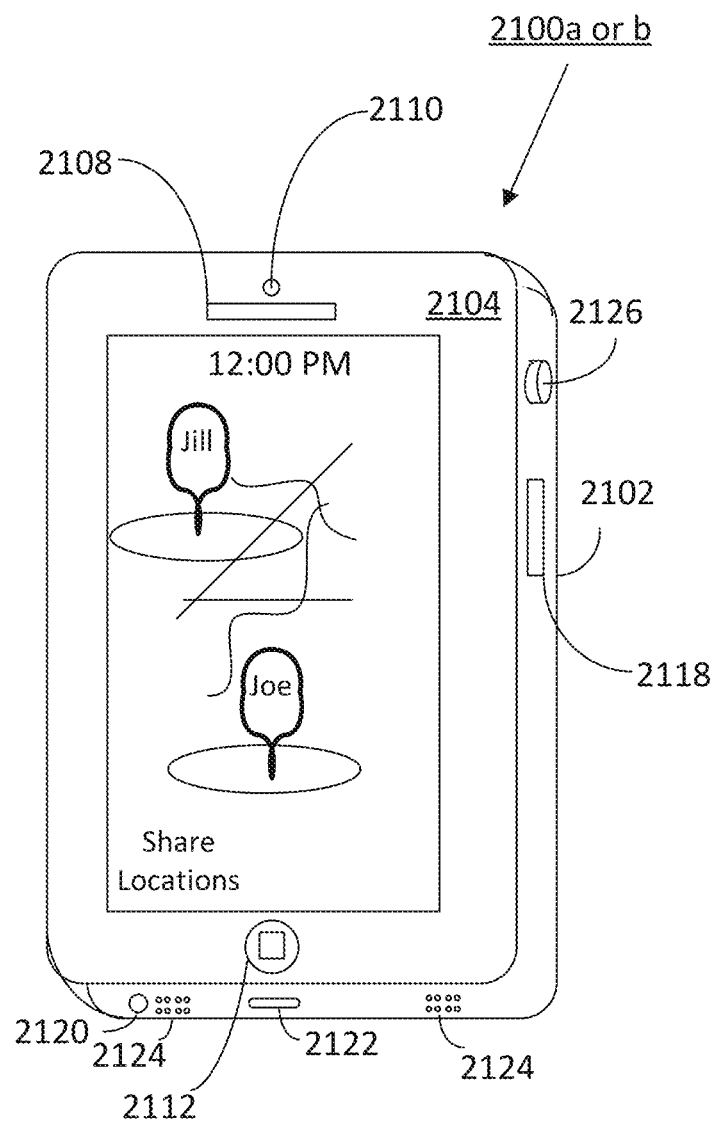
FIG. 31 shows another example of the user screens of the users of FIG. 26 after both users have shared their locations with each other and each of the users has changed their respective locations.

FIG. 31 shows another example of the user screens of the users of FIG. 26 after both users have shared their locations with each other and each of the users has changed their respective locations form that of FIG. 30. In FIG. 31, both Joe and Jill have moved their locations and as a consequence the locations of their grid stamps have moved.

Figure 32:
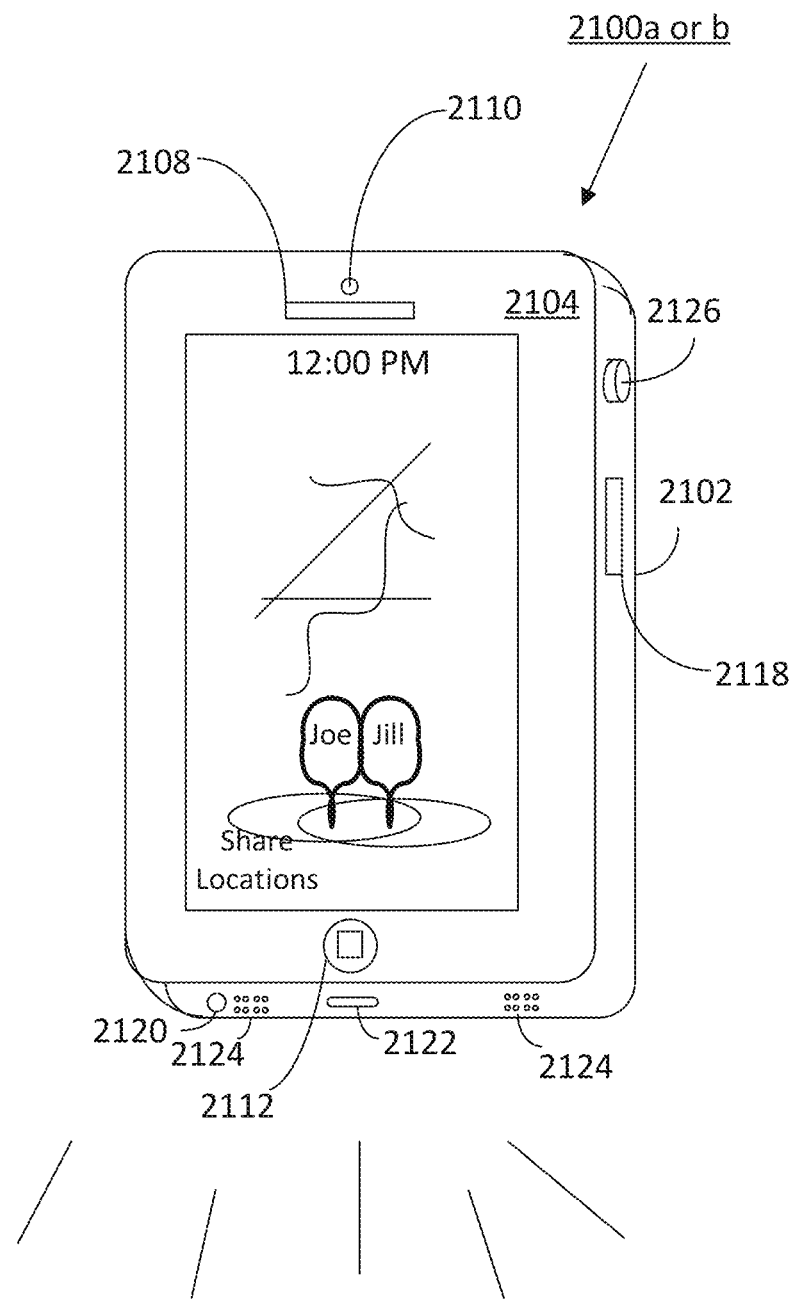
FIG. 32 shows another example of the user screens of the users of FIG. 26 after both users have shared their locations with each other and each of the users has changed their respective locations, but are now near each other.

FIG. 32 shows another example of the user screens of the users of FIG. 26 after both users have shared their locations with each other and each of the users has changed their respective locations, but are now near each other. In FIG. 32 since both Jill and Joe are within a certain predetermined proximity of one another, an alert is sent notifving the user (Jill or Joe) that Jill and Joe are near each other.

Bookmarks

In an embodiment, a bookmark of a location associated with a proximity grid is created. The bookmark may be associated with a card that is associated with the location and with the proximity grid. In an embodiment, a first machine associated with a first user, may designate a second user with whom to share the bookmark. In a further embodiment, the first machine may update the bookmark, and as a result of the desigpating the second user for sharing the bookmark and as a result of updating the bookmark, the first machine automatically sends the updates of the bookmark, to a second machine associated with the second user.

Tools are provided for a user to create a community grid card. The community grid card is located on a proximity grid at a location associated with a billboard having the same or similar information.

Signs are provided that indicate that an item associated with a location or location is on the grid. Optionally, a server stores an association between the physical sign and the location or item. Upon activation of an event stamp function the user is presented with a grid card that stores information associated with the location or item having the on-the-grid card.

Tools are provided to users for creating a video about a location and add the video to the proximity grid, so that the proximity grid may be easily populated with user content. The user searches for a particular location or object at location (e.g., a building or a monument). The system image information about the location and a way of creating different views of the object. The user captures multiple images of the object of interest using the tools. An app on the user's device or a server or other machine of the system automatically creates a video based on the images captured. The video is stored in searchable database associated with a proximity grid, in association with the object and the location of the object. Optionally an already existing searchable database storing image information about locations is used to initially populate the proximity grid prior to user's adding content.

A function on a user device is activated, and in response, the user device automatically collects location information. The user device also automatically sends, from the user device to a server, a request. The request includes at least the location information indicative of a location of the user device that sent the request and an indication to create a grid card. A copy of the page showing the grid card located on a map and a pin associating the grid card with the location is received at the user device from the server.

MUTUAL SHARING OF LOCATIONS

When a user is close to a particular grid card, and the user has indicated that the user is looking for the location associated with that grid card, the user may receive an alert (e.g., the phone may vibrate and/or the card or information from the grid card may appear on the screen of the user).

One user may share a location with other users and include a request that one or more of the other users share their location with that user. The mutual sharing may be set up to last for a fixed period of time. until the users have located one another, or reach a certain destination (e.g., a meeting place). The system may indicate directions of travel on the balloons representing the people mutually sharing their locations with one another. Each user may be presented with map showing markers (e.g., balloons)—one for each user whose location is being shared, and optionally a marker for an agreed upon destination.

The grid cards created may be kept personal and only available on the proximity grid to the creator and/or those users that the creator of the cards designate.

A data container may be associated with the cinemap created (e.g., a balloon), which may include several pictures.

The cards created on the proximity grid may have two sides. On one side there may be a photo and some basic information, such as the date, time, and name of location, while the other side may include further information. the Geo cards (which may be referred to as proximity cards) may scrape information about current the current locations from various sources, such as Wikipedia, personal information stored in the system (e.g., phone number, e-mail address, name) listings of business, and public places, and automatically add the information to the GeoCard (or proximity card), by default, and then give the user an option to accept and/or remove the information, in addition to providing fields for the user to add further information and/or comments.

In an embodiment, the system has an option for viewing photos prior to selecting the photos for adding the photos to a proximity/Geo card. In an embodiment, the photos are labeled with an indication as to whether the system has a location associated with the photo (so that the user knows whether the photo may be uploaded to the system immediately or whether the user needs to associate a location with the photo). Additionally, a filter may be provided for viewing only the photos that have been associated with a location.

Bookmark Buddies 22-14(FIGS. 33-37B) Bookmarks

In an embodiment, a bookmark of a location associated with a proximity grid is created. The bookmark may be associated with a card that is associated with the location and with the proximity grid. In an embodiment, a first machine, associated with a first user, may designate a second user with whom to share the bookmark. In a further embodiment, the first machine may update the bookmark, and as a result of the desigpating the second user for sharing the bookmark and as a result of updating the bookmark, the first machine automatically sends the updates of the bookmark, to a second machine associated with the second user.

The user can set up a bookmark of locations, which are stored in a folder or otherwise categorized as bookmarks. The bookmarks can be created by just pressing a physical or virtual button, based on information readily available, such as the dated, time GPS coordinates street address landmarks and name of establishment and what the establishment does. The system may gather the lowest level details about the location and/or other landmarks that may be of interest, the information that seems like it is likely to be of interest (e.g., regarding the name of the location—Niagra falls). As part of the information gathering process, the user may be prompted or otherwise offered the option to take a picture. Alternatively upon selecting the button a picture is taken. Additionally, pattern matching software automatically identifies the object photographed (e.g., a blue couch). The user may also be given an option to add a voice and/or text comment. When the user views the bookmark, the user may be presented with all the information gathered, and the user may uncheck and/or check fields associated with information supplied, so that the user can choose what information the user does or does not want associated with the bookmark. When the user is near one of the bookmarks, the user may receive an alert. The user can then go to the bookmarks look at the list of bookmarks and choose one to opep, or search the bookmarks using keyword searching, for example. Each bookmark may be associated with a cinemap of the location that was bookmarked. Each bookmark (and cinemap) may be associated with a proximity grid and optionally when the user having the bookmark is within a certain vicinity of the book the bookmark may appear with the user's list of bookmarked locations.

Bookmark Sharing

Another user may choose to share bookmarks with the user, and then any bookmark one user makes is sent to the bookmark folder of each user that is sharing each other's bookmarks. The sharing of the bookmarks may be set up so that by default when two user indicate that both want to share bookmarks, each user mutually shares each all of other's bookmarks. Alternatively, it may setup so that the one creating the bookmark chooses to who's bookmark folder the bookmark is sent, or other user (with the permission of the first user) may request to be automatically sent the other's bookmarks.

Sharing Bookmark Updates

After creating the bookmark, the user creating the bookmark of the one receiving the shared bookmark may request for updates to the bookmark. If updates are requested, the entity associated with the location of the bookmark or the one creating the bookmark may push updates to the those sharing the bookmarks. For example, the owner of a restaurant may create a bookmark for the restaurant, and then other's may choose to share the bookmark and receive updates. If that happens, then the user may receive updates, such special offers, the special of the day, changes in the menu, etc.

SCREENSHOT OF PAGE WITH AN ICON FOR CREATING A BOOKMARK

FIG. 33 shows an example of a page that one may see upon opening the application. The page includes a menu of items that may be selected by selecting one of the icons on the page. In the example the icons are arranged in a circle or by selecting on of the icons at the bottom or tope of the page. In this example, one of the icons in the circle as well as one of the icons at the bottom of the page may be selected to initiate viewing a bookmark, and another icon initiate creating a bookmark.

Figure 34A:
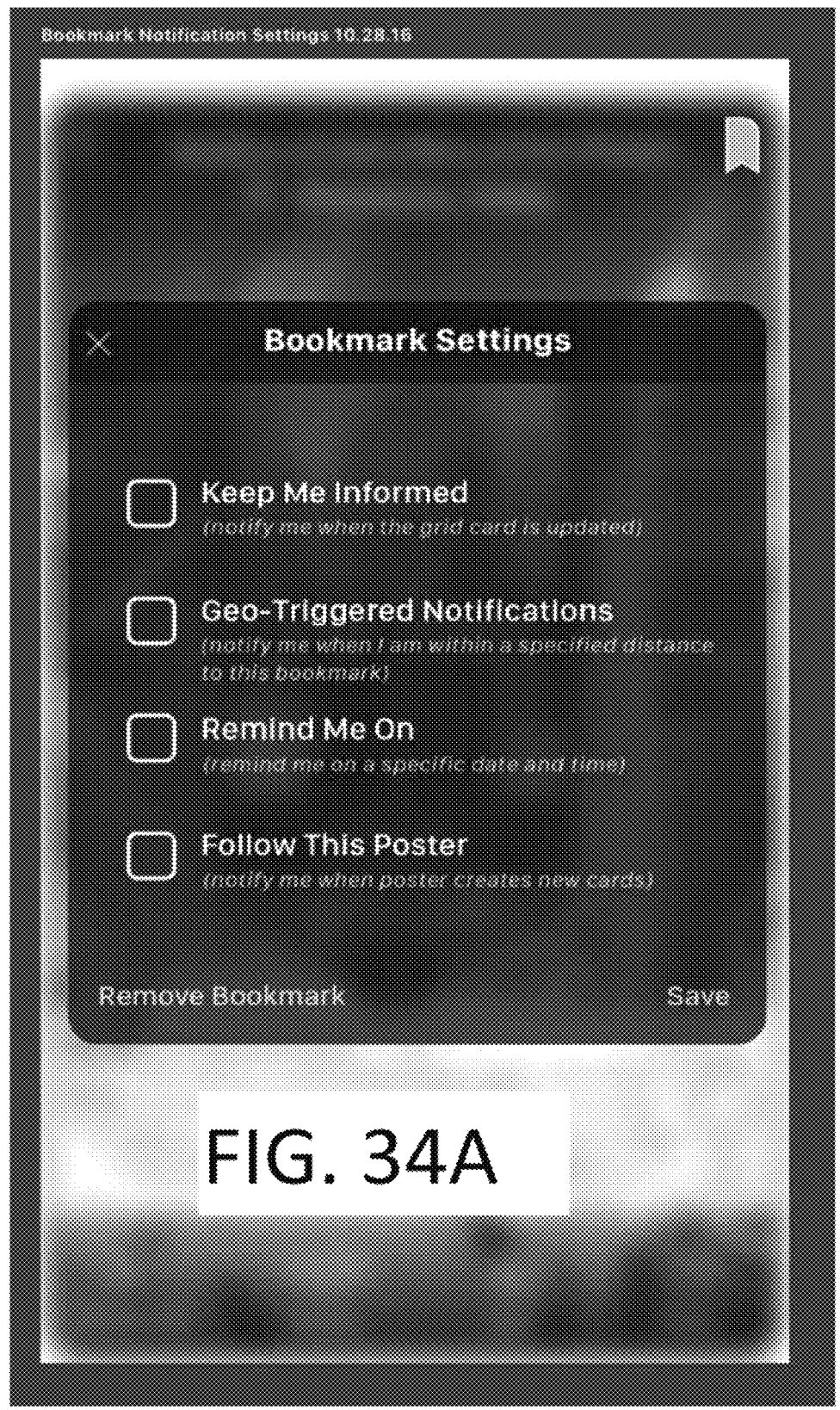
FIG. 34A shows an example of a page for choosing settings for a bookmark before any settings have been selected.

FIG. 34A shows an example of a page for choosing settings for a bookmark before any settings have been selected. In the embodiment of FIG. 34A, if one is bookmarking a grid card created by someone else, one may choose to receive notification about updates to the grid card that was book marked. One may choose to receive a notification when within a certain proximity of the location associated with the card that was bookmarked. One may choose to receive a reminder on a specific date that relates to the bookmarked grid card. On may choose to follow a poster. Alternatively, one may choose to remove a bookmark.

Figure 34B:
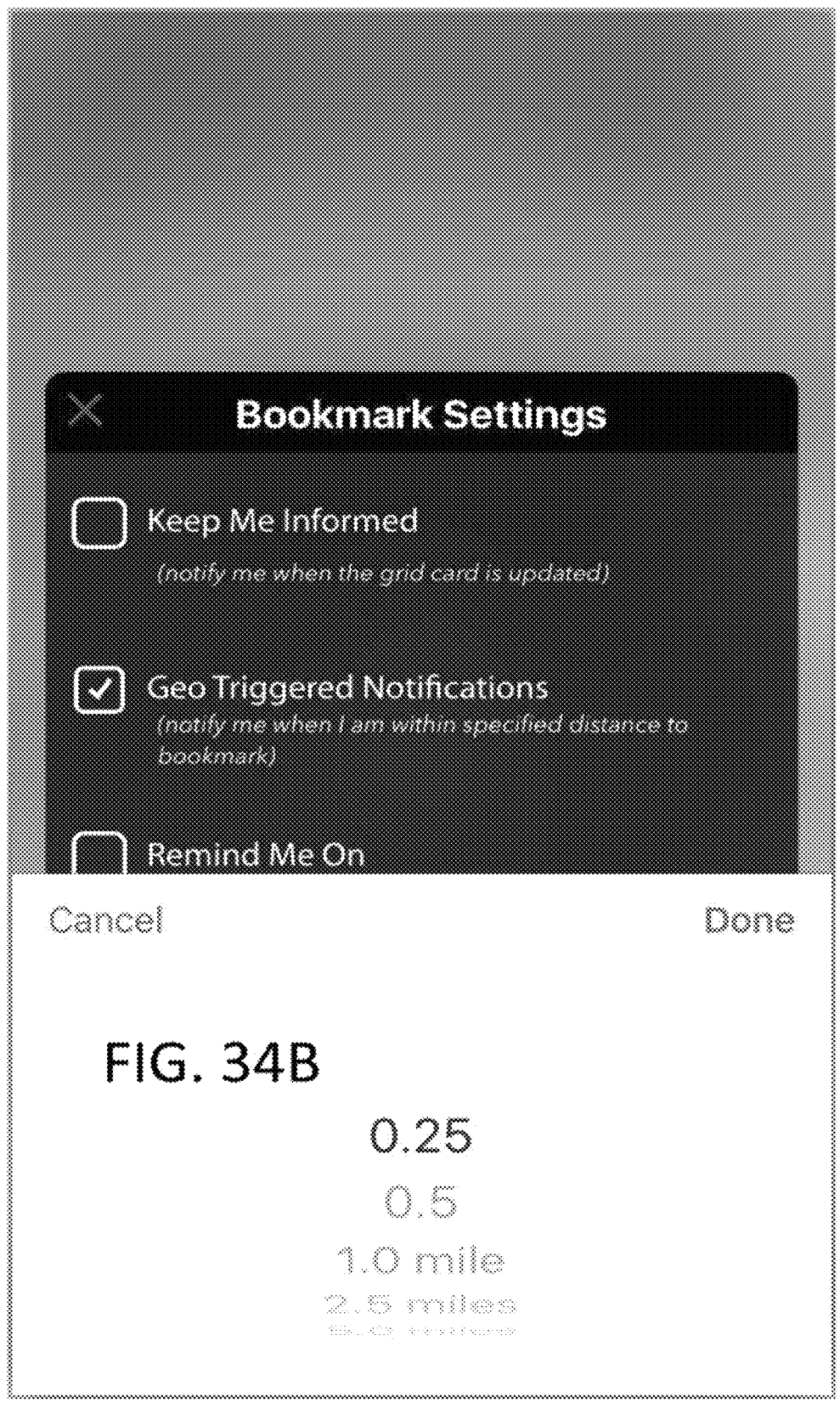
FIG. 34B shows an example of a page for choosing settings for a bookmark after one of the settings has been selected.

FIG. 34B shows an example of a page for choosing settings for a bookmark after one of the settings has been selected. In the example of FIG. 34B, the option for having a notification when the user is within a s certain proximim of the location associated with the bookmark. Below the menu of items to select appears a list of various distance that the user may select. After selected, when the user is within that distance selected of the location associated with the bookmark, a notification is sent to the user whenever the user is within that distance selected of the location associated with the bookmark. For example, if the user choses 25 miles, then when the user is within 25 miles of the location associated with the bookmark the user receives a notification (e.g., the user's smart phone may vibrate or buzz, and/or the user may receive a text notification.

Figure 35:
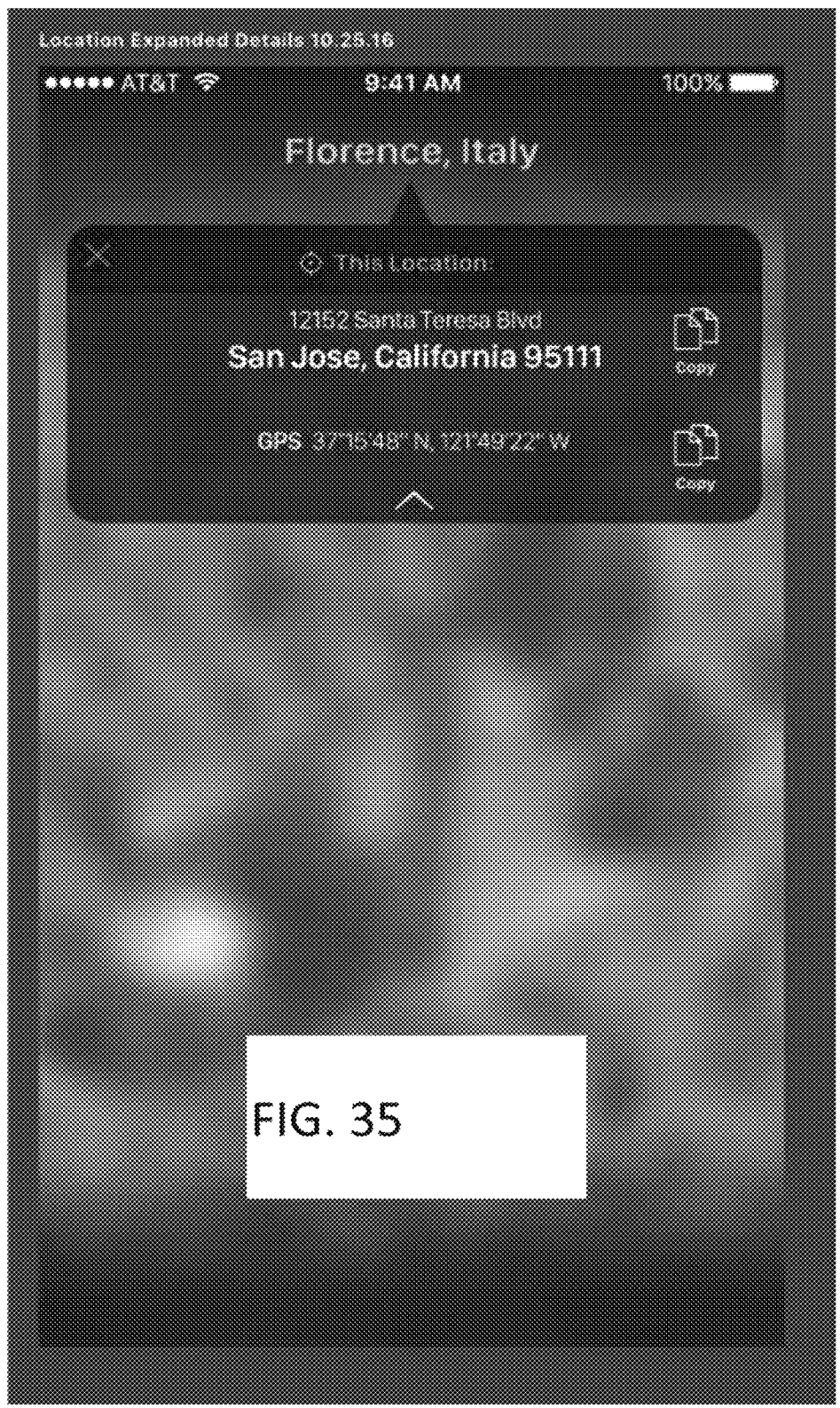
FIG. 35 shows an example of a page that presents information to the user regarding information collected for creating a bookmark.
Figure 37A:
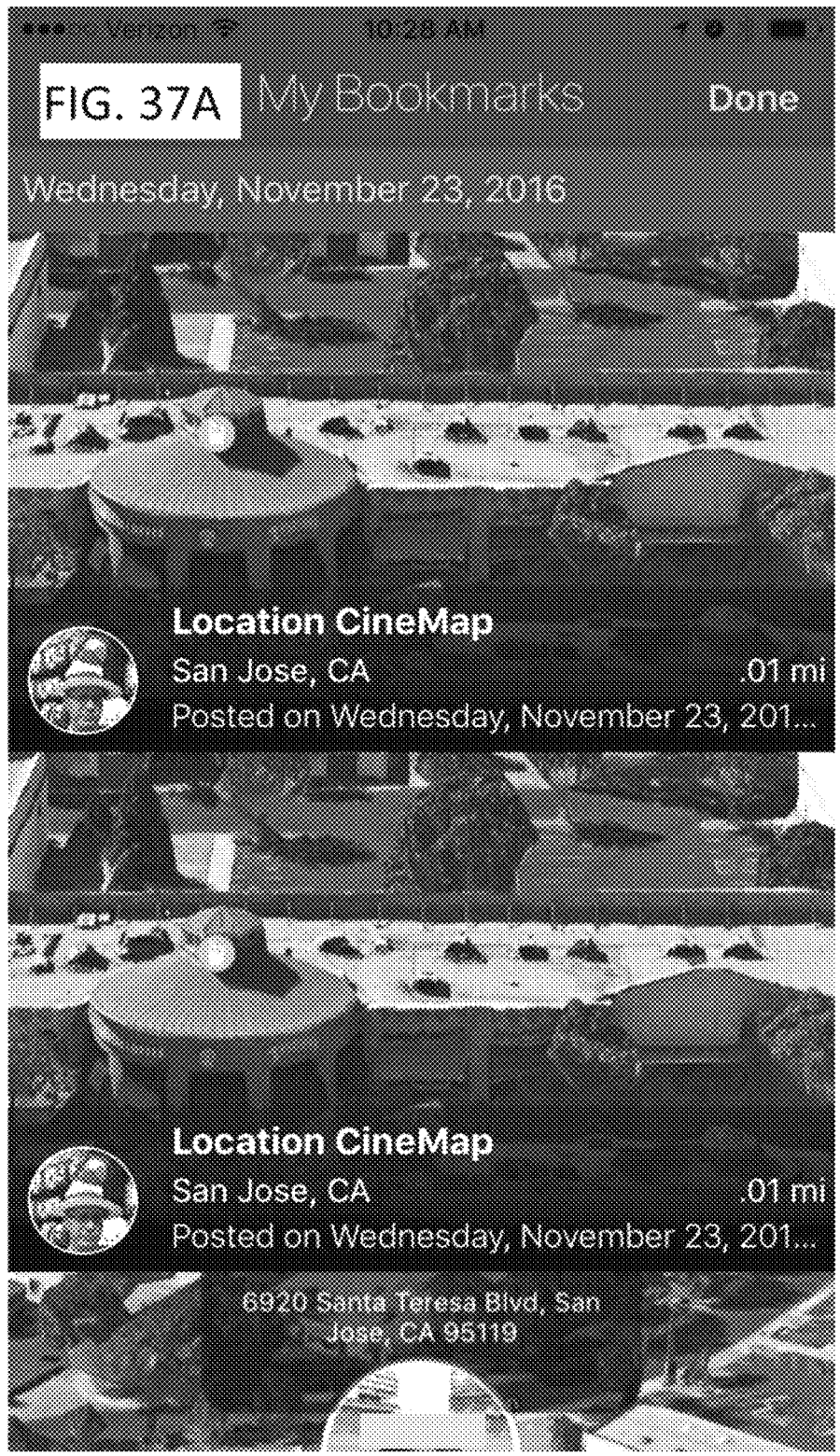
FIG. 37A shows another example of a list of bookmarks.
Figure 37B:
FIG. 37B shows an example of a screenshot of a page of the application having an icon at the bottom for initiating the creation of a bookmark.

FIG. 35 shows a page that presents information to the user regarding information collected for grid stamp, which may be part of creating a bookmark. FIG. 36 shows a page having a list of bookmarks created that the user can choose. The page also includes a list of grid cards created. FIG. 37A shows a list of bookmarks. At the bottom of the list of bookmarks is a link for exploring. FIG. 37B shows a screenshot of a page of the application having an icon at the bottom for initiating the creation of a bookmark. An icon or other selector may be present on many different pages of the application, which when activated causes the initiation of the creation of a bookmark.

Figure 38:
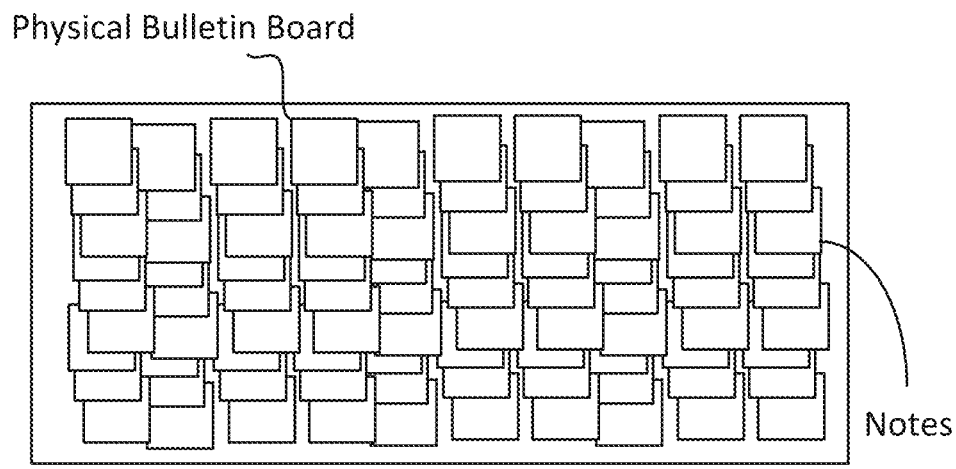
FIG. 38 shows a representation of a physical community note board.
Figure 39:
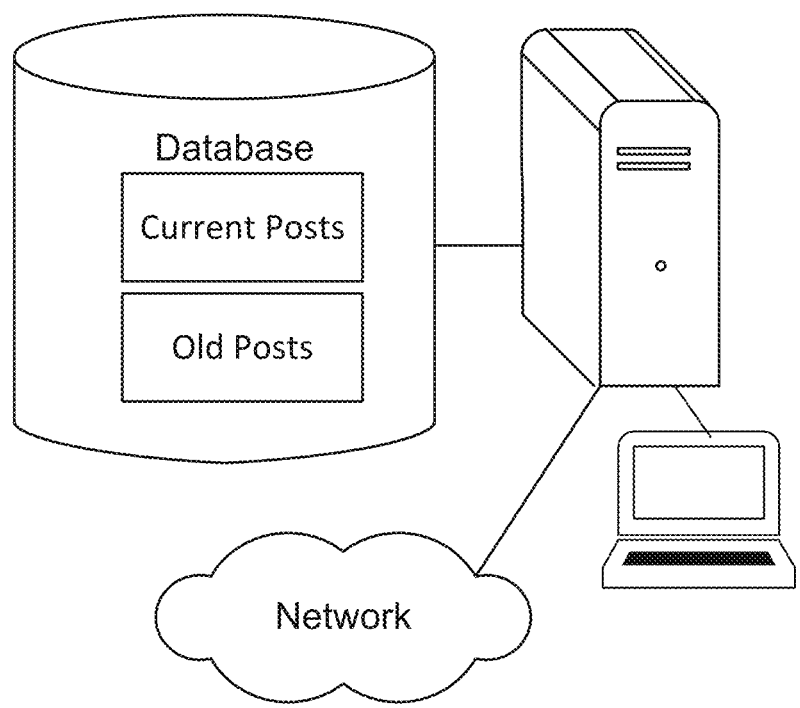
FIG. 39 shows a system in which may be used in conjunction with the community note boards of FIG. 38.

FIGS. 38 and 39
COMMUNITY GRIDCARDS (22-15)

Tools are rovided for a user to create a community grid card. The community grid card is located on a proximity grid at a location associated with a billboard having the same or similar information.

A user may be provided with tools for creating a grid card (which may also be referred to as a proximity card). The grid card may include posts from multiple people, so that the grid card is a community grid card where multiple people can post information, thereby creating a virtual billboard. One may have a physical billboard associated with a corresponding virtual billboard. The community grid card may have rules, such as how long a post remains present. There may also be a database of old posts, so that even after the post is removed from the phvsical and virtual billboards a grid card having the old posts can still be found, as a convenience for someone interested in a post that is no longer present. The system associated with the community grid card may include a database for storing current and part posts, an algorithm that deletes posts that are older than a predetermined amount of time, and user devices for accessing the system.

The tools provided to the user may include a graphical user interface. which may include a button that activates an event stamp function. The interface may include a field for indicating that the grid card created will be a community grid card. Once created, users viewing the community grid card may be presented with a button for posting information. Alternatively or additionally, after a user posts something on the physical billboard, an administrator may add the post to the community grid card. For example, the administrator (or user posting the post) may take a photo of the added post, and then the user device creates an event stamp that includes the post, which is sent to the server, and the server may automatically add the post to the community grid card. As a result of the administrator or user adding the post to the community grid card, the community grid card and the billboard mirror one another in terms of the information present.

Optionally, the physical billboard may be electronic and may automatically communicate with the community grid card, and the information of the community grid card and physical billboard are automatically kept synchronized, so that when a user enters information into the physical billboard the information is automatically sent to the community grid card and posted on the community grid card. Similarly, when a user enters information into the community grid card, the information is automatically sent to the physical billboard and posted on the physical billboard.

FIG. 38 shows a representation of a physical community note board. Users may post physical notes on the community note board of FIG. 38. The community note board of FIG. 38 may be located in a place that is accessible to the public, such inside of a store, inside a mall, inside a post office, inside a swimming pool, inside a gymnasium, inside a hotel, inside a lodge, and/or in the lobby of an office building, for example. Corresponding to each note placed on the communig note board may be a virtual note placed on a virtual note board, which is accessible to the public, via a network. Each virtual note is associated with a grid card.

In an embodiment, each time a virtual note is added to the system a grid card is created having the information that is in the virtual note. Online users that want to see the contents of the note board, may go to the URL of the virtual note board and select a note to view. In an embodiment, upon selecting, opening, or activating one of the virtual notes, the grid card of that virtual note is opened. This way, the user can view the information in the virtual note along with a graphical depiction of the location information associated with the note. In an embodiment, each time a user posts a note on the physical community note board, an operator of the system adds a virtual note to a virtual community note board. Alternatively, the user is offered to add a corresponding virtual note to the virtual note board online or via a network, such as the Internet.

In an alternative embodiment, the community note board may be an electronic note board and the notes may be electronic notes, so that as the notes are entered into the electronic note board, a note and grid card are also added to the virtual note board.

FIG. 39 shows a system in which may be used in conjunction with the community note boards of FIG. 37. The system of FIG. 39 includes a database that stores the virtual notes and the virtual communitv note board. The database may store the current notes and old notes that have been removed from the physical note board in different and/or distinct memory areas that differentiate between the current notes and the old notes, so that when one browses through the virtual notes, by default the user sees only the current notes. However, the old notes may still be searched and/or browsed through, should the user choose to do so, by activating one or more link that allows the searching and/or browsing of the old notes.

Additionally, the system of FIG. 39 includes a server, via which information that is stored in the database may be accessed. The server may serve pages and/or information about the virtual community note board and/or the virtual notes on the virtual community note board to clients that request to view information about the virtual community note board. Clients may be able to view the virtual community note board and/or the virtual notes of the virtual community note board, via the server. Although in FIG. 39, the database and the server are depicted as separate systems that communicate with one another in other embodiments the database may be part of the memory system of the server. The server of FIG. 39 may be accessed a terminal (also shown in FIG. 39). One may enter the information on the physical notes into the virtual community note board, via the terminal, which sends the information entered, via the server into the database. Optionally, after creating the virtual note, using the terminal, the note may be printed out and placed on the physical community note board. In an embodiment in which the physical note board is electronic, the entering the note into the terminal may place the note on the note board and in the virtual note of the database simultaneously. In an embodiment in which the physical note board is electronic, the phvsical note board may be the terminal via which the note is entered into the database, and one may enter information into the electronic community note board using a stylus, keyboard, mouse, or other input device. In an embodiment in which the physical note board is electronic, the commmunity note board, the database, and the server may all be one and the same device.

The network cloud of FIG. 39 represents a publicly accessible network, via which users may access the virtual network. The publicly accessible network may include a combination of networks, such as Internet and/or a wireless phone network.

TEMPLATES OF GRID CARDS (22-17) (FIGS. 40-43)

Templates are provided for creating grid cards that are associated with locations on a proximity grid. For example, the templates may include a template for a personal residence, a template for a business, a template for a geographical location, and an outdoors template.

In an embodiment templates for four types of locations are provided, which may include a template for a residence, a template for a business, a template for an outdoors location, a template for a point of interest (in other embodiments other templates may be provided).

One can click (e.g., by touching a touch screen) on any of most locations and a card will come up with information about the location, which the user may use to create a card for that location. Optionally. based on the location information in the event stamp, a template may be automatically chosen which the user can change, if desired. If the user wants, the user can click a button to accept the card, as is, and the card is automatically created. The card may vary the type of information on the grid card according to the type of location. As a default, the card may initially have fields filled in with information that is available from public records (e.g., the name of home owner, address, value of home, link to relevant websites for finding more info), and the user a may add information or change the information stored on the grid card prior to clicking the button to create or publish the grid card.

As an example, the template for a house may include information about the price of the house and the neighborhood the house is located in. The template for a business may include information about the products sold, customer ratings, and the type of business. The template for an outdoors location may include the types of activities available near that location, lists of nearby eateries and stores, and/or nearby places of interest. The template for a place of interest may include information about history of the place of interest, activities, associated with the place of interest, and visitor comments and/or ratings.

When one clicks on a location that is within a building, images of the inside of the building may be displayed, if images of the inside of the building are publicly available.

SCREENSHOTS OF PORTIONS OF TEIVIPLATES

Figure 40:
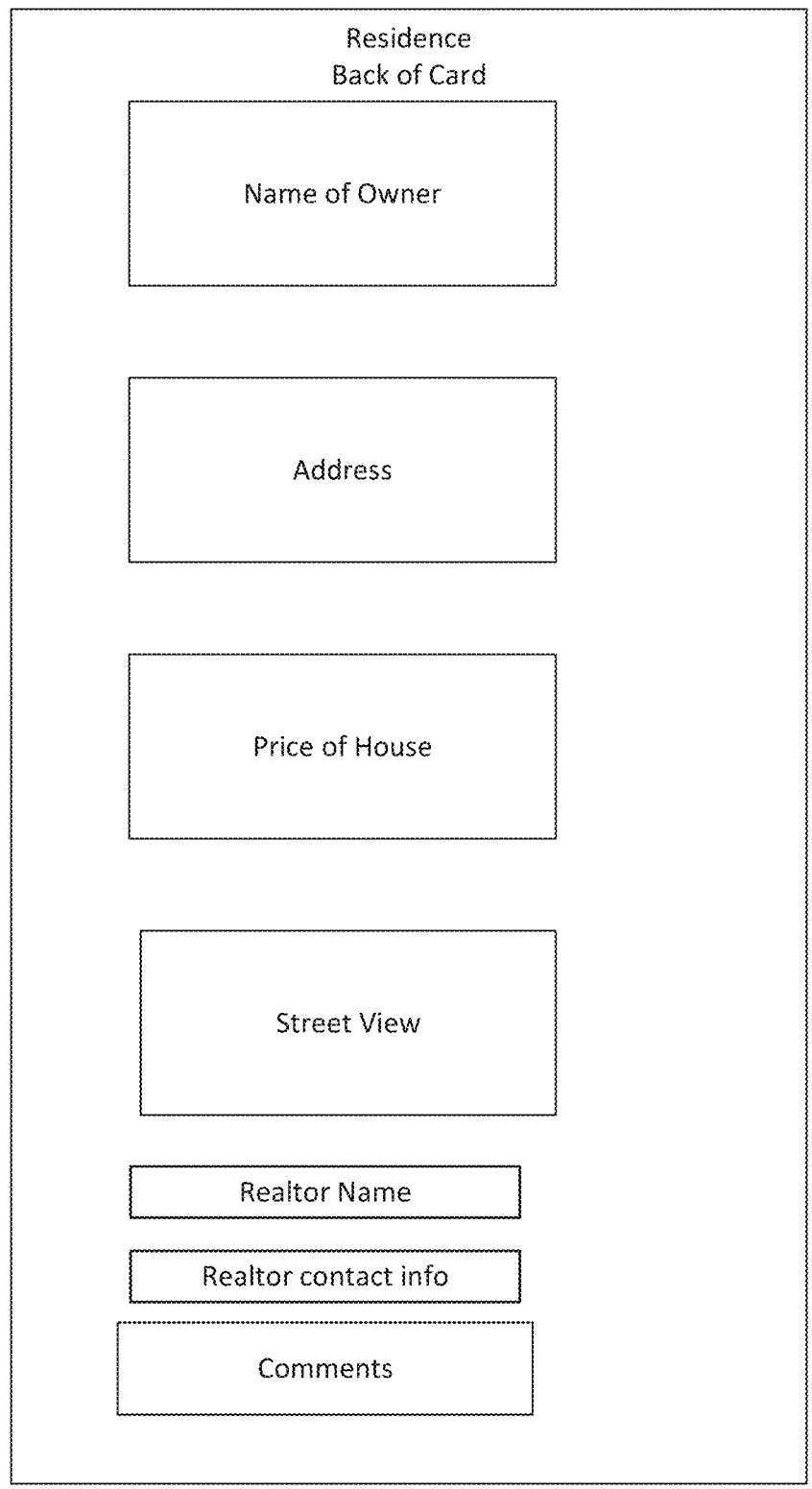
FIG. 40 shows an embodiment of the template for the back of a grid card for a residence.

FIG. 40 shows an embodiment of the template for the back of a grid card for a residence. In the example of FIG. 40, the template includes a field for the name of the owner, the address, a street view, the price of the house, the name of a realtor, contact information for the realtor and a comment box.

FIG. 41 shows an embodiment of the template for the back of a grid card for a business. In the example of FIG. 41, the template includes a field for the name of the business, the address, a street view, the hours that the business is open, a description of the products and services sold, a map showing the location of the business, a web address, phone number, a comment box and rating information. The rating information may include a score indicating the degree to which customers were satisfied and/or comments by customers.

Figure 42:
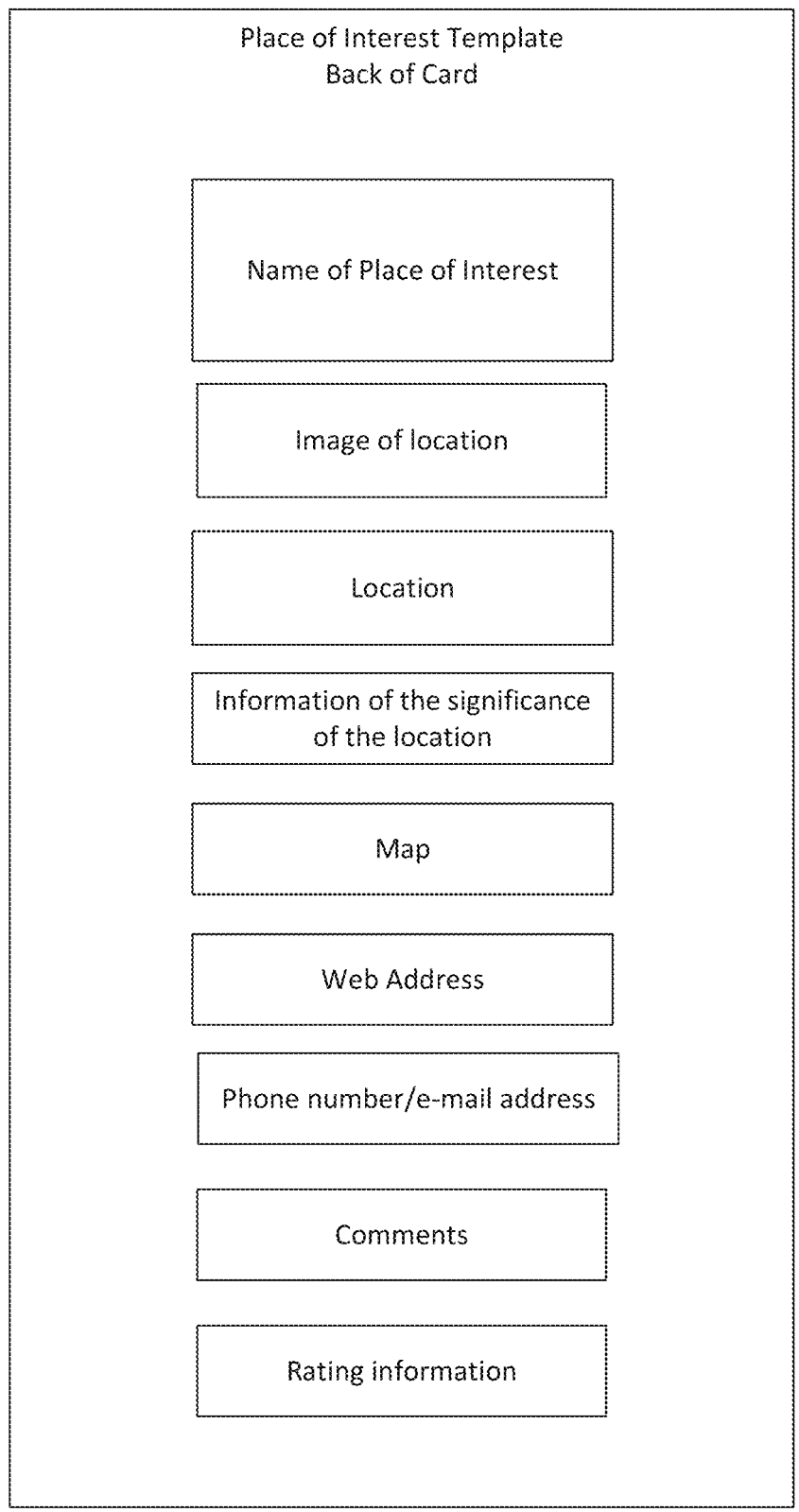
FIG. 42 shows an embodiment of the template for the back of a grid card for a place of interest.

FIG. 42 shows an embodiment of the template for the back of a grid card for a place of interest. In the example of FIG. 42, the template includes a field for the location of the business, the address, a street view, the hours that the location of interest can be visited, a description of the significance of the point of interest, a map showing the location of the point of interest, a web address, phone number, a comment box and rating information. The rating information may include a score indicating the degree to which visitors enjoyed visiting the point of interest.

Figure 43:
FIG. 43 shows an embodiment of the template for the back of a grid card for an outdoors location.

FIG. 43 shows an embodiment of the template for the back of a grid card for an outdoors location. The template of FIG. 43 may include a street address, GPS coordinates (or other ways of determining the address of the outdoors location), a photo, and a comment.

In other embodiments, there may be other templates in addition to, or instead of those listed above. In other embodiments, the templates of FIGS. 40-43 may not include all of the fields listed above and/or may include other fields in addition to or instead of those listed above.

ON-THE-GRID CARDS (22-19) (FIG. 44]

Signs are provided that indicate that an item associated with a location or location is on the grid. Optionally, a server stores an association between the physical sign and the location or item. Upon activation of an event stamp function the user is presented with a grid card that stores information associated with the location or item having the on-the-grid card.

In an embodiment, users may associate on-the-grid signs with a grid card. The on-the-grid signs are signs that one may place at a location or on an object to indicate that the object is on the grid. The user may request the server to store an association between the grid card and the on-the-grid sign. In an embodiment, when a user clicks on a location of the map, a list of locations in the system may appear, with the closest locations listed first. However, since the user likely sees the on-the-grid sign and is likely interested in information about the item having the on-the-grid card, if one of the locations has an on-the-grid sign, the location with the on-the-grid sign may be listed higher up in the list than at least some locations that are closer to the user than the on-the-grid sign.

Figure 44:
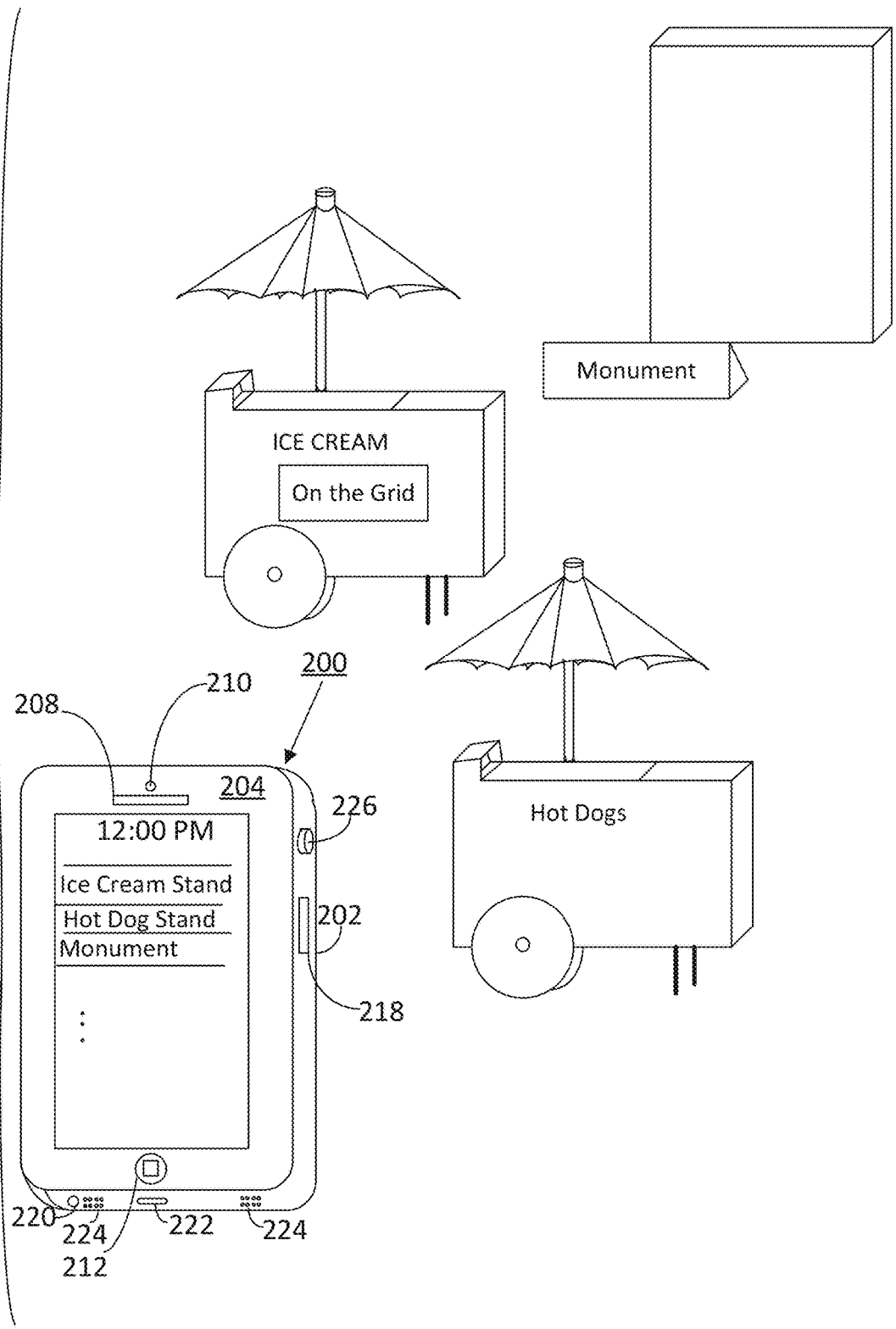
FIG. 44 shows an example of an embodiment of an on-the grid card.

FIG. 44 shows an example of an embodiment of an on-the grid card. The on-the-grid card includes an indication that the location or an item at the location where the sign is placed is on the grid. In the example of FIG. 6, there are three items that are on the grid, an ice cream stand, a hot dog stand, and a monument. Ordinarily, when a search for items on the grid is performed the items are listed with the closest item at the top of the list and the further items further down the list. In this example, the hotdog stand is the closest item, the ice cream stand is the next closest item and the monument is the furthest away from the user. However, when the user does a search, the ice cream stand is listed first, then the hotdog-stand and then the monument. Since the ice cream stand has an on-the-grid card, the ice cream stand is listed first. In an embodiment, those items having an on-the-grid card that are within a certain predetermined vicinity (with a one mile or within 10 miles for example) are listed first or that are within a predetermined distance from the user are listed first. In an embodiment, only those items having an on-the-grid card that are close enough to the user to be visible are listed first or that are within a predetermined distance from the user are listed first. In an embodiment, the order in which the nearby items according to a score, where the score is the distance of each item multiplied by a weight plus to weight corresponding to the item having an on-the-grid-card. In an embodiment, the weights may be determined statistically based on which item tent do be interested in when standing in that vicinity.

CINEMAPS 22-12(FIGS. 45-49)

Tools are provided to users for creating a video about a location and add the video to the proximity grid, so that the proximity grid may be easily populated with user content. The user searches for a particular location or object at location (e.g., a building or a monument). The system image information about the location and a way of creating different views of the object. The user captures multiple images of the object of interest using the tools. An app on the user's device or a server or other machine of the system automatically creates a video based on the images captured. The video is stored in searchable database associated with a proximity grid, in association with the object and the location of the object. Optionally, an already existing, searchable database storing image information about locations is used to initially populate the proximity grid, prior to user's adding content.

The series of images may form a cinemap showing directions of how to get from a parking location to the location of interest (a user could create such a cinema to help find their car when returning). As another example, the series of images may show how to follow a bicycle path (or other path of travel).

FIGS. 45-53 show a sequence of screenshots of an example of making and previewing a cinemap.

Once one initially has a proximity grid, it may be desirable to have an inexpensive and/or efficient manner of populated the proximity grid with grid cards (e.g., geocards) for various locations of interest (each card is a container that holds information, such as an address, a name, a URL for a website, a phone number, a map, a description, and/or other comments, about an object of interest). Grid cards are discovered by either sharing the information with someone, searching a database, or by just opening up the proximity grid, based on the user's location.

One approach is to allow the user to make the grid cards themselves. Otionally, pre-existin location based content is loaded into the system. For example, one could load a pre-existing database of locations (e.g., Apple Maps or the street view of Google Maps), where for each location in the database, a video or image (e.g., a street view) appears that shows the facility building, monument or other item of interest at the location of interest, and/or other information, such as a street address may be provided. For example, the video may show a series of images of the item from all sides, similar to what one would see were one to walk or fly around the object of interest in a helicopter. For example, by default, the item pivots on the screen so that by watching the video, the viewer can see the item from all sides. As an example, if the user searched for the statue of liberty, before users have added their own video, the user is automatically presented with a video in which the Statue of Liberty is rotating, thereby providing the view one would see were one to fly around the Statue of Liberty (alternatively, the user may by default just see a still image of the location a name of an establishment, and/or a street address).

After finding the object based on the user's location or after doin a search e.g., the user could just say the name of the object into the microphone on their device to have the information about the object appear), the user could then create a card for the object, which further adds information about the object. Additionally, the user could make their own video of the object that is more interesting and/or more informative than the image or video provided automatically. For example, the user may create a short video showing the viewer the path that one takes up the dock to the boat going to the Statue of Liberty in addition to the showing a view of the Statue of Liberty. To assist people in creating videos, tools may be provided to the user, via which the user can capture different images related to the object in a particular seguence. Each image could be the image one would see if located at a particular location with respect to the object. Then the images specified and/or captured by the user may be automatically supplemented with additional images of views that would occur were one to move to the locations between the locations from consecutive captured images. The images could be arranged in a seguence, so as to create a video.

The user may also be provided with tools for adding their own image (or video), such as an uploaded photo, and/or text to the video created. For example, if the user visited a particular ride at a theme park, the user might add an uploaded picture showing the user on the ride. The picture may be presented in an image container that resembles the image of a blowup of a detail on a drawing. So, for example, if the user road on a merry-go-round, the video created may show a series of views rotating around the merry-go-round with a blowup box pointing to the merry-go-round that has a picture of the user on the merry-go-round, where the picture in the picture container was taken and uploaded by the user. The use may also add text to the same video, such as "that was fun."

In an embodiment, the user device only needs to generate the locations coordinates e.g., the GPS coordinates associated with each image (e.g., the location coordinates of a viewer that would see the image being captures), and the application fills in the rest of the image.

In an embodiment, the points associated with images that are between two points chosen by the user are automatically chosen to fit a parabola and two automatically chosen parabolas that are joined by a point chosen by the user are chosen to have parameters that ensure that the transition between parabolas is smooth (e.g., a spline in which both parabolas have the same first derivative at the point joining the two parabolas).

In an embodiment, the points associated with images that are between two points chosen by the user are automatically chosen to fit a parabola and two automatically chosen parabolas that are joined by a point chosen by the user are chosen to have parameters that ensure that the transition between parabolas is smooth (e.g., a spline in which both parabolas have the same first derivative at the point joining the two parabolas). The time interval between way points and the speed that the cinemap changes from way point to way point may be adjusted so that the transition is smooth. In an embodiment if two way points are too close together to create a smooth video of moving from one way point to the next point, the path taken in the three dimensional virtual space is not the shortest path, but the shortest path that can be depicted as smooth transition from one way point to the next way point. In an alternative embodiment, the user may be prohibited from choosing two-way points so close that a smooth video cannot be chosen.

In an embodiment, the length of time of the video between two captured images used to create the video is automatically set to be related to (e.g., proportional to) the distance between where the viewers would stand to see the view in the image, so that the transition between an image of the object from a far distance and an image form a relative close distance appears to be smooth and consistent with the speed at which the video rotates around the object. In another embodiment, the length of time may be a slowly increasing exponential function of time, so that for distances close to the shortest distance between two images, the time between captured images is almost proportional to the distance, whereas for much larger distances the time between images is quicker. On the one hand, when zooming in from a far distance, one does not want the increase in size of the image to occur too quickly. On the other hand, if the first image is a satellite image from space (to take an extreme example), the amount of time spent zooming-in should not be so long as to wear the patience of the viewer. Optionally, the user may adjust the speed at which the video that the user creates is played and change the speed for different sections of the video.

When the user is in a particular location, the user may see a list of cinemaps and/or other grid cards in the location that the user is in.

Users can of course create grid cards without cinemaps. Users can add cinemaps to the cards in a mashguide. Users can also have standalone cinemaps, where the cinemap is the grid card.

Gradually, as people add more and more of these videos, the system will become populated with grid cards for different location. When one is in a particular location, and the user connects to the proximity grid, the user may find a list of cinemaps of locations near where the user is currently located or interested in learning about (similar to the way the available routers are displayed on a computer when searching for nearby routers to connect to).

The series of images may form a cinemap showing directions of how to get from a parking location to the location of interest (a user could create such a cinema to help find their car when returning). As another example, the series of images may show how to follow a bicycle path (or other path of travel).

The cinemap may be timestamped and the user may set a time at which cinemap is removed. If the cinema is associated with an object (e.g., a food stand) that is only present during certain times of the day, the cinemap may include time information indicating when the object is present and/or may not appear when the object is not present.

Figure 45:
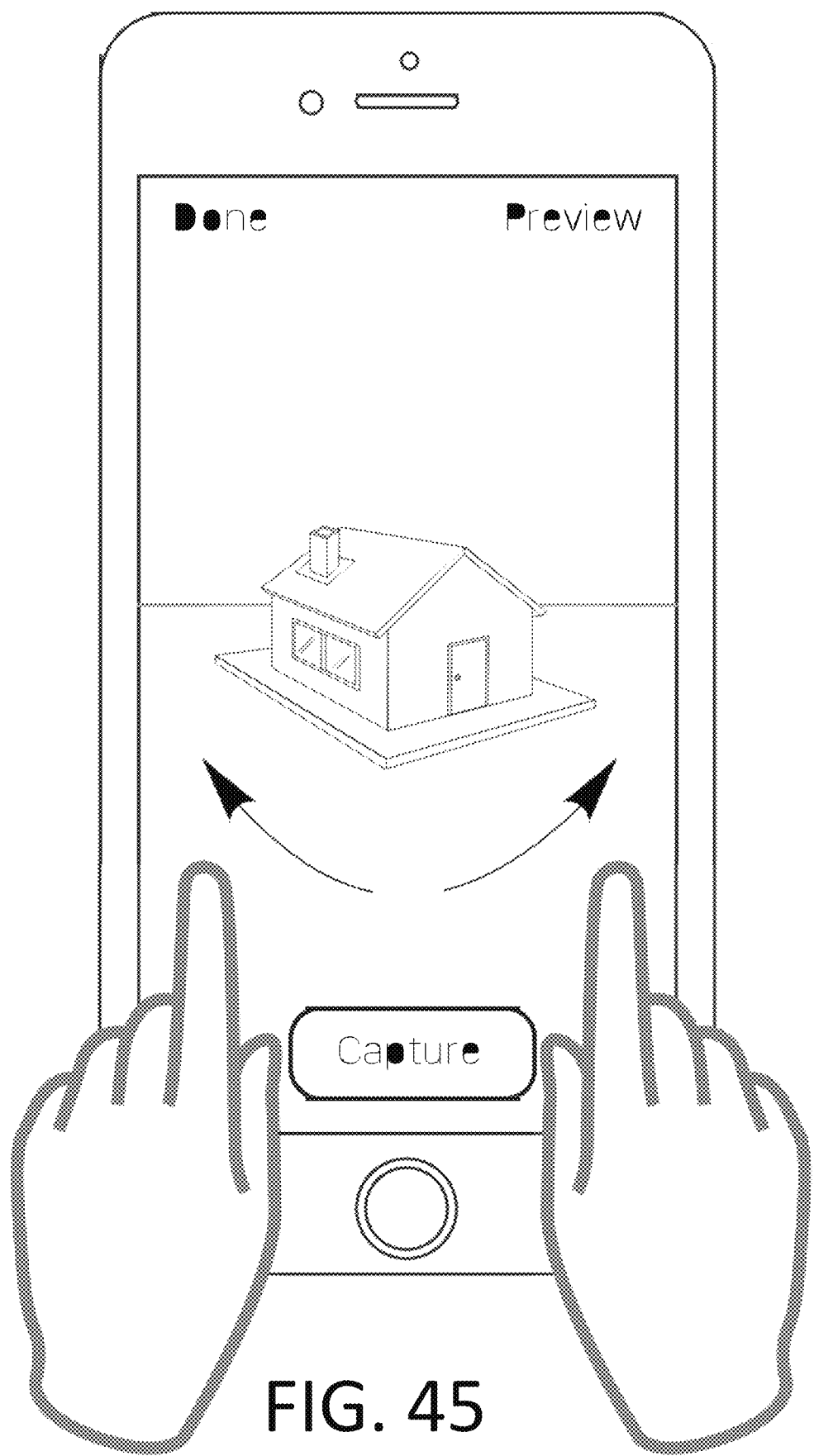
FIG. 45 shows a screenshot of an embodiment of a user capturing waypoints that will make of the cinemap.

FIG. 45 shows a screenshot of an embodiment of a user capturing waypoints that will make of the cinemap. The user rotates the image, zooming the image in and/or out, and/or translating the viewpoint seen be the viewer, choosing viewpoints to capture as waypoints. For example, each time the user finds a view point that the user would like to be a waypoint, the user may tap on the display screen or in another embodiment click on a button creating a cinemap having multiple points. The multiple point CineMap may include an animated 3D flyover view between the waypoints that were defined by the user. The buttons on the cinemap editing screens may be displayed as graphical icons, text, or a combination of both. The user can use touch gestures to swipe, pinch and zoom, etc, to bring the flyover to the desired starting view and to each way point in the sequence that user desires the waypoints to be viewed.

Figure 46:
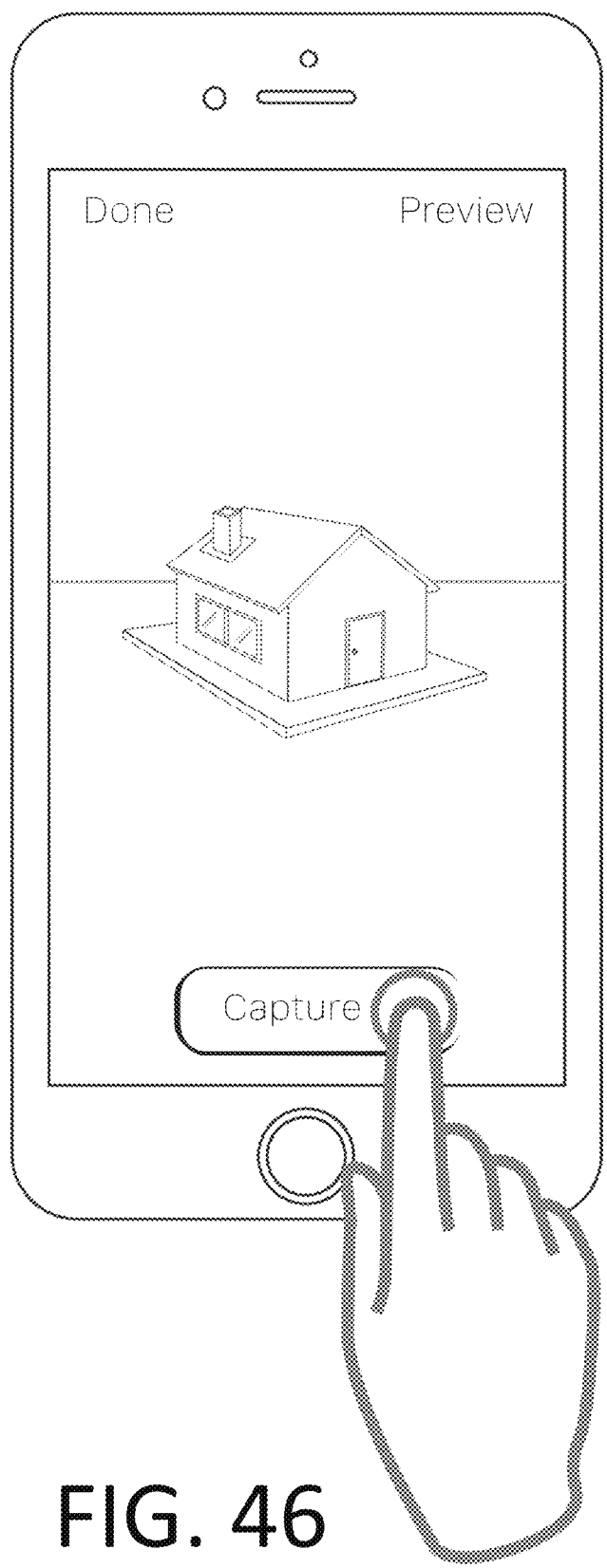
FIG. 46 shows the user clicking on the capture button.

FIG. 46 shows the user clicking on the capture button. After the user has captured a series of waypoints that user would like to convert into a cinemap, the user may click on the capture button. FIG. 46 shows the user clicking on the capture button to capture a way point. For example, once the flyover is oriented to the desired opening view, the user presses the "capture" button to define the first waypoint for the animation. The user repeats the process by continuing to navigate the flyover view to the subsequent desired waypoints capturing each in the same way.

Figure 47:
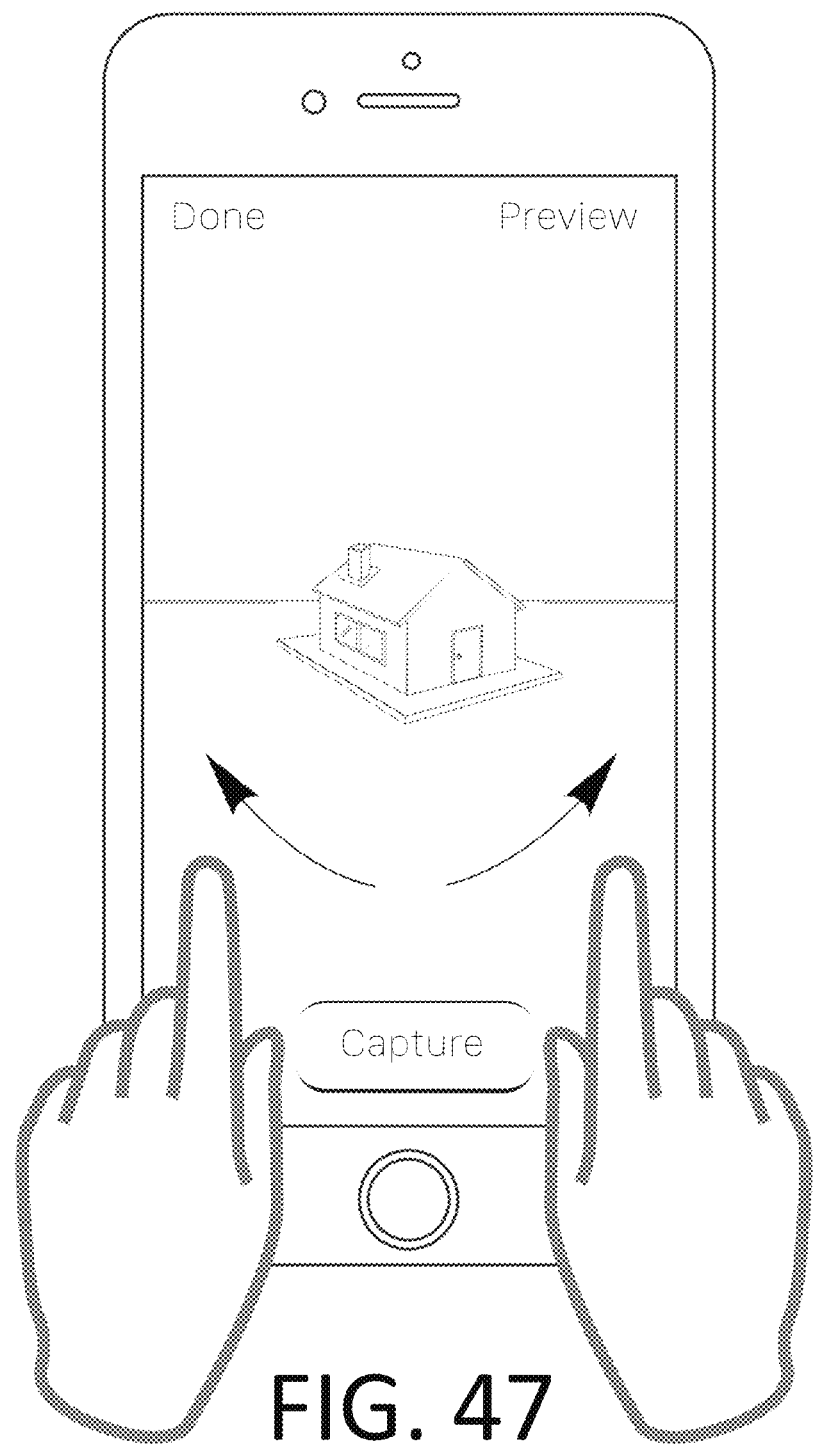
FIG. 47 shows the user repeating the first step looking for the next way point.
Figure 48:
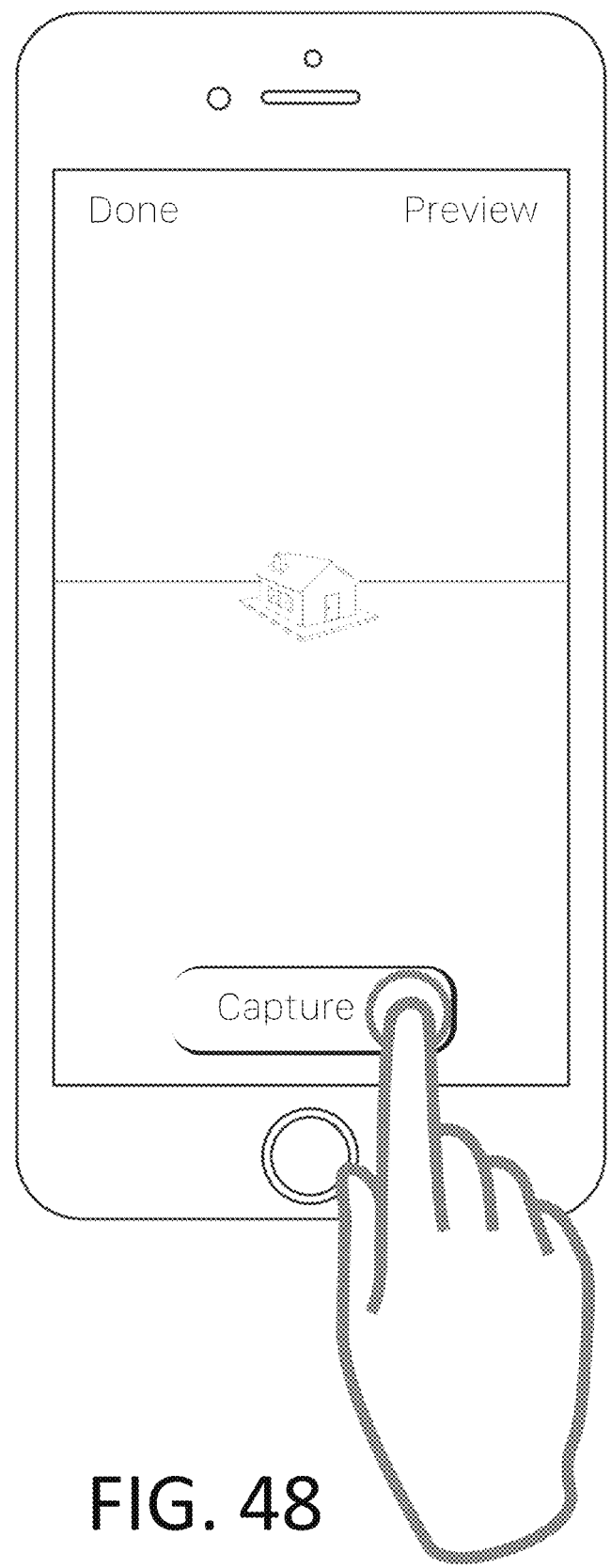
FIG. 48 shows the capturing another waypoint.

FIG. 47 shows the user repeating the first step looking for the next way point. FIG. 48 shows the capturing another waypoint.

Figure 49:
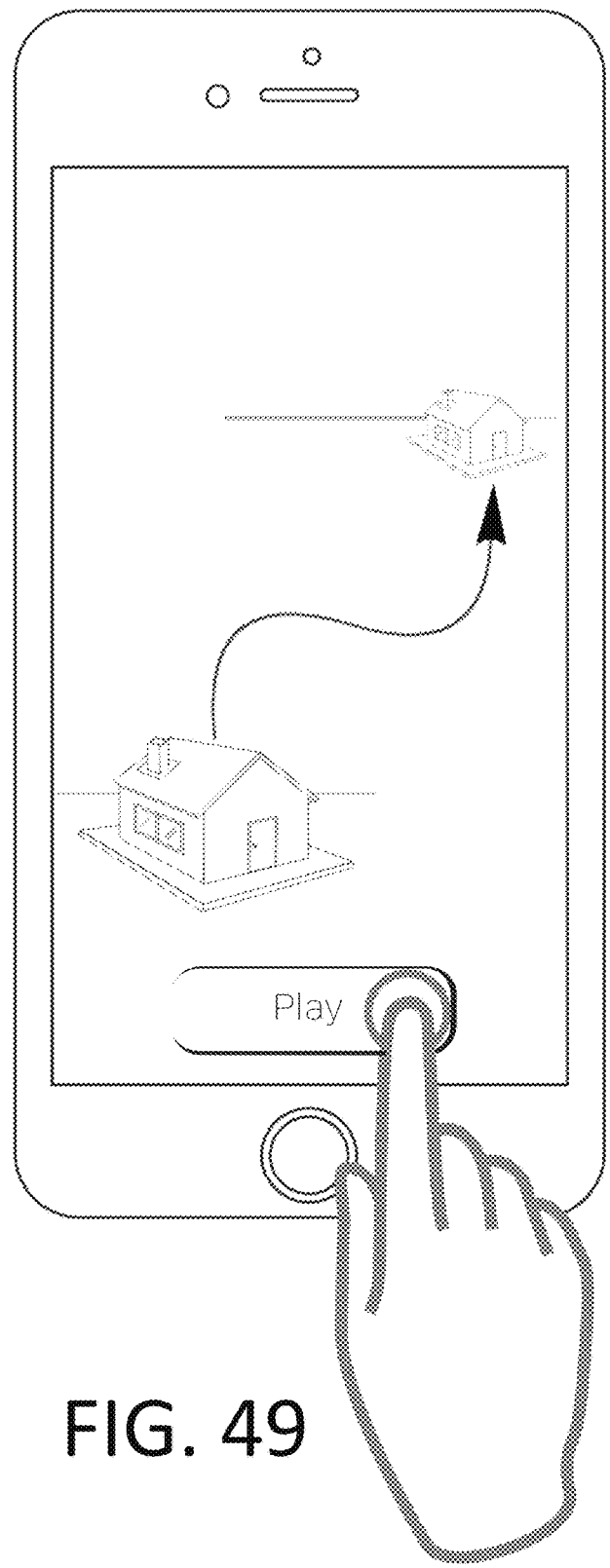
FIG. 49 shows the user clicking on the play button to play the cinemap.

FIG. 49 shows the user clicking on the play button to play the cinemap. The squiggle arrow represents the path the that the viewer in guided along while viewing the cinemap, which is a series of views, which include the viewpoints and frames of views that one sees as transitioning from one view point to another viewpoint. Optionally, the user can preview the animation during the editing process by pressing the "preview" button. In an embodiment, when the user is finished adding waypoints, the user completes the multiple point cinemap editing process by pressing a "Done" button.

Figure 50:
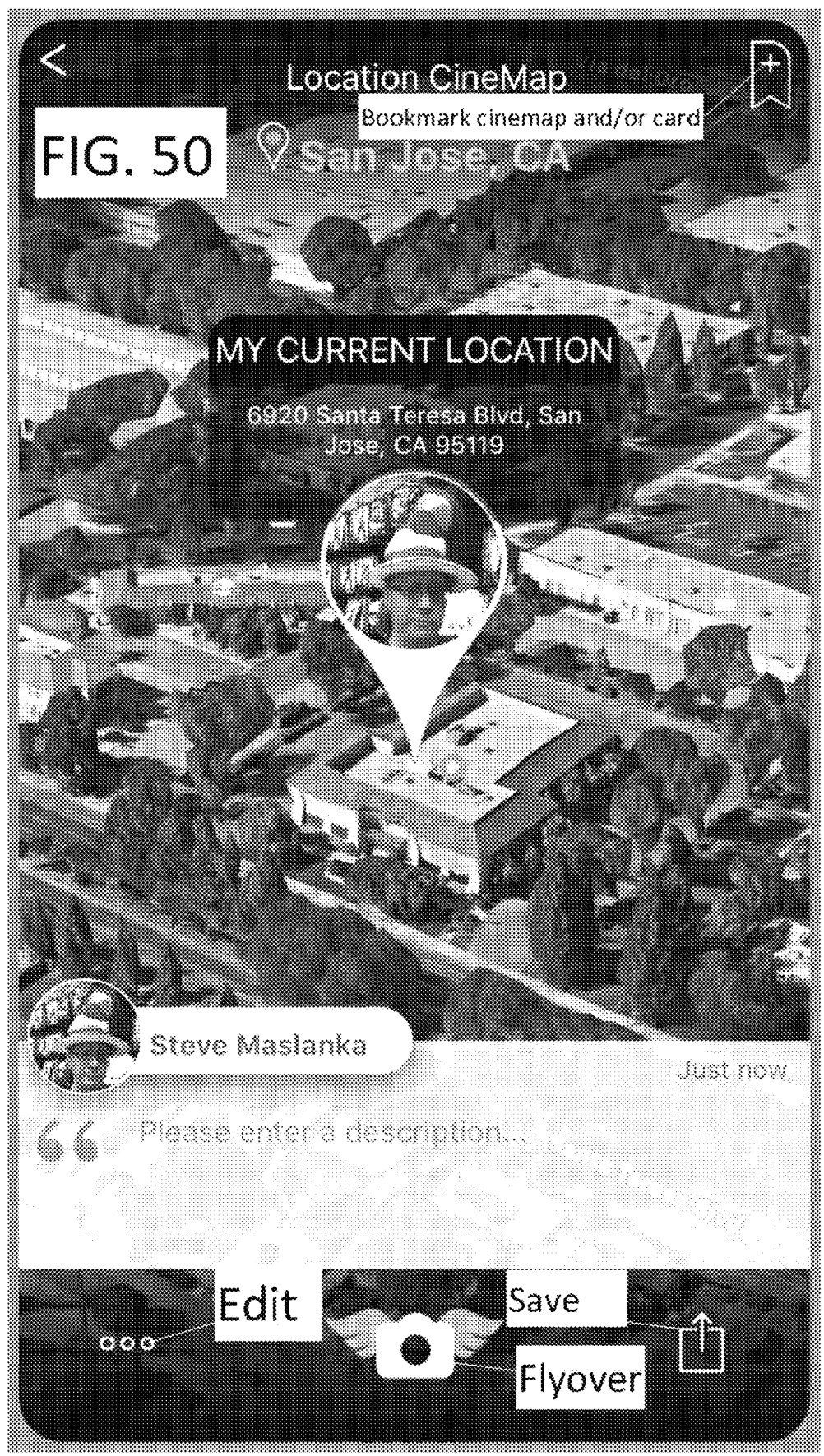
FIG. 50 shows a page having an example of a card, which includes a cinemap of the location and a field for entering a description of the card.

FIG. 50 shows a page having an example of a card, which includes a cinemap of the location and a field for entering a description of the card. The page of FIG. 50 has a box open having a field for adding description of a cinemap. In an embodiment, the description box opens after the cinemap is created. Prior to creating the cinemap may be closed, but the page under the description box may be used to initiate the creation of the cinemap. The page of FIG. 50 includes an icon, which when selected may be used for editing the card, an icon, which when selected initiates a flyover that may be used for creating a cinemap, a save icon, which when selected initiate saving the card in the current state of the card (which may save a newly created cinemap), and an icon for bookmarking the cinemap and/or a card having the cinemap.

Figure 51:
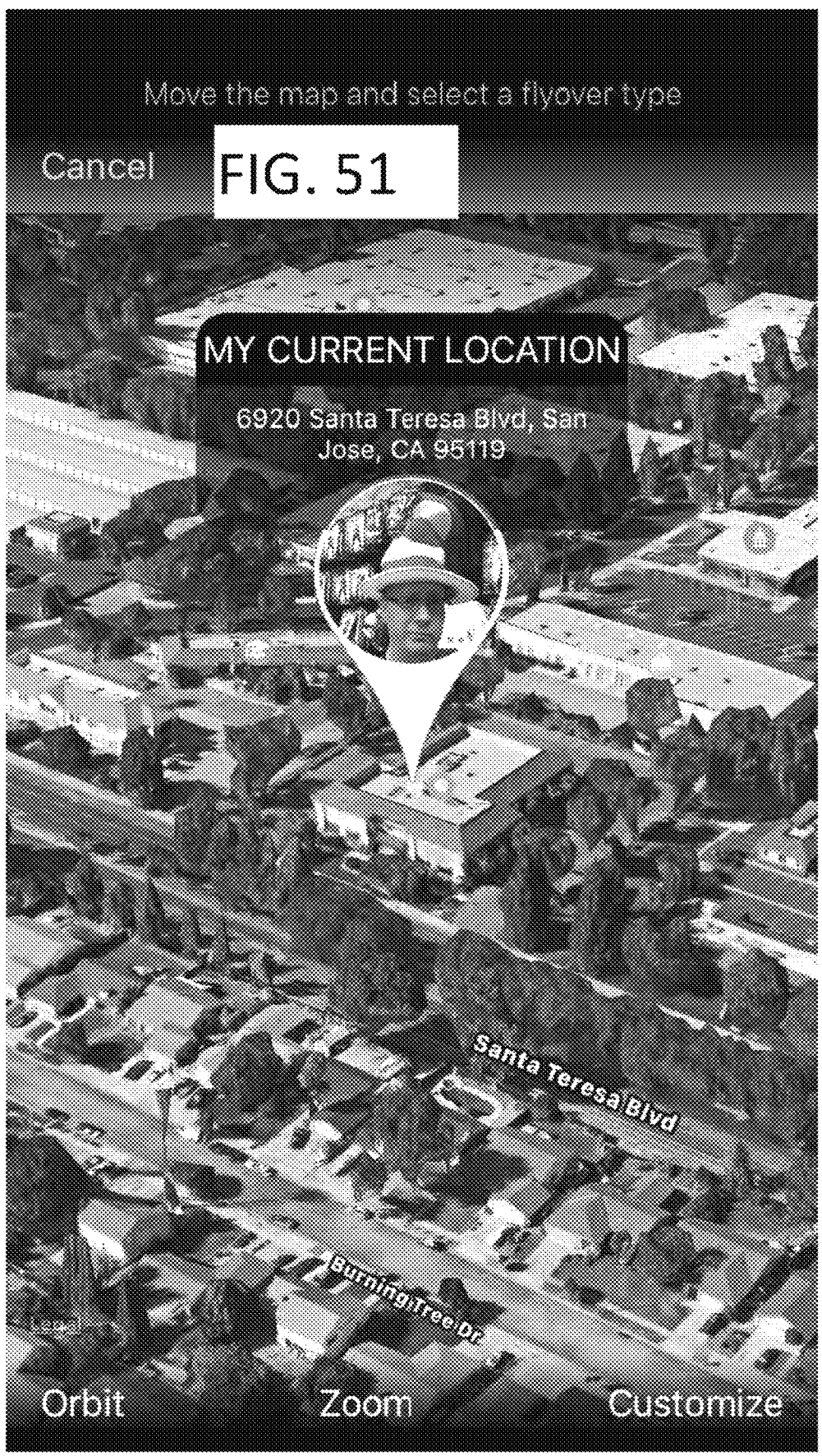
FIG. 51 shows an example of the results of capturing or going to a current location

FIG. 51 shows an example of the results of capturing or going to a current location. The user's current location information is placed in a data container in a balloon that is anchored in an image of the location. In the example of FIG.

51, there is a link for changing the location and at the top of the page are a link for saving the location (e.g., as grid card or bookmark) and a link for cancelling the task. The page of FIG. 51 may appear after creating a cinemap. Using the page of FIG. 49, the user may save the cinemap by selecting the save link or change the cinemap by selecting the change link.

Figure 52:
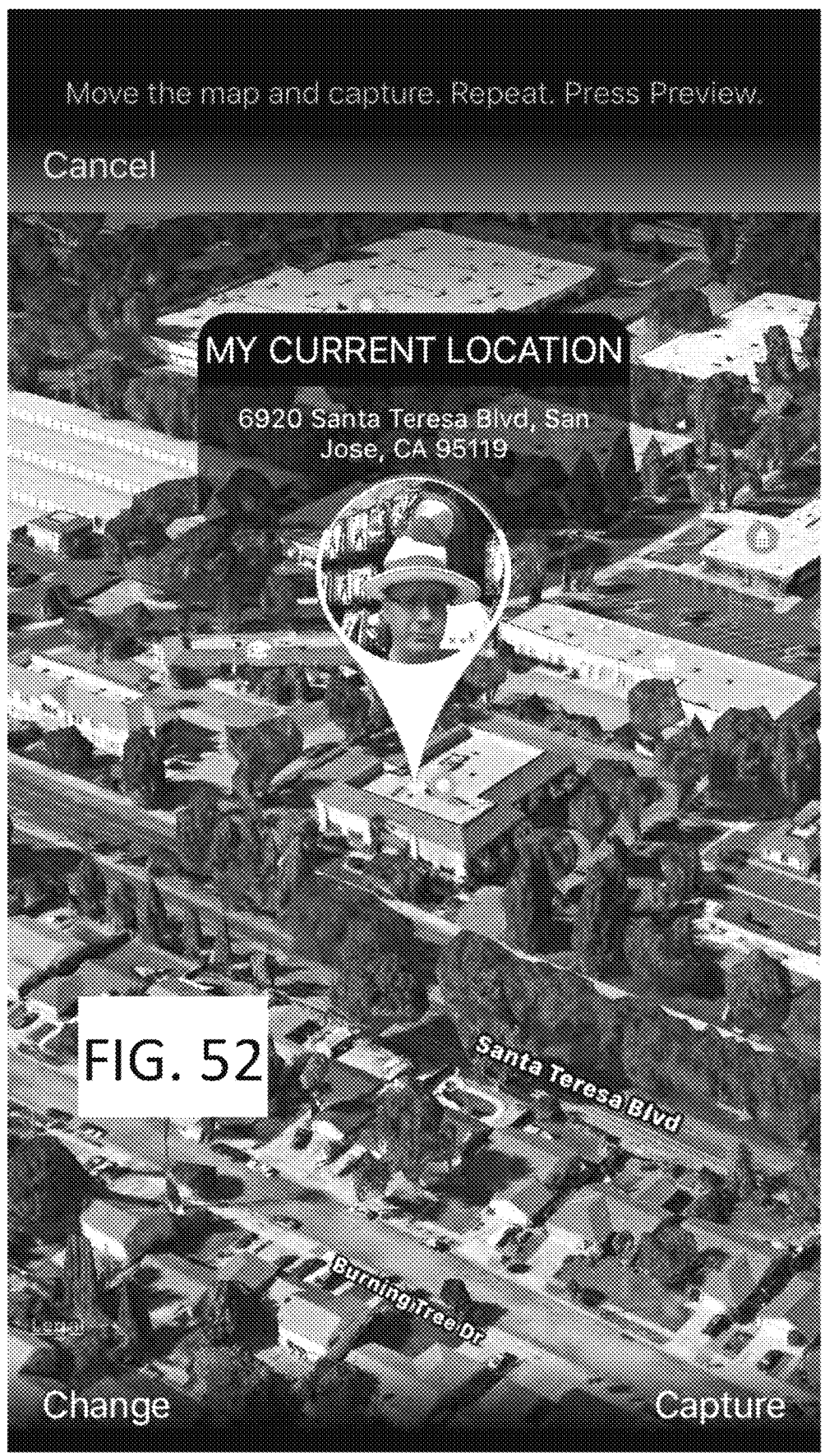
FIG. 52 shows an example of a screen that may appear as part of making a grid card, cinemap, or bookmark.

FIG. 52 shows an examle of a screen that may appear as part of making a grid card cinemap, or bookmark. The user may click on the top of the page to choose a type of flyover to see of the location. The user may also choose Orbit to view the location selected while orbiting around the object. The user may choose to zoom in or out of the view, or otherwise customize the view (e.g., by creating a cinemap) or cancel the task. Using the page of FIG. 52, the user may zoom in or orbit around the location that a grid card represents. The user may also customize the flyover, by creating a cinemap.

Figure 53:
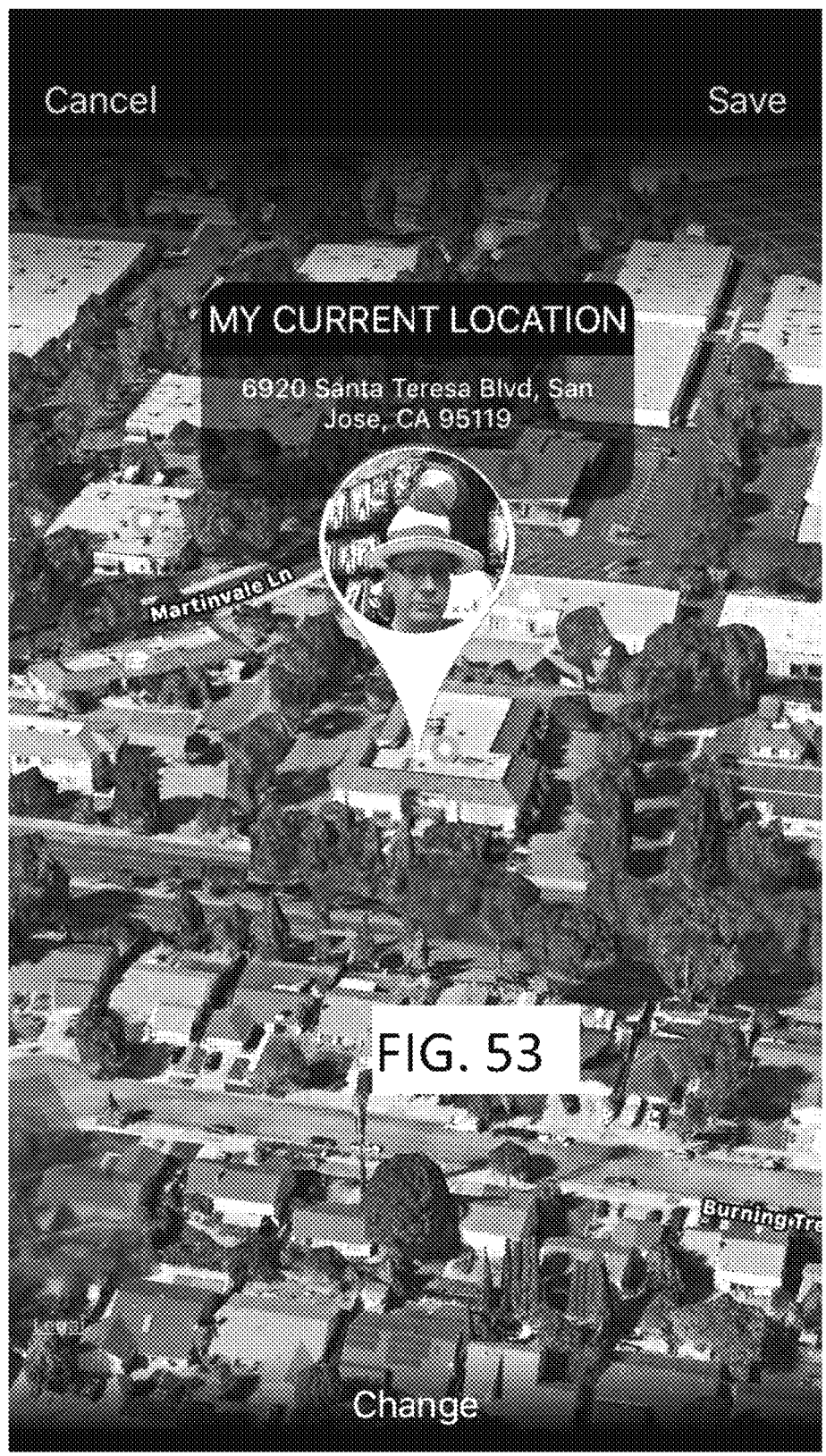
FIG. 53 shows the screen that may be used for creating a cinemap.

FIG. 53 shows the screen that may be used for creating a cinemap. After selecting choose customize. The user may move the view and capture the view to create a way point, and then repeat the process multiple times. By clicking on the capture line, the user may capture the current view as a waypoint. By selecting change, the user may change to the current view to another view, which may then be captured to create the next way point. The user may move the map, press the capture button, and repeat the process. If the user does not like the location the user may select change to go to another location. After the user is done, the user selects an appropriate icon to gather together the different locations selected, via the moving of the map and capturing the view, and creates a cinemap. Optionally, street names are written on the streets and/or the names or other identifiers of other locations may be written on the image. When the user is has captured enough way points, the user may select preview link to see the flyover that will be the cinemap. If the user is satisfied, the user may select the save link to save the cinemap.

CREATING GRIDCARDS WITH WIDGETS FIGS. 54-58

A function on a user device is activated, and in response, the user device automatically collects location information. The user device also automatically sends, from the user device to a server, a request. The request includes at least the location information indicative of a location of the user device that sent the request and an indication to create a grid card. A copy of the page showing the grid card located on a map and a pin associating the grid card with the location is received at the user device from the server.

Figure 54:
FIG. 54 shows a page associated with a grid card with a street view with a link for adding a widget.
Figure 55:
FIG. 55 is a continuation of the page FIG. 54, having a link for navigating the street view.

FIGS. 54 and 55 show a series of screenshots that of an embodiment of pages that may be used to create a grid card. A grid stamp may be created using a smart watch. In an embodiment, creating the grid stamp or grid stamp may be created most efficiently via the smart watch. In an embodiment, a user opens an app on the smart watch and taps the create grid stamp button, and thereby instantly creates a grid stamp. The first screenshot shows is an example of a page for creating a grid stamp. The second screenshot is an example of a confirmation page. After the grid stamp is created a confirmation screen is presented to the user. By presenting the confirmation screen to the user, it can be verified that that the user's location has been captured. In an embodiment, the user's location and time are captured in the grid stamp.

The third screenshot show an example of a page that may be presented for adding an audio recording to the grid stamp. After confirming that the grid stamp has been captured, the user may optionally add a voice note that will be saved with the grid stamp. The voice note may be transcribed using voice recognition technology to convert the voice recording to text, and/or the voice may be saved as an audio file.

The grid stamp may be selected from the smartwatch's operatings system's touch menu e.g., the Apple IOS menu). From the operating system's home screen the user can touch an icon representing the app, which causes a menu of quick actions to be presented on the screen. One of the guick actions may be to create a new grid stamp.

Alternatively, the user may use smart hone instead of the smart watch. The first smartphone screen shows the menu presented by the operating system, which includes a list of apps, that the user may select. The next screenshot shows the page on a smart phone for creating a grid stamp, which is presented to the user after the application is opened. One may create the grid stamp from the App home screen by selecting the main action button. The main action button captures the time and location (Grid "Event" Stamp) and opens to a page where the user may optionally add data to the grid stamp record. The data that is added becomes part of the grid stamp and is uploaded to the proximity grid (the platform). The user may use smart phone instead of the smart watch or with the smart watch.

After creating a new grid stamp the (e.g., and the a captures the time and location (Grid "Event" Stamp)), the app opens to a page where the user can optionally add data to the grid stamp record. The data that may be added becomes part of the grid stamp and is uploaded to the platform.

The grid stamp data may be referred to as "cargo." The cargo may be sent to the proximity grid server (or other elements of the proximity grid platform) either directly or through the paired mobile devices (the smartwatch or other wearable device and smart phone). For example, the cargo sent to the proximity grid server may be Date: Nov. 2, 2016
Time 5,40 PM
Location, 37'15'48"N, 121'49'22"W
Voice Note: mp3
Query for information related to the location.

The cargo may automatically be sent witha ue information about the location. The grid stamp cargo may be sent via a network, such as the internet to the proximity grid server. The query is processed and results of the query are returned, via the network to the user's smart phone and/or smart watch. Tapping on the screen having a listing will open a flyover at the location where the grid stamp was created. The results of the Query and the cargo is downloaded from the platform and is viewable on the mobile device. An example of the information presented to the user, after receiving results of the Query (which may be referred to as Query Result Data Cargo).

Date: Nov. 2, 2016
Time 5,40PM
Location, 37°15'48"'N, 121'49'22'22"W
Voice Note: mp3
Query Result: The Eiffel Tower, nearby businesses, nearby people, nearby parks, nearby photos, etc.

The last screenshot shows an example of the manner in which the grid stamp cargo may be presented to the user. The cargo appears in a box or other data container that is associated with the location of the grid stamp.

FIG. 45 may include a 3D flyover mode, via which the user may explore nearby locations, such as nearby businesses and/or other objects of interest near the location. The user may be presented with a list of nearby locations, and by tapping on the area the user wishes to explore the user may be brought to the location of interest.

Tapping the second to last screen (or selecting an icon on the screen) may cause a page to be displayed, which is the last screenshot of FIG. 45 and which has an image of the location, and a button that may be touched to cause other information about the location to be displayed
MORE SCREENSHOTS—ADDING WIDGETS TO THE CARD FIG. 54 shows a page associated with a grid card. The grid card may have a back and front. FIG. 54 shows a page related to the back of the grid card. The page of FIG. 54 includes a street map the date at when the grid card was created and a link for adding widgets, which may be called "add more cool stuff." The page may also include a link to indicate that the user is finished editing the grid card, which saves the changes and returns the user to the front of the grid card. FIG. 54 shows an initial street view which may have been automatically captured by the application.

FIG. 55 is a continuation of the page FIG. 54, if one scrolls down the page of FIG. 54, eventually one arrives at the FIG. 55. In FIG. 55, there is a link for navigating a street view, so that one can choose the street view to associate with the grid card. The page of FIG. 55 also has a link for creating a link to a website, and a link for adding a text box. FIG. 28 shows the street view that results after clicking on the navigation arrow that appear further down the road in the street view of FIG. 55.

Figure 56:
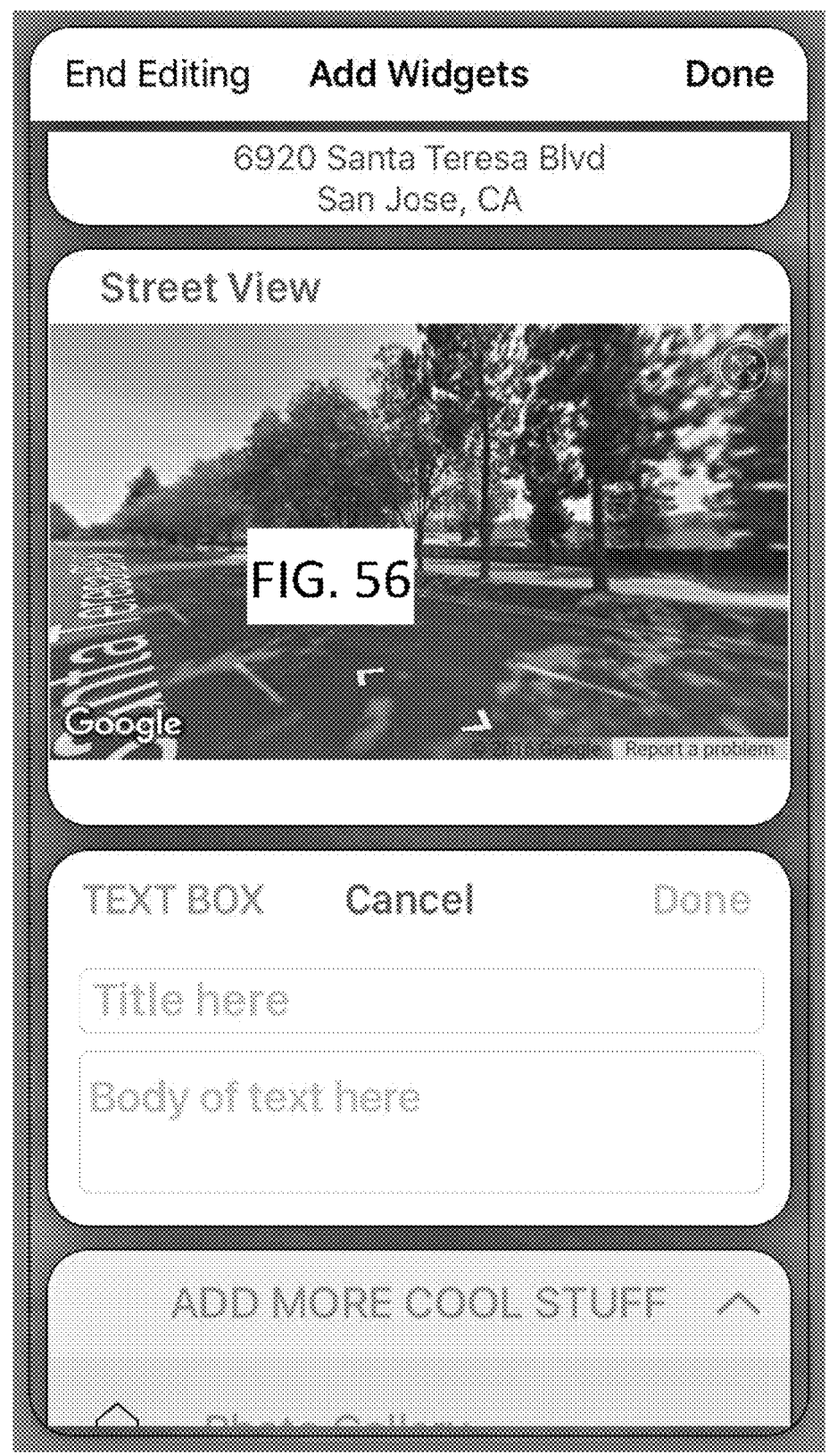
FIG. 56 shows an example of a page that may be used for creating text box to add to the grid card.

FIG. 56 shows an example of a page that may be used for creating text box to add to the grid card. After selecting the create the text box option of FIG. 54 the user is brought to FIG. 56. The page of FIG. 56 includes a title field, where the user enters the title of the text box, and a field for the body of the text, where the user enters the rest of the text. In other embodiments, there may be just one field for the text box or there may be more than just two fields that make up the text box. FIG. 56 shows the street view that results after further manipulating the street view.

Figure 57:
FIG. 57 shows an example of a page for adding a web address to the grid card.

FIG. 57 shows an examle of a page for adding a web address to the grid card. In response to the user selecting the add links option of the page of FIG. 55, the user is brought to the page of FIG. 57. The page of FIG. 57 includes a title field, and a field for entering the URL. The page also includes a Cancel link, which when selected causes the ending of the creation of the link without saving the information entered into the fields, and a Done link which ends the creation of the web link while saving the information added and creating a link, if there is adequate information that was entered for creating the web link. FIG. 57 shows the street view that results after further manipulating the street view.

Figure 58:
FIG. 58 shows a page in which the navigation icon for navigating the street view is active.

FIG. 58 shows a page in which the navigation icon is active. In FIG. 54 the naviation icon is greved out, whereas in FIG. 58 the navigation icon has its full color. The street page has navigation arrows on the street view to indicate that clicking on the arrow causes the image to change to give the appearance of moving in the direction of the navigation arrow. Once one has found the desired street view, and is satisfied with the URL link and text box, the user may select (e.g., by clicking on) the end editing link and save the view. FIG. 57 shows the street view that results after further manipulating the street view.
BOOKMARKING RELATIONSHIPS (FIGS. 59-62)
22-23 Bookmarking Relationships A user may be provided with a tool for bookmarking grid cards. As a result of bookmarking a grid card, a two-way relationship may be established between the grid card owner and the user that bookmarked the grid card.

A user may select a grid card in order to get directions to a location or be sent a grid card for use while traveling to the location associated with the grid card. The user is then provided with the option of providing location information to the owner of the grid card while the user is traveling to the location, so that the owner of the grid card knows when to expect the user to arrive. Also, the user receives updates of the user's proximity to the location. Optionally, the user can control the degree of access that the owner of the grid card has and/or how often the owner of the grid card receives updates of the user's location.

Figure 59:
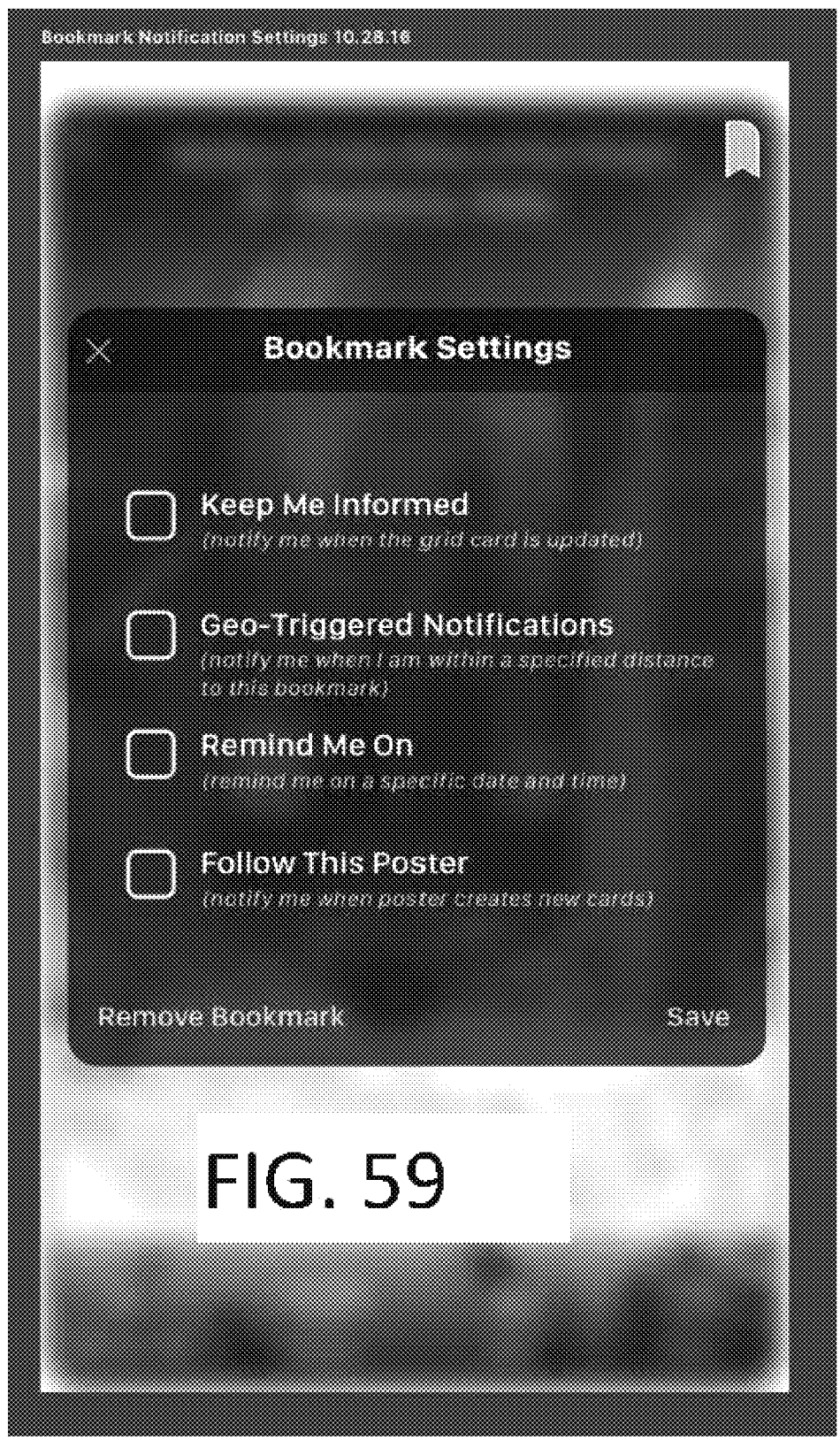
FIG. 59 shows a screenshot of another embodiment of setting options that may be provided to the user upon creating a bookmark.

FIG. 59 shows an examle of a page of the grid card that may be sent to the user if the user bookmarks the grid card. As a result of bookmarking the grid card, the user may be offered to choose whether the user would like updates to the grid cards, which may be related to the establishment. Similarly, the user may also be asked whether the user is interested in promotional offers and whether the user would like to join a group of users that have bookmarked the same grid card. When a user bookmarks a grid card of an individual (e.g., a friend, relative, or acquaintance). the user may also be asked whether the user is interested in receiving updates to the grid card and/or wants to join group of those that have bookmarked the same grid card. Since a similar behavior happens whether the user is bookmarking a grid card of an individual, nonprofit organization, place of interest (e.g., a park or a beach), the user becomes accustomed to associating bookmarking with establishing a relationship and understands that by bookmarking a store or a restaurant, for example, the user is establishing an ongoing relationship with the store or restaurant, and so the receipt of the updates to the grid card are likely to be desired and intentionally requested by the user.

Figure 59A:
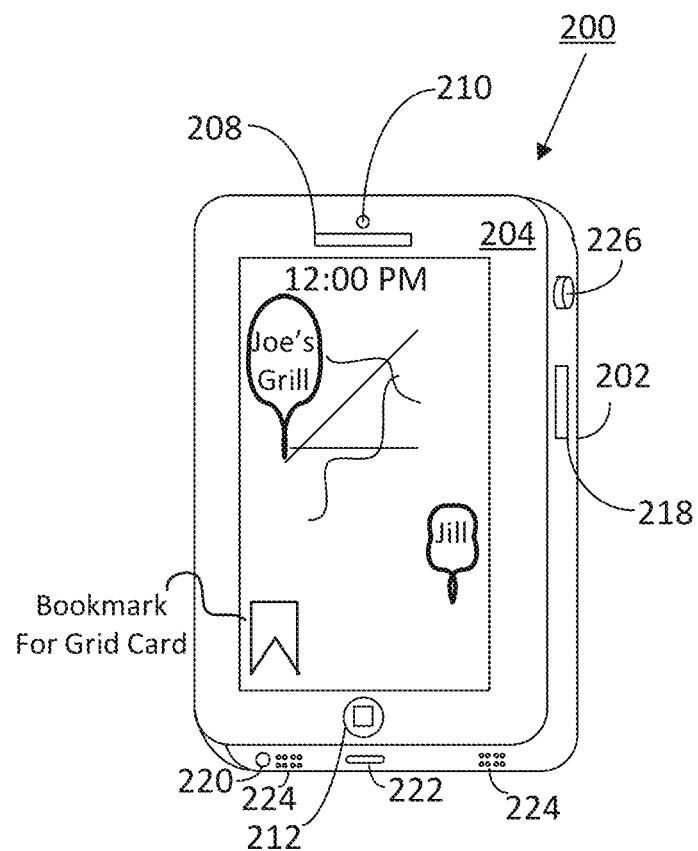
FIG. 59A shows an example of the user screen a user, by the name of Jill, with an icon for creating a bookmark.

FIG. 59A shows an example of the user screen of a user, by the name of Jill. The screen shows a grid card marking Jill's current location and a grid card marking Jack's Grill. Jill may like Jack's Grill, (e.g., because she loves the fresh well-water that they serve with their meals). So, that Jill can stay in touch with happenings at Jack's Grill, Jill selects the grid card for Jack's Grill and then selects a bookmark icon (or other link) on the page, thereby bookmarking the grid card. Alternatively, Jill could first open the grid card and then after the grid card is open select a bookmark icon (or other link) on a page of the grid card. After the grid card is bookmarked a link to the grid card is stored in a location that has a list of bookmarked grid cards.

FIG. 59A shows an example of the user screen of a user, by the name of Jill. The screen shows a grid card marking Jill's current location and a grid card marking Jack's Grill. Jill may like Jack's Grill, (e.g., because she loves the fresh well-water that they serve with their meals). So that Jill can stay in touch with happenings at Jack's Grill, Jill selects the grid card for Jack's Grill and then selects a bookmark icon (or other link) on the page, thereby bookmarking the grid card. Alternatively, Jill could first open the grid card and then after the grid card is open select a bookmark icon (or other link) on a page of the grid card. After the grid card is bookmarked a link to the grid card is stored in a location that has a list of bookmarked grid cards.

FIG. 59B shows an examle of a page of the grid card that may be sent to the user if the user bookmarks the grid card. As a result of bookmarking the grid card, the user may be offered to choose whether the user would like updates to the grid cards, which may be related to the establishment. Similarly, the user may also be asked whether the user is interested in promotional offers and whether the user would like to join a group of users that have bookmarked the same grid card. When a user bookmarks a grid card of an individual (e.g., a friend, relative, or acquaintance), the user may also be asked whether the user is interested in receiving updates to the grid card and/or wants to join group of those that have bookmarked the same grid card. Since a similar behavior happens whether the user is bookmarking a grid card of an individual, nonprofit organization, place of interest (e.g., a park or a beach) the user becomes accustomed to associating bookmarking with establishing a relationship, and understands that by bookmarking a store or a restaurant, for example, the user is establishing an ongoing relationship with the store or restaurant, and so the receipt of the updates to the grid card are likely to be desired and intentionally requested by the user.

FIG. 59C shows an example of the page of the grid card that is presented to the user if the user selects to join a group of those that bookmarked the grid card. If the user selects to receive promotional offers or to be kept informed, optionally, in an embodiment, the user is asked if it is OK to if the establishment associated with the grid card to have access to the demographic and or user information in exchange (so that the information sent can be more targeted to the user). Optionally, the grid card owner may be presented with an option to provide promotional information and/or grid card updates, without being provided with demographic or personal information.

Figure 60:
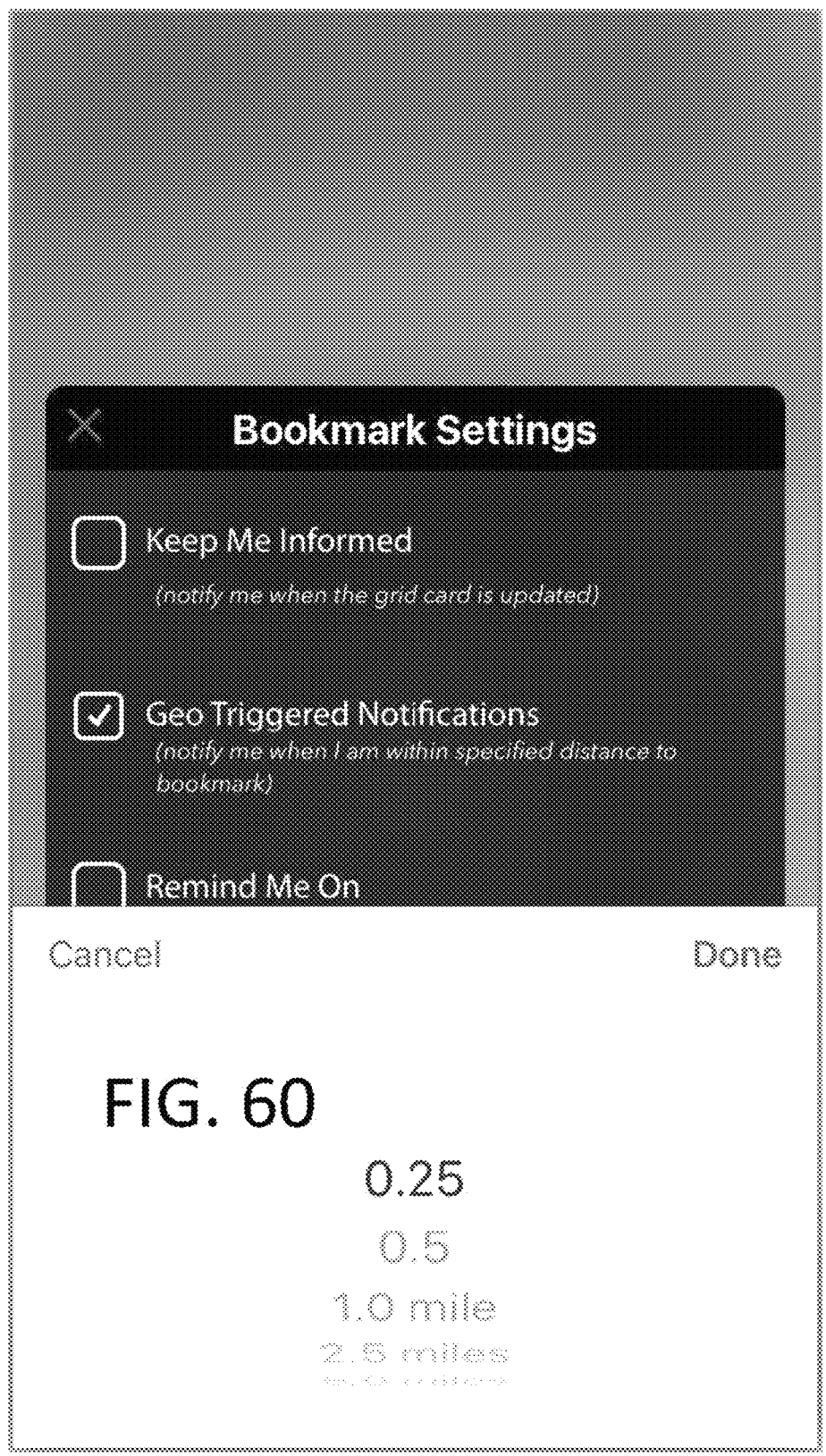
FIG. 60 shows a screenshot of settings that may be provided upon selecting Geo notifications, such as when traveling to the bookmarked location.

FIG. 60 shows a screenshot of another embodiment of setting options that may be provided to the user upon creating a bookmark. The settings include a keep me informed option, which if selected causes the user to receive updates to the grid card that was book marked. The settings also include an option for having notifications sent to the user when the user is within a user-chosen distance from the location associated with the bookmark. Another option provided is the user may select a specific time and/or date on which to get a reminder related to the grid card (perhaps a special even is happening at that location that the user would like to attend). Additionally, the user may be provided with an option to follow the user that created the grid card (perhaps the user that created the grid card frequently creates grid cards of different locations that are of the type that the user tends to like to visit). Any combination of the options in FIGS. 59-62 may be provided to the user. For example, the user may be provided all of the options listed in FIGS. 59-62 as choices that the user may select.

FIG. 60 shows a screenshot of settings that may be provided upon selecting Geo notifications, such as when traveling to the bookmarked location. In the embodiment of FIG. 60, the user may select to receive a notification at .25 miles, .5 miles, 1mile, 2.5 miles and/or 5 miles.

Figure 61:
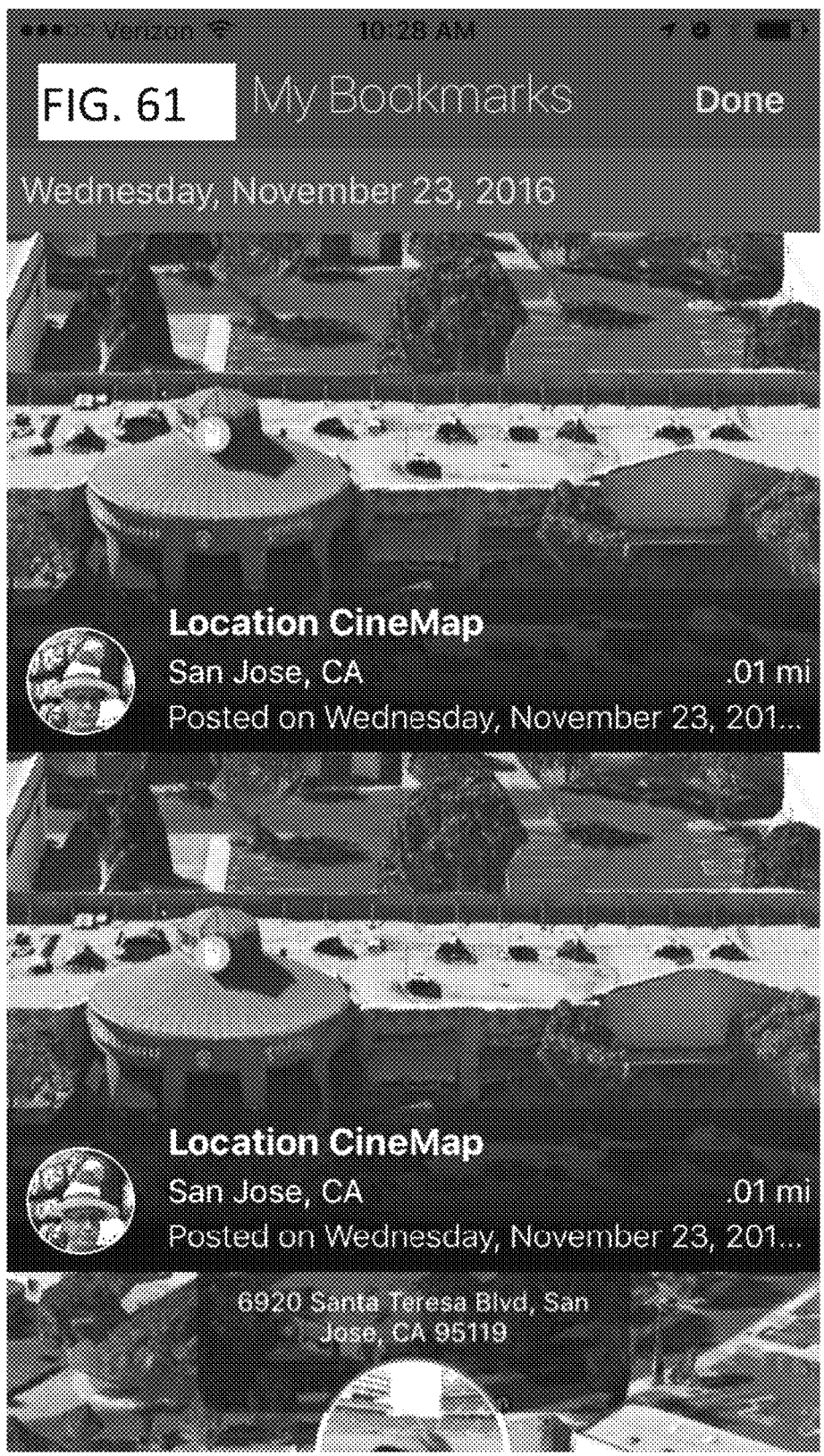
FIG. 61 shows a screenshot of page displayed having a list of bookmarks in a column.

FIG. 61 shows a screenshot of page displayed having a list of bookmarks in a column. When the user is finished viewing the bookmarks the user selects "Done."

Figure 62:
FIG. 62 shows two screenshots of a page having a list of bookmarks.

FIG. 62 shows two screenshots of a page having a list of bookmarks. The page is split into two halves on the top the user may view a list of grid cards that the user created and on the bottom, the user may view a list of the grid cards that the user bookmarked.

Figure 63:
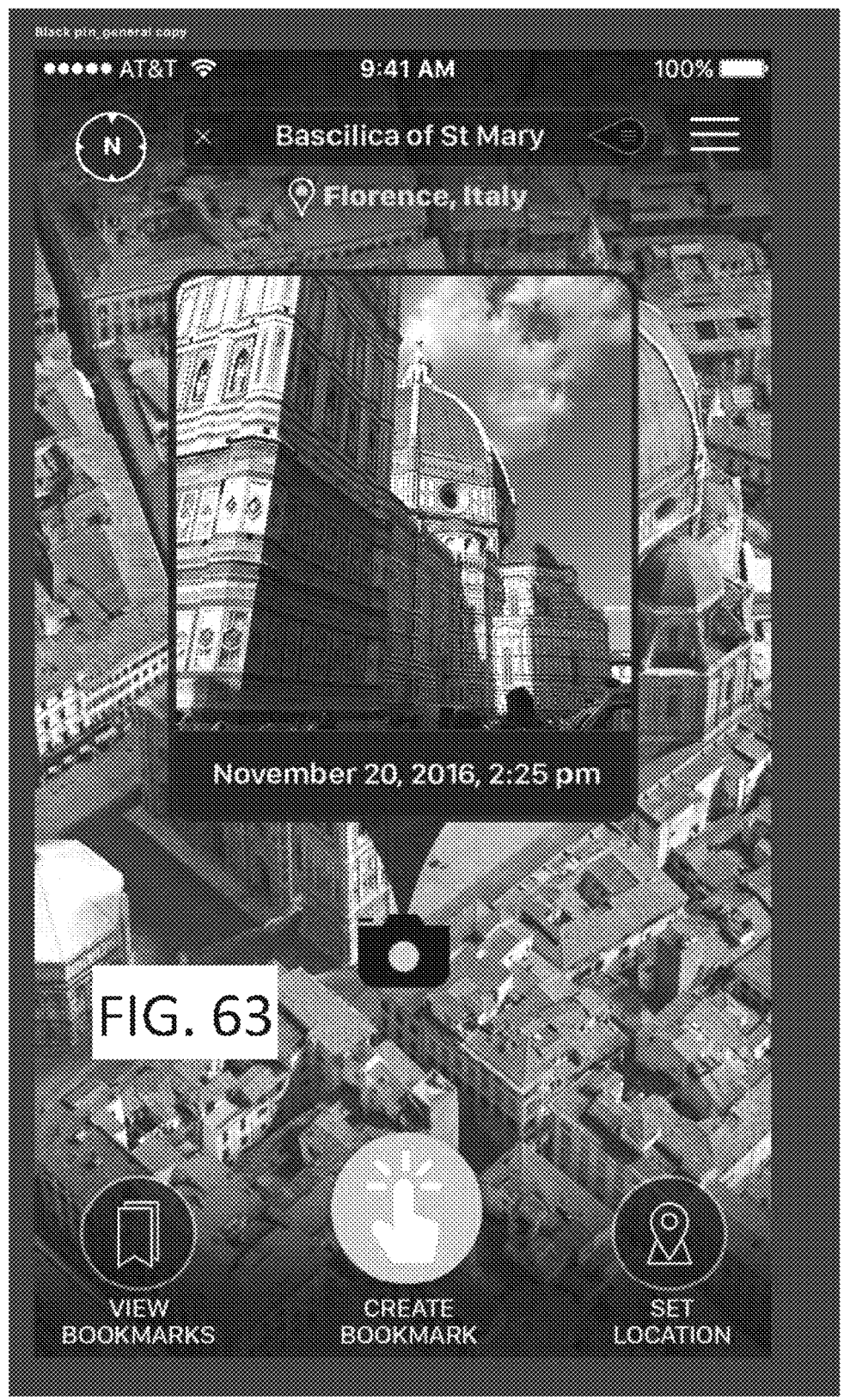
FIG. 63 shows a screenshot of a page showing a grid card, which includes an icon for viewing bookmarks.

FIG. 63 shows a screenshot of a page showing a grid card, which includes an icon for viewing bookmarks.
22-23

By bookmarking a grid card, a connection/communication channel is created to the owner of the grid card, where information is shared between the grid card owner and the user that selected the grid card (to the extent permitted by the user and the grid card owner), which can be thought of as intelligent bookmarking for the physical world or bookmarking relationships. In contrast, in the prior art, bookmarking and advertising are generally not associated with one another. After a user bookmarks a grid card, the owner of the grid card may (e.g., automatically) send updates about the location, or the one that bookmarked the location may send messages to the owner of the grid card, via the grid card.

Optionally, the establishment may have a live webcam, via which those that bookmarked the grid card may see what is currently happening at the location. As an example, if the owner of the grid card is a beach, the owner of the grid card may post, current whether conditions (such as surf conditions) and/or a webcam of the beach.

Optionally, when a user bookmarks a grid card, the user may be automatically given the option to be entered into, a user's group, which may be a group of users that have bookmarked the grid card. Using the group of those that have bookmarked the grid card, if some information about the establishment is not available (e.g., the webcam is down), a message may be sent asking if anyone of the users knows the information sought. Optionally, the message may only be sent to those who have bookmarked the location and are in a certain location (e.g., those that are currently present at the location). Thus, if for example, the webcam of a beach is down, a message could be sent to those at the beach asking what the surf conditions are currently. Also, as another example, if the grid card is associated with a meeting, those traveling to the meeting, upon arriving by plane in an airport (or upon arrivin at another location by other means), the user may send a message to only those that also bookmarked the meeting and that are at the airport (or other locations), so that those at the airport at the same time can share a ride.

After a grid card is bookmarked, the user can quickly find the grid card, by searching a list of bookmarked grid cards, and then send a notification that the user is on their way to visit the establishment associated with the bookmark, and provide the owner of the grid card access to the location of the user while the user is traveling to the location associated with the grid card and the establishment associated with the grid card, for example. The bookmarking process may be essentially the same whether the user is bookmarking grid card associated with an establishment or a grid cards of another user in that either way, the user receives updates to the grid card and possibly be entered into a group of user that have book marked the grid card of the same user. As a consequence a of the bookmarking the establishment may receive information when to expect to arrive at the location of the establishment and the workers of the establishment may are given time to make appropriate preparations for the user's arrival (e.g., and if the establishment is a restaurant, the restaurant, may have a table waiting for the user when the user arrives).

As a consequence of the results of the bookmarking being similar or the same whether the grid card belongs to another user or an establishment, the user expects that bookmarking a grid card of an establishment will lead to receiving updates to the grid card of the establishment (such as sales information). In contrast to Service Providers that follow the user's activities (without the user fully realizing that that is what is happening) and in contrast to bookmarks where the user is just more-easily able to find the item bookmarked, when the grid cards are bookmarked, the user knowingly and actively requests a two way sharing of information.

The cards created on the proximity grid may have two sides. Each grid card may contain information about the location and the entity associated with the location. On one side there may be a photo and some basic information, such as the date, time, and name of location, while the other side may include further information. The grid card may be initially established automatically, based on publicly available information. Alternatively, any user may establish a grid card. Upon creation of the grid cards, the proximity grid server may scrape information about current the current locations from various sources, such as Wikipedia, personal information stored in the system (e.g., phone number e-mail address name) listings of business, and public places, and automatically add the information to the gird card (which may be referred to as a proximim card or geo card), by default.

The entity associated with the grid may later take ownership of the grid card by establishing a membership in the proximity grid and/or entering information about the location and the establishment at the location. Upon taking ownership of a grid card or at the time a user is establishing a grid card, the user may be provided with an option to accept and/or remove any part of the information that was added automatically, in addition to providing fields for the user to add further information and/or comments.

The grid cards may be correlated with location on an electronic map, and presented as pins attached to the map, with a balloon or card attached to the pin providing information. The information about the grid cards and the electronic map, may be stored at a proximity server which correlates location information (such as the grid cards and GPS coordinates or other location coordinates indicative of a user's whereabouts) with the electronic map. The grid card may have some information about the establishment on the front of the grid card such as picture of the location, the address, the name of the establishment, type of establishment (e.g., a restaurant a law office a software company etc.), and some contact information. The grid card may also have other information on the back of the grid card, which may include multiple pages.

22-24
PROXIMITY GRID AND LOCATION SHARING

In an embodiment various locations in the proximity grid are represented by a grid card that contains information about the location. Searching the proximity grid, the user can find information about physical locations that are nearby to the current locations. Then the user can send a grid card showing the location having a photo and/or comments marking the location. The shared location may include sending a link to a cinemap, which may be automatically created or which the user may create prior to sending the location. The cinemap may be associated with the grid card.

SEND IT ONCE WITH SHARING LOCATIONS

In an embodiment, the user may be provided with a widget on the backside of the card, which may include a button (or other link) to select, and once the button is selected, another user is automatically provided with access to the user's current location. Based on the mpe of card, the back side of the card may contain different widgets, tailored for the mpe of relationship that the user and owner of the card are likely interested in.

For example, the backside of the card of a doctor, may include a widget for asking the doctor a question and a widget for scheduling an appointment. in addition to a widget that tracks the patient while the user is on the way to see the doctor, so that the doctor knows when to expect the patient to arrive. In an embodiment, both the patient and the doctor receive updates while the patient is traveling, so that the patient receives information about how close the patient is to the doctor to confirm to the patient that the patient is taking the correct route, as does the doctor thereby informing the doctor when the patient is likely to arrive.

The user may receive a request askin whether the user wants to provide that level of access or whether to just provide an alert when the user is close. So, a first user may send the grid card to a second user, (e.g., just before the second user starts the trip), and is asked to activate the tracking widget prior to leaving. Alternatively, the second user may on-their-own select the grid card of the first user, without the first user sending the grid card to the second user and the second user may decide to activate the tracking widget, so that the first user knows when to expect the second user. Either way, the second user may be provided with an option to select how long the second user wants to be tracked for. In addition to the first user getting a notification when the second user is close, both users receive a map showing each other where each is on the map.

To elaborate on the situation in which the second user selects the grid cad of the first user to get directions, in an embodiment, each card that has an owner has a contact person associated with the card. So, a user may select a card as a way of getting directions to the location. Then, when the user selects the card, the user may select an option that sends to the contact person information about the whereabouts of the user to help the contact person know when the user will arrive. A grid card may be selected by a user or sent to a user and the Grid cards may include an option for requesting directions.

For example, a doctor may select the grid card of a hospital at which the doctor needs to perform surgery. Then, an administrator of the hospital (the contact person of the grid card) may receive updates about where the doctor is located, so that the hospital administrator knows when the patient should be prepped for surgery. Similarly, a user wanting to visit a restaurant may select the card of the restaurant, so that restaurant may have a table waiting for the customer when the customer arrives and/or provide a promotional offer.

Before the card is owned, publicly available information about the establishment may still be provided automatically (such as the type of establishment and contact information and/or establishment A has specials X and Y available), and even if the card is not owned a user selecting the card may still get travel updates such as you are now within 1 mile of establishment A, which may be helpful in finding the establishment or whether to use the establishment. The Geo cards (which may be referred to as proximity cards) may scrape information about current the current locations from various sources, such as Wikipedia, personal information stored in the system (e.g., phone number e-mail address name) listings of business, and public places, and automatically add the information to the GeoCard (or proximity card or grid card), by default, and then give the user an option to accept and/or remove the information, in addition to providing fields for the user to add further information and/or comments. There may be incentives for the establishment of a grid card to take ownership of the grid card, by being given control of the content provided when a user selects the grid card. Optionally, there may be some widgets and options that are only available by paying a fee. The establishment associated with a grid card may be provided with analytical information associated with users that have bookmarked the grid card (so that the establishment has more information about the customer base of the establishment and how to adjust the products that are offered to increase sales). In an embodiment, each user is given control over how much information is provided to another user or to the owner of another grid card. The grid cards created may be kept personal and only available on the proximity grid to the creator and/or those users that the creator of the cards designate.

Optionally the grid cards may include a data container, which may be associated with a cinemap created (e.g. a balloon) which may include several pictures. The cards created on the proximity grid may have two sides. On one side there may be a photo and some basic information, such as the date, time, and name of location, while the other side may include further information.

In an embodiment, the system has an option for viewing photos prior to selecting the photos for adding the photos to a proximity/Geo card. In an embodiment, the photos are labeled with an indication as to whether the system has a location associated with the photo (so that the user knows whether the photo may be uploaded to the system immediately or whether the user needs to associate a location with the photo). Additionally, a filter may be provided for viewing only the photos that have been associated with a location.

PROXIMITY SERVER 122-241

Figure 64:
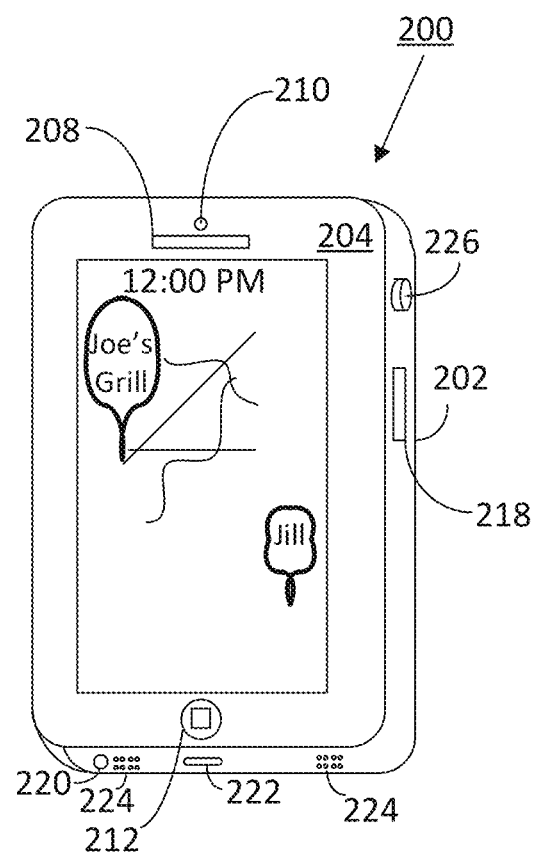
FIG. 64 shows an example of the user screen a user, by the name of Jill.
Figure 67:
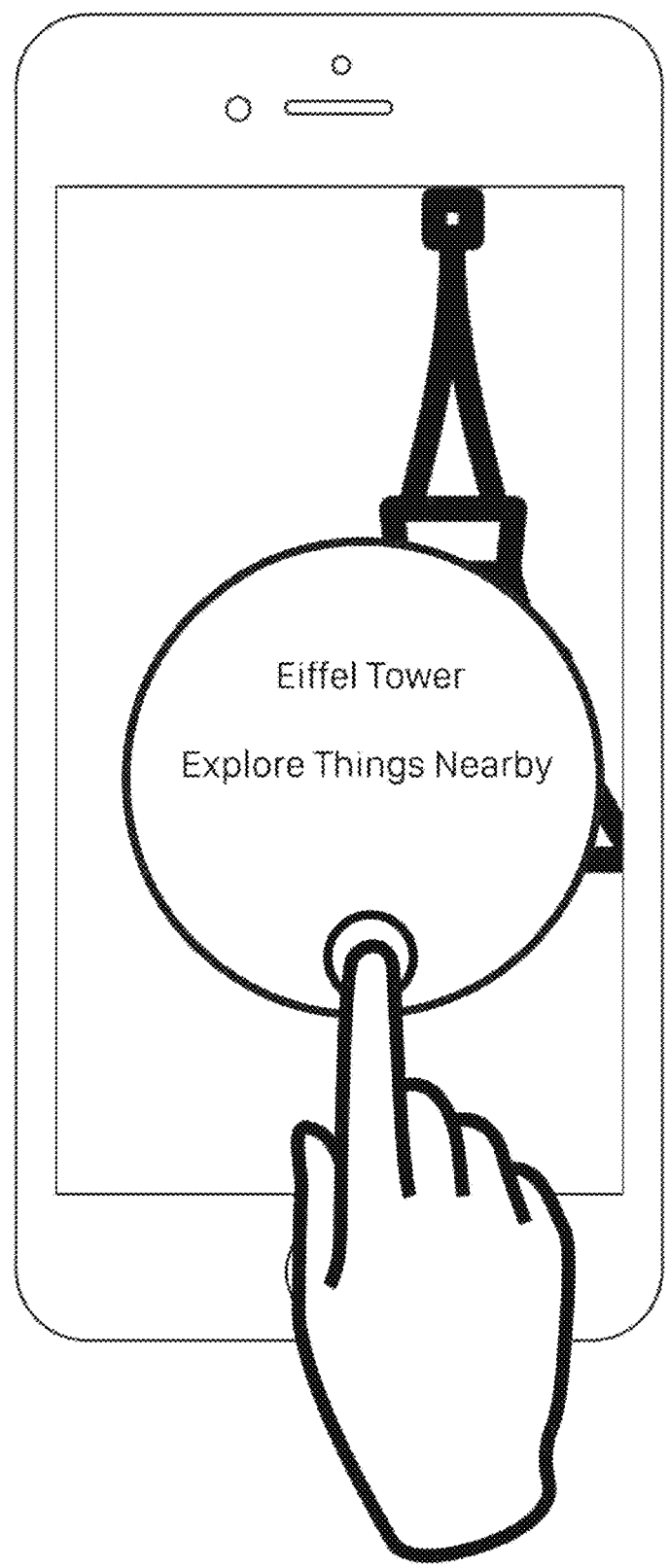
FIG. 67 shows a screenshot of an example of page via which the user may lookup information about nearby locations.

FIG. 64 shows an example of the user screen for a user, by the name of Jill, On the user screen. Jill's location is marked by a grid card and the location of a place of interest, Jack's grill, is also marked with another grid card. For example, the user of smart phone 200 may be Jill. Jill may select the grid card of Jack's Grill to get directions to Jack's grill and/or to get other information about Jack's Grill.

Figure 65:
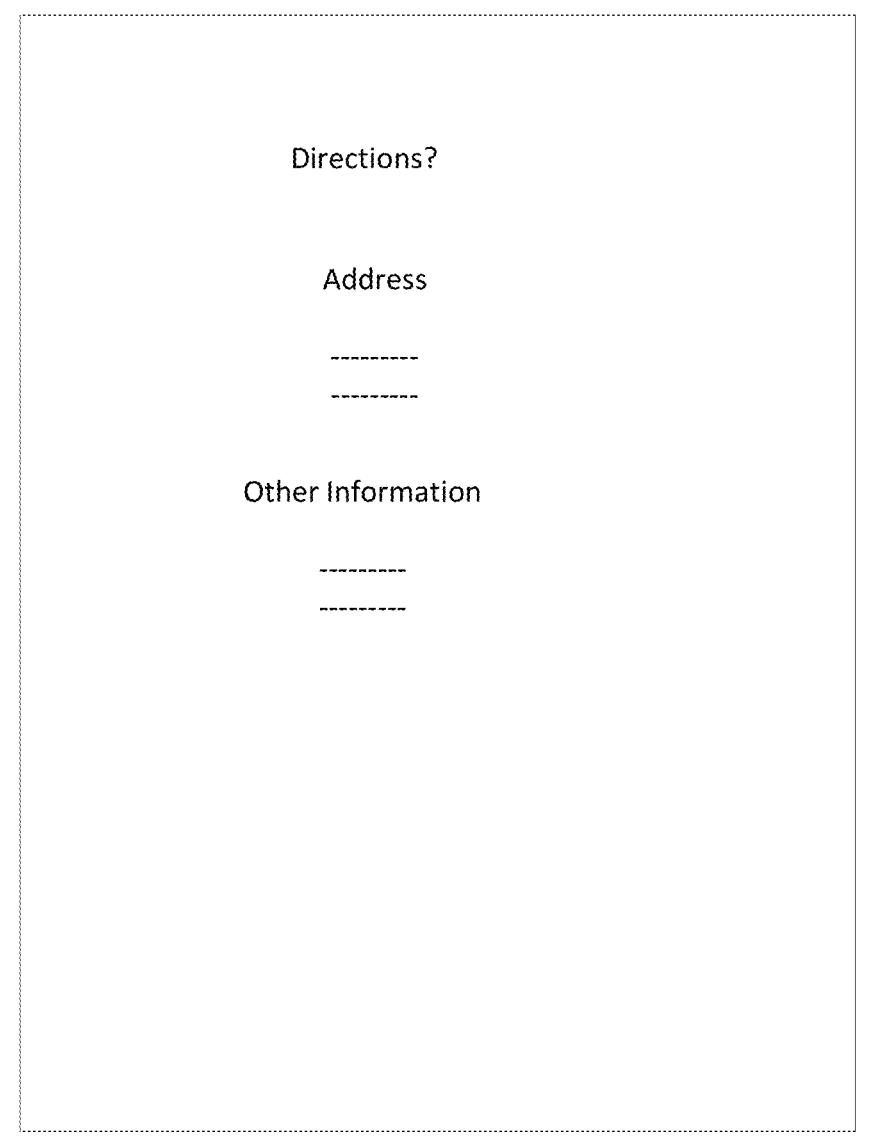

FIG. 65 shows an example of the backside of the grid card. FIG. 64 may include the address associated with the grid card, an option for requesting directions, and other information about the establishment or location associated with the grid card.

FIG. 66 shows and example of the page of the grid card that is presented to the user if the user asks for directions. The user may be presented with the directions. and an option to grant access to the owner of the grid card related to the user's location so that the grid card owner may monitor the user's progress in traveling to the location associated with the grid cards which may be helpful in determining when the user will arrive and/or allow the grid card owner to send useful messages, should the user appear to get lost or delayed. The user may be given options of determining the length of time during which the grid card owner may view the user's location, and/or the degree of access to the user's information, while the grid card owner is granted access while the user is traveling to the location associated with the grid card. For example, the grid card owner may only be sent an alert when the user is nearby and the use may choose not to grant nay other access to the user's information. As another example, the user may decide to grant the owner of the establishment access to the user's personal grid card, so that the owner of the establishment can see the user's location by observing the current location of the user's personal grid card on the map.

EXAMPLE EMBODIMENTS 22-12

Embodiment 1. A method comprising:
receiving, and the system, search information associated with a location, the system including at least a processor system having one or more processors and a memory system;
retrieving, by the processor system, information about an object associated with the location and search information;
presenting, by the system, the information about the object to the user, based on the retrieved information;
receiving, at the system, a series of locations, each location being associated with a view of the object.
automatically creating, by the system, a video of the object based on the series of locations received; and
storing by the system the video in searchable database within the memory system in association with the object and the location of the object.

Embodiment 2. A system comprising:
a processor system having one or more processors and memory system, the memory system storing one or more machine instructions, which when invoked causes the machine to implement a method including at least, receiving, and the system, search information associated with a location;
retrieving, by the processor system, information about an object associated with the location and search information;
presenting, by the system, the information about the object to the user, based on the retrieved information;
receiving, at the system, a series of locations, each location being associated with a view of the object;
automatically creating, by the system, a video of the object based on the series of locations received; and
storing, by the system, the video in searchable database within the memory system, in association with the object and the location of the object.

22-13

Embodiment 3. A method comprising:
at a first machine associated with a user, creating a grid card of a location associated with a proximity grid;
sending an indication, by the first machine, to a second machine associated with a second user that a proximity card is available for viewing indicating a location of interest to the first user; and
updating, by the first machine, the location information on the grid card as the location of interest changes.

Embodiment 4. A system comprising:
a server storing a proximity grid, the server including a processor system and a memory system;
the memory system storing one or more instructions, which when implemented cause the server to implement a method including at least
in response to user input creating a grid card indicating a location of interest;
receiving information requesting that a second user have access to the grid card;
receiving periodic updates to the location information associated with the grid card;
in response to receiving the updates, updating the location information associated with the grid card; and
allowing the second user to view the grid card, therein allowing the second user to view the updated location information and track changes in the location information.

22-19

Embodiment 5. A method comprising:
placing a physical sign at a location;
storing a grid card on a proximity grid at a server, the grid card including information about the location or an item at the location.

Embodiment 6. A system comprising:
a physical sign indicating that an item or location is on a proximity grid;
a server storing location information and grid cards having information about locations or items at locations, where in the grid cards include at least one grid card that is associated with the location or item associated with the physical sign; and the server storing one or more machine instructions, which when implemented cause the server, in response to receiving location information about a location within a predetermined proximity to the location associated with the physical sign, sending to machine that sent the location information a grid card associated with the physical sign.

Embodiment 7. A method comprising:
at a first machine associated with a user, creating a grid card of a location associated with a proximity grid;
sending an indication, by the first machine, to a second machine associated with a second user that a proximity card is available for viewing indicating a location of interest to the first user; and
updating, by the first machine the location information on the grid card as the location of interest changes.

Embodiment 18. A system comprising:
a server storing a proximity grid, the server including a processor system and a memory system;
the memory system storing one or more instructions, which when implemented cause the server to implement a method including at Last
in response to user input creating a grid card indicating a location of interest;
receiving information requesting that a second user have access to the grid card;
receiving periodic updates to the location information associated with the grid card;
in response to receiving the updates, updating the location information associated with the grid card; and
allowing the second user to view the grid card, therein allowing the second user to view the updated location information and track changes in the location information. 22-14

Embodiment 19. A method comprising:
at a first machine associated with a first user, creating a bookmark of a location associated with a proximity grid, the bookmark being associated with a card that is associated with the location and with the proximity grid;
designating, by the first machine a second user with whom to share the bookmark;
updating, by the first machine, the bookmark;
as a result of the designating and updating, automatically sending, by the first machine updates to the bookmark, to a second machine associated with the second user.

Embodiment 10. A method comprising:
receiving at a server associated with a proximity, a request, from a machine of a first user, to associate a geo card with a bookmark of a location associated with a proximity grid, the bookmark being associated with the card;
receiving at the server, from the machine of the first user a request to share the bookmark with another user,
in response, designating by the server, the second user as sharing the bookmark of the first user;
receiving an update to the bookmark, at the server from the first machine; and
as a result of the designating, in response to receiving the update to the bookmark, sending update to the bookmark to a second machine associated with the second user; or
as a result of the designating and updating, automatically sending, by the first machine updates to the bookmark, to a second machine associated with the second user. 22-15

Embodiment 11. A method comprising:
at a first machine associated with a user, adding information to a community grid card that is associate with a location on a proximity grid and is available to the public;
adding the information sent to that was added to the community grid card to the billboard.

Embodiment 12. A system comprising:
a physical billboard having information posted thereon;
a server storing a proximity grid and storing a community grid card, accessible to a group of users, the community grid card being associated with a location on the proximity grid that is also associated with a physical location associated with the physical billboard, wherein information posted on the physical billboard is also posted on the community grid card. 22-17

Embodiment 13. A method comprising:
receiving at a machine a page having a collection of selectable templates for grid cards;
in response to the receiving sending, by the machine a selection of one of the templates to a server,
in response to the sending, receiving a information representing a grid card, the filed provided as part of the grid card and the type of information in the grid being determined by the template selected;
sending a message to store the grid card in associated on a location on the proximity grid stored in a server.

Embodiment 14. A system comprising:
a server having a processor system and a memory system;
the memory system storing a proximity grid associated with grid card and templates for grid cards;
the memory system also storing one or more machine instructions, which when invoked cause a method to be implemented including at least
sending to a user an option for choosing a template for a grid card,
in response to receiving a selection of a template of a grid card, creating a grid card; and
automatically accessing a database and retrieving information of fields of the grid card, the fields included as part of the grid card and the information retrieved depending the template selected.
22-20

Embodiment 15. A method comprising:
receiving, and the system, search information associated with a location, the system including at least a processor system having one or more processors and a memory system;
retrieving, by the processor system; information about an object associated with the location and search information;
presenting, by the system, the information about the object to the user, based on the retrieved information;
receiving, at the system a series of locations, each location being associated with a view of the object;
automatically creating, by the system, a video of the object based on the series of locations received; and
storing, by the system, the video in searchable database within the memory system, in association with the object and the location of the object.

Embodiment 16. A ystem comprising:
a processor system having one or more processors and memory system, the memory system storing one or more machine instructions, which when invoked causes the machine to implement a method including at least, receiving, and the system, search information associated with a location;
retrieving by the processor system information about an object associated with the location and search information;
presenting, by the system, the information about the object to the user, based on the retrieved information;
receiving, at the system, a series of locations, each location being associated with a view of the object;

automatically creating, by the system, a video of the object based on the series of locations received; and storing, by the system the video in searchable database within the memory system, in association with the object and the location of the object.

Embodiment 17. A method comprising:

receiving, at a server, a request, the request including at least location information indicative of a location of the device that sent the request and an indication to create a grid card;

matching by the server the location information received and a location on a map;

adding, by the processor system, an information container to the map, the information container being a grid card displaying the information received, when the map is viewed;

sending, to the device, an image of the map that includes the information container.

Embodiment 18. The method of Embodiment 17, the grid card having a backside and a front side, the front side including an image and the backside including information about the location.

Embodiment 19. The method of Embodiment 18, the request including the image and including the information for that is on the backside of the grid card.

Embodiment 20. The method of Embodiment 17, sending to a user device a page for entering the request to create a grid card.

Embodiment 21. The method of Embodiment 17, sending to a user device a page for requesting to add information to a grid card.

Embodiment 22. The method of Embodiment 21, the page including a link for adding a website associated with the location.

Embodiment 23. The method of Embodiment 21, the page including a tool for adding a street view associated with the location.

Embodiment 24. The method of Embodiment 17, the grid card automatically including a default street view associated with the location, and the method further including sending to a user device a page showing the grid card with the street view and a tool for editing the street view.

Embodiment 25. The method of Embodiment 17, sending to a user device a page for requesting to add a text box to the grid card.

Embodiment 26. The method of Embodiment 17, the grid card automatically including a default street view associated with the location, and the method further including sending to the user device a page showing the grid card with the street view and a tool for editing the street view.

Embodiment 27. The method of Embodiment 26, tool for editing the street view including navigation buttons for changing the street view, but virtually navigating within the street view therein changing an appearance of the street view, and a capture link, which when activated captures the street view created by virtually navigating and causes the user device to send to the server an indication to includes the street view created and captured on the grid card.

Embodiment 28. A method comprising:

activating a function on a user device; and in response, (1) the user device automatically collecting location information;

(2) automatically sending, from a user device to a server, a request, the request including at least the location information indicative of a location of the user device that sent the request and an indication to create a grid card; and (3) receiving from the server at the user device, a copy of the page showing the grid card located on a map and a pin associating the grid card with the location.

Embodiment 29. The method of Embodiment 28, the grid card including an information container, the information container being a grid card displaying the information received, when the map is viewed, Embodiment 30. The method of Embodiment 28, the grid card having a backside and a front side, the front side including an image and the backside including information about the location.

Embodiment 31. The method of Embodiment 28, in response to the activating of the function automatically sending an image for the grid card and the copy of the page showing the grid card, including the image as part of the grid card.

Embodiment 32. The method of Embodiment 31, sending to a user device options for editing the grid card.

Embodiment 33. The method of Embodiment 32, the page including a link for adding a website associated with the location to the grid card.

Embodiment 34. The method of Embodiment 32, the page including a tool for adding a street view associated with the location.

Embodiment 35. The method of Embodiment 34, the page including a tool for adding a text box to the grid card.

Embodiment 36. The method of Embodiment 28, the grid card automatically including a default street view associated with the location, and the method further including receiving at the user device a page showing the grid card with the street view and a tool for editing the street view.

Embodiment 37. The method of Embodiment 36, the tool for editing the street view including navigation buttons for changing the street view, but virtually navigating within the street view therein changing an appearance of the street view, and a capture link, which when activated captures the street view created by virtually navigating and sends to the server an indication to include the street view created and captured on the grid card.

Embodiment 38. A method comprising:

bookmarking by a first machine, a grid card associated with a location, the first machine including at least a processor system including at least one processor, a memory system that is connected to the processors system, the memory system storing information that is accessible to the processor system; the information that is accessible being stored on one or more nonvolatile machine readable media; and as a result of the bookmarking, receiving at the first machine, from a second machine, updates about of information associated with the location, Embodiment 39. A system comprising:

a first machine including at least, a processor system including at least one processor a memory system that is connected to the processors system, the memory system storing information that is accessible to the processor system; the information that is accessible being stored on one or more nonvolatile machine readable media, the system being associated with a first user, the information including one or more machine instructions, which when invoked cause the processor system to implement a method including at least, bookmarking by a first machine a grid card associated with a location; and as a result of the bookmarking receiving at the first machine, from the second machine, updates about of information associated with the location.

22-24

Embodiment 40. A method comprising:

at a first machine associated with a user selecting a grid card of a location associated with a proximity grid;

sending an indication, by the first machine, to a second machine associated with a second user that the grid card has been selected; and updating, by the first machine, information associated with a location of the first user relative to a location of the second user;

providing the information that was updated to an interface on the first machine where the information that was updated is viewable to the first user; and sending the information that was updated to the second machine.

Embodiment 41. The method of Embodiment 40 the method further comprising: receiving updates from the second machine of information related to an establishment associated with the grid card.

Embodiment 42. A system comprising:
a first machine including at least,
a processor system including at least one processor,
a memory system that is connected to the processors system, the memory system storing information that is accessible to the processor system, the information that is accessible being stored on one or more nonvolatile machine readable media, the system being associated with a first user, the information including one or more machine instructions, which when invoked cause the processor system to implement a method including at least,
selecting, via the system, to a first machine a grid card of a location associated with a proximity grid associated with a second machine, which in turn is associated with a second user;
sending, via the system, an indication to the second machine associated, that the grid card has been selected; and
updating, by the system information associated with a location of the first user relative to a location of the second user,
providing the information that was updated to an interface on the system, where the information that was updated is viewable to the first user; and
sending, by the system, the information that was updated to the second machine.

Extensions or Alternatives

In general, each of the embodiments and each aspect of each embodiment disclosed in this specification may be used together in any combination or separately from one another. Each embodiment disclosed herein may be used or otherwise combined with any of the other embodiments disclosed. Any element of any embodiment may be used in any embodiment.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:

1. A method comprising:
detecting, by a detector, information related to an orientation of a mobile device system, the mobile device system including the detector, a processor system including one or more processor, and nonvolatile memory system;
determining, by the mobile device system, that the orientation information detected corresponds to a predetermined orientation that is associated with actively collecting information related to an event, where the information related to the event is different than information that is automatically collected as event stamp information, the event stamp information including a location;
in response to the determining, automatically by the processor system, collecting the event stamp information; and
at least temporarily storing, by the processor system the event stamp information in the nonvolatile memory.

2. The method of claim 1, the mobile device system being a wearable device.

3. The method of claim 1, the mobile device system being a smartphone.

4. The method of claim 1, further comprising creating, by the processor system an indication that the mobile device system is collecting the event stamp information.

5. The method of claim 4, the creating of the indication including at least causing, via a vibrator, the mobile device system to vibrate.

6. The method of claim 4, the creating of the indication including at least causing, via a microphone, a sound to be emitted.

7. The method of claim 4, the creating of the indication including at least causing, via a display, to display an image indicating that the event stamp information is being collected.

8. The method of claim 4, the creating of the indication including at least creating
an indication that the mobile device system has started collecting the event stamp information;
determining that the collecting of the event stamp information is complete; and
indicating that that the collecting of the event stamp information is complete.

9. The method of claim 1, the information related to the orientation of a mobile device system including at least an information related to an indication that a change in orientation occurred.

10. The method of claim 1, the information related to the orientation of a mobile device system including at least an information related to orientating the mobile device system to face towards the user.

11. The method of claim 1, the mobile device system being a wearable device that is worn on a wrist of the information related to the orientation of a mobile device system including at least information related to turning a wrist of the user.

12. The method of claim 11, the information related to the orientation of a mobile device system including further at least information related to bending an arm having the wrist towards the user in combination with turning the wrist.

13. The method of claim 1, the method further including detecting by a detector that a display of the mobile device system is facing the user.

14. The method of claim 11, the information related to the orientation of a mobile device system including further at least information related to a placement of the mobile device system at a height of a head of the user.

15. The method of claim 1, further including detecting by a detector that a viewer of the mobile device system is facing the user, detecting a camera lens of the mobile device system facing away from the user.

16. The method of claim 1, further including detecting by a detector an orientation of the user's head.

17. The method of claim 1, further including determining that a picture was taken and automatically adding the event information to the picture.

18. The method of claim 1, the storing including storing the event stamp in nonvolatile memory a collection of event stamps.

19. A method comprising:
- detecting, by a detector, information related to an orientation of a mobile device system, the mobile device system including the detector, a processor system including one or more processor, and nonvolatile memory system;
- determining, by the mobile device system, that the orientation information detected corresponds to a predetermined orientation for collecting event stamp information, the event stamp information including a location;
- in response to the determining, automatically by the processor system, collecting the event stamp information; and
- at least temporarily storing, by the processor system the event stamp information in the nonvolatile memory, the mobile device system including a camera, and the information related to the orientation of a mobile device system including at least information related to lifting the mobile device system so as to be oriented parallel to the user's face with the camera facing away from the user's face.

20. A method comprising:
- detecting, by a detector, information related to an orientation of a mobile device system, the mobile device system including the detector, a processor system including one or more processor, and nonvolatile memory system;
- determining, by the mobile device system, that the orientation information detected corresponds to a predetermined orientation for manually collecting event stamp information, the event stamp information including a location;
- in response to the determining, automatically by the processor system, collecting the event stamp information; and
- at least temporarily storing, by the processor system the event stamp information in the nonvolatile memory.

\* \* \* \* \*